US011520611B2

(12) United States Patent
Durham et al.

(10) Patent No.: US 11,520,611 B2
(45) Date of Patent: Dec. 6, 2022

(54) SECURE PUBLIC CLOUD USING EXTENDED PAGING AND MEMORY INTEGRITY

(71) Applicant: Intel Corporation, Santa Clara, CA (US)

(72) Inventors: David Durham, Beaverton, OR (US); Siddhartha Chhabra, Portland, OR (US); Geoffrey Strongin, Tigard, OR (US); Ronald Perez, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 685 days.

(21) Appl. No.: 16/370,924

(22) Filed: Mar. 30, 2019

(65) Prior Publication Data
US 2020/0057664 A1    Feb. 20, 2020

Related U.S. Application Data

(60) Provisional application No. 62/719,979, filed on Aug. 20, 2018.

(51) Int. Cl.
*G06F 9/455*    (2018.01)
*G06F 12/1009*    (2016.01)
*H04L 9/32*    (2006.01)

(52) U.S. Cl.
CPC ...... *G06F 9/45545* (2013.01); *G06F 9/45558* (2013.01); *G06F 12/1009* (2013.01);
(Continued)

(58) Field of Classification Search
CPC ............ G06F 9/45545; G06F 9/45558; G06F 12/1009; G06F 2209/5011; G06F 9/455; H04L 9/32; H04L 9/3242
See application file for complete search history.

(56) References Cited

U.S. PATENT DOCUMENTS 10,846,117 B1 * 11/2020 Steinberg ................ G06F 9/544
2011/0202919 A1 * 8/2011 Hayakawa .......... G06F 9/45558
718/1
(Continued)

FOREIGN PATENT DOCUMENTS

EP    3367287 A1    8/2018

OTHER PUBLICATIONS

Chen et al., "Overshadow a Virtualization-Based Approach to Retrofitting Protection in Commodity Operating Systems", Acm Sigarch Computer Architecture News, Acm Special Interest Group on Computer Architecture, vol. 36, No. 1, Mar. 1, 2008, pp. 2-13.
(Continued)

*Primary Examiner* — Jung W Kim
*Assistant Examiner* — Howard H. Louie
(74) *Attorney, Agent, or Firm* — Nicholson De Vos Webster & Elliott LLP

(57) ABSTRACT

A host Virtual Machine Monitor (VMM) operates "blindly," without the host VMM having the ability to access data within a guest virtual machine (VM) or the ability to access directly control structures that control execution flow of the guest VM. Guest VMs execute within a protected region of memory (called a key domain) that even the host VMM cannot access. Virtualization data structures that pertain to the execution state (e.g., a Virtual Machine Control Structure (VMCS)) and memory mappings (e.g., Extended Page Tables (EPTs)) of the guest VM are also located in the protected memory region and are also encrypted with the key domain key. The host VMM and other guest VMs, which do not possess the key domain key for other key domains, cannot directly modify these control structures nor access the protected memory region. The host VMM, however, using VMPageIn and VMPageOut instructions, can
(Continued)

build virtual machines in key domains and page VM pages in and out of key domains.

10 Claims, 54 Drawing Sheets

(52) U.S. Cl.
CPC .............. *H04L 9/32* (2013.01); *H04L 9/3242* (2013.01); *G06F 2209/5011* (2013.01)

(56) References Cited

U.S. PATENT DOCUMENTS

| | | | |
|---|---|---|---|
| 2012/0179909 A1* | 7/2012 | Sagi | H04L 9/0872 713/167 |
| 2017/0139840 A1* | 5/2017 | Klein | G06F 3/0673 |
| 2017/0220466 A1* | 8/2017 | Gupta | G06F 12/084 |
| 2018/0046823 A1 | 2/2018 | Durham et al. | |
| 2018/0060249 A1* | 3/2018 | Tsirkin | G06F 9/445 |

OTHER PUBLICATIONS

European Search Report and Search Opinion, EP App. No. 19183502.4, dated Dec. 13, 2019, 10 pages.
Office Action, EP App. No. 19183502.4, dated Jan. 11, 2021, 4 pages.
Office Action, EP App. No. 19183502.4, dated Dec. 16, 2021, 8 pages.

\* cited by examiner

SECURE PUBLIC CLOUD USING EXTENDED PAGING AND MEMORY INTEGRITY

CROSS-REFERENCE TO RELATED APPLICATIONS

This application claims priority to U.S. Provisional Patent Application No. 62/719,979, filed on Aug. 20, 2018, in the name of David Durham, Siddhartha Chhabra, Geoffrey Strongin, and Ronald Perez, entitled "Secure Public Cloud Using Extended Paging and Memory Integrity," the disclosure of which is hereby incorporated by reference.

TECHNICAL FIELD

Embodiments relate to security of a public cloud, and in particular, enabling a consumer of public cloud services to ensure that the consumer's processes executing in the cloud and the consumer's private data are secured from access and modification by others, including the public cloud services provider.

BACKGROUND

The term "cloud computing" is used to describe network-based computing (typically over the Internet). According to Wikipedia, "cloud computing provides shared processing resources and data to computers and other devices on demand. Cloud computing is a model for enabling ubiquitous, on-demand access to a shared pool of configurable computing resources (e.g., networks, servers, storage, applications and services), which can be rapidly provisioned and released with minimal management effort. Cloud computing and storage solutions provide users and enterprises with various capabilities to store and process their data in third-party data centers. Cloud computing relies on sharing of resources to achieve coherence and economy of scale, similar to a utility (like the electricity grid) over a network." (Source: Wikipedia, https://en.wikipedia.org/wiki/Cloud_computing, visited Aug. 11, 2016, citations omitted.)

The present availability of high-capacity networks, low-cost computers and storage devices as well as the widespread adoption of hardware virtualization, service-oriented architecture, and autonomic and utility computing have led to a growth in cloud computing. Companies can scale up by requesting additional resources from cloud services provider as computing needs increase and then scale down again as demands decrease.

Cloud computing provides resources as services. "Cloud-computing providers offer their 'services' according to different models, of which the three standard models per the National Institute of Standards and Technology (NIST) are Infrastructure as a Service (IaaS), Platform as a Service (PaaS), and Software as a Service (SaaS). These models offer increasing abstraction; they are thus often portrayed as layers in a stack, with infrastructure-as-a-stack serving as the bottom layer; platform-as-a-service serving as the middle layer; and software-as-a-service serving as the top layer. These layers can be implemented independently of one another. For example, one can provide SaaS implemented on physical machines (bare metal), without using underlying PaaS or IaaS layers; and conversely one can run a program on IaaS and access it directly, without wrapping it as SaaS." (Source: Wikipedia, https://en.wikipedia.org/wiki/Cloud_computing, visited Aug. 11, 2016, citations omitted.)

"The NIST's definition of cloud computing defines the service models as follows:

Software as a Service (SaaS). The capability provided to the consumer is to use the provider's applications running on a cloud infrastructure. The applications are accessible from various client devices through either a thin client interface, such as a web browser (e.g., web-based email), or a program interface. The consumer does not manage or control the underlying cloud infrastructure including network, servers, operating systems, storage, or even individual application capabilities, with the possible exception of limited user-specific application configuration settings.

Platform as a Service (PaaS). The capability provided to the consumer is to deploy onto the cloud infrastructure consumer-created or acquired applications created using programming languages, libraries, services, and tools supported by the provider. The consumer does not manage or control the underlying cloud infrastructure including network, servers, operating systems, or storage, but has control over the deployed applications and possibly configuration settings for the application-hosting environment.

Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, and deployed applications; and possibly limited control of select networking components (e.g., host firewalls)." (Source: Wikipedia, https://en.wikipedia.org/wiki/Cloud_computing, visited Aug. 11, 2016, citations omitted.)

One enabling technology for cloud computing is virtualization. "Virtualization software separates a physical computing device into one or more 'virtual' devices, each of which can be easily used and managed to perform computing tasks. Hardware virtualization is the virtualization of computers as complete hardware platforms, certain logical abstractions of their componentry, or only the functionality required to run various operating systems. Virtualization hides the physical characteristics of a computing platform from the users, presenting instead another abstract computing platform," often referred to as a 'virtual machine.' (Source: Wikipedia, https://en.wikipedia.org/wiki/Hardware_virtualization, visited Aug. 11, 2016, citations omitted.) The software that controls virtualization is referred to as a "hypervisor" or "virtual machine monitor." The provisioning and execution of a hypervisor/virtual machine monitor to create virtual machines on behalf of the consumer is an example of a service provided by a public cloud services provider.

DETAILED DESCRIPTION

Figure 1:
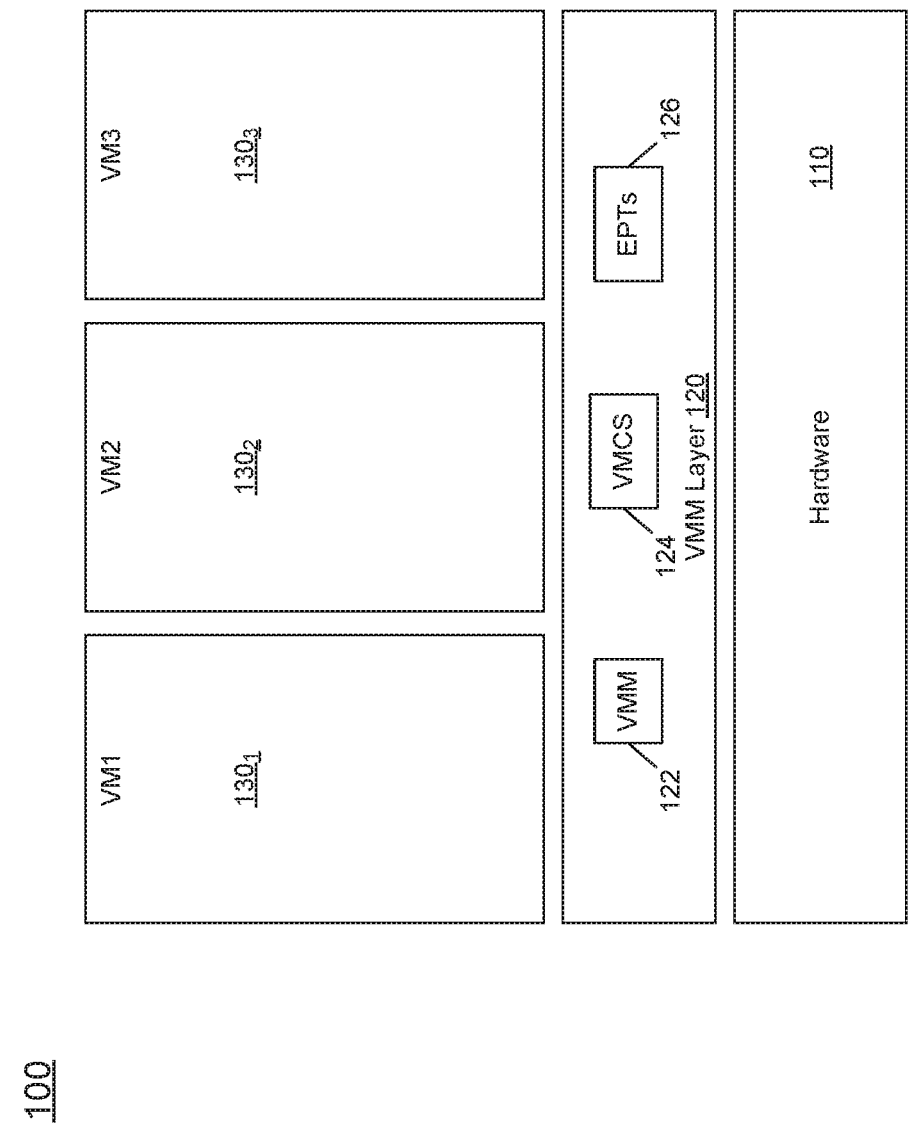
FIG. 1 is a block diagram showing a typical virtual machine environment.

In known virtualized environments today, a host Virtual Machine Monitor (VMM)/hypervisor (which shall be referred to as simply a "VMM" or a "host VMM" hereinafter) has full control over the guest virtual machines (VMs) that the host VMM manages. The host VMM can read/write guest VM memory, modify guest VM control flow (single step, rewind, repeat, debug), read/modify guest VM register state, read/modify guest VM control structures, and so on. However, this complete control over the execution of the guest VM poses a security risk that the host VMM is compromised and may modify the guest VM such that consumer's secrets and data residing within the guest VM are exposed.

In a typical virtualized environment, with a switch from one virtual machine to another, data structures that pertain to the execution state of the virtual machine are modified by the VMM. These data structures may include a Virtual Machine Control Structure (VMCS) and memory mappings (e.g., Page Tables and Extended Page Tables (EPTs). The VMCS is a data structure in memory that exists once for each logical processor for each guest VM, while the guest VM is managed by the host VMM. In a multi-processor system, each processor simultaneously executing the guest VM may have a unique VMCS. With every change of the execution context between different VMs, the VMCS is restored for the currently-executing VM, defining the state of the VM's virtual processor. When the execution context switches (VMExits) from a guest VM back to the host VMM, the same VMCS structure is used to restore the host's processor state from the host state area of the VMCS.

The operating system for a guest VM will form its own memory mappings between virtual and guest physical memory addresses (GPAs) using its own page tables. The VMM then uses extended page tables (EPTs) to map guest physical addresses (GPAs) to the actual physical addresses (PAs) used by hardware to access physical memory. However, these VMM controlled memory mappings can be used by the VMM to compromise a guest VM.

The disclosure presented herein introduces a new model for operation of the host VMM where the host VMM operates "blindly," without the ability to access data within a guest VM or the ability to access directly control structures that control execution flow of the guest VM. Guest VMs execute within a protected region of memory that even the host VMM cannot access. In one embodiment, the protected region of memory in which a guest VM executes is implemented as a key domain, which is encrypted with a consumer-provided key domain key. Key domains are described in detail with respect to FIGS. 1-30 below. In another embodiment, the protected region of memory is implemented using range registers, where a designated register blocks the host VMM (and other software) from accessing a guest VM's protected memory region. For purposes of this application, the guest VM's protected memory region will be described with respect to key domains, although the techniques described herein are applicable to protected memory regions implemented using other techniques to make the consumer's guest VM inaccessible to the host VMM.

Virtualization data structures that pertain to the execution state (e.g. VMCS) and memory mappings of the guest VM are also located in the protected memory region (key domain). These virtualization data structures are encrypted with the key domain key. The host VMM and other guest VMs, which do not possess the key domain key for other key domains, have no access to modify directly these control structures nor access the protected memory region.

To enable the host VMM to manage execution of guest VMs without directly modifying the control structures of the guest VMs, another type of guest VM, referred to herein as a "guest agent VM," or simply, "agent," is introduced. The host VMM launches an agent to operate within the protected key domain in which the guest VM executes, working with the guest VM to protect the guest VM from tampering. In one embodiment, the virtualization environment implements policies that enable the agent to access and modify the control structures that control execution flow and register state of other guest VMs on behalf of the host VMM. By modifying other guest VM's control structures, the agent can perform such functions as loading a consumer-supplied image into the guest VM and creating or modifying additional VMCSs and EPTs for multiple guest VMs within a protected memory region (referred to herein as a key domain). Note that the functionality provided in traditional virtualization environments by the host VMM is implemented instead by the agent upon request by the host VMM, making the agent an intermediary for the host VMM Furthermore, using the agent as an intermediary between the host VMM and the guest VM allows the agent to validate that the VMM does not misconfigure the guest VM to leak confidential data, inject code or data, or modify the execution flow of the guest VM. In addition, the techniques disclosed herein enable mutual verification, where the host VMM can be assured that the guest VM cannot affect host VMM state, while at the same time the guest VM is assured that the host VMM cannot access or affect guest VM state.

Thus, in one embodiment, the EPT control structures may also be placed within the protected memory of a guest VM, inaccessible by the host VMM. To prevent a guest VM from undermining the security of the host VMM by maliciously modifying the EPTs, a running guest VM should not be able to modify its own EPTs. Another trusted VM with another VMCS may be given access to modify the EPTs of another guest VM, but not given the ability to modify its own EPTs. Alternatively, in an embodiment with a single guest VM, the guest VM may use its own memory encryption key (key domain key) to encrypt memory structures on behalf of the host VMM. The guest VM then returns the resulting ciphertext to the host VMM for installation into the correct memory locations on the guest VM's behalf under the host VMM's control.

Using a Hash Key Domain (HashKD) instruction, the host VMM can verify that the guest-created data structures, such as EPTs, match the host VMM's expectations and do not allow the guest VM to access the host's or other guest VM's memory space. The HashKD instruction does not reveal the memory contents or secrets of the guest VM, but produces a representative SHA hash value that can be used by the host VMM to verify the memory contents without invoking the guest VM. For example, if the HashKD instruction produces a value that matches an expected hash value for the Extended Page Tables (EPTs), the host VMM is assured that the memory was correctly configured by the guest VM and can safely launch the guest VM.

In one implementation consistent with the present disclosure, Intel®'s Virtualization Technology (VT) and Trusted Execution Technology (TXT) are used in conjunction with a protected memory range inaccessible by the VMM (but originally accessible to TXT), or memory encryption technology such as Intel®'s Total Memory Encryption (TME), TME with Integrity (TMEi) or Memory Encryption Engine (MEE). This embodiment removes the public cloud services provider's Virtual Machine Monitor (VMM)/hypervisor code from the Trusted Code Base (TCB) of the guest virtual machine (VM)/workload. These techniques protect the consumer's workload from access by the host VMM yet enable the host VMM to retain full control of the platform and manage guest virtual machines running on the platform.

Memory encryption technology protects guest VM workloads from physical attacks and prevents the host VMM from accessing the VM's (encrypted) memory. Neither the cloud service provider's software, administrators, nor anyone with physical access to the cloud service provider's servers can access or modify protected guest VMs.

The present disclosure prevents exposure of consumer data contained within a guest virtual machine by protecting the consumer's data from access by the cloud services provider, by the host VMM, by other guest VMs, by administrators or others with physical access, by governments, and so on. The protection provided using the techniques described herein effectively provides the same level of confidentiality and security as the consumer would have running the same workload in a private cloud (on premise). A mutual trust relationship is established between the consumer and the public cloud services provider by enabling the consumer to verify that the public cloud services provider's processes running in the cloud have not compromised the consumer's code and data. Similarly, the public cloud services provider is able to verify that the consumer's processes running in the cloud have not compromised the public cloud services provider's code and data.

Referring now to FIG. 1, a block diagram showing components of a typical virtual machine environment 100 is shown. A typical implementation of a virtual machine environment provided in a server of a cloud services provider is shown. Running on the server hardware 110 is a Virtual Machine Monitor (VMM) layer 120. In the typical virtual machine environment 100 shown, the VMM layer 120 is computer software or firmware that creates and runs virtual machines (VMs), such as VM1 $130_1$, VM2 $130_2$, and VM3 $130_3$, on the cloud services provider's server hardware 110. Each of VMs VM1 $130_1$, VM2 $130_2$, and VM3 $130_3$ is shown as standalone block in FIG. 1, representing different VMs all under the control of a common VMM layer 120.

The VMM layer 120 provides access to server resources, such as server hardware 110, to the VMs that the VMM controls.

The VMM layer 120 uses data structures such as a VM control structure (VMCS) 124 and extended page tables (EPTs) 126 to control execution of VMs. The VMCS is a data structure in memory that exists once for each VM, while it is managed by the VMM. With every change of the execution context between different VMs, the VMCS is restored for the current VM, defining the state of the VM's virtual processor. Extended page tables (EPTs) are used to launch a VM's virtual processor with privileges as an "unrestricted guest."

The VMM layer's 120 software or firmware is provided by the cloud services provider and is part of the Trusted Computing Base (TCB) for each VM. According to Wikipedia, a "trusted computing base (TCB) of a computer system is the set of all hardware, firmware, and/or software components that are critical to its security, in the sense that bugs or vulnerabilities occurring inside the TCB might jeopardize the security properties of the entire system. By contrast, parts of a computer system outside the TCB must not be able to misbehave in a way that would leak any more privileges than are granted to them . . . . Modern operating systems strive to reduce the size of the TCB so that an exhaustive examination of its code base (by means of manual or computer-assisted software audit or program verification) becomes feasible." (See Wikipedia, https://en.wikipedia.org/wiki/Trusted_computing_base, visited Aug. 9, 2016.)

In the normal virtual machine environment 100 of FIG. 1, the VMM 122 provided by the cloud services provider is in the TCB of each of VMs VM1 $130_1$, VM2 $130_2$ and VM3 $130_3$. The inclusion of the VMM 122 in the TCB forecloses a particular VM such as VM1 $130_1$ from seeing, measuring, or trusting the VMM 122 that controls that particular VM. The cloud services provider can change the VMM 122 at any time without the VM VM1 $130_1$ owner's knowledge. Furthermore, no cryptographic separation exists between VMs. If the VMM has been compromised, a corrupt VM can access private data in a second VM via the compromised VMM that nevertheless is trusted by the second VM.

For a consumer to receive assurance that the VMM controlling the consumer's processes/VMs is trustworthy, most known techniques use hardware to measure the software/firmware running on the remote machine in the cloud (in this case, the VMM 122) and attest back to the consumer that the software/firmware that is running on the remote machine in the cloud is a version of the software/firmware that the consumer expects. With the public cloud services provider's VMM being included in the consumer's TCB, the consumer has no way to independently assess an attestation of trustworthiness made by the public cloud services provider.

Figure 2:
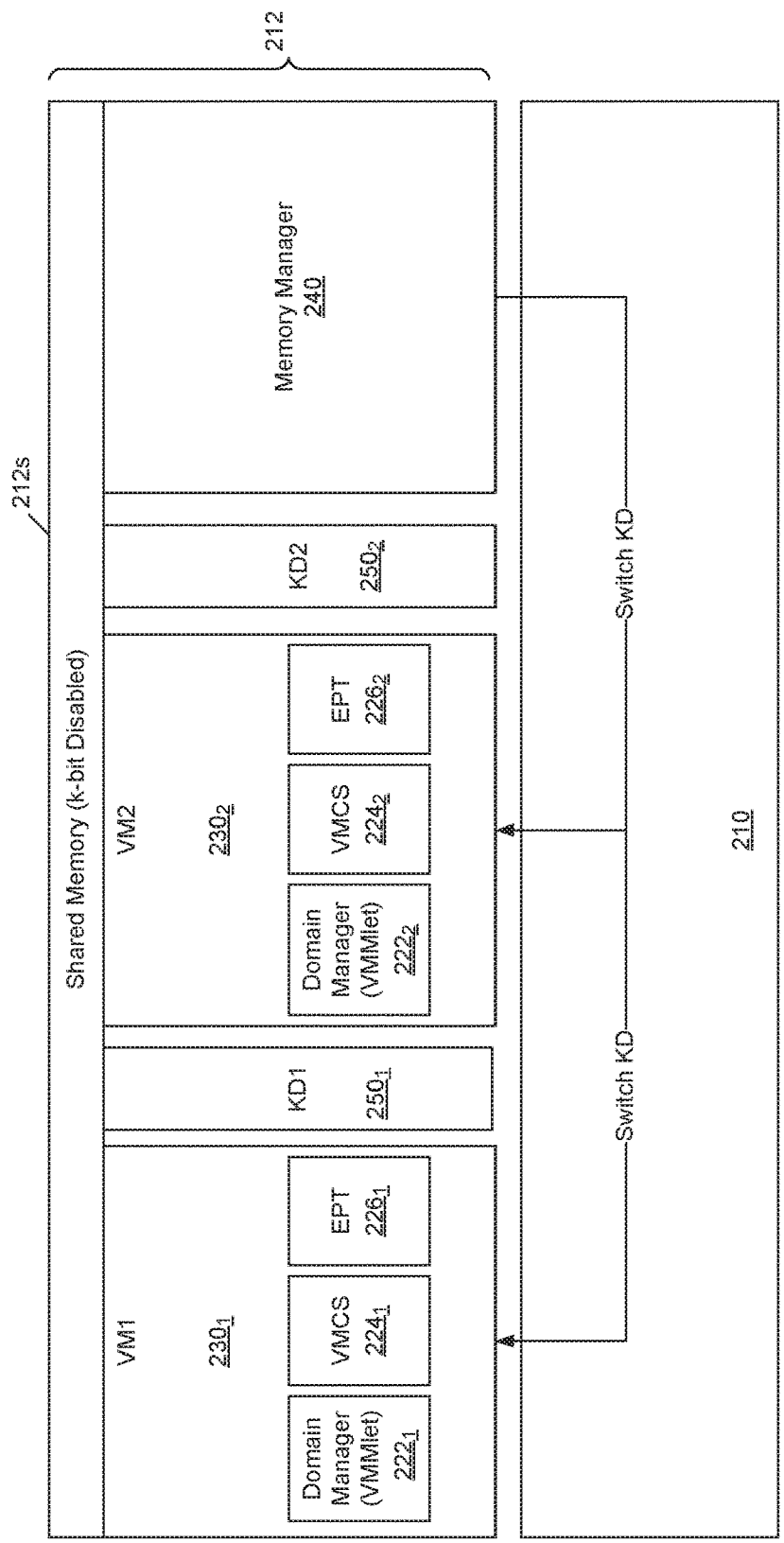
FIG. 2 is a block diagram showing a virtual machine environment in accordance with one embodiment of the invention.

FIG. 2 is a block diagram of a virtual machine environment 200 in accordance with one embodiment of the invention. In this environment, the concepts of a key domain and a domain manager are introduced. A key domain is a cryptographically separate portion of memory, where access to data stored in memory locations belonging to the key domain requires using an associated key domain key to decrypt the data. A domain manager may use a key domain to cryptographically separate data belonging to different owners; in a cloud services environment, a domain manager may use a key domain to cryptographically separate data belonging to different consumers of cloud services, such as banking services.

For example, in the virtualization environment 200 of FIG. 2, key domains KD1 $250_1$ and KD2 $250_2$ are used to separate data belonging to different virtual machines VM1 $230_1$ and VM2 $230_2$. The data belonging to each of virtual machines VM1 $230_1$ and VM2 $230_2$ may include, for example, consumer secrets (such as bank account numbers, social security numbers, etc.) belonging to each virtual machine VM1 $230_1$ and VM2 $230_2$. As another example, the data belonging to each of virtual machines VM1 $230_1$ and VM2 $230_2$ may include computer code (also referred to as a code image or simply an image) that is to be executed to protect each respective virtual machine's secrets within the cloud services provider's environment.

The respective domain managers (VMMlets $222_1$ and $222_2$) play a role similar to that of a virtual machine monitor (VMM, such as VMM 122 of FIG. 1) on behalf of their respective host owners VM1 $230_1$ and VM2 $230_2$. A domain manager (VMMlet) provides VMM functionality within a VM, rather than as a completely separate VMM layer as shown in FIG. 1. The domain manager (VMMlet) is privileged code having the ability to create, exit, and resume execution of VMs. These privileges may be referred to as "vmxroot" functionality, and include the ability to perform commands such as a Virtual Machine Control Structure (VMCS) save/restore, General Purpose Register (GPR) save/restore, and/or vmexit/vmresume. Furthermore, the domain manager (VMMlet) controls critical resources such as Interrupt Descriptor Tables (IDT), Advanced Programmable Interrupt Controller (APIC) instructions, and paging data structures such as Page Tables and Extended Page Tables (EPTs). In some embodiments, the domain manager (VMMlet) portion may only consist of the data structures that control the VM, such as the VMCS, its associated data structures and the EPTs associated with the VM.

A domain manager (VMMlet) limits access by its host VM to a corresponding cryptographically separate portion of memory called a key domain. The contents of each physical memory location belonging to a key domain are hardware-encrypted using a common key domain key. When the hardware writes data to a memory location belonging to a key domain, the data are encrypted using the key domain key; when the hardware reads data from a memory location belonging to the key domain, the data are decrypted using the key domain key.

In one embodiment, the key domain key is created by the consumer owning the key domain and securely provided directly to the cloud services provider's server hardware. In other embodiments, the consumer may translate a key provided by another entity (such as the cloud services provider's server) into another key that is used to encrypt memory locations belonging to a key domain. In still other embodiments, different keys may be used to encrypt different IP blocks (sets of memory locations) belonging to the key domain; for example, a different key may be used for encrypting an IP block containing code for a consumer VM image from the key used to encrypt other consumer secrets. To simplify the descriptions of embodiments herein, the present application describes the contents of each physical memory location belonging to a key domain as encrypted by a key domain key that is created by the consumer owning the key domain, although other embodiments are within the scope of the invention.

If contents of the physical memory locations belonging to a key domain are decrypted using the wrong key domain key, the resulting plaintext will be corrupted. Furthermore, if the memory is integrity protected, and the contents of the physical memory locations belonging to the key domain are decrypted using the wrong key domain key, the resulting plaintext will not satisfy integrity criteria for the physical memory locations belonging to the key domain. While the scope of the invention does not require that memory locations belonging to a key domain are integrity-protected, memory integrity protection may be used to enhance the security of the techniques described herein.

In one embodiment, a key domain is defined using unused physical address bits (or other metadata passed through a cache). For example, because there will likely be fewer physical memory locations installed in a system than can be addressed using a 64-bit physical memory address, the unused most significant address bits can be used to select between different key domains. Two different key domain addresses can alias to the same physical memory location. However, when data from that physical memory location is read into a cache, the cache holds the key domain addresses independently at the full address resolution (e.g., including the full 64-bit physical memory address). The key domain address uniquely identified when considering the unused physical address bits of the full 64-bit physical memory address determines the key domain to which the physical memory location belongs. By identifying the key domain to which the physical memory location belongs, the key domain key that can be used to decrypt the contents of that physical memory location is also identified.

A memory manager can select between different address values that alias to the same physical memory location; i.e., the memory manager can select between different key domains based upon the address alias. In one embodiment, integrity check values (ICVs, such as keyed-hash message authentication codes (HMACs)), are calculated using a key domain key created by the owner of the key domain (the consumer). The memory manager can access an integrity check value table (or authorized portion thereof) to determine whether the correct key domain key was used to access the data. If the wrong key domain key was used to decrypt the data, the resulting plaintext will be corrupted and will not match a corresponding integrity check value in the integrity check value table.

In one embodiment, when data are read into a cache line, the data are compressed to provide space for integrity check values and/or the key domain identifier/selector (i.e., the unused address bits are embedded into the cache line). The key domain identifier/selector may also be included in the compressed data when writing to memory. When reading memory for a compressed data line, the actual unused address bits designating the key domain are compared with the key domain identifier/selector value that was embedded in the compressed data cache. If the key domain values match, the data are decompressed and forwarded to the cache. Compression is an integrity optimization to avoid the need to consult an integrity check value table each time that data is accessed in memory. Furthermore, compression of the key domain into the cache line alleviates the need for some caches to include a key domain identifier as metadata. While some embodiments of the invention may compress data written to a cache line or memory, compression of the data is not required to implement the present invention.

If the key domain values do not match when the actual unused address bits designating the key domain are compared with the key domain identifier/selector value that was embedded in the compressed data cache, a determination is made of which key domain is currently authorized. If the address used to read memory corresponds to the current key domain, the data are cleared (i.e., data bits are set to zeroes) and a cache eviction of the old key domain address is performed. (Although both key domain addresses alias to the same physical memory location, the cache holds the key domain addresses independently at the full address resolution.)

Referring again to FIG. 2, each of VM1 $230_1$ and VM2 $230_2$ is shown with its own domain manager (VMMlet) $222_1$ and $222_2$. Domain manager VMMlet1 $222_1$ is shown inside VM1 $230_1$, and domain manager VMMlet2 $222_2$ is shown inside VM2 $230_2$, to represent that code for each respective domain manager (VMMlet) is included within code for the respective VM. When a consumer requests services requiring virtualization, a code image implementing functionality of a domain manager (VMMlet) is provided by the cloud services provider to the consumer. The domain manager (VMMlet) image provided by the cloud services provider is incorporated into the consumer's domain (VM) image.

A consumer owning VM1 $230_1$ can measure and verify the domain manager (VMMlet) $222_1$ code before incorporating VMMlet1 $222_1$ into the consumer's domain (VM1 $230_1$) image. By placing the consumer's VM in control of the entire software stack of the consumer's VM image, including the domain manager (VMMlet), the consumer can measure, verify, and trust the image that is used to instantiate the domain manager (VMMlet) running within the consumer's VM. Finally, the consumer creates a domain launch image (including the domain manager image) that is memory position-dependent based on physical addresses, encrypts the domain launch image with the consumer's own key domain key, and provides the encrypted domain launch image to the cloud services provider server that will launch that domain launch image.

In one embodiment, the consumer creates an encrypted domain launch image in an attested SGX (Intel® Software Guard Extensions) enclave on the cloud services provider's server. In this embodiment, the domain launch image is encrypted with the key domain key inside the enclave and the encrypted domain launch image (and any associated ICV values) is written to memory outside the enclave.

When the cloud services provider receives the encrypted domain launch image (including the domain manager image) from the consumer, the cloud services provider can measure, verify, and trust that the consumer-encrypted domain launch image contains the same domain manager image that was provided to the consumer. In one embodiment, the cloud services provider's server hardware provides a mechanism to measure (create a hash of) the domain manager portion of the consumer-encrypted domain launch image, so the cloud services provider can then attest that the domain manager image included in the consumer-encrypted domain launch image is the same as the domain manager image that the cloud services provider supplied (and is therefore is trusted by the cloud services provider). In one embodiment, the hash function measuring the domain manager image is position-dependent, so that the domain manager image must be loaded into the correct memory location of the cloud services provider server's memory to be decrypted properly. For example, even if the contents of two different memory locations are the same (for example, all zeroes), only the domain manager image loaded into the correct memory location will produce the expected position-dependent hash result. The property of a position-dependent hash verification function provides a security advantage that encrypted portions of the domain manager image cannot be rearranged in memory by an adversary in an attempt to alter the behavior of the domain manager image.

In this cooperative model, the domain manager image is verified by both the consumer and the cloud services provider. The consumer can trust a domain manager image provided by the public cloud services provider, and trust that the hardware of the cloud services provider will enforce security and confidentiality for consumer virtual machines (VMs). This verification is important to the security of the VM because the domain manager (VMMlet) has full vmx-root privileges, including the ability to perform commands such as a Virtual Machine Control Structure (VMCS) save/restore, General Purpose Register (GPR) save/restore, and/or vmexit/vmresume. Furthermore, Interrupt Descriptor Tables (IDT), Advanced Programmable Interrupt Controller (APIC) instructions, and paging data structures (such as Page Tables and/or Extended Page Tables (EPTs)) are encrypted in the key domain. In some embodiments, the domain manager image only consists of the VM control structures such as the VMCS and associated data such as the EPTs that control the behavior of the consumer's VM, but not the code or data used for VMX root operation which can reside outside of the consumer's key domain.

This cooperative model enables a consumer to trust privileged software provided by the cloud services provider by moving measurement and verification to the consumer. The consumer can assure the security of the consumer's own workload in the cloud, guaranteed by the cloud services provider's server hardware. The cloud services provider can then re-verify that the correct domain manager image was used. This model greatly simplifies the hardware requirements for providing a true secure public cloud foundation. No changes are needed to the operating system (OS) portion of a virtual machine (VM). Most of the complexity of implementation is contained in the design of the domain manager (VMMlet), which is software that can easily be patched, updated, measured, and certified. In one implementation, hardware instructions are used for creating a key domain, switching between key domains, and verifying the contents of a key domain by computing a hash value of the contents of the memory locations corresponding to the key domain and comparing the hash value to an expected hash value for valid contents of the key domain.

Referring again to FIG. 2, a processor (included in hardware 210) switches between VMs $230_1$ and $230_2$ and their respective key domains KD1 $250_1$ and KD2 $250_2$ using a SwitchKD (switch key domain) instruction in response to a command issued by memory manager 240. The result of switching from one key domain to another (e.g., from key domain KD2 $250_2$ to KD1 $250_1$) is that control over a particular physical memory alias is passed to a VM ($230_1$) that is authorized to access the current key domain KD1 $250_1$. Different hardware key domains accessed via key domain keys prevent information leaks of consumer private data across VMs and even by an adversary with access to the external physical memory manager 240. A key domain identifier/selector (e.g., part of the physical address) keeps VM memory regions separate in cache. In one embodiment, instead of a switch key domain instruction, the VMX root vmlaunch/vmresume instructions will switch the key domain to the key domain containing the VMCS as identified by the key domain identifier in the address provided by the vmptrld instruction, which loads the pointer to the current VMCS from the address specified in the vmptrld instruction. A vmexit will then switch back to the VMX root key domain or shared memory region.

In one embodiment, a portion 212s of memory 212 is shared and is used to communicate across key domain cryptographic boundaries. In other words, the shared memory is not encrypted and can be used to communicate messages between VMs that otherwise can only access memory locations belonging to the key domain for which each particular VM is authorized. The shared memory is shown as having a physical address with a bit, described herein as a "k-bit," disabled. The k-bit is used to determine whether the current key domain is used to limit VM access to memory locations belonging to a key domain (such as one of key domains KD1 $250_1$ or KD2 $250_2$), or allow sharing unencrypted information across key domains in shared memory 212s. The k-bit indicates to the CPU whether the key domain indicated in a physical address should be set to the shared key domain (plaintext/!k) or to the currently active key domain (encrypted).

The above embodiment has been described with regard to a domain manager (VMMlet) that manages virtual machines, although the invention is not so limited. A similar key domain model can be used to support processes or containers; although there is no corresponding VMM, the OS kernel (or microkernel) serves a similar purpose. Each process or container image in each key domain will have cooperating OS kernel components (referred to herein as a domain manager or OSlet) that are measured by the cloud services provider. A domain manager (OSlet) responds to memory manager commands, interrupts, scheduling, resource management, etc., in a similar manner as the domain manager (VMMlet).

Figure 3:
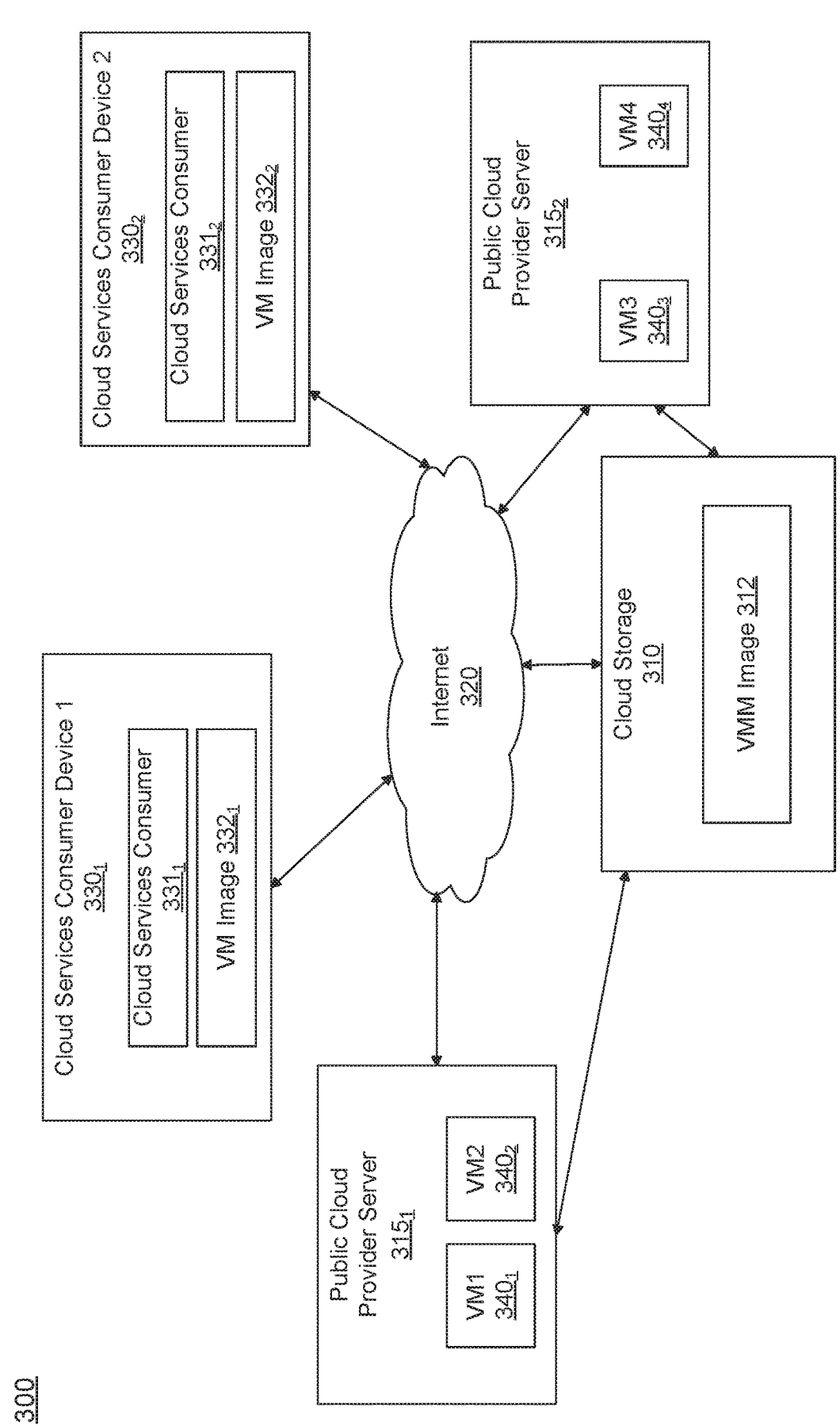
FIG. 3 is a block diagram of a cloud services environment in accordance with one embodiment of the invention.

Referring now to FIG. 3, shown is a block diagram of a cloud services environment in accordance with an embodiment of the present invention. As shown in FIG. 3, network 300 can be used to allow consumers to request services, including virtualization services, from a public cloud services provider. As seen, network 300 can correspond to any type of communications network and can include many different types of computing devices interconnected via a given network such as Internet 320.

Cloud storage 310 can be provided as part of a data center that includes various computing devices, storage devices and so forth. As one example, cloud storage 310 can be a storage device that includes multiple storage components such as disks, optical, or semiconductor-based storage. Cloud storage 310 can act, for example, as a repository of master copies of various applications, including a virtual machine monitor (VMM) application that instantiates virtual machines to provide services in response to a consumer's request. In the embodiment shown in FIG. 1, a master copy of a VMM application is stored in the form of VMM image 312. VMM image 312 is a software image containing a software stack designed to provide a virtual machine platform in the form of a virtual machine monitor (VMM).

Thus as further seen in FIG. 3, at the same location, e.g., as part of the same data center, one or more public cloud services provider servers, such as public cloud provider servers $315_1$ and $315_2$ can be coupled to cloud storage 310. In various embodiments, public cloud services provider servers can be used to service consumer services requests, including virtualization requests. For example, each public cloud services provider server may host one or more virtual machines on behalf of a consumer. In the example shown in FIG. 3, public cloud provider server $315_1$ hosts two virtual machines, VM1 $340_1$ and VM2 $340_2$. Similarly, public cloud provider server $315_2$ hosts two virtual machines, VM1 $340_3$ and VM2 $340_4$.

As shown in FIG. 3, various consumer devices can be present, e.g., cloud services consumer devices $330_1$ and $330_2$. Such cloud services consumer devices may be personal devices of a given user such as a smartphone, tablet computer, desktop computer or so forth. Alternatively, cloud services consumer devices may be servers for an organization that consumes cloud services. In addition, cloud services consumer devices may be emulated via software. In other words, an emulator or simulator can emulate the cloud provider's hardware in software such that the consumer may run emulators of the cloud provider's hardware on the consumer's devices.

Each of cloud services consumer devices $330_1$ and $330_2$ provides a respective cloud services consumer $331_1$ and $331_2$ and a respective VM image $332_1$ and $332_2$. Cloud services consumers $331_1$ and $331_2$ may be, for example, a client component of a cloud services application used to request cloud services. Cloud services consumers such as cloud services consumers $331_1$ and $331_2$ are referenced herein as "consumers." VM images $332_1$ and $332_2$ may be stored in storage (not shown) coupled to the respective cloud services consumer devices $330_1$ and $330_2$. These VM images are provided by the consumer to the cloud services provider and used to create a secure VM, such as VM1 $340_1$, running on the cloud provider's server $315_1$.

When a secure VM has been established on the cloud services provider's server in accordance with the techniques described herein, the consumer may then use that VM, with the consumer's secret keys, to create additional VMs on behalf of the consumer. Thus, once one consumer VM can be securely established in the cloud services provider's cloud, that VM can then perform all the operations of the consumer devices in FIG. 3, including creating additional secure VMs.

Likewise, a consumer can establish secure VMs with multiple cloud services providers and these secure VMs can interact securely via secure communications channels using the consumer's secret keys.

Figure 4:
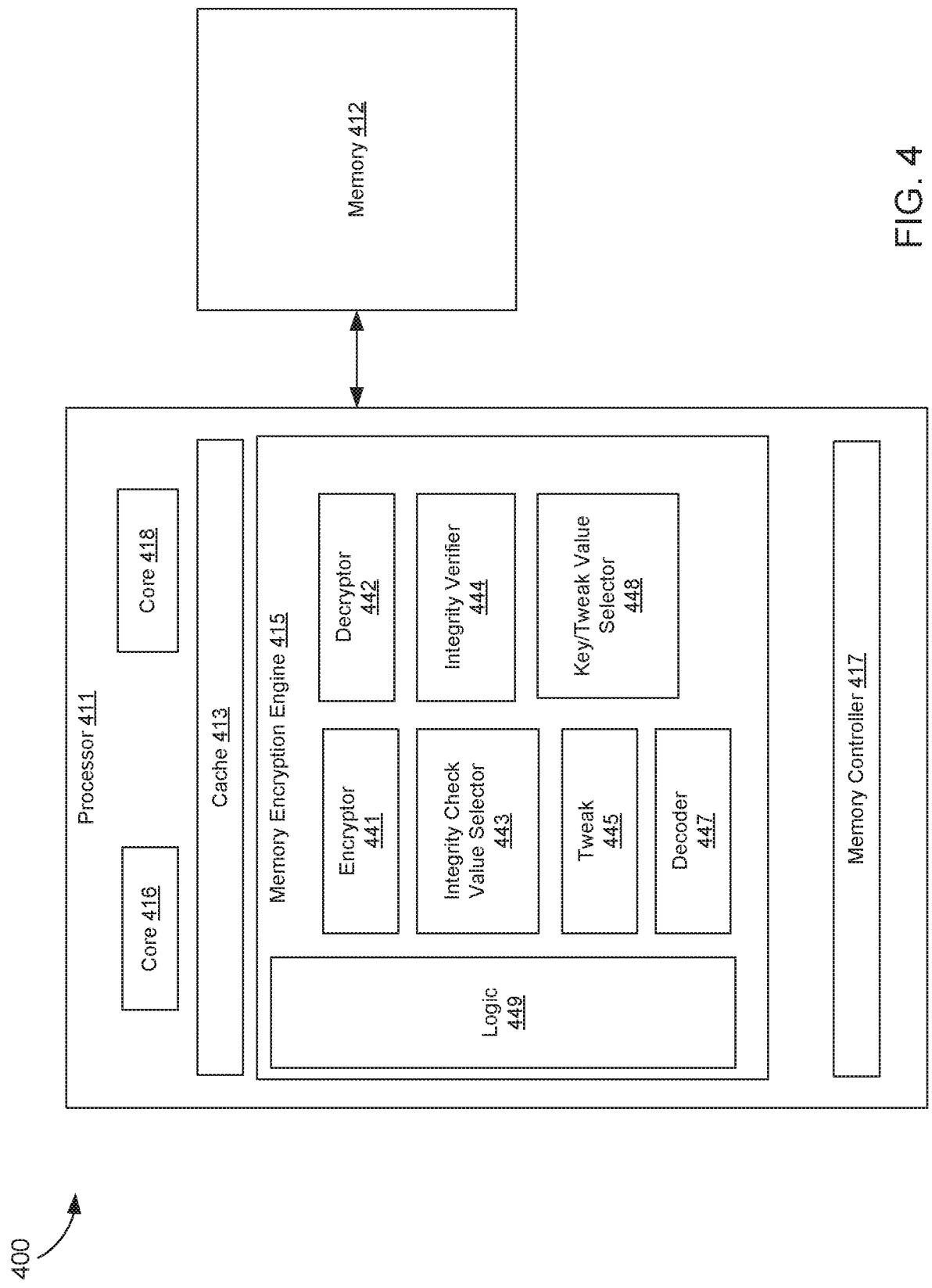
FIG. 4 is a diagram showing an apparatus that can be used to implement an embodiment of the invention.

FIG. 4 is a diagram showing an apparatus in accordance with one embodiment of the invention. An apparatus 400 to secure a public cloud environment according to an embodiment is shown. The apparatus 400 may include any computing device and/or data platform such as a laptop, personal digital assistant (PDA), media content player, imaging device, mobile Internet device (MID), any smart device such as a wireless smart phone, smart tablet, smart TV, computer server, and so on, or combinations thereof. In addition, the apparatus 400 may include any platform having computing functionality (e.g., personal digital assistant/PDA, laptop, smart tablet), communications functionality (e.g., wireless smart phone), imaging functionality, media playing functionality (e.g., smart television/TV), and so on, or combinations thereof (e.g., mobile Internet device/MID).

The illustrated apparatus 400 includes memory 412. The memory 412 may be external to a processor 411 (e.g., external memory), and/or may be coupled to the processor 411 by, for example, a memory bus. In addition, the memory 412 may be implemented as main memory. The memory 412 may include, for example, volatile memory, non-volatile memory, and so on, or combinations thereof. For example, the memory 412 may include dynamic random access memory (DRAM) configured as one or more memory modules such as, for example, dual inline memory modules (DIMMs), small outline DIMMs (SODIMMs), etc., read-only memory (ROM) (e.g., programmable read-only memory (PROM), erasable PROM (EPROM), electrically EPROM (EEPROM), etc.), phase change memory (PCM), and so on, or combinations thereof.

The memory 412 may include an array of memory cells arranged in rows and columns, partitioned into independently addressable storage locations. Thus, access to the memory 412 may involve using an address for a storage location such as, for example, a row address identifying the row containing the storage memory location and a column address identifying the column containing the storage memory location. In addition, a device internal to the apparatus 400 and/or a device external to the apparatus 400 may accomplish access to the memory 412. Access to the memory 412 may involve, for example, direct memory access (DMA).

Memory 412 may be protected using encryption and integrity checking. In one embodiment, an encryption technique called a tweakable block cipher is used. A tweakable block cipher accepts a second input, called a tweak, along with plaintext or ciphertext input to be encrypted. The tweak, along with the key, selects the permutation computed by the cipher. For example, a tweak function may use a physical memory address as a tweak to a block cipher to bind unencrypted data with the physical memory address. The tweak function 445 may include, for example, XTS (XOR-encrypt-XOR/XEX-based tweaked codebook mode with ciphertext stealing) algorithm, Liskov, Rivest, and Wagner (LRW) algorithm, and so on, or combinations thereof.

With regard to integrity of memory 412, in one embodiment, a hardware capability based on memory encryption with integrity is used, which is described in U.S. Pat. No. 9,213,653 B2, "Memory Integrity," hereinafter referred to as a Total Memory Encryption engine with integrity, or TMEi. In another embodiment, memory encryption with integrity is provided by a Memory Encryption Engine (MEE), as described in U.S. Pat. No. 8,819,455, "Parallelized Counter Tree Walk for Low Overhead Memory Replay Protection." The present invention is not limited to these implementations, however, as any cryptographic mechanism providing memory encryption via a memory position-dependent ("tweaked") cipher can be used. Furthermore, any memory integrity mechanism can be used to enhance the security provided by encryption alone, although a memory integrity mechanism is not required for implementation of the invention.

The processor 411 may include any type of processor such as, for example, micro-processor, an embedded processor, a digital signal processor (DSP), a central processing unit (CPU), a graphical processing unit (GPU), a visual processing unit (VPU), a network processor, a device to execute code to implement the technologies described herein, and so on, or combinations thereof. The processor 411 may include one or more cores such as, for example, a core 416 and a core 418. The cores 416, 418 may include a single-threaded core, a multithreaded core including more than one hardware thread context (or "logical processor") per core, and so on, or combinations thereof. The cores 416, 418 may include an instruction decoder to recognize and/or decode an instruction (e.g., from an instruction register), to activate appropriate circuitry to execute the instruction, to verify that a stream of instructions (e.g., operation codes, etc.) will compute, and so on, or combinations thereof.

For example, the cores 416, 418 may execute one or more instructions such as a read instruction, a write instruction, an erase instruction, a move instruction, an arithmetic instruction, a control instruction, and so on, or combinations thereof. The cores 416, 418 may, for example, execute one or more instructions to move data (e.g., program data, operation code, operand, etc.) between a register (not shown) and the memory 412, to read the data from the memory 412, to write the data to the memory 412, to perform an arithmetic operation using the data (e.g., add, subtract, bitwise operation, compare, etc.), to perform a control operation associated with the data (e.g., branch, etc.), and so on, or combinations thereof. The instructions may include any code representation such as, for example, binary code, octal code, and/or hexadecimal code (e.g., machine language), symbolic code (e.g., assembly language), decimal code, alphanumeric code, higher-level programming language code, and so on, or combinations thereof. Thus, for example, hexadecimal code may be used to represent an operation code (e.g., opcode) of an x86 instruction set including a byte value "00" for an add operation, a byte value "8B" for a move operation, a byte value "FF" for an increment/decrement operation, and so on.

The processor 411 may include internal storage such as, for example, a processor cache including one or more levels. The processor cache may not be encrypted and/or may share a same die as the processor 411, on the same chip. In addition, the processor cache may be integrated onto one or more of the cores 416, 418. The illustrated processor 411 includes a cache 413, which may store data (e.g., instructions, operands, program data, etc.) utilized by one or more components of the processor 411. The cache 413 may include any type of cache such as, for example, an instruction cache, a data cache, a single level cache, a multilevel cache, a shared cache, a strictly inclusive cache, an exclusive cache, and so on, or combinations thereof. For example, the cache 413 may include a mid-level cache, such as level 2 (L2), level 3 (L3), level 4 (L4), or other levels of cache, a last level cache (LLC), and so on, or combinations thereof. The cores 416, 418 may check whether data is located in the cache 413 to execute one or more instructions and/or other data (e.g., program data, etc.), wherein a cache miss may cause a transfer of the data from the memory 412 to the cache 413 in a block of fixed size (e.g., cache line).

Each core 416, 418 may be, for example, coupled with respective memory via a respective memory controller such as memory controller 417, coupled with shared memory via a shared memory controller, coupled with respective memory via a shared memory controller, and so on, or combinations thereof. In addition, a shared cache may be coupled with a shared memory controller, a plurality of caches may be coupled with a plurality of respective memory controllers, and so on, and combinations thereof. For example, the memory controller 417 may be shared among the cores 416, 418, may be coupled with the cache 413 (e.g., shared multilevel cache), and may couple the cores 416, 418 with the memory 412 (e.g., shared DRAM). The memory controller 417 may be coupled with the memory 412 (e.g., external memory, DRAM, etc.).

Processor 411 also includes memory encryption engine 415. The illustrated memory encryption engine 415 includes an encryptor 441, which may encrypt unencrypted data. The unencrypted data may include, for example, cleartext data, plaintext data, and so on, or combinations thereof. The cleartext data may be subject to encoding in a special format (e.g., hypertext transfer markup language (HTML), rich text format (RTF), etc.) and read by an appropriate program (e.g., word processor, text editor, etc.) without the need for decryption. The plaintext data may include pre-encryption data such as, for example, cleartext data which is to be encrypted prior to transmission and/or storage. In addition, the plaintext data may include post-decryption data such as, for example, data which is the result of decryption on received and/or retrieved data.

Additionally, the plaintext data may include data which is encodable in any format, such as audio/video data (e.g., moving picture experts group (MPEG) data, etc.), image data (e.g., joint photographic experts group (JPEG) data, etc.), financial data (e.g., automatic transfer machine (ATM)

transaction data, etc.) and so on, or combinations thereof. The plaintext data may include program data such as, for example, at least a part of a program, an operating system (OS), an application, a virtual machine (e.g., Virtual Machine Monitor (VMM) code, etc.), and so on, or combinations thereof. The plaintext data may also include, for example, an instruction including an opcode, an operand, and so on, or combinations thereof.

The unencrypted data may include a plurality of bits. The plurality of bits may include one or more bits (e.g., a byte, etc.) in any code representation, such as binary code, octal code, hexadecimal code, symbolic code, decimal code, alphanumeric code, higher-level programming language code, and so on, or combinations thereof. For example, a memory reference instruction may include a bit for an opcode, a bit for an address, and so on, wherein the bits of the memory reference instruction may be represented in hexadecimal code (e.g. machine language), in symbolic code (e.g., assembly language), and so on, or combinations thereof. Additionally, the plurality of bits may be translated to and/or from binary code, wherein the binary code may be executed by the cores 416, 418, may be sorted at the memory 412, may be fetched from the memory 412, and so on, or combinations thereof.

The encryptor 441 may include any type of cipher to generate cyphertext data such as, for example, a block cipher in any desired mode of operation. The block cipher may include a fixed block size, wherein the block cipher may be repeatedly implemented to encrypt data larger than the block size. For example, the block cipher may include Advanced Encryption Standard (AES) in a propagating cipher-block chaining (PCBC) mode of operation. In addition, the block cipher may include an expandable block size.

In one example, the block cipher is Threefish, which may be implemented to obtain an expandable block size of any length (e.g., 256 bits, 512 bits, 1024 bits, etc.). For example, Threefish may utilize a tweak (e.g., 128 bits), which may include a memory address and/or location, and a key which may be the same width as the block. Threefish may utilize a number of rounds (e.g., 72) to encrypt for blocks of 256 bits and 1024 bits, a number of rounds (e.g., 80) for blocks of 1024 bits, and so on. Threefish may utilize a function MIX including an addition operation, a rotation operation by a constant, and an exclusive-or (XOR) operation. Words may be permutated, for example, after each set of MIX functions (e.g., 2, 4, or 8, respectively by block size). A subkey may be injected into the system, for example, every number of rounds (e.g., 4) wherein the subkey may be generated by parts of the key, the tweak, and a counter value. The key and the tweak may be given an extra word at the end (e.g., an XOR of all the other words).

The illustrated memory encryption engine 415 also includes a decryptor 442, which may decrypt ciphertext data to generate unencrypted data. The decryptor 442 may include an inverse of the encryptor 441. For example the decryptor 442 may include an inverse of AES-PCBC. In addition, the decryptor 442 may include an inverse of Threefish. For example, the subkeys may be applied in reverse order, with each round including the reverse word permutation followed by the reverse MIX functions. Thus, unencrypted data (e.g., plaintext data) may be implemented as input to the encryptor 441 to generate an unreadable copy of the unencrypted data (e.g., ciphertext data) when the unencrypted data is to be stored in the memory 412 (e.g., write instruction), wherein the decryptor 442 may be implemented to decrypt the ciphertext data and generate the unencrypted data when the ciphertext data is to be fetched from the memory 412 (e.g., read instruction).

The memory encryption engine 415 may include a cache line monitor to identify a cache line corresponding to a freed address alias from multiple address aliases, and flush the identified cache line. The memory encryption engine 415 may also include an integrity check value selector 443 to determine integrity check values to apply to unencrypted and/or encrypted data lines (e.g., aliased by at least one of a plurality of address aliases). The memory encryption engine 415 may also include a memory initializer to write to a location in the memory without first reading previously stored data at the location in the memory. The memory encryption engine 415 may include an allocator to assign/bind a flushed cache line to a data line physical address.

Figure 31A:
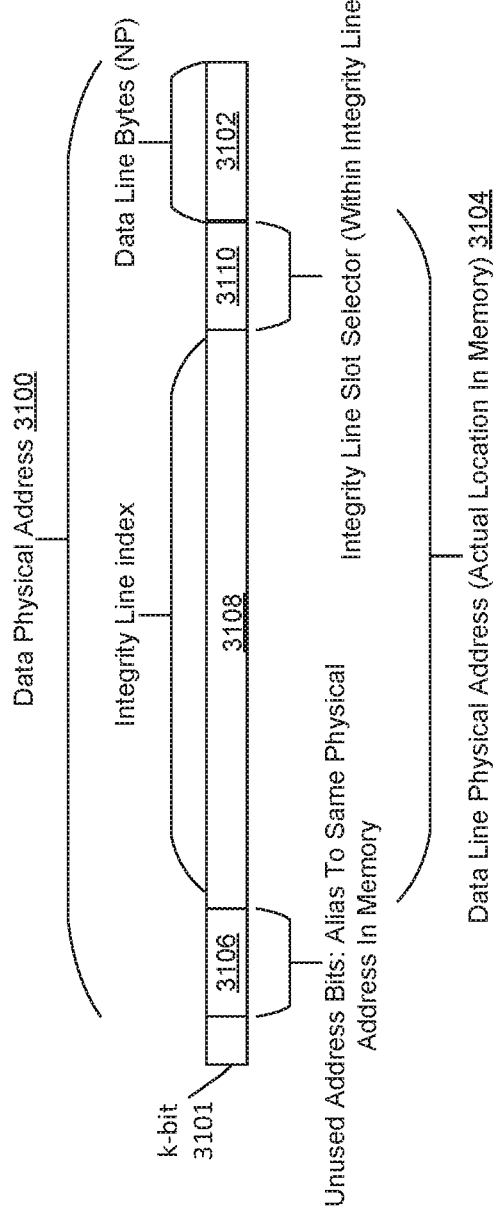
FIG. 31A is a diagram showing determination of integrity line location and slot from a physical memory address in accordance with one embodiment of the invention.

The memory encryption engine 415 may further include a cache line interpreter to determine, for each cache line, a data physical memory address, as illustrated in FIG. 31A, that includes: data line bytes; a data line physical address comprising an integrity line slot selector and an integrity line index; and a key domain selector formed from unused address bits of the data physical memory address. The integrity line index identifies an integrity line address location in the memory, and the integrity line slot selector identifies an integrity line slot in the integrity line address where an integrity line slot value is stored and used to determine whether an address alias is valid.

The memory encryption engine 415 may further include an alias manager to determine the data line physical address for multiple cache lines that identify alias addresses, wherein the alias addresses alias to a single memory location. The memory encryption engine 415 may include an integrity check value calculator to set the key domain selector of a cache line with a valid integrity value to designate the cache line as a currently valid address alias. The memory encryption engine 415 may include a data retriever to read the encrypted data line from the data line physical address of the data physical memory address for the cache line, and a decryptor 428 to decrypt the encrypted data line. A decrypted data line may identify the data line physical address, the integrity line index and the integrity line slot selector for the decrypted data line (e.g., as illustrated in FIG. 31A). The memory encryption engine 415 may include a slot value interpreter to read an integrity line slot value stored in the integrity line slot and a comparator (e.g., integrity verifier 444) to confirm a match between the integrity line slot value and the key domain selector of the data physical memory address for the decrypted data (e.g., data line). Integrity verifier 444 may determine a mismatch/match between plaintext of an integrity value (e.g., a copy stored in an integrity check line) and plaintext of a data line (e.g., a portion copied of the data line), which indicates error corruption or validity of the integrity value and/or of the data line. Integrity verifier 444 may further compare a hash value of data to an expected hash value for the data.

The memory encryption engine 415 and/or alias manager may store alias bits (e.g., the integrity line slot selector, the integrity line index, a key domain selector, and/or valid integrity value, or some combination thereof), separate from the data line bytes, in a separate location (e.g., an alias bits cache line and/or alias bits memory location), which the memory encryption engine 415, a data retriever and/or alias manager may retrieve and compare with a request (e.g., request for data identified by a corresponding data line physical address) to ensure that a particular access control policy matches. In the event the alias bits compare with the request fails (e.g., no match results), the memory encryption engine 415 and/or alias manager may report (e.g., raise an alert) the no match condition as one or more of an error or a fault.

The memory encryption engine 415 data retriever (or cores 416, 418) may read the encrypted data line from the data line physical address of the data physical memory address for the at least one cache line of the plurality of cache lines. The decryptor 442 may decrypt the encrypted data line, wherein the decrypted data line identifies the data line physical address, the integrity line index and the integrity line slot selector for the decrypted data line. The comparator (e.g., integrity verifier 444) may identify no match between the integrity line slot value stored and the key domain selector of the data physical memory address for the decrypted data line, and the memory encryption engine 415 and/or comparator, responsive to the no match identification, may cause the memory encryption engine 415 or a component thereof to flush the cache line, and report the no match condition as one or more of an error or a fault.

The memory encryption engine 415 may further include an integrity value embedder to embed, for each cache line, the data line bytes with the valid integrity value for the data physical memory address. The memory encryption engine 415 may also include a compressor to compress the data line bytes embedded with the valid integrity value. The encryptor 441 may encrypt the compressed data line bytes embedded with the valid integrity value. The memory encryption engine 415 may further include a data line writer to write to the location in the memory identified, by the data line physical address, the valid integrity value to the key domain selector, the data line physical address, and the encrypted and compressed data line bytes embedded with the valid integrity value.

The memory encryption engine 415 and/or the compressor may determine the data line bytes of a particular cache line to be uncompressible, and instead of attempting to embed alias bits (e.g., the integrity line slot selector, the integrity line index, a key domain selector, and/or valid integrity value, or some combination thereof) into the data line with the data line bytes, may store the valid integrity value separately (e.g., in a separate location such as another cache line and/or memory location).

The illustrated ciphertext discussed herein may be decrypted to generate unencrypted data when the ciphertext is to be fetched from the memory 412 (e.g., read operation). The illustrated memory encryption engine 415 may further include a tweak function 445 to utilize a physical memory address as a tweak to a block cipher to bind unencrypted data with the physical memory address. The tweak function 445 may include, for example, XTS (XOR-encrypt-XOR/XEX-based tweaked codebook mode with ciphertext stealing) algorithm, Liskov, Rivest, and Wagner (LRW) algorithm, and so on, or combinations thereof. The tweak function 445 may, for example, spread the original physical memory address, XOR the address with the unencrypted data, and run the result through the encryptor 441 with a key to bind the unencrypted data to the address.

The illustrated memory encryption engine 415 may further include a decoder 447 to decode the unencrypted data and recognize one or more instructions. For example, uncorrupted unencrypted data (e.g., valid plaintext) may contain opcodes when substantially an entire data line (e.g., a 64-byte cache line) is fetched from the memory 102 and is decrypted. Thus, the decoder 447 may recognize an opcode of an instruction set such as, for example, an x86 instruction set, etc., when the decoder 447 decodes the plaintext data.

The illustrated memory encryption engine 415 may further include a key/tweak value selector 448 to select a key from a plurality of keys (e.g., a key domain) and/or a tweak from a plurality of tweaks (e.g., a tweak domain) for a physical location in the memory 412. For example, the illustrated memory encryption engine 415 may include a function detector to determine that a function (e.g., a program, middleware, an operating system, firmware, virtual machine, VMM, Operating System (OS) kernel, etc.) or a part of the function (e.g., part of a program, etc.) is being launched for the first time, or is being given access to a physical location in the memory 412 for the first time. The key/tweak value selector 448 may, in response, select a key and/or a tweak (e.g., a key from a key domain, a different key from a same key domain, a different key from a different key domain, a tweak from a tweak domain, a different tweak from a same tweak domain, a different tweak from a different tweak domain, etc.) for the physical location in the memory when the function (and/or part thereof) is given access.

The key/tweak value selector 448 may select a key based on a value determined from a bit of a physical memory address for a data line, such as an unused address bit. A key domain for a specific physical memory location may be defined by a number of unused address bits to be selected to determine the value. For example, a particular physical memory location may belong to a particular key domain at one time, wherein the unused address bits may be used to define the key domain (e.g., a key domain including 16 keys for a single physical memory location where four unused address bits are utilized). Thus, the physical memory location may use different keys at different points in time based on a domain to which the location maps. The key/tweak value selector 448 may derive the key by, for example, encrypting the value (e.g., 0001, 0010, etc.) using a secret master key that may be protected (e.g., in a trusted execution environment) by the apparatus 400. In addition, the key/tweak value selector 448 may derive the key by, for example, retrieving the key from an array of protected keys using the value as a pointer to the array.

Moreover, the key/tweak value selector 448 may select a tweak by setting a bit of the physical memory address that is to be used as a tweak by the tweak function 445. In this regard, a tweak for XTS mode will include the unused address bits and the used address bits of a physical memory address. Thus, different ciphertext will result from different addresses used for the tweak (even if actually referring to the same physical memory location) when the unused address bits are selected/changed by the key/tweak value selector 448.

The illustrated memory encryption engine 415 also includes logic 449, which may utilize components of the processor 410 such as, for example, the cores 416, 418, the encryptor 441, the decryptor 442, etc., to maintain (e.g., ensure, verify, test, etc.) the security and integrity of the memory 412.

Memory corruptions caused from components (e.g., internal or external devices, accelerators, etc.) may be detected as these components access memory with addresses that may pertain to a particular key domain or alias and tweak. These devices may use the current and correct address for accessing memory. Similarly, and inversely, software corrupting the memory of such devices may also be detected when an incorrect or non-current address is used.

Although not illustrated in FIG. 4, the apparatus 400 may include other elements on chip with the processor 411. For example, the processor 411 may include input output (IO)

control logic integrated with the memory encryption engine 415. In addition, the apparatus 400 may include, for example, an IO module, sometimes referred to as a Southbridge of a chipset, that functions as a host device and may communicate with, for example, a front/rear image sensor (e.g., a two-dimensional camera, a three-dimensional camera, etc.), a microphone, a display (e.g., screen), a motion sensor (e.g., an accelerometer, a gyroscope, etc.), mass storage (e.g., hard disk drive/HDD, optical disk, flash memory, etc.), a network interface to provide a wide variety of communication functionality (e.g., cellular telephone, WiFi, WiMax Global Positioning Systems (GPS), spread spectrum (e.g., 900 MHz), other radio frequency (RF), etc.). The processor 411 and the IO module may, for example, be implemented as a system on chip (SoC).

Additionally, while examples have shown separate components for illustration purposes, it is should be understood that one or more of the components of the apparatus 400 may be combined, may reside in the same and/or different physical and/or virtual locations, and so on, or combinations thereof. For example, the logic 449 may include one or more of the components of the memory encryption engine 415 to execute corresponding functionality thereof, which may reside in the same or different location as the cores 416, 418, the memory 412, and so on, or combinations thereof. In addition, one or more components of the memory encryption engine 415 may be implemented in computer program code, such as a software value selector that may interface with one or more components of the memory encryption engine 415 implemented in logic hardware.

Some of the functionality provided by apparatus 400 may be delivered by a System-on-Chip (SoC) IP block on the memory/DRAM (dynamic random access memory) side of the processor cache, enabling the functionality to be used for software running on the host processor (e.g., central processing unit/CPU) cores, as well as on other IP blocks and accelerators such as General Purpose Graphics processing unit (GPGPUs) and integrated graphics (e.g., Intel® Processor Graphics).

The illustrated apparatus 400 employs unused physical address bits (and/or other metadata passed through the cache) to manipulate cryptographic memory integrity value pointers (e.g., implementing one or more access control policies), enabling software memory allocation routines to control assignment of pointers (e.g., "malloc" and "free"). The apparatus 400 may generally use unused address bits as a key domain. For example, there may be less external physical memory installed in a system than can actually be addressed by a 64 bit physical memory address, so the most significant address bits may be used to select between different "key domains", as the caches may still convey these addresses at the physical memory addresses full resolution to the apparatus 400. The illustrated apparatus 400 may use 5-level paging for virtual memory and 64-bit addressing to allow a software memory allocator/manager (e.g., memory manager 240 of FIG. 2) to select between different address values that alias to the same physical memory location. The software memory allocator/manager may control an integrity value table (or authorized portion thereof) to determine which alias is currently valid, so that use of invalid aliases/addresses by software may then raise a fault in the hardware that may be reported to a software monitor to deal with memory violations.

Figure 5:
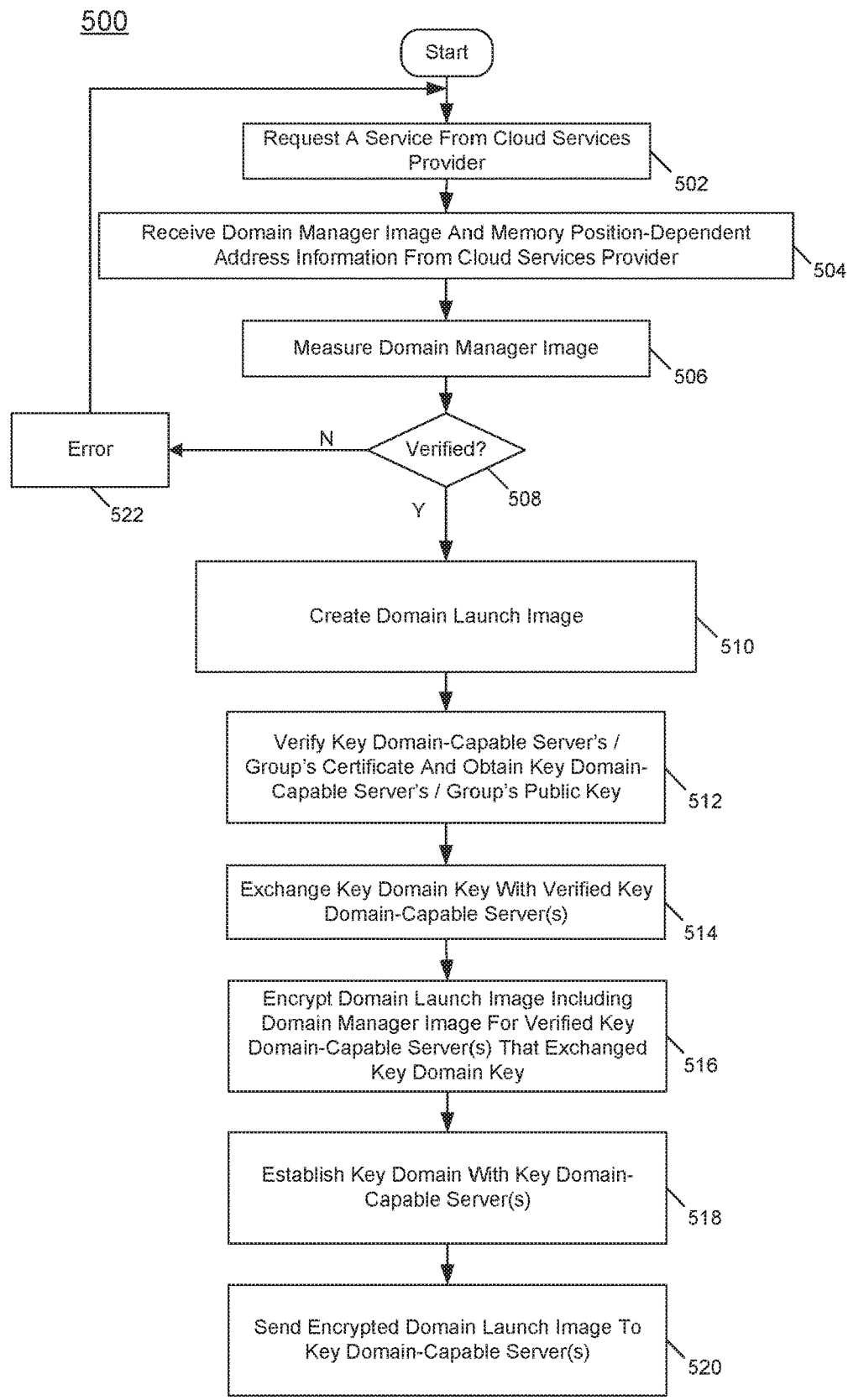
FIG. 5 is a flowchart of a method performed by a consumer of cloud services in accordance with one embodiment of the invention.

FIG. 5 is a flowchart of a method performed by a consumer of cloud services in accordance with one embodiment of the invention. In "Request a Service from Cloud Services Provider" block 502, the consumer requests a service from the cloud services provider. For example, the request may be for virtualization services, or the request may be to perform a transaction for which the cloud services provider will establish a virtual machine or other process to perform the transaction.

The cloud services provider identifies a key domain-capable server or group of servers to service the consumer's request. In "Receive Domain Manager Image and Memory Position-Dependent Address Information from Cloud Services Provider" block 504, the consumer receives a domain manager image and memory position-dependent address information, also referred to herein as fix-up variable information, from the cloud services provider. The memory position-dependent address information specifically identifies physical locations in memory of the server(s) that are servicing the consumer's request. This memory position-dependent address information may include physical addresses of pages in memory, physical addresses for page tables, control register information (e.g., CR3 values), interrupt descriptor table register information, etc. for the server(s) that are servicing the consumer's request. The domain manager image may contain page table structure(s) that map linear/virtual addresses of the domain manager image to the physical addresses where the domain manager image is to be located in memory of the cloud services provider's server.

Control then passes from "Receive Domain Manager Image and Memory Position-Dependent Address Information from Cloud Services Provider" block 504 to "Measure Domain Manager Image" block 506, where the consumer measures the domain manager image to ensure that the domain manager image has not been compromised. The consumer may verify the domain manager image using known whitelisting techniques, such as computing a hash of the domain manager image and comparing the hash value to a master hash value for a master domain manager image (that is known to be uncorrupted); source code can be checked and recompiled into a matching image; government certification of the image may be verified; the image may be confirmed to be consistent with open source software, etc. An image is considered to be trustworthy if the image will not leak consumer data. For example, an image may be considered trustworthy if all communications are secured using the consumer's secret keys, and files/memory pages are encrypted and integrity checked when saved and/or restored to or from storage.

From "Measure Domain Manager Image" block 506, control passes to "Verified?" decision point 508. If the domain manager image is not verified, control passes to "Error" block 522, where the consumer handles the situation where the cloud provider's domain manager image has not been verified. In such a situation, the consumer may choose not to use that particular public cloud services provider's services.

If the domain manager image is verified at "Verified?" decision point 508, control passes to "Create Domain Launch Image" block 510. At block 510, the consumer creates a domain launch image, which will be executed on the cloud services provider's server to "launch" a key domain. Launching a key domain may include, for example, creating a key domain, causing hardware to encrypt the data stored in memory locations belonging to the key domain with a key domain key, and storing data (such as code to be executed to initially establish the key domain) in the memory locations belonging to the key domain.

In one embodiment, the consumer uses the memory position-dependent address information provided by the cloud services provider in "Receive Domain Manager Image and Memory Position-Dependent Address Information from Cloud Services Provider" block 404 to modify the provider-supplied domain manager image as part of the code to be executed to launch the key domain. For example, the consumer may modify the domain manager image's page tables so that the physical addresses in the page tables are updated (fixed up) given the physical memory addresses where the domain manager image is to be located. Once the paging structures are updated, all the linear/virtual addresses used by the executing domain manager image's code, data, and programs will map to the correct corresponding physical memory addresses on the cloud service provider's server. In one embodiment, the consumer encrypts a fixed-up domain manager image using the consumer's key domain key and creates integrity check values (ICVs) for the encrypted fixed-up domain manager image using the consumer's key domain key.

In one embodiment, the consumer creates a domain launch image including the encrypted fixed-up domain manager image for distribution to the cloud services provider server. The consumer also includes secret keys in the domain launch image for paging, migration, attestation, communications, and other functions provided by the executing domain process (e.g., VM, OS, etc.). When the domain launch image is encrypted, the corresponding page table structures contained within the domain launch image are also encrypted.

Because the domain launch image is encrypted (and integrity checked) using a memory position-dependent "tweaked" cipher, an adversary cannot move parts of the domain launch image around in memory. The page tables map the domain launch image's programs and data to the correct physical memory addresses on the cloud services provider's server, so program behavior cannot be maliciously changed given that the domain launch image is cryptographically bound to the correct physical memory locations. In other words, the domain launch image cannot be decrypted correctly if the domain launch image is not loaded into the correct physical memory locations on the cloud services provider's server. Furthermore, integrity check values can detect any attempts to modify the domain launch image contents and/or the location in memory into which the domain launch image is loaded.

Control passes from "Create Domain Launch Image" block 510 to "Verify Key Domain-Capable Server's/Group's Certificate and Obtain Key Domain-Capable Server'/Group's Public Key" block 512.

In block 512, the consumer verifies the identified cloud services provider server's/group's certificate, and obtains the identified key domain-capable server's/group's public key.

Control passes from block 512 to "Exchange Key Domain Key with Verified Key Domain-Capable Server(s)" block 514. The consumer exchanges a key domain key with the key domain-capable server(s) verified in block 512. One aspect of the exchange of the key domain key is that the key domain key is provided only in encrypted form by the consumer directly to the hardware (such as memory encryption engine 415 of FIG. 4) of the key domain-capable server. Because the key domain-capable server's software does not receive the key domain key, the key domain-capable server software cannot decrypt the contents of the key domain without requesting the hardware to perform the decryption. In one embodiment, the consumer uses the server's/group's public key obtained in block 512 to encrypt the consumer's key domain key before providing the encrypted key domain key to the hardware of the key domain-capable server.

In another embodiment, the key domain key may be negotiated between the consumer and the server hardware. The key domain key may be generated directly with hardware (e.g., microcode, firmware, CSME, SMM), where the server hardware can provide its unique (or group) identity and public key/CERT, and then a Diffie Hellman key exchange (or RSA) can complete the key domain key exchange with the consumer. This embodiment requires the consumer to be online to perform the key exchange at the time that the domain image is launched.

This key exchange enables the virtual machine running on the verified key domain-capable server to access domain launch image data encrypted with the consumer's key domain key without exposing the key domain key itself. Encrypted messages are passed through the cloud services provider's software stack on the key domain-capable server. The key domain-capable server hardware provides a cryptographic endpoint for the commands. For example, the consumer can encrypt a key that it uses for the key domain with the server's public key, and send this encrypted key domain key to the cloud services provider. The cloud services provider then could issue an instruction, such as a Create Key Domain (CreateKD) instruction, on the key domain-capable server hardware to create the new key domain. In addition, the provider can also use the same Create Key Domain (CreateKD) instruction to recreate a key domain, for example, if a VM has been suspended and is to be resumed.

Control passes from "Exchange Key Domain Key with Verified Key Domain-Capable Server(s)" block 514 to "Encrypt Launch Image including Domain Manager Image for Key Domain-Capable Server that Exchanged Key Domain Key" block 516. Once a key domain key is established (or before, as it is the consumer's key), the consumer uses the key domain key to encrypt a domain launch image including the domain manager image for the specific server with which the consumer exchanged the key domain key. The consumer encrypts the domain launch image given memory position-dependent address information provided as the fix-up variable information by the cloud services provider. In one embodiment, an encryption technique called a tweakable block cipher is used. A tweakable block cipher accepts a second input, called a tweak, along with plaintext or ciphertext input to be encrypted. The tweak, along with the key, selects the permutation computed by the cipher. In encrypting the consumer's domain launch image, the key domain-capable server's physical memory address is used as the tweak, making the resulting encrypted launch image memory position-dependent. The encrypted launch image is described as memory position-dependent because the encrypted launch image must be loaded into the correct physical memory addresses of the cloud services provider's server before it can be correctly decrypted.

In one embodiment, the domain launch image is encrypted using XEX-based tweaked codebook mode with ciphertext stealing (XTS). The consumer encrypts the domain launch image in memory position-dependent XTS mode using page address tweaks and the key domain key. The correct physical addresses of where the domain launch image will be loaded are included in the XTS tweak for each block encrypted. Other tweakable ciphers may also be used in other embodiments, such as Liskov, Rivest, and Wagner (LRW) or counter mode cipher.

The consumer may also calculate integrity check values (ICVs, such as keyed-hash message authentication codes (HMACs)), for the domain image using the key domain key. In one embodiment, integrity check values are also memory position-dependent so that the address/memory location of the corresponding data line in memory is taken into account in verifying the integrity of the data. The consumer may include the ICV values in the encrypted launch image in a situation where the consumer knows the address locations of the ICV table on the server corresponding to the consumer's encrypted launch image. The ICVs values table could also be encrypted with the key domain key using a tweak indicating the correct server memory addresses for the ICV table. The cloud services provider server would then load the ICV portion of the encrypted launch image into the correct slots of the ICV table at those same server memory addresses for the ICV table.

From "Encrypt Launch Image including Domain Manager Image for Key Domain-Capable Server that Exchanged Key Domain Key" block 516, control passes to "Establish Key Domain with Key Domain-Capable Server" block 518. In block 518, the consumer sends a request to create a key domain to the key domain-capable server. This request may include the encrypted key domain key, which serves as an input value for a Create Key Domain (CreateKD) instruction to be executed by the processor of the key domain-capable server. The key domain selector/identifier to use is a local decision made by the cloud service provider's memory manager, as the cloud service provider's memory manager needs to manage a limited key domain namespace. The consumer does not need to know the key domain selector/identifier, and the value of the key domain selector/identifier can be changed by the cloud services provider to avoid local conflicts. The actual key domain key provides security for the consumer's VM image while the key domain selector/identifier tells the cloud services provider server's hardware in which slot/register the key domain key is currently locally stored.

From block 518, control passes to "Send Encrypted Domain Launch Image to Key Domain-Capable Server(s)" block 520. The encrypted domain launch image is sent to the cloud services provider, and the cloud services provider's software stack on the key domain-capable server loads the domain launch image into memory (i.e., into a k-bit off (i.e., unencrypted) region of memory), at the correct physical memory addresses.

Figure 6:
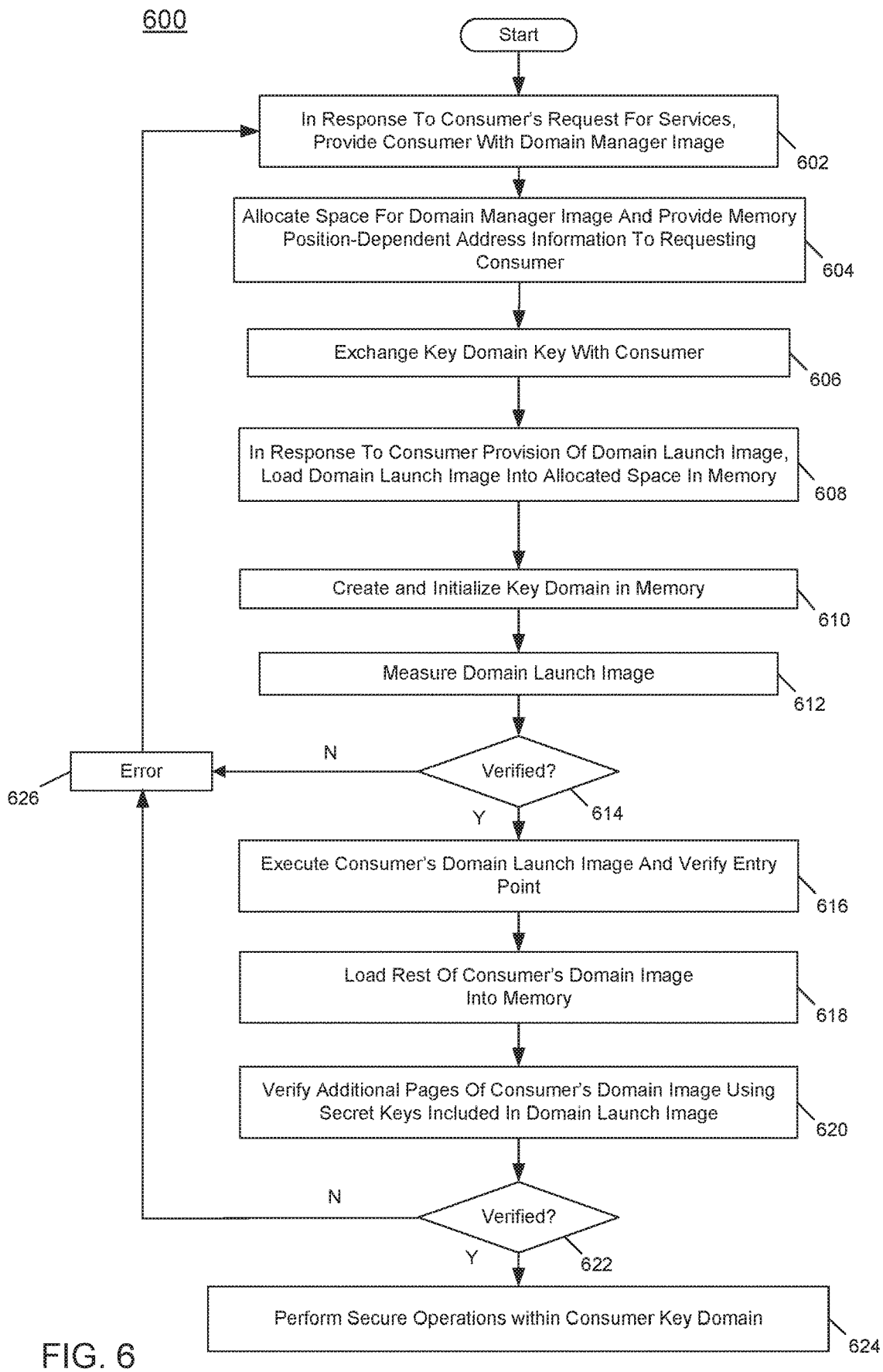
FIG. 6 is a flowchart of a method performed by a cloud services provider in accordance with one embodiment of the invention.

FIG. 6 is a flowchart of a method performed by a cloud services provider in accordance with one embodiment of the invention. Control begins at "In Response to Consumer's Request for Services, Provide Consumer with Domain Manager Image" block 602. The consumer's request may be specifically for virtualization services, or the consumer's request may be to perform a transaction that the cloud services provider will perform via a virtual machine or other process for the consumer.

Control proceeds from "In Response to Consumer's Request for Services, Provide Consumer with Domain Manager Image" block 602 to "Allocate Space for Domain Manager Image and Provide Memory Position-dependent Address Information to Requesting Consumer" block 604. In this block, the cloud services provider allocates space in memory for the domain manager image, and notifies the requesting consumer of memory position-dependent address information for the allocated memory space. This memory position-dependent address information may include, inter alia, physical addresses of pages in memory, physical addresses for page tables, control register information, interrupt descriptor table register information, etc.). The memory position-dependent address information may also include an expected entry point. As an alternative embodiment, the cloud services provider can create an already fixed-up domain image that the consumer can re-verify as correct.

As mentioned above with reference to "Request a Service from Cloud Services Provider" block 502 of FIG. 5, the cloud services provider may identify a group of servers that can provide key domain capabilities. For example, each server in a group of servers may use the same key, referred to as a group key, such as Direct Anonymous Attestation/Enhanced Privacy Identifiers (DAA/EPID)'s group public verification key. DAA is a digital signature algorithm supporting anonymity. Unlike traditional digital signature algorithms, in which each entity has a unique public verification key and a unique private signature key, DAA provides a common group public verification key associated with many (typically millions) of unique private signature keys. DAA was created so that a device could prove to an external party what kind of device it is (and optionally what software is running on the device) without needing to provide device identity, i.e., to prove that the device is an authentic member of a group without revealing which member. EPID enhances DAA by providing an additional utility of being able to revoke a private key given a signature created by that key, even if the key itself is still unknown.

From block 604, control proceeds to "Exchange Key Domain Key with Consumer" block 606, where the key domain-capable server obtains the key domain key from the consumer. The key domain key is provided by the consumer as an encrypted key, where the consumer's key domain key has been encrypted with the key domain-capable server's public key. In one embodiment, a memory manager of the key domain capable-server causes the encrypted key domain key to be written into a slot/register of the key domain-capable server and a memory encryption engine (such as memory encryption engine 415 of FIG. 4) reads the encrypted key domain key from the slot/register and decrypts the key domain key using the key domain-capable server's private key.

From block 606, control proceeds to "In Response to Consumer Provision of Domain Launch Image, Load Domain Launch Image into Allocated Space in Memory" block 608. When the consumer provides a VM workload to the key domain-capable server, the consumer provides the domain launch image, encrypted with the consumer's key domain key. The key domain-capable server loads the domain launch image into the physical memory space allocated in block 604. The domain launch image is installed in physical memory on the cloud services provider's server at the physical memory location communicated to the consumer via the memory position-dependent address information. Shared, unencrypted memory locations can be made available by the cloud services provider (e.g. using a portion of the physical address, such as k-bit) for initially loading this encrypted launch image in memory.

Because multiple servers may share the same public key, identifying memory position-dependent address information may require resolution of memory conflicts between the multiple servers. In one embodiment, memory location conflicts between the multiple servers in a group are resolved because the image that is position-dependent in the server's memory is the consumer's domain launch image, which can be transient. That is, the domain launch image is used to launch the consumer's larger domain (VM) image, which can be paged anywhere in memory selected by the cloud services provider. After the consumer's larger domain image is launched, the position-dependent portion of the encrypted image can be removed from memory (having performed the function of launching the consumer's larger domain image). Thus, memory usage can be managed by the cloud services provider, which makes space for the position-dependent launch image, uses the position-dependent launch image to launch the rest of the domain image into variable memory, and then frees the space occupied by the domain launch image (e.g. to make room for a different domain launch image for a different key domain that happens to overlap with those same memory locations).

The consumer's domain image can be launched in multiple phases, under software control. The first phase is executing the domain launch image, which is encrypted by the consumer in accordance with the memory position-dependent address information. The second phase is launching the rest of the consumer's domain image, which is not required to be loaded into particular physical memory locations on the cloud services provider's server.

From block 608, control proceeds to "Create and Initialize Key Domain in Memory" block 610. In one embodiment, the key domain-capable server receives a request to create a key domain from the consumer. This request may include the encrypted key domain key, which may serve as an input value for a Create Key Domain (CreateKD) instruction to be executed by the key domain-capable server. The CreateKD instruction may also initialize the new key domain by quiescing processor cores, flushing caches and translation look-aside buffers (TLBs) of old key domains, and initializing a memory encryption engine with the new key for the key domain. Initializing the memory encryption engine with the new key domain key may include writing the key domain key to a memory slot/register accessible by the memory encryption engine hardware. Alternatively, these initialization functions may be performed via a separate Initialize Key Domain (InitKD) instruction.

From block 610, control proceeds to "Measure Domain Launch Image" block 612. The cloud services provider verifies that the expected domain manager image is present within the consumer's encrypted domain launch image. This verification ensures that privileged code such as VMX-root components and data structures were included in the consumer's encrypted domain launch image.

In one embodiment, a memory manager uses a hash key domain (HashKD) instruction to verify that the domain launch image's pages contain the provider's domain manager (VMMlet) image. A "secure hash" function, such as the Secure Hash Algorithm 3 (SHA3) defined by the National Institute of Standards and Technology (NIST), is used to compute a hash value for the provider's domain manager image within the encrypted domain launch image. Secure hash algorithms transform data using a hash function, which may be an algorithm that includes bitwise operations, modular additions, and compression functions. The hash function then produces a fixed size string that looks nothing like the original input string. These algorithms are designed to be one-way functions, meaning that once the original input data has been transformed into hash values, it is virtually impossible to transform the hash values back into the original input data.

The cloud services provider can verify that the domain manager image is present within the consumer's domain launch image by constructing the domain manager image from the consumer's encrypted domain launch image in local memory. The cloud services provider can then perform the same verification function (i.e., hash function) that the HashKD instruction uses on the contents of the local memory locations for the constructed domain manager image. If the verification function (hash) values of the contents of the local memory locations match results of the hash KD instruction, the cloud services provider can be assured that the provider's domain manager image was correctly incorporated as part of the consumer's encrypted domain launch image.

In one embodiment, the HashKD instruction can provide a hash value for a cache line, or, in another embodiment, the HashKD instruction can provide a hash value for up to a page of memory at a time.

In one embodiment, the HashKD instruction provides only hash values so that no consumer secrets in the domain launch image are revealed to the cloud services provider. The consumer's secrets can be in the VMX-non-root portion of the domain launch image, e.g., as part of the operating system running above the domain manager (VMMlet). Providing only hash values as a result of the HashKD instruction enables the cloud services provider to verify only the provider's portion (the domain manager image portion) of the encrypted domain launch image. Verification of the provider's portion independently of the consumer-modified (including consumer secrets) portion of the encrypted domain launch image prevents disclosure of consumer's secrets to the cloud services provider.

From block 612, control proceeds to "Verified?" decision point 614. If the domain launch image measurement was not verified, control proceeds to "Error" block 626, where the cloud services provider may report the verification failure to the consumer. If the image measurement was verified at "Verified?" decision point 614, control proceeds to "Execute Consumer's Domain Launch Image and Verify Entry Point" block 616.

At "Execute Consumer's Domain Launch Image and Verify Entry Point" block 616, the key domain-capable server's stack will execute the consumer's domain launch image at the expected entry point (as was provided via the memory position-dependent address ("fix-up variable") information to the consumer). A memory manager VM loads the consumer-encrypted domain launch image into unencrypted memory pages (with k-bit disabled). A new key domain is initiated.

In one embodiment, the key domain-capable server's processor executes a Switch Key Domain (SwitchKD) instruction, providing as input the destination key domain identifier/selector, an entry point address, and control register information. In addition, in one embodiment, a keyed-hash message authentication code (HMAC) calculated by the consumer (e.g., using the key domain key or a derivative thereof) is used to verify that the entry point address and control register information are correct.

Prior to executing the domain launch image, the key domain-capable server may turn interrupts off. In one embodiment, the first instruction executed after switching key domains is a special ENDBRANCH-like instruction denoting the expected entry point for a key domain switch. The destination domain manager (VMMlet) code after the ENDBRANCHKD instruction verifies that the VMM is in protected mode. The destination domain manager (VMMlet) code also verifies that control registers and interrupt descriptor table registers, etc. are correct. The destination domain manager (VMMlet) code then re-enables interrupts and resumes execution from a saved state.

In one embodiment, the SwitchKD instruction is implemented using an HMAC function to verify the consumer's domain launch image. This implementation is the preferred embodiment of SwitchKD, as it is the most flexible. The consumer can use a secret established with the server hardware, e.g. the key domain key or a derivative thereof, to calculate an HMAC (e.g. SHA3 HMAC) over the expected processor state for entering the key domain (e.g. verify the processor's registers for the instruction pointer, the stack pointer, CR0, CR3, CR4, IDTR, GDTR, LDTR, any MSRs that can impact the security of the VM, etc.). The HMAC implementation of the SwitchKD instruction can be established dynamically by the consumer's domain image, and multiple entry points can be supported by computing multiple HMACs, one for each unique valid entry point into the consumer's domain image. This flexibility to dynamically define new entry points using the HMAC allows the server to start with the original encrypted domain launch image, execute the original encrypted domain launch image at a fixed initial entry point, then internally (from within the key domain) copy that domain launch image to new dynamically assigned memory locations (in accordance with the provider's memory management policies), and a new entry point location established for the new dynamically assigned memory locations. Now the original domain launch image, and the static memory locations to which the original domain launch image is cryptographically bound, can then be freed by the cloud services provider leaving only the dynamically reassigned VM image in memory at the locations dynamically defined by the provider's memory manager software. In this way, even if multiple initial launch images for different consumers happen to overlap in memory, they can be loaded sequentially, transitioning to dynamic memory locations, freeing that domain launch image's memory locations for the next consumer's domain launch image and so on, with each executing domain image re-computing HMACs using the consumer's key domain key for the new entry points as each dynamic image is created.

Alternatively, when creating a new key domain (CreateKD), the entry point values (instruction pointer registers, stack pointer registers, control registers, interrupt descriptor table registers, etc.) can be established by the consumer with the key domain-capable server, and verified by the cloud services provider.

When the key domain-capable server executes the domain launch image, the page tables are referenced by the processor's control register (i.e., CR3) that specifies the physical address for the root of the page table structure. The control register must be set to the correct value on switching into the key domain. In one embodiment, a Switch Key Domain (SwitchKD) instruction includes a keyed hash parameter, such as an SHA3 HMAC. The keyed hash parameter is used to assure that operationally the correct page table structure within the image is used by the cloud services provider server's processor when executing the domain launch image (and thus, that all the memory mappings are correct.) The keyed hash parameter is used to confirm that the cloud services provider's server processor state is correct when entering the domain launch image, as the processor will validate the keyed hash parameter (HMAC) against the cloud services provider server's processor control register state, instruction pointer, stack pointer, etc.

From "Execute Consumer's Domain Launch Image and Verify Entry Point" block 616, control proceeds to "Load Rest of Consumer's Domain Image into Memory" block 618. The key domain-capable server loads remaining portions of the consumer's domain image into memory. The remaining portions of the consumer's domain image may include, for example, the rest of a domain image 2532 of FIG. 25, including operating system(s), application(s), scripts, or other code.

From "Load Rest of Consumer's Domain Image into Memory" block 618, control then proceeds to "Verify Additional Pages of Consumer's Domain Image using Secret Keys included in Domain Launch Image" block 620. The running verified domain image now can verify additional pages of the consumer's domain image using secret keys from the domain launch image. For example, the domain launch image may include secret keys for paging, migration, attestation, communications, and other functions.

From "Verify Additional Pages of Consumer's Domain Image Using Secret Keys Included in Domain Launch Image" block 620, control proceeds to "Perform Secure Operations within Consumer Key Domain" block 624. Once the consumer domain (VM) image has been properly executed and the corresponding key domain has been switched, the domain manager can complete loading an operating system and request additional resources (memory pages, IO resources, etc.) from the cloud services provider's memory manager. Save and restore memory operations (involving, e.g. the VM control structure, control registers, etc.) stay inside the key domain, are performed directly by the memory encryption engine hardware, and are not exposed to the cloud services provider. Because the domain manager image originated as the cloud services provider's software, once verified, the executing domain manager will obey memory manager commands and cooperate with other domain managers. In addition, like a normal VMM, the domain manager will protect the server's hardware and resources from the rest of the consumer domain's less privileged code, such as an operating system, applications, etc.

Figure 7:
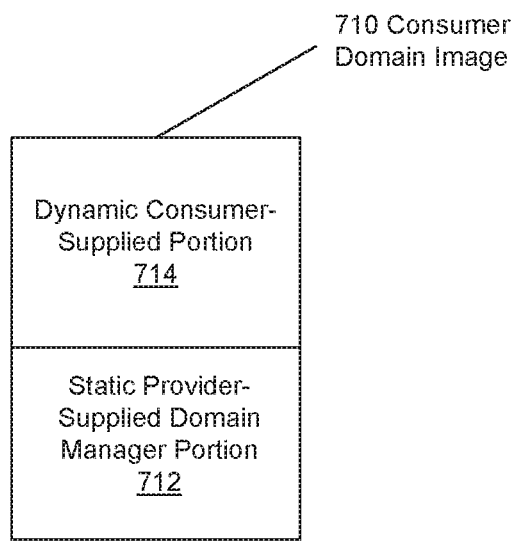
FIG. 7 is a diagram showing components of a consumer domain image in accordance with one embodiment of the invention.

FIG. 7 is a diagram showing components of a consumer domain image (e.g., a consumer VM image) in accordance with one embodiment of the invention. Consumer domain image 710 includes a static provider-supplied domain manager portion 712 and a dynamic consumer-supplied portion 714. In one embodiment, static provider-supplied domain manager portion 712 corresponds to a domain manager (VMMlet), which is privileged code that instantiates and manages consumer virtual machines. The static provider-supplied domain manager portion 712 may also issue a command to the cloud provider service's hardware to create a key domain, providing the consumer's encrypted key domain key to be used to encrypt memory locations belonging to the newly-created key domain. The static provider-supplied domain manager portion 712 may also issue a command to the cloud provider service's hardware to switch to a different key domain, providing the consumer's encrypted key domain key for the key domain to which control is to be switched. A virtual machine managed by the domain manager (VMMlet) may then be caused to operate within the currently active key domain. The domain manager (VMMlet) privileged code can be measured and verified by the consumer, thereby enabling the consumer to trust the domain manager (VMMlet) privileged code as part of its Trusted Computing Base.

To establish the consumer domain image 710 in memory of the cloud provider server, the consumer creates an encrypted domain launch image that is executed in the memory of the cloud provider server. The domain launch image may contain only the basic code needed to (1) cause the cloud services provider server hardware to create a new key domain or switch to an existing key domain within memory of the cloud services provider server and (2) cause some baseline code to operate within that key domain. For example, the domain launch image may create a new virtual machine or cause an existing virtual machine to access data within the memory locations of the key domain established by the portion of code provided in (1).

The domain launch image is created by the consumer as it would appear in designated memory locations of the cloud services provider server's memory. For example, the consumer may encrypt the domain launch image with the consumer's key domain key using a memory position-dependent cipher to cryptographically bind the domain launch image into the designated memory locations of the cloud services provider server's memory. Once the encrypted domain launch image is loaded into the memory locations designated by the memory position-dependent cipher, the executing encrypted domain launch image can then bootstrap dynamically loading additional domain image code (such as dynamic consumer-supplied portion 714 code) into the consumer's domain image 710. In one embodiment, dynamic consumer-supplied portion 714 corresponds to the consumer domain image's less privileged code, such as an operating system, applications, etc.

In one embodiment, the consumer's encrypted domain launch image includes at least the domain manager (VMMlet) privileged code. In at least one embodiment, the consumer's encrypted domain launch image also includes some consumer-supplied code.

Because the domain launch image is encrypted by the consumer using the consumer's key domain key in the consumer's own environment, the executing encrypted static portion 712 can be described as being made "externally" to the key domain. Because only the consumer knows the key domain key, the cloud services provider cannot create, add code to, or modify the consumer's encrypted domain launch image without corrupting the consumer's encrypted domain launch image.

Once code included in the consumer's domain launch image begins to execute on behalf of the consumer within the key domain, the executing consumer's domain launch image code can take over and extend the consumer's domain image 710. Extending the consumer's domain image 710 includes, for example, dynamically adding new code (such as dynamic consumer-supplied portion 714) to the consumer's domain image 710. New code can be added to and/or modifications can be made to the consumer's domain image 710 from within the key domain using a protocol determined by the consumer (e.g., the consumer's domain image 710 may be extended only after new extension code segments are verified).

As the consumer's domain image 710 writes to memory from within the key domain, data from those memory write operations is encrypted and tweaked with the memory addresses by the memory encryption engine. Read and write operations performed from within the key domain are therefore also location-dependent because they are created from code executing within the key domain. Such operations can be described as being made "internally to the key domain" by the memory encryption engine. In other words, the cloud services provider software executing outside the key domain cannot modify or rearrange this dynamically-created portion of the consumer domain image.

In one embodiment, a consumer domain image that has been extended dynamically can be converted to a static version of the consumer domain image. For example, converting from a dynamic to a static consumer domain image could be performed when execution of a virtual machine instantiated from the consumer domain image has been suspended and is to be resumed. A copy of the dynamic consumer domain image could be captured at the time the virtual machine is suspended, the copy of the dynamic consumer domain image could be flushed to memory, and ciphertext bound to the addresses from memory could be saved. The consumer could recalculate any integrity check values associated with the memory addresses and re-create the consumer domain image to incorporate those integrity check values. The re-created consumer domain image could be re-launched as a static consumer domain image when the virtual machine is to be resumed.

As described with reference to FIGS. 5 and 6, the encrypted domain launch image created by the consumer includes a consumer domain manager (VMMlet) image, which is a modified version of the cloud services provider-supplied domain manager (VMMlet) image. The provider-supplied domain manager (VMMlet) image is modified to incorporate memory position-dependent address information for a designated server of the cloud services provider. The consumer domain manager image is statically bound to the designated server and the designated server's memory addresses, which means that the consumer domain manager image must be installed and executed at a designated memory address of the designated server in order to function properly.

The cloud services provider executes the consumer's encrypted domain launch image (containing the consumer's domain manager (VMMlet) image), which causes an initial static domain manager image to be installed at a designated static memory address of the designated server. The initial static domain manager image is executed on the cloud services provider's server as a consumer domain manager (VMMlet). The consumer domain manager (VMMlet) manages virtual machines on behalf of the consumer by causing code of the consumer's VM image to be loaded into memory and executed as a consumer domain (VM). A consumer domain (VM) performs operations on data in the server's memory through the server's memory encryption engine. A memory footprint for the consumer domain (VM) image dynamically grows and shrinks as contents of the consumer domain (VM) image dynamically change.

Figure 8:
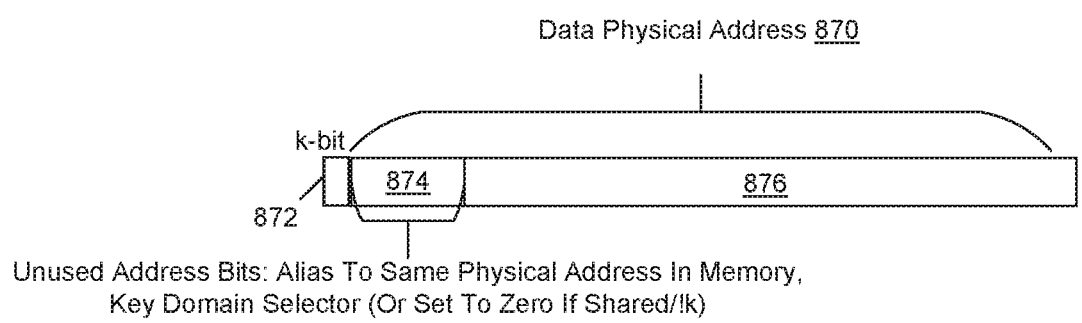
FIG. 8 is a diagram showing a data physical address in accordance with one embodiment of the invention.

FIG. 8 is a diagram showing a data physical address 870 in accordance with one embodiment of the invention. Data physical address 870 may be used to determine a key or a tweak, discussed above.

As described above, a key domain can be defined using unused physical address bits 874 (also referred to as alias bits 874) of the data physical address 870 (or, alternatively, other metadata passed through a cache). For example, because there will likely be less physical memory installed in a system than can be addressed using a 64-bit physical memory address, the unused most significant address bits 874 can be used to select between different "key domains." As described above, the term "key domain" refers to a set of memory locations that are encrypted with a common key domain key. Unused bits of the data physical address 870 may be used to determine, for example, which key and/or tweak is to be used when encrypting and/or decrypting memory for a physical memory address. Different keys can be selected for the same data physical address 870 based on unused address/alias bits 874. For example, the encryption technique XTS (XEX-based tweaked-codebook mode with ciphertext stealing) may use the unused address/alias bits 874 for a tweak for the same physical memory location, where different address aliases may result in different ciphertext even if the data is the same.

The remaining bits 876 of the data physical address are used to identify the physical memory address of the location in memory where the data is stored. Although two key domain addresses can alias to the same external memory location, when data from the physical memory location is read into a cache, the cache holds the key domain addresses independently at the full address resolution (e.g., including the full 64-bit physical memory address).

Different keys can be selected based on unused address bits (e.g., XTS may use the alias bits for a tweak for the same physical memory location), where different address aliases may result in different ciphertext even if the data is the same.

Because the unused address bits 874 alias to the same physical address in memory for a key domain when there are unused address bits due to unpopulated memory, the key domain selector can be set to the value of the unused address bits. Alternatively, the key domain selector can be set to zero if data in the physical address in memory is to be shared (i.e., not limited to a particular key domain).

In one embodiment, "k-bit" field 872 represents one bit of the data physical address 870, in this case, the upper-most bit of the data physical address 870. The k-bit can be set by a domain manager (VMMlet) or by a virtual machine (VM) in page tables or extended page tables to indicate whether data resulting from a memory access should be encrypted with the corresponding key domain key. When k-bit=0, the k-bit is said to be disabled and data resulting from the memory access are not encrypted by the key domain key (although it is possible that the data may be encrypted using a shared key). When k-bit=1, the k-bit is said to be enabled and results of the memory access are encrypted with the key domain key. The k-bit field 872 can also be used to designate a range of memory that is shared and does not require key domain encryption. In an alternative embodiment, the k-bit can be additional metadata associated with cache lines and carried through the cache rather than a component of the data physical address.

In the scenario when a system has sufficient installed memory such that all the address bits of data physical address 870 are used (with the exception of the one k-bit 872), the key domain addresses consume a physical range of the total populated memory (corresponding to the key domain's physical address bits) when k-bit is true/enabled. When k-bit is off/disabled, the key domain selector bits 874 reference all the memory ranges, but as plaintext (or shared), such that all populated memory is addressable as shared memory.

Figure 9:
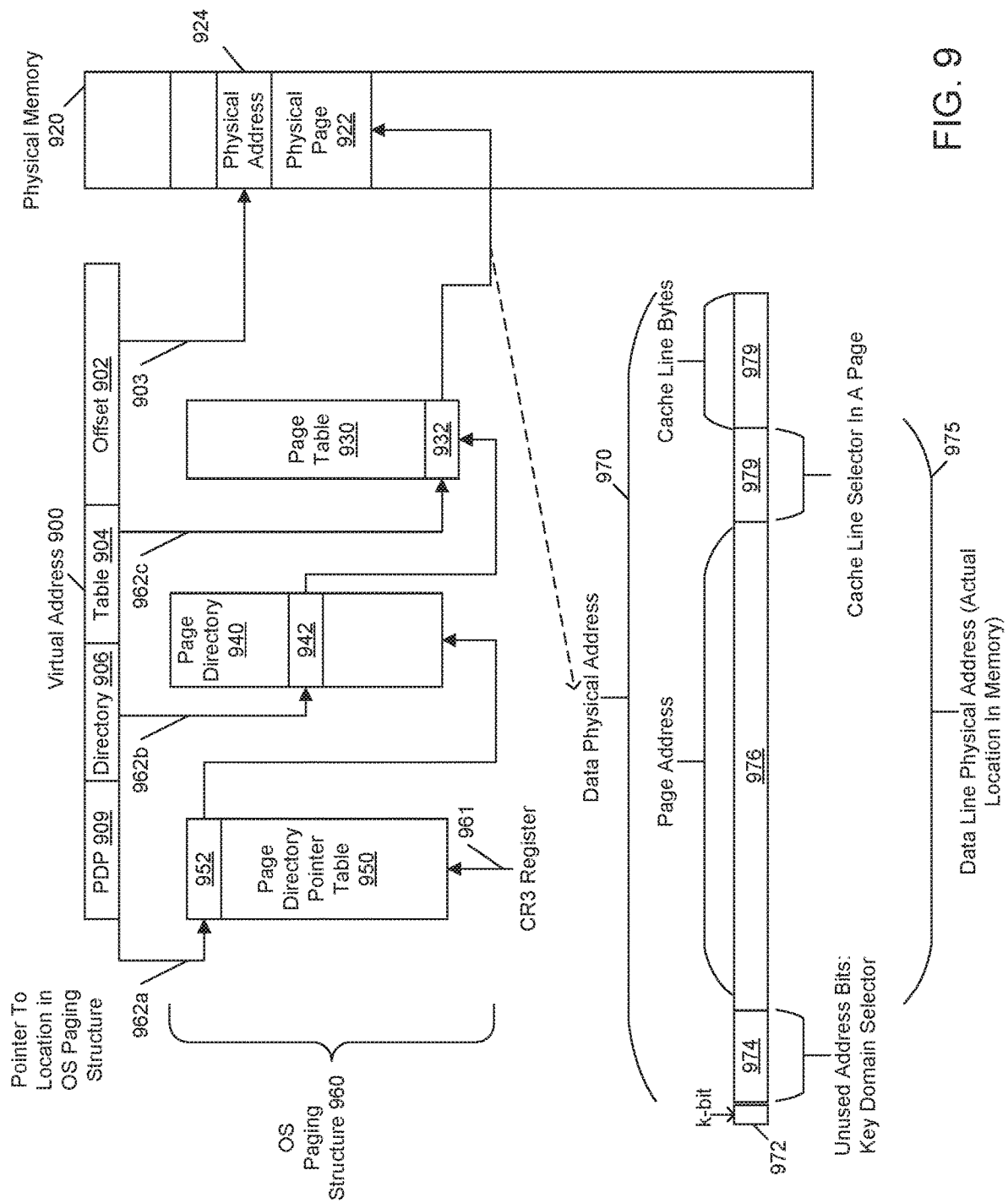
FIG. 9 is a diagram showing virtual to physical memory mapping in accordance with one embodiment of the invention.

FIG. 9 is a diagram showing virtual to physical memory mapping in accordance with one embodiment of the invention. Many computer systems today use virtual memory systems to manage and allocate memory to various processes running within the system. Virtual memory allows each process running on the system to operate as if it has control of the full range of addresses provided by the system. The operating system (OS) maps the virtual address space for each process to the actual physical address space for the system. Mapping from a physical address to a virtual address is typically accomplished through the use of page tables.

The term "address space" is used herein to mean a set of addresses in memory corresponding to a given process or virtual machine (VM), and an "address space identifier (ASID)" may be any number, code, or other notation which identifies one or more address spaces with which the ASID is associated.

FIG. 9 represents the case where there is no aliasing; i.e., sufficient memory is available in the system such that the key domain selector address bits 974 are used together with the page address 976 and cache line selector 978 to select an actual physical memory location referenced by data line physical address 975. Here, each individual key domain will be located in a non-overlapping range of physical memory 920.

FIG. 9 shows a virtual address to physical address mapping in accordance with an embodiment of the invention. A physical address 924 within a physical page 822 in a physical memory 920 may be addressed using a virtual address 900. As shown, virtual address 900 includes a number of fields to index a multi-level paging structure 960 to access physical address 924, which addresses a particular physical page 922 within a physical memory 920. Note that multi-level paging structure 960 is just one example of a multi-level paging structure for accessing a physical memory location. While multi-level paging structure 960 is described with reference to a 64-bit virtual address, different page table structures may be used for 32-bit virtual addresses, Physical Address Extension (PAE) extended mode addresses, or other types of virtual addresses.

In virtual address 900, an offset field 902 (such as bits 0-11 of a 64-bit address) is used to address the physical address 924 (as shown by pointer 903) within a physical page 922 of physical memory 920. A page table entry field 904 (entitled "table," such as bits 12-20 of a 64-bit address) addresses a page table entry 932 (as shown by pointer 962c) in a page table 930. A page directory entry 906 (entitled "directory," such as bits 21-29 of a 64-bit address) addresses a page directory entry 942 (as shown by pointer 962b) in a page directory 640. A page directory pointer 909 (entitled "PDP," such as bits 30-38 of a 64-bit address) addresses a page directory pointer entry 952 (as shown by pointer 962a) in a page directory pointer table (PDPT) 950. The base address of OS paging structure 960 may be accessed using a pointer 961 in a control register, such as CR3. In such manner, a 64 bit linear address may be used to implement a multi-level paging 9 structure to access a physical address.

FIG. 9 also shows components of a data physical address 970 corresponding to physical address 924 of physical page 922 of physical memory 920. "K-bit" field 972 represents one bit of the data physical address 970, in this case, the upper-most bit of the data physical address 970. The k-bit can be set by a domain manager (VMMlet) or by a virtual machine (VM) in page tables or extended page tables to indicate whether data resulting from a memory access should be encrypted with the corresponding key domain key. When k-bit=0, the k-bit is said to be disabled and data resulting from the memory access are not encrypted by the key domain key (although it is possible that the data may be encrypted using a shared key). When k-bit=1, the k-bit is said to be enabled and results of the memory access are encrypted with the key domain key. The k-bit field 772 can also be used to designate a range of memory that is shared and does not require key domain encryption. In an alternative embodiment, the k-bit can be additional metadata associated with cache lines and carried through the cache rather than a component of the data physical address.

In data physical address 970, the "Unused Address Bits: Key Domain Selector" field 974 may represent a set of unused address bits that are used to distinguish between key domains. If the unused address bits of two data physical addresses have different values, then they alias to the same physical address in memory. The "Page Address" field 976 represents the address of the physical page 922 in physical memory 920. The "Cache Line Selector" field 978 represents a cache line within the page referenced by "Page Address" field 976. Together, the "Page Address" field 976 and the "Cache Line Selector" field 978 make up the "Data Line Physical Address" field 975, which represents the actual physical location in physical memory 920. The "Cache Line Bytes" field 979 contains the number of bytes in the cache line.

Figure 10:
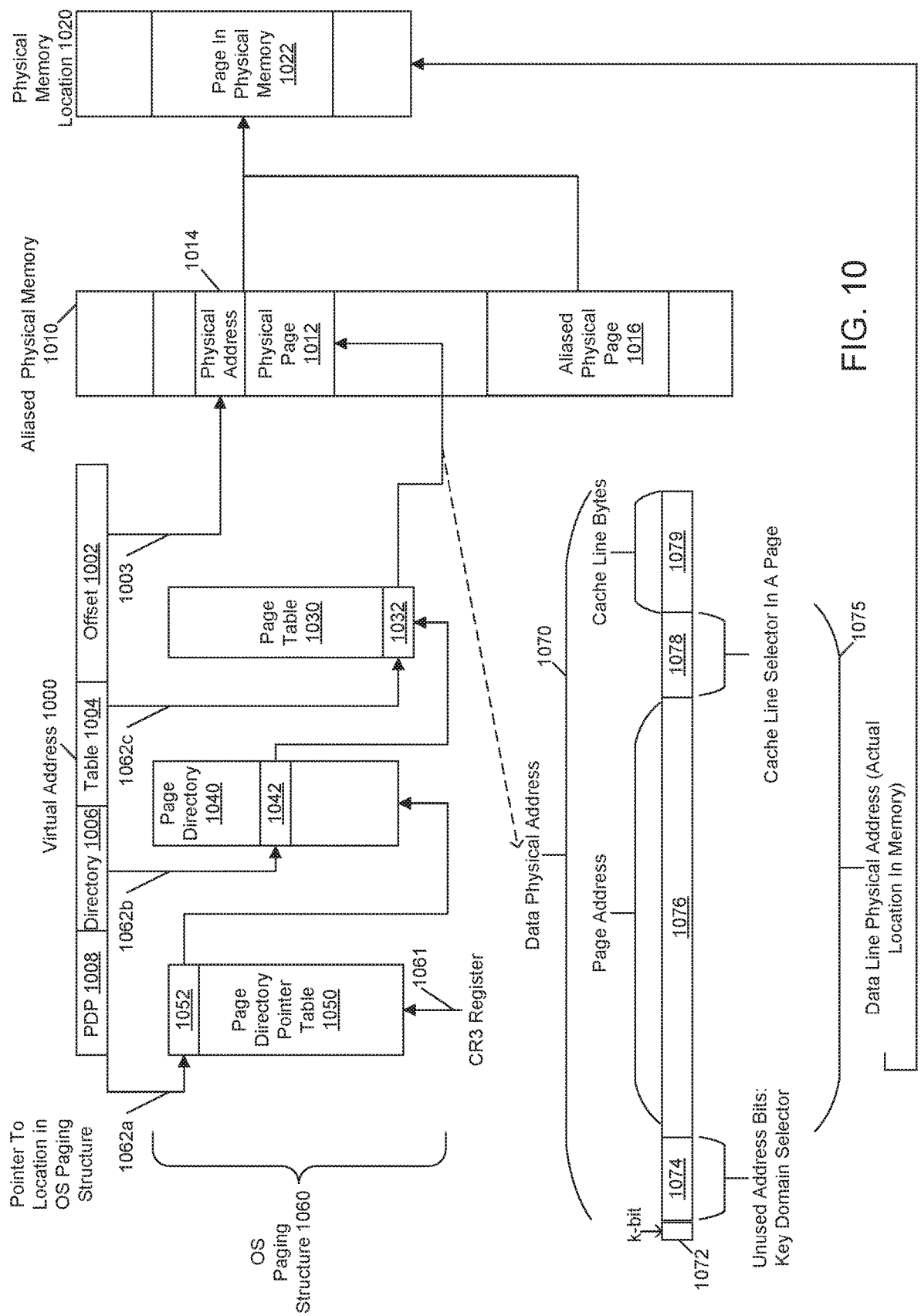
FIG. 10 is a diagram showing another virtual to physical memory mapping in accordance with one embodiment of the invention.

Referring now to FIG. 10, shown is another virtual address to physical address mapping in accordance with an embodiment of the invention. As shown in FIG. 10, an aliased guest physical address 1014 within an aliased guest physical page 1012 in an aliased physical memory 1010 may be addressed using a virtual address 1000. As shown, virtual address 1000 includes a number of fields to index a multi-level paging structure 1060 to access aliased guest physical address 1014, which addresses a particular page 1022 within a physical memory location 1020. Note that multi-level paging structure 1060 is just one example of a multi-level paging structure for accessing a physical memory location. While multi-level paging structure 1060 is described with reference to a 64-bit virtual address, different page table structures may be used for 32-bit virtual addresses, Physical Address Extension (PAE) extended mode addresses, or other types of virtual addresses.

Aliased physical memory 1010 also includes aliased guest physical page 1016, which represents a second range of aliased guest physical memory 610 that is aliased to the same physical memory location 1022.

In virtual address 1000, an offset field 1002 (such as bits 0-11 of a 64-bit address) is used to address the aliased guest physical address 1014 (as shown by pointer 1003) within an aliased guest page 1012 of aliased physical memory 1010. A page table entry field 1004 (entitled "table," such as bits 12-20 of a 64-bit address) addresses a page table entry 1032 (as shown by pointer 1062c) in a page table 1030. A page directory entry 1006 (entitled "directory," such as bits 21-29 of a 64-bit address) addresses a page directory entry 1042 (as shown by pointer 1062b) in a page directory 640. A page directory pointer 1008 (entitled "PDP," such as bits 30-38 of a 64-bit address) addresses a page directory pointer entry 1052 (as shown by pointer 1062a) in a page directory pointer table (PDPT) 1050. The base address of OS paging structure 1060 may be accessed using a pointer 1061 in a control register, such as CR3. In such manner, a 64 bit linear address may be used to implement a multi-level paging structure to access a physical address.

Figure 11:
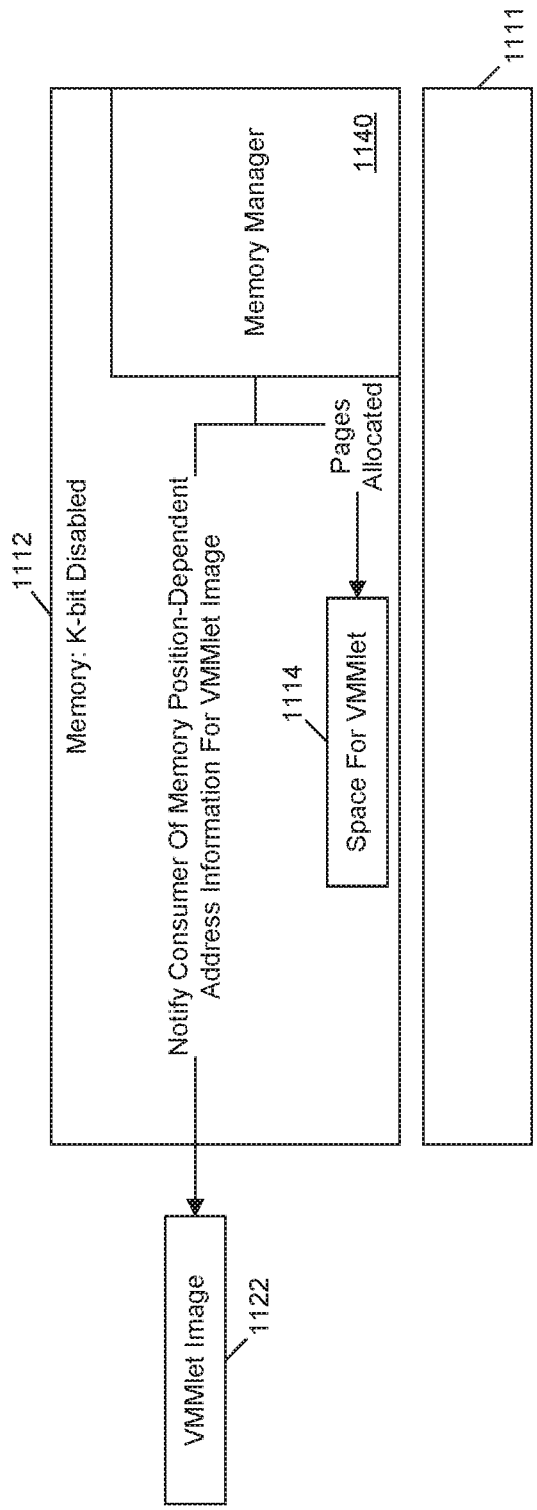
FIG. 11 is a diagram showing initial steps by a cloud services provider to provide a domain image to a consumer in accordance with one embodiment of the invention.

FIG. 11 is a diagram showing initial steps by a cloud services provider to provide a domain image to a consumer in accordance with one embodiment of the invention.

In the example shown in FIG. 11, a memory manager 1140 of a cloud services provider server including hardware 1110 allocates space 1114 in memory 1112 for the domain image 1122, and notifies the requesting consumer of memory position-dependent address ("fix-up variable") information. This memory position-dependent address ("fix-up variable") information may include, inter alia, physical addresses of pages in memory (such as the physical addresses of the pages making up space 1114), physical addresses for page tables, control register information, interrupt descriptor table register information, etc.). As an alternative embodiment, the cloud services provider can create an already fixed-up domain image that the consumer can re-verify as correct. Specifically, the portion of the domain image that needs to be altered is the physical memory page addresses in the page tables as shown in FIG. 9, page table entry 832. Page table entry 932 points to physical page 922 in physical memory 920. The domain image can be viewed as a series of pages (e.g., 4 Kbytes each), with each page given a physical page address (its location in memory). Image verification then comprises checking that the virtual to physical mappings through the page tables are correct given the contents of the pages comprising the domain image.

Figure 12:
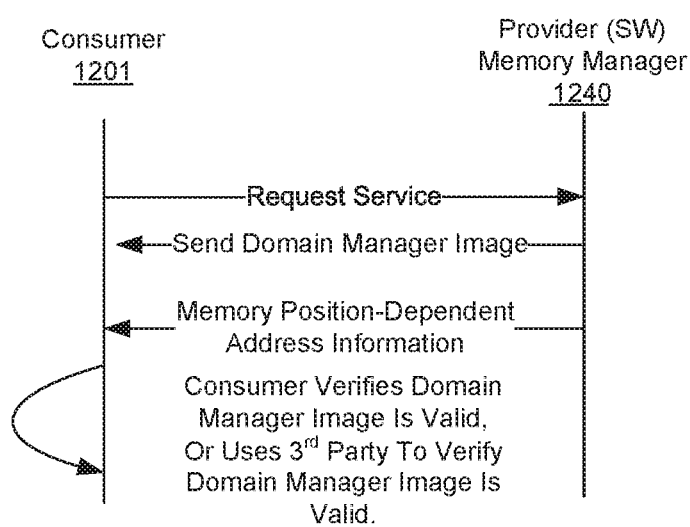
FIG. 12 is a diagram showing messages between a consumer and a cloud services provider to provide a domain image to the consumer in accordance with one embodiment of the invention.

FIG. 12 is a diagram showing messages between a consumer 1201 and a cloud services provider's memory manager 1240 to provide a domain manager image (such as VMMlet image 1122 of FIG. 11) to the consumer in accordance with one embodiment of the invention.

In response to a consumer's request for service, software of a cloud services provider's server (i.e., memory manager 1240) is configured to provide a domain manager image (such as VMMlet image 1122 of FIG. 11) to the consumer. The memory manager 1240 also sends memory position-dependent address information, also referred to herein as fix-up variable information, for the domain manager image to the consumer. The consumer verifies that the domain manager image is valid or uses a third party to verify that the domain manager image is valid.

After determining that the domain manager (VMMlet) image is valid as described with reference to FIG. 11, the consumer use memory position-dependent address information identifying memory locations provided by the cloud services provider as fix-up variable information to modify the verified domain manager image provided by the cloud services provider to create a domain launch image to launch the domain manager (VMMlet). Alternatively, the domain manager image may be "fixed-up" by the cloud services provider, so that the domain manager image is prepared to run in the allocated memory locations.

In one embodiment, the consumer may also add the consumer's own components, such as the consumer's secret keys for secure communications, to the domain launch image. Having a method for secure communication allows the consumer's basic domain launch image to securely retrieve the rest of the consumer's domain (VM) image from the consumer using the consumer's secret keys. The consumer may also include the consumer's own operating system, applications, etc., in the domain launch image.

Finally, when the consumer's domain launch image includes any consumer-supplied components, the consumer encrypts the domain launch image. "Fixing up" the domain manager (VMMlet) image and creating the encrypted domain launch image is described further with reference to FIG. 13.

Figure 13:
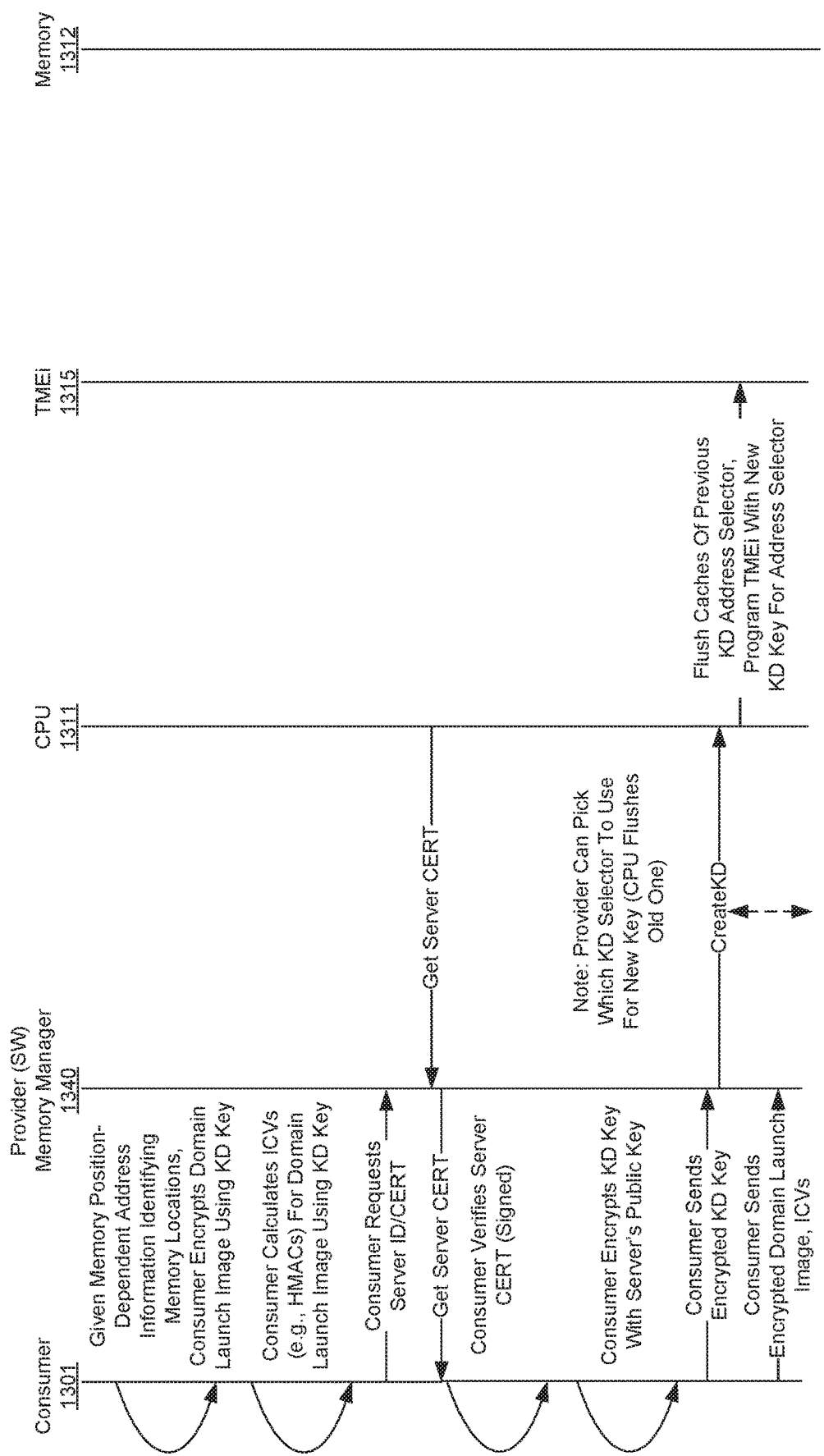
FIG. 13 is a diagram showing a consumer providing an encrypted domain image in accordance with one embodiment of the invention.

FIG. 13 is a diagram showing messages between components of a cloud service environment to encrypt a domain launch image and establish a key domain in accordance with one embodiment of the invention. As described above, the consumer 1301 modifies the verified domain manager image provided by the cloud services provider to create a domain launch image for the domain manager (VMMlet). The domain launch image is then encrypted using a memory position-dependent "tweaked" cipher and the consumer's key domain key.

The consumer 1301 may also calculate integrity check values (ICVs, e.g., keyed-hash message authentication codes (HMAC) values) for the encrypted domain launch image using the key domain key. The ICVs may be calculated as position-dependent values and are used to verify the position as well as the contents of the associated memory locations for the encrypted domain launch image.

The consumer 1301 requests the cloud services provider memory manager 1340 to identify a server in the cloud services provider's network that provides key domain management functionality. The cloud services provider memory manager 1340 obtains a server certificate for a key domain-capable server (in this example, from a server having CPU 1311) and provides the server certificate to the consumer 1301. The consumer 1301 verifies that the server certificate is signed by an authority certifying that the identified server provides key domain management functionality.

The consumer 1301 encrypts the consumer's key domain key with the cloud services provider's key domain-capable server's public key corresponding to the key domain-capable server's certificate. The consumer 1301 sends the encrypted key domain key, encrypted launch image, and (optionally) integrity check values (ICVs) to the cloud services provider memory manager 1340, which provides a Create Key Domain (CreateKD) command to the CPU 1311 of the key domain-capable server. In one embodiment, the cloud services provider memory manager 1340 identifies a key domain address selector to use for the new key domain, providing the key address domain selector to the CPU 1311 of the key domain-capable server. The CPU 1311 of the key domain-capable server creates and initializes a key domain. Initializing the key domain may include flushing caches of any previous key domain (identified by the previous key domain address selector) as well as flushing translation look-aside buffers that cached address mappings for the previous key domain. As an alternative to performing initialization functions as part of the Create Key Domain instruction, the CPU 1311 of the key domain-capable server may execute an Initialize Key Domain (InitKD) instruction to flush the caches and translation look-aside buffers. The CPU 1311 of the key domain-capable server may also provide the encrypted key domain key and key domain address selector identifying the new key domain to a memory encryption engine 1315 (shown in FIG. 13 as a Total Memory Encryption engine with integrity, designated as TMEi 1315), although an alternative embodiment is to use a Memory Encryption Engine (MEE)).

Figure 14:
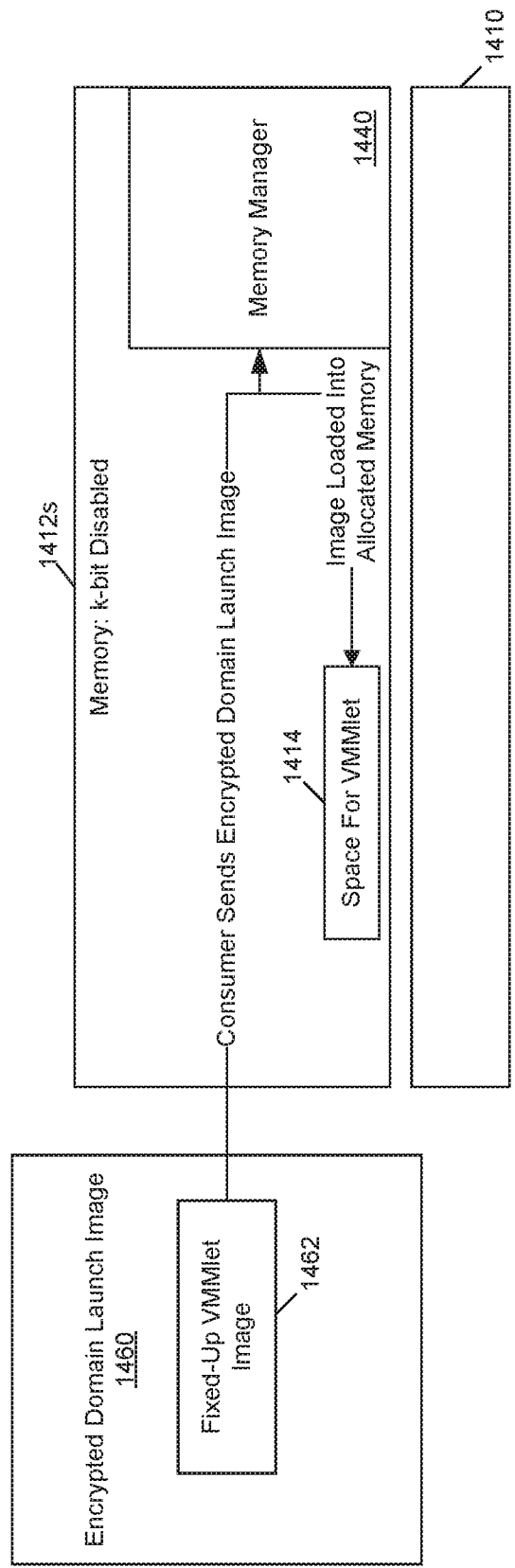
FIG. 14 is a diagram showing messages between components of a cloud service environment to encrypt a domain image and establish a key domain in accordance with one embodiment of the invention.

FIG. 14 is a diagram showing a consumer providing an encrypted launch image for a domain manager (VMMlet) in accordance with one embodiment of the invention. As described above with reference to FIGS. 5, 12 and 13, a consumer encrypts a domain launch image using memory position-dependent address information provided by the cloud services provider and a key domain key. In one embodiment, the consumer encrypts the domain launch image in a memory position-dependent XTS mode using page address tweaks and the key domain key.

In FIG. 14, the consumer 1410 sends a fixed-up VMMlet 1462 (which is a modified version of the provider's original VMMlet 1022 of FIG. 10) as part of an encrypted domain (VM) launch image 1460 to the cloud services provider's memory manager 1440. The cloud services provider's memory manager 1440 loads the Fixed-up VMMlet image 1462 of the encrypted VM launch image 1460 into the previously allocated memory space 1414 that has been reserved (as space 1014 of FIG. 10) within shared memory 1412s. Because shared memory 1412s is unencrypted memory pages (with k-bit disabled), memory manager 1440 needs to ensure that the encrypted VM launch image is completely loaded into physical memory 1412s and does not remain cache-resident. Writing the encrypted VM launch image 1460 to physical memory 1412s can be accomplished by either flushing the encrypted VM launch image 1460 from cache (e.g., using a CLFLUSH instruction), or using uncached/write through/non-temporal memory accesses. These techniques for write operations assure that the consumer's encrypted image data is directly written past a memory encryption engine of hardware 1410 and into memory 1412s (and does not remain cache resident).

Figure 15:
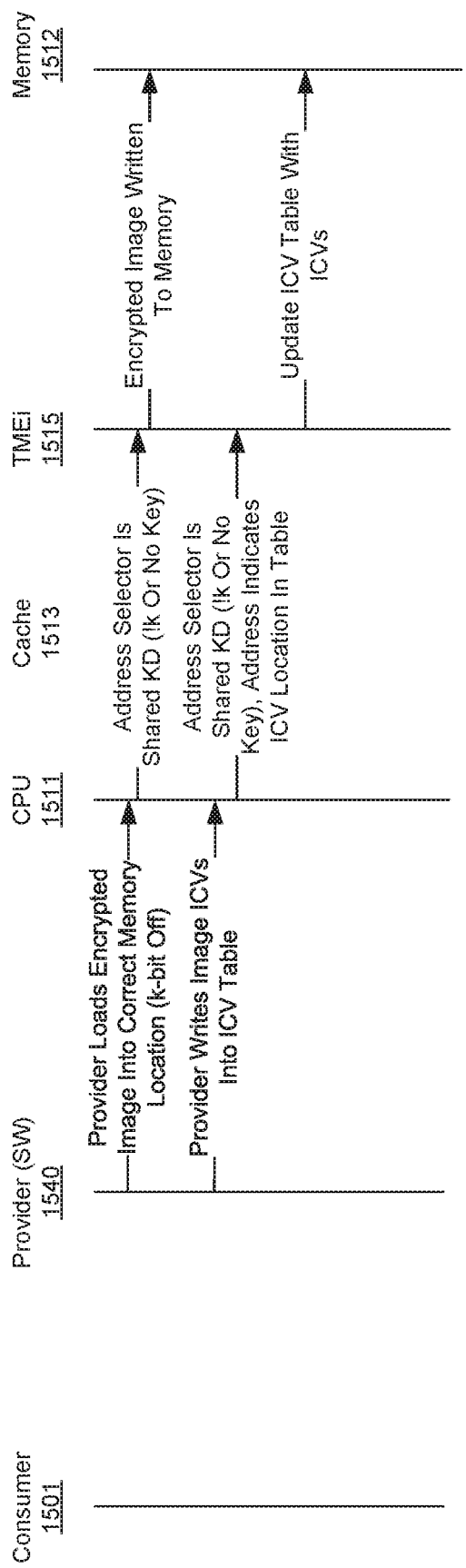
FIG. 15 is a diagram showing messages between components of a cloud service environment to load a consumer's encrypted domain image into memory of a key domain-capable server in accordance with one embodiment of the invention.

FIG. 15 is a diagram showing messages between components of a cloud service environment to load a consumer 1501 encrypted domain image into memory 1512 of a key domain-capable server in accordance with one embodiment of the invention. As described above with regard to FIG. 11, cloud services provider's software, such as a memory manager 1540 of the key domain-capable server, loads the consumer-encrypted domain launch image into unencrypted memory pages (with k-bit disabled) of memory 1512. The cloud services provider's software (i.e., memory manager 1540) also writes ICVs for the encrypted domain image into an ICV table. The ICV table can be a protected range of memory 1512 managed and protected by a memory encryption engine (TMEi) engine 1515. Write operations by software components that are not part of memory manager 1540 to this range of memory addresses may be intercepted by the memory encryption engine (TMEi) 1515, which can likewise configure the ICV values in memory 1512.

Similarly, the memory encryption engine (TMEi) 1515 may prevent software from reading ICV values from this protected memory range to prevent the replay of ICV values by malicious software. Only memory encryption engine (TMEi) 1515 can read the ICV values once they have been established. Preventing software from replaying ICV values prevents the replay of dynamic domain image contents (e.g., the rest of the consumer's domain image provided subsequent to the domain launch image). Static image contents (e.g., the domain launch image) can be replayed because the ICV values for the static image contents are provided by the consumer.

The ICVs themselves provide an integrity check of the data and data's location (address), and the ICVs are keyed using the key domain key, or derivative thereof, used to encrypt the data line the ICV is checking. (For example, HMAC uses a secret key, as does Galois/Counter Mode (GCM) and IPHash.)

In one embodiment, a partial copy of the diffused cache line data is XTS encrypted with the key domain key to compute a secure ICV. In one embodiment, ICV table entries are encrypted with the same key domain key as the memory locations that they are used to integrity check. Encrypting both the ICVs and the data in memory locations that the ICVs protect with the same key domain key cryptographically assures that the ICVs belong to the same key domain as the data they protect.

The address selector for the key domain is also provided in unencrypted memory (with k-bit disabled). The address also indicates the location in the ICV table containing ICVs for the key domain when writing an ICV computed by the consumer using the consumer's key domain key to the ICV table. (In other words, for every data line written to memory from the consumer's encrypted Domain launch image, there is a corresponding integrity check value written to the ICV table for that data line).

No key domain is used to write the consumer's encrypted domain launch image data to memory 1512 (because the consumer's domain launch image data is already encrypted by the consumer). In other words, memory manager 1540 may write the consumer's encrypted domain launch image to shared, unencrypted locations in memory 1512 without any additional encryption. (Memory manager 1540 loads the consumer's encrypted image into memory 1512 so that when memory encryption is turned on with the consumer's key (setting k-bit to 1 or "enabled,") memory encryption engine (TMEi) 1515 will properly decrypt the consumer's image when reading it from memory 1512).

The CPU 1511 for the key domain-capable server obtains the address selector for the key domain from the unencrypted locations in memory 1512 and provides the address selector for the key domain to the memory encryption engine (TMEi) 1515. The memory encryption engine (TMEi) 1515 then writes the encrypted launch image to memory 1512 of the key domain-capable server. Similarly, the CPU 1511 for the key domain-capable server obtains the address indicating the location in the ICV table containing ICVs for the key domain. The CPU 1511 provides the location of the ICV table containing ICVs for the key domain to the memory encryption engine (TMEi) 1515. The memory encryption engine (TMEi) 1515 then updates the ICV table in memory 1512 with the ICVs for the key domain. Memory manager 1540 either flushes these values from cache 1513 (e.g., by issuing a command to execute a CLFLUSH instruction), or uses uncached/write through/non-temporal memory access to assure the ICV data is directly written to memory 1512.

Updating the integrity check values (ICVs) for the key domain in the memory of the key domain-capable server is a write-only operation, such that the cloud services provider's software (memory manager 1540) cannot read the ICVs for the key domain. This write-only operation prevents replay of dynamic image data. Only the domain launch image ICVs can be replayed in-place (the consumer knowing the place because the consumer created the encrypted launch image and ICVs). This functionality allows the provider to suspend, store and later resume VMs reusing the consumer's domain launch image, without exposing additional ICVs, such as those ICVs created dynamically as memory is updated by applications executing within a current key domain, to the cloud services provider's software (not even memory manager 1540).

Figure 16:
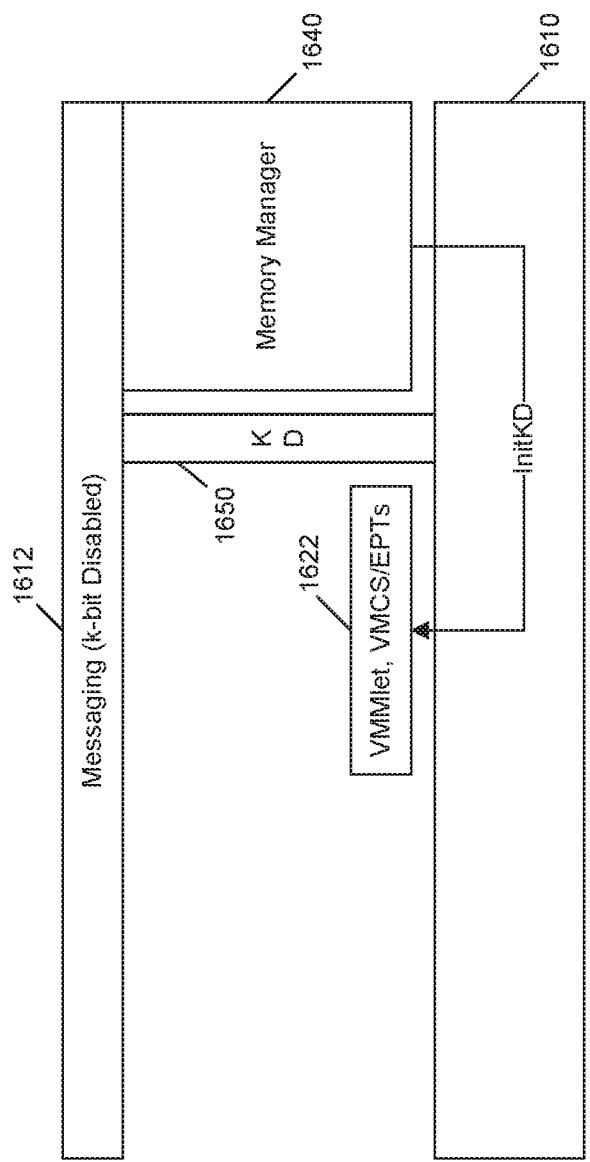
FIG. 16 is a diagram showing the initialization of a key domain in accordance with one embodiment of the invention.

FIG. 16 is a diagram showing the initialization of a key domain in accordance with one embodiment of the invention. A memory manager 1640 of the key domain-capable server can initialize the new key domain 1650 by issuing an Initialize Key Domain (InitKD) command to the domain manager (VMMlet) 1622. The InitKD command causes the CPU 1611 of the key domain-capable server to execute an InitKD instruction, which quiesces cores, flushes caches of old key domains, flushes all translation look-aside buffers and address space identifiers (ASIDs) containing the old key domain mappings, and initializes the key domain-capable server's memory encryption engine (TMEi) with the new key domain key for the key domain address selector.

In one embodiment, initialization of a key domain is one of the actions performed by a Create Key Domain (CreateKD) instruction. References to a Create Key Domain (CreateKD) instruction hereinafter may refer to a CreateKD instruction that not only creates a key domain from the server's public key-encrypted key domain key, but also initializes the new domain by quiescing cores, flushing caches of old key domains, flushes all translation look-aside buffers and address space identifiers (ASIDs) containing the old key domain mappings, and initializing the key domain-capable server's memory encryption engine (TMEi) with the new key domain key for the key domain address selector.

Figure 17:
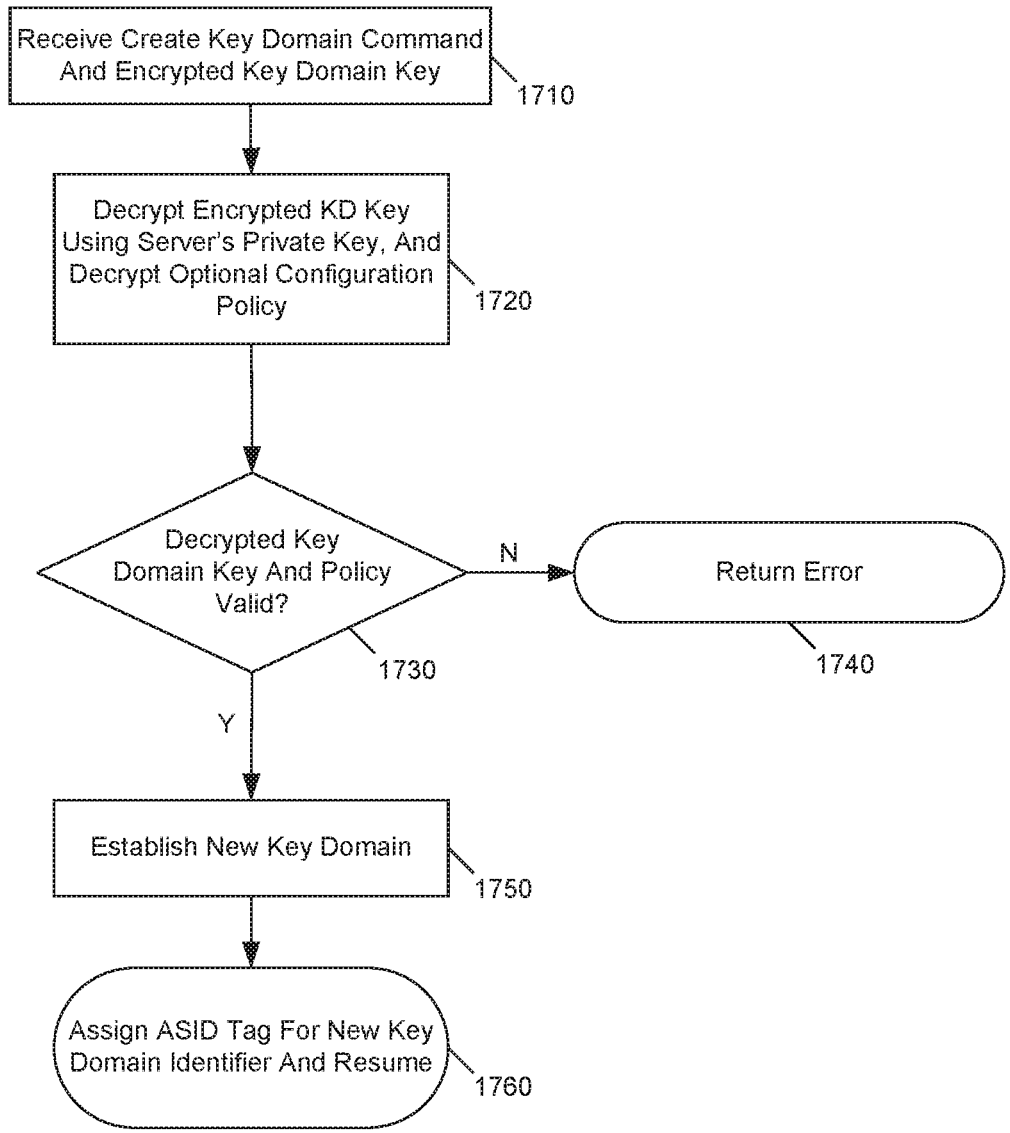
FIG. 17 is a flowchart of a method of operation of a CPU of a key domain-capable server in performing a Create Key Domain operation in accordance with one embodiment of the invention.

FIG. 17 is a flowchart of a method of operation of a CPU of a key domain-capable server in performing a Create Key Domain operation in accordance with one embodiment of the invention. In "Receive Create Key Domain Command with Encrypted Key Domain Key" block 1710, the key domain-capable server CPU receives a Create Key Domain command with input parameters KD_Id, the local key domain identifier (key domain address selector), and Encrypted_Key, the encrypted key domain key. Control proceeds to "Decrypt Encrypted Key Domain Key Using Server's Private Key, and Decrypt Optional Configuration Policy" block 1720, where the encrypted key domain key is decrypted using the server's private key, a secret key that is unknown/unexposed to the cloud services provider. Optionally, a configuration policy may also be decrypted, again using the server's private key, or alternatively, a hash value of the policy data may be decrypted using the server's private key. Control proceeds to "Decrypted Key Domain Key and Policy Valid?" decision point 1730. Examples of policy data that may be evaluated include the amount of memory a server is expected to have installed, the encryption algorithms the server should use, that number of CPUs that are socketed, whether hardware debug is allowed, etc. This policy data is compared by hardware against the server's current configuration to assure that the server's configuration is valid per the consumer's expectations prior to using the consumer's key domain key. If the decrypted key domain key and configuration policy are not valid, control proceeds to "Return Error" block 1740, where the CPU returns an error in response to the Create Key Domain command.

At "Decrypted Key Domain Key and Policy Valid?" decision point 1730, if the decrypted key domain key and configuration policy are valid, control proceeds to "Establish New Key Domain" block 1750. In establishing a new key domain, the CPU of the key domain-capable server prevents other CPUs from using the key domain identifier or otherwise verifies that other CPUs are not currently using the key domain identifier, flushes caches for the key domain identifier, flushes all translation look-aside buffer address space identifiers for the key domain identifier, and sets the current key domain identifier and key domain key in the memory encryption engine. Control then proceeds to "Assign ASID Tag for New Key Domain Identifier and Resume" block 1760, where a new address space identifier (ASID) tag is assigned for the new key domain identifier, and the process issuing the Create Key Domain command is resumed. Furthermore, all processors are re-enabled if previously quiesced.

Figure 18:
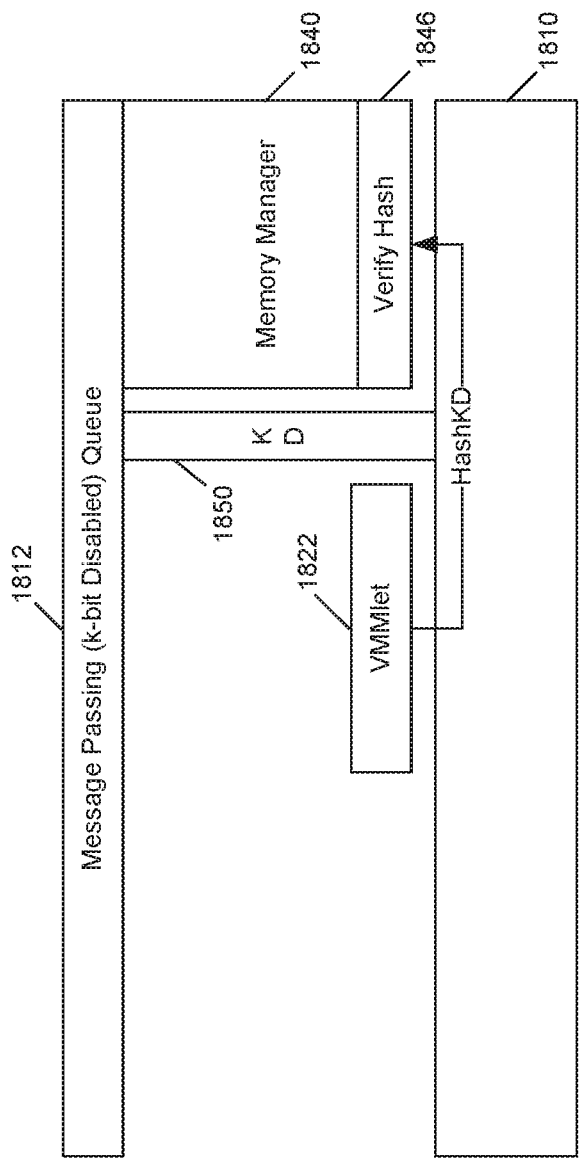
FIG. 18 is a diagram showing verification of the domain image in accordance with one embodiment of the invention.

FIG. 18 is a diagram showing verification of a domain image in accordance with one embodiment of the invention. A Verify Hash function 1846 of the memory manager 1840 of a key domain-capable server verifies that the domain image (e.g., VMMlet 1822) for key domain 1850 is correct using a Hash Key Domain (HashKD) instruction. Some values in the domain image will be values for machine-specific variables/fixups (such as physical addresses used in page tables). Hash values for these machine-specific variables can be virtually reconstructed (substituting the current address values) by the cloud services provider. When the resulting HashKD hash value matches the expected value for a hash of the domain manager (VMMlet) provider/static portion of the image, both the consumer and the cloud services provider agree that the domain launch image is correct. Some other image locations may contain the consumer's secrets (keys/code/data, e.g. in the OS portion of the domain image). These locations can be hashed but the hash values will not disclose the memory plaintext (and thus the secret) to the cloud services provider. Hash values may have a minimum granularity, such as no less than a cache line or no less than a page of memory (e.g. 4 KB).

When a secure VM executes for the first time, the secure VM may turn off the HashKD functionality into its key domain, as the HashKD may be used on initialization to read through a key domain, providing visibility to the cloud services provider that the domain manager (VMMlet) was properly provisioned by the consumer. Otherwise, the HashKD functionality may not be needed.

Figure 19:
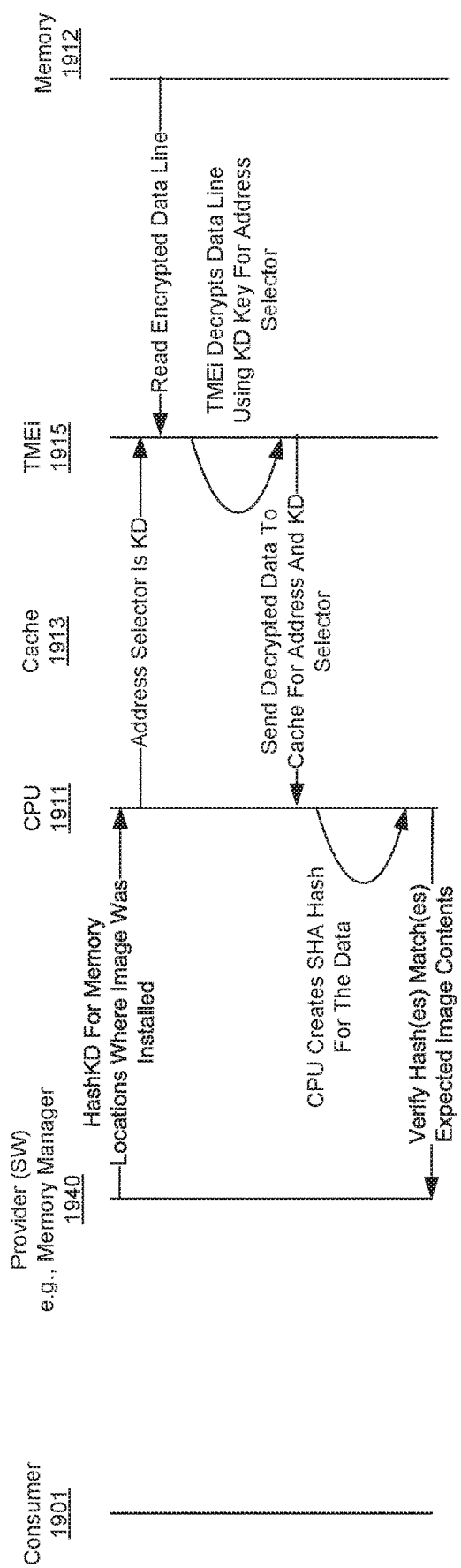
FIG. 19 is a diagram showing messages between components of a cloud services environment to verify a domain image in accordance with one embodiment of the invention.

FIG. 19 is a diagram showing messages between components of a cloud services environment to verify a domain image in accordance with one embodiment of the invention. In the first message, cloud services provider software, such as a memory manager 1940 of the key domain-capable server, requests a Hash Key Domain (HashKD) function to be performed on memory locations where the consumer's encrypted launch image for a domain manager (VMMlet) was installed. The CPU 1911 executes a Hash Key Domain (HashKD) instruction, providing the current address selector identifying the key domain to be hashed, via cache 1913, to the memory encryption engine (TMEi) 1915. The memory encryption engine (TMEi) 1915 reads the encrypted data line from the memory locations where the encrypted launch image was installed, and the memory encryption engine (TMEi) 1915 decrypts the data line using the key for the key domain identified by the address selector. The memory encryption engine (TMEi) 1915 sends the decrypted data to cache 1913, tagging the decrypted data with the address and the key domain address selector. The CPU 1911 for the key domain-capable server creates a hash value for the decrypted data, stores the resulting hash value in a register of CPU 1911 or in a memory location of memory 1912, and the cloud provider's software (i.e., memory manager 1940) verifies that the hash value matches an expected hash value for the domain image originally provided to the consumer.

Figure 20:
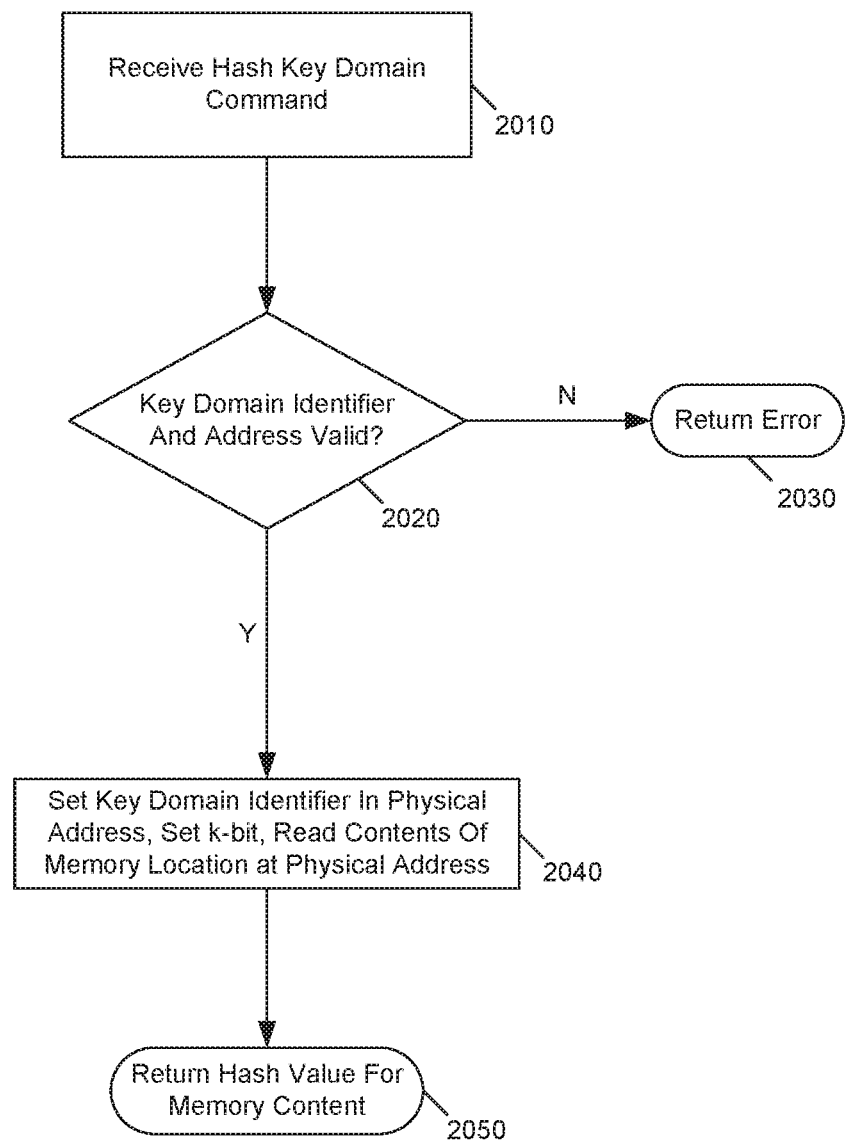
FIG. 20 is a flowchart of a method of operation of a CPU of a key domain-capable server in performing a Hash Key Domain operation in accordance with one embodiment of the invention.

FIG. 20 is a flowchart of a method of operation of a CPU of a key domain-capable server in performing a Hash Key Domain operation in accordance with one embodiment of the invention. At "Receive Hash Key Domain Command" block 2010, the CPU of the key domain-capable server receives a hash key domain command with input parameters of a key domain identifier and physical address. Control proceeds to "Key Domain Identifier and Address Valid?" decision point 2020, where the CPU of the key domain-capable server determines whether the key domain identifier and physical address are valid. To make this determination, the CPU of the key domain-capable server may verify that the physical address points to a memory location that is populated, and that there is a page table mapping and read permission for the physical address. The CPU of the key domain-capable server may also verify that the key domain identifier has a corresponding key domain key installed in the memory encryption engine (TMEi) for that key domain identifier. If the key domain identifier and physical address are not valid, control proceeds to "Return Error" block 2030, where an error is returned to the issuer of the Hash Key Domain command. If the key domain identifier and physical address are valid at "Key Domain Identifier and Address Valid?" decision point 2020, control proceeds to "Set Key Domain Identifier in Physical Address, Set k-bit, Read Contents of Memory Location at Physical Address" block 2040. The unused bits of a physical address are set to the key domain identifier, the value of the k-bit is set to 1 to indicate that encrypted data are to be read from the memory location at the physical address, and the contents of the memory location at the physical address are read by the memory encryption engine (TMEi) using the key domain key for the key domain identified by the key domain identifier. When reading the contents of the memory location at the physical address, the memory encryption engine (TMEi) decrypts the contents using the key domain key. The memory encryption engine (TMEi) places the decrypted contents of the memory location at the physical address into cache, and the CPU of the key domain-capable server computes a hash value, a hash value, such as an SHA2/3 hash value, by hashing the decrypted contents in the cache. Control proceeds to "Return Hash Value for Memory Content" block 2050, where the hash value is returned to the issuer of the HashKD command. The issuer of the HashKD instruction can then determine whether to switch to the verified key domain.

Figure 21:
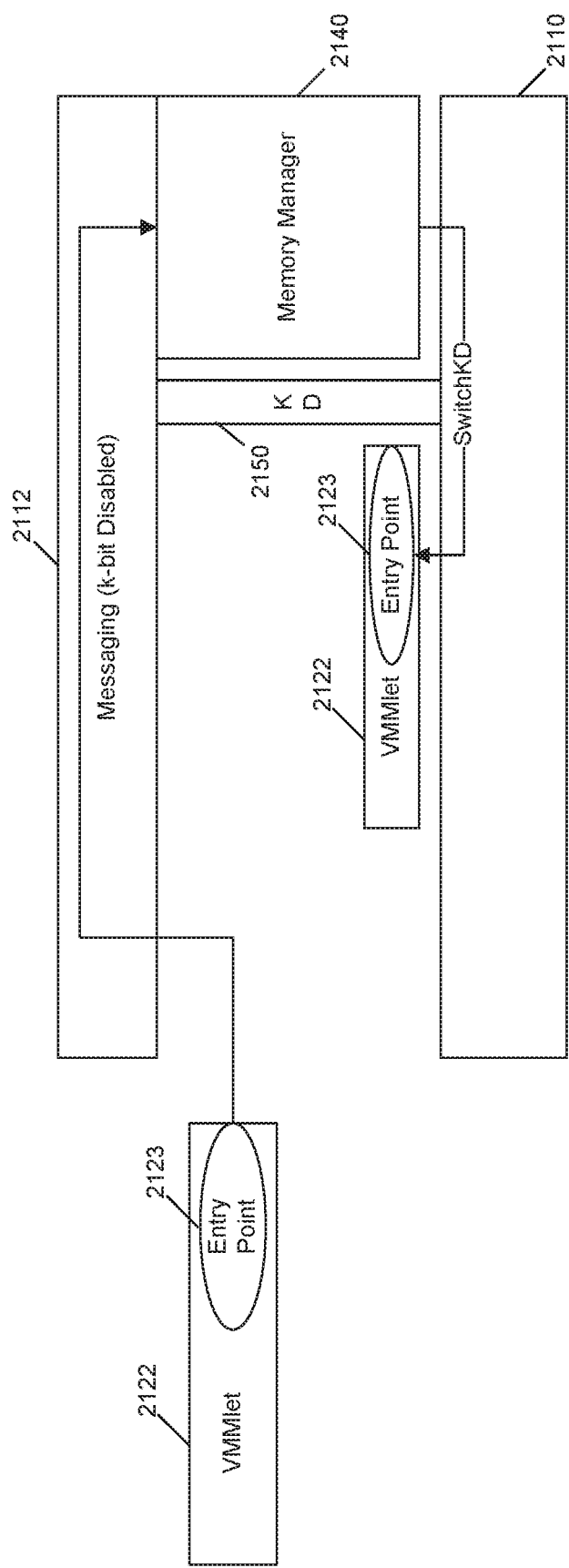
FIG. 21 is a diagram showing switching between key domains in accordance with one embodiment of the invention.

FIG. 21 is a diagram showing switching between key domains in accordance with one embodiment of the invention. A switch to a new key domain is initiated by a memory manager 2140 of a key domain-capable server to switch from one key domain to another. A switch to a new key domain may be initiated, for example, in response to a new consumer request for services received by the key domain-capable server. Having previously provided a domain manager image to the consumer, the memory manager 2140 obtains a fixed-up version of the domain manager image (e.g., VMMlet 2122) containing memory position-dependent address information such as entry point address 2123 that the consumer has provided via unencrypted (k-bit disabled) memory 2112. Memory manager 2140 issues a Switch Key Domain (SwitchKD) command to a CPU of hardware 2110, which causes domain manager image (VMMlet) 2122 to execute beginning at entry point address 2123 in the memory of the key domain-capable server, thereby establishing key domain 2150.

In one embodiment, the consumer calculates an HMAC value for an expected processor state prior to entering a new key domain. The HMAC value for the expected processor state includes expected values for instruction pointers; stack pointers; control registers (such as control registers 0, 3, and 4); and special descriptor table registers, such as GDTR, LDTR, any MSRs that may pertain to the correct execution of the encrypted domain launch image containing the domain manager image, and IDTR. For example, this HMAC value will ensure proper execution within a key domain (i.e., that interrupts are turned off) or else the new key domain is not entered and no switch between key domains occurs.

Execution of a domain manager (VMMlet) inside a new key domain may be accomplished using a Switch Key Domain (SwitchKD) instruction. This CPU instruction determines an HMAC value using the key domain key to validate the processor's current processor state on entry. For example, a hash function may be calculated from the same information as used to calculate the HMAC value for the expected processor state, including instruction pointers, stack pointers, control registers, and special descriptor table registers. If the calculated HMAC value of the expected processor state does not match a hash value of the CPU's current processor state upon entry, the Switch Key Domain instruction will fail. The key domain selector will remain unchanged, and execution of the domain manager (VMMlet) will not switch to a new key domain.

In another embodiment, control flow transfer into a new key domain terminates on an End Branch Key Domain (ENDBRANCHKD) instruction. The only way to change control flow into a new key domain from another key domain is to enter the new key domain at an entry point where the next instruction to be executed is the End Branch Key Domain instruction. This requirement for changing key domains assures the consumer that control flow transfers go through an expected entry point.

After correct execution of the Switch Key Domain (SwitchKD) instruction, the domain manager (VMMlet) is now measured and running correctly within the key domain. All other functionality is provided by software to load the rest of the consumer's domain (VM) image, to perform secure storage, communications, paging (e.g., to page out, the consumer's domain (VM) image needs to go through the domain manager (VMMlet)), migration, Input/Output (I/O), etc.

Figure 22:
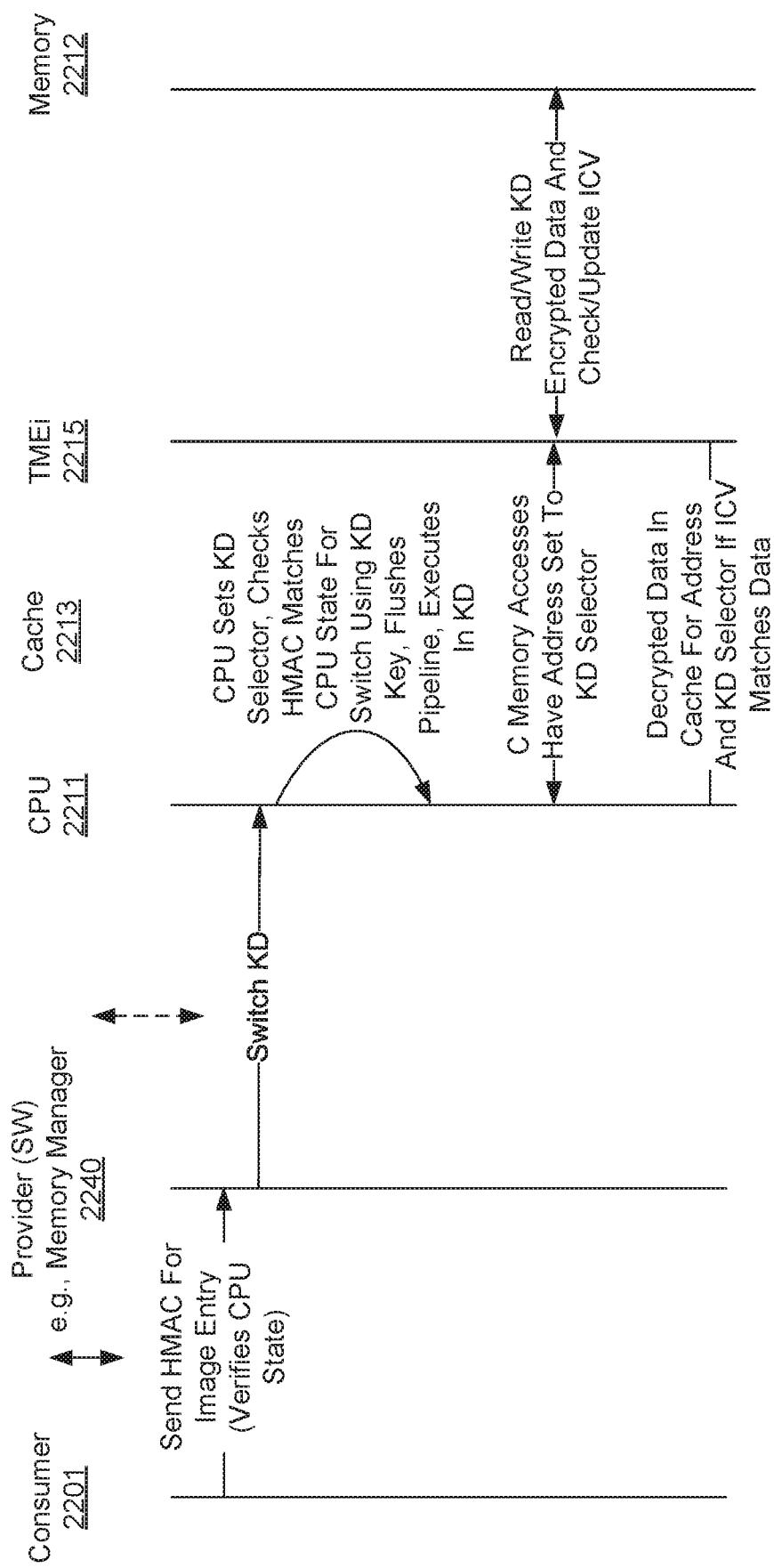
FIG. 22 is a diagram showing messages between components of a cloud services environment while executing inside a key domain in accordance with one embodiment of the invention.

FIG. 22 is a diagram showing messages between components of a cloud services environment while executing inside a key domain in accordance with one embodiment of the invention. In one embodiment, the consumer calculates a hash message authentication code (HMAC) value for an expected processor state prior to entering a new key domain. The HMAC value for the expected processor state includes expected values for instruction pointers; stack pointers; control registers (such as control registers 0, 3, and 4); and special descriptor table registers, such as GDTR, LDTR, any relevant MSRs, and IDTR. For example, this HMAC value will ensure that the processor state is such that proper execution of the domain manager (VMMlet) occurs within a key domain (i.e., that interrupts are turned off).

In the next communication, the cloud services provider software, such as a memory manager 2240 on a key domain-capable server, issues a Switch KD command to cause the CPU 2211 of the key domain-capable server to switch key domains. The CPU 2211 sets the key domain selector and checks that the expected processor state HMAC value matches an HMAC value calculated for the current CPU state. If the HMAC values match, the key domain is switched, the instruction pipeline is flushed, the translation look-aside buffer (TLB) address space identifier (ASID) tag is changed for the key domain identifier, and the domain manager (VMMlet) executes in the new key domain. While executing in the new key domain with the k-bit enabled, memory locations of the key domain are accessed using an address set to the key domain selector value. While executing in the new key domain, the memory encryption engine (TMEi) 2215 can read and write key domain encrypted data from memory 2212 and check and/or update the integrity check values (ICVs) for the encrypted data. If the ICV values are consistent with the encrypted data, the encrypted data is decrypted into cache 2213 for the address and key domain selector.

Figure 23:
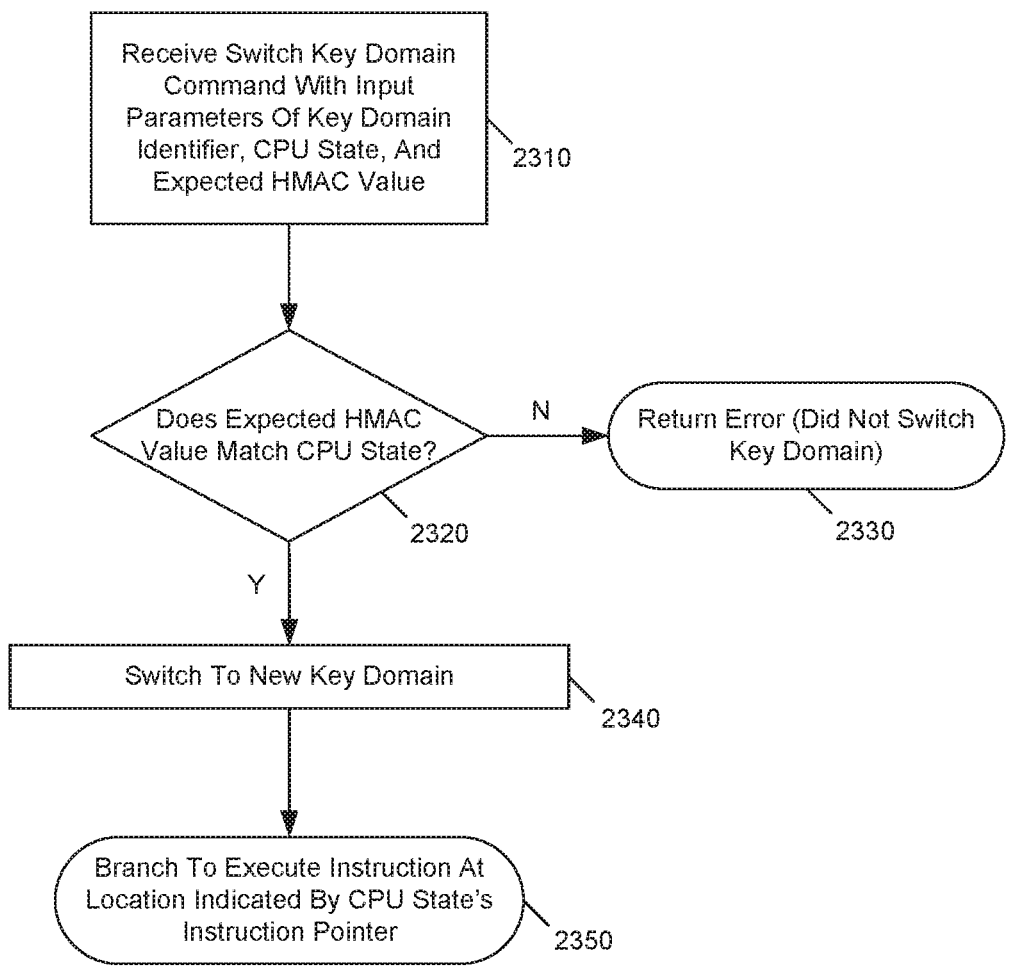
FIG. 23 is a flowchart of a method of operation of a CPU of a key domain-capable server in performing a Switch Key Domain operation in accordance with one embodiment of the invention.

FIG. 23 is a flowchart of a method of operation of a CPU of a key domain-capable server in performing a Switch Key Domain operation in accordance with one embodiment of the invention. At "Receive Switch Key Domain Command with Input Parameters of Key Domain Identifier, CPU State, and Expected HMAC Value" block 2310, a Switch Key Domain command is received by the CPU. The input parameters of the Switch Key Domain command include the key domain identifier to which to switch, the expected CPU state to switch to the new key domain, and the Expected HMAC value for the processor state. Control proceeds to "Does Expected HMAC Value Match CPU State?" decision point 2320. At decision point 2320, a determination is made whether the current CPU state and/or the proposed CPU state specified as a parameter to the SwitchKD instruction matches an expected HMAC value. Some CPU state information, such as the instruction pointer, is state that is set as a parameter by the SwitchKD instruction. If the HMAC also matches the Instruction Pointer parameter, then SwitchKD will set the instruction pointer register in the CPU accordingly, resuming in the new key domain starting execution at that instruction location. Alternatively, all CPU state values may be parameters to SwitchKD, meaning that SwitchKD will populate all the register states to the input parameters if the HMAC matches that proposed input state. At decision point 2320, if the Expected HMAC value for the processor state does not match an HMAC value calculated for the current CPU state or proposed CPU state specified as parameters to the SwitchKD instruction, the key domain is not switched and an error is returned to the issuer of the Switch Key Domain command in "Return Error (Did Not Switch Key Domain)" block 2330.

At "Does Expected HMAC Value Match CPU State?" decision point 2320, if the expected HMAC value for the processor state matches an HMAC value calculated for the current CPU state, control proceeds to "Switch to New Key Domain" block 2340. At "Switch to New Key Domain" block 2340, the CPU pipeline is flushed, and either the address space identifier (ASID) tag for translation look-aside buffers (TLBs) is set to the new key domain identifier or the TLBs are flushed. The current key domain is set as the key domain identifier, and CPU registers are set to match the CPU state input parameter values. Control then proceeds to "Branch to Execute Instruction at Location Indicated by CPU State's Instruction Pointer" block 2350. At block 2350, the CPU of the key domain-capable server branches to execute an instruction at the location indicated by the CPU state's instruction pointer as provided as an input parameter to the SwitchKD instruction. Upon completing execution of the SwitchKD instruction, the domain manager (VMMlet) is operating within the new key domain.

Figure 24:
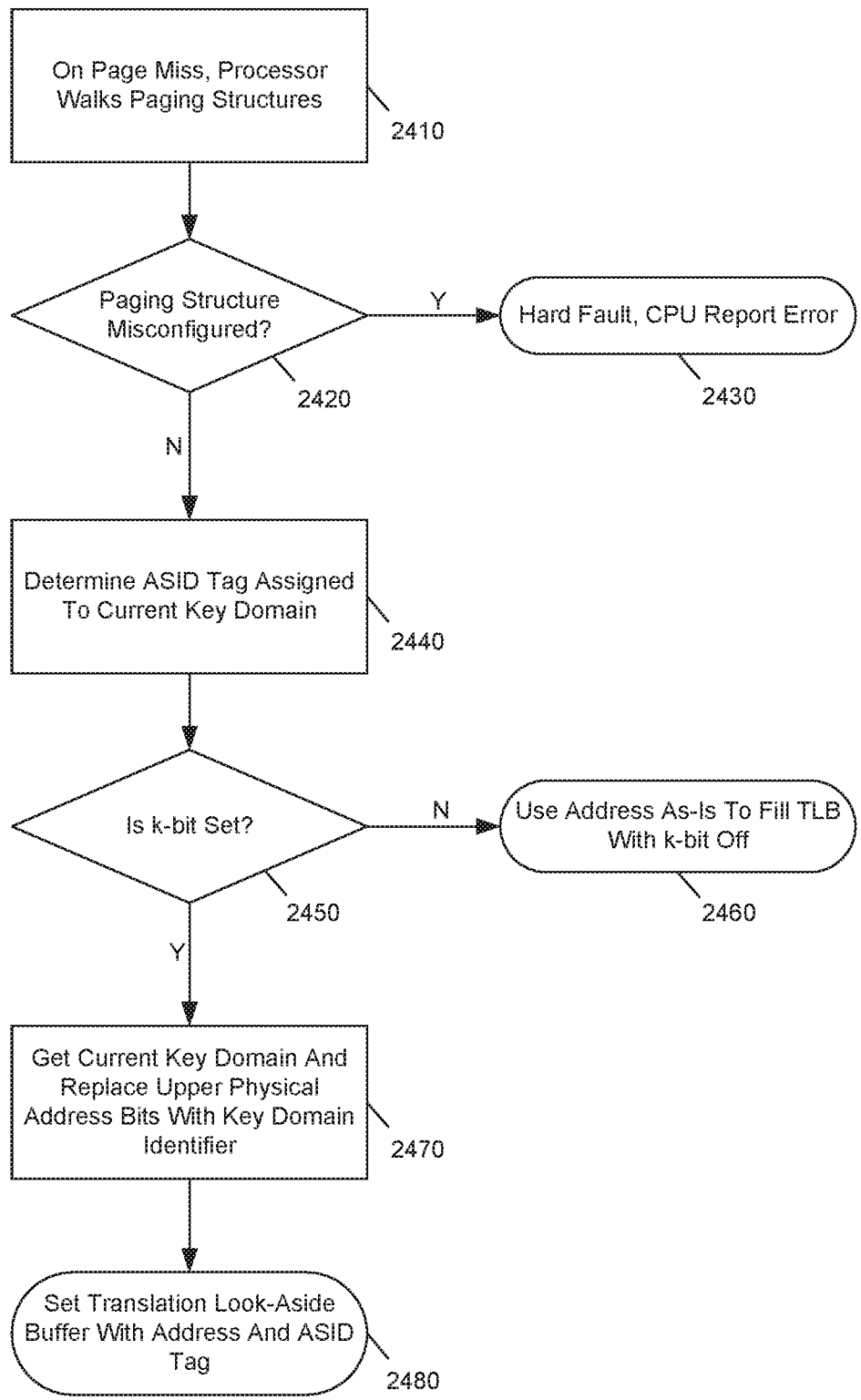
FIG. 24 is a flowchart of a method of operation of a CPU of a key domain-capable server in performing a walk of paging structures in response to a page miss in accordance with one embodiment of the invention.

FIG. 24 is a flowchart of a method of operation of a CPU of a key domain-capable server in performing a walk of paging structures in response to a page miss in accordance with one embodiment of the invention. Control begins at "On Page Miss, Processor Walks Paging Structures" block 2410. Upon encountering a page miss (where a page the CPU attempts to read or write is not found within the translation look-aside buffers), the CPU of the key domain-capable server begins walking paging structures (such as the OS paging structure 860 described with reference to FIG. 9 or the OS paging structure 960 described with reference to FIG. 9). For example, the CPU of the key domain-capable server may begin by reading control register 3 (CR3) for a pointer to the base address of the paging structures. Control then proceeds to "Paging Structure Misconfigured?" decision point 2420, where the CPU determines whether the paging structure is configured as expected. For example, the CPU determines whether a page fault to the operating system has occurred, or a VMExit to the domain manager (VMMlet) has occurred. These faults are still within the same key domain as the domain (VM) image causing the fault. If the paging structure is not configured as expected, control proceeds to "Hard Fault, CPU Reports Error" block 2430, where the CPU causes a hard fault and reports an error to the process that encountered the page miss.

At "Paging Structure Misconfigured?" decision point 2420, if the paging structure is configured properly, control proceeds to "Determine ASID Tag Assigned to Current Key Domain" block 2440. The address space identifier (ASID) tag assigned to the current key domain is determined, and control proceeds to "Is K-bit Set?" decision point 2450. If the K-bit of the ASID tag is not set, control proceeds to "Use Address As-Is to Fill TLB with K-bit Off" block 2460. At block 2460, the CPU of the key domain-capable server causes the translation look-aside buffer (TLB) to be filled with the physical address as it is. Leaving the physical address as-is enables data to be read directly from unencrypted memory without using a key domain key.

At "Is K-bit Set?" decision point 2450, if the k-bit of the ASID tag is set, control proceeds to "Get Current Key Domain and Replace Upper Physical Address Bits with Key Domain Identifier" block 2470. The current key domain is determined from the internal processor state set by the Switch Key Domain (SwitchKD) instruction, which sets the current key domain to the key domain identifier of the new key domain, as described with reference to FIG. 23. Upper bits in the physical address are replaced with the key domain identifier/selector for the current key domain, with the k-bit (which is the uppermost bit in one embodiment) enabled. Control then proceeds to "Set Translation Look-Aside Buffer with Address and ASID Tag" block 2480, where the translation look-aside buffer is set with the physical address (including key domain selector and k-bit enabled, or k-bit=1) and ASID tag for the current key domain.

Figure 25:
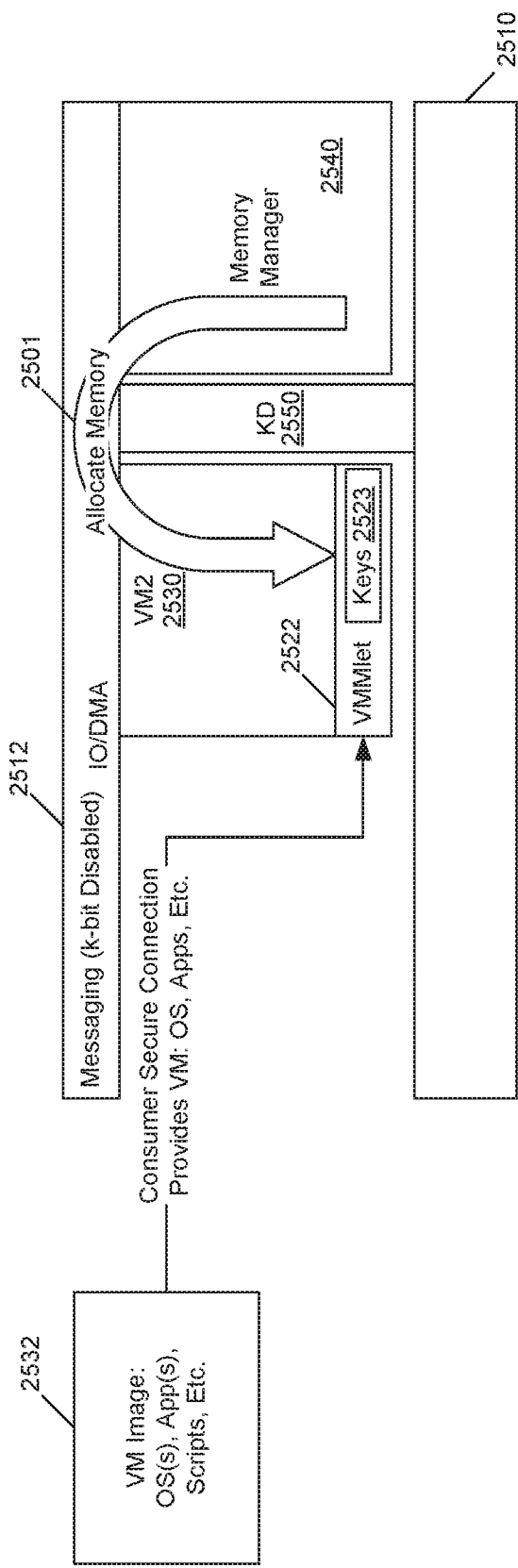
FIG. 25 is a diagram showing growth of a domain image in accordance with one embodiment of the invention.

FIG. 25 is a diagram showing growth of a domain manager (VMMlet) in accordance with one embodiment of the invention. Growth of a domain manager (VMMlet) may be needed, for example, to include additional memory to load a remaining portion of the consumer's VM image after the consumer's domain launch image has been loaded and the domain manager (VMMlet) is executing. Once a secure domain manager (VMMlet) 2522 with consumer secret keys 2523 is running in a key domain 2550, the consumer can securely communicate the rest of the consumer's VM image 2532 to the domain manager (VMMlet) 2522. The rest of the consumer's VM image 2532 may include, for example, operating system(s), application(s), scripts, or other code.

A secure communication channel between the consumer and the domain manager (VMMlet) 2522 can be enabled by a Transport Layer Security/Secure Sockets Layer (TLS/SSL) connection to the consumer's network, using the consumer's secret keys 2523 of the original encrypted Domain launch image given to the cloud services provider. In other words, if the original encrypted domain launch image had an operating system with an OpenSSL stack above the domain manager (VMMlet), and the consumer's secret keys, that OpenSSL software stack can be executed to retrieve the rest of the consumer's VM image 2532 from the consumer's network.

An operating system running above the domain manager (VMMlet) 2522 may support full volume storage encryption, so that the operating system can securely page in encrypted pages, files, etc. from k-bit off (shared) channels, where the memory manager 2540 acts as an intermediary. Once the original encrypted domain launch image is loaded into memory and is executing, domain manager (VMMlet) 2522 may allow other software, such as the operating system, to page in additional information from the consumer using any secure method that is desired.

The addition of memory pages for the rest of the consumer's VM image 2532 may cause the domain manager (VMMlet) 2522 to need an additional allocation of memory. In one embodiment, a domain manager (VMMlet) 2522 can grow by requesting more memory from the memory manager 2540. The memory manager 2540 can allocate additional memory to the domain manager (VMMlet) 2522, as shown by "Allocate Memory" action $250_1$. This additional memory enables the consumer to perform a write-only operation, such as a non-temporal move (MOVNT) operation (a non-cached write combining operation for writing to memory without first reading the memory), to write additional pages in the domain/VM workload image from the consumer or consumer-authorized third parties. For example, the consumer can provide the rest of a VM image 2532, including operating system(s), application(s), scripts, or other code, via a secure connection to the domain (VMMlet) 2522.

Figure 26:
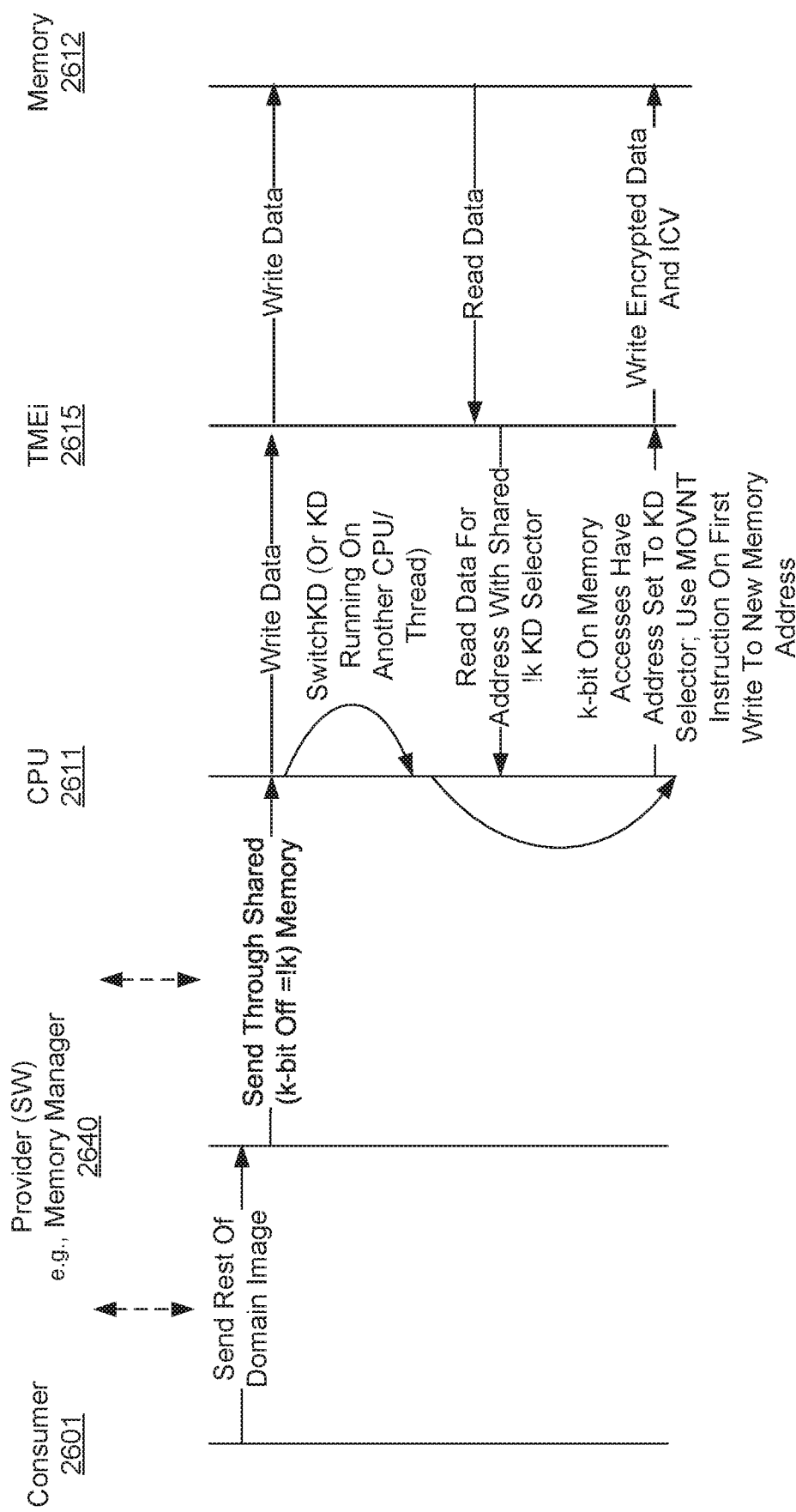
FIG. 26 is a diagram showing messages between components of a cloud based environment to grow a domain manager (VMMlet) in accordance with one embodiment of the invention.

FIG. 26 is a diagram showing messages between components of a cloud services environment to grow a domain manager (VMMlet) in accordance with one embodiment of the invention. The consumer 2601 sends the rest of the VM image to cloud services provider software, such as a memory manager 2640 of a key domain-capable server. In one embodiment, the rest of the VM image is communicated from the consumer to the running domain manager (VMMlet) via a Transport Layer Security (TLS)/Secure Sockets Layer (SSL) communication session from the consumer using the consumer's secret keys (such as keys 2523 of FIG. 25) to the running domain image's TLS stack.

As described above with reference to FIG. 25, the consumer's secret keys are included as part of the consumer's encrypted domain launch image given to the cloud services provider. At the point in time represented by FIG. 26, the consumer's VM is securely running and self-sufficient, running any software the consumer provided on top of the VMMlet (similar to an operating system running on top of a VMM). Data packets are sent from the consumer 2601 to the running domain manager (VMMlet) via the memory manager 2640 through shared, unencrypted memory (i.e., memory 2612 with the k-bit disabled). These data packets may include a stream of software encrypted data that the consumer's software running within the consumer's VM on top of the running domain manager (VMMlet) can decrypt and verify.

The cloud provider software may send, on behalf of the consumer, the data for the rest of the VM image through shared, unencrypted memory (i.e., memory 2612 with the k-bit disabled) via the CPU 2611 and memory encryption engine (TMEi) 2615. The data for the rest of the VM image is shown as flowing from CPU 2611 through memory encryption engine (TMEi) 2615 to memory 2612, as illustrated by the two "Write Data" actions. When data for the rest of the VM image is provided to the cloud services provider, the cloud services provider software may cause the CPU 2611 to execute a Switch Key Doman (SwitchKD) instruction to switch to the key domain for the consumer's running domain manager (VMMlet). Alternatively, the CPU 2611 may provide control to the consumer's running domain manager (VMMlet) that is running on another thread or another CPU. These actions by CPU 2611 are shown by the "SwitchKD (Or KD Running on Another CPU/Thread)" action of FIG. 26.

The running domain manager (VMMlet) copies the data (including the rest of the VM image) from unencrypted memory to encrypted memory that is part of the consumer VM's key domain. As shown by the "Read Data" action, the memory encryption engine (TMEi) 2615 reads data from the unencrypted memory. In the "Read Data for Address with Shared !k KD Selector" action, the domain manager (VMMlet) running on the CPU 2611 reads the data from an unencrypted memory location identified by the key domain address selector that was provided with the data in the unencrypted memory.

The running domain manager (VMMlet) may process the data, decrypting the data in software, performing integrity checks, and so on. For example, the running domain manager (VMMlet) may request the memory encryption engine (TMEi) 2615 to write encrypted data to a memory address with a key domain address selector that was provided in the unencrypted memory. As shown in "k-bit On Memory Accesses have Address Set to KD Selector; Use MOVNT Instruction on First Write to New Memory Address" action of FIG. 26, CPU 2611 writes encrypted data and associated integrity check values to an address specified in the key domain identifier/selector into memory 2612 (with k-bit enabled, indicating that the data is encrypted with the key domain key prior to writing the data to memory 2612).

Writing data to a memory address establishes an "owner" of the memory location. When switching between key domains, the owner of a memory location changes from the owner of one key domain to the owner of another key domain. When the key domain changes, the corresponding key domain key for encrypting data stored in the memory locations belonging to the key domain changes accordingly.

When data are read from a memory location belonging to a key domain, the "current" key domain key is used. After a switch key domain instruction, a new "current" key domain key must be established. As described above, the "current" key domain key is established upon writing data to the memory location, thereby establishing a new owner of the memory location. When data is read from a memory location, the read operation will use the "current" key domain key. If the data is read from the memory location before the owner of the new key domain has written to the memory location, the read operation will use the current key domain key, which has not yet been changed to reflect the new owner of the key domain. The read operation will be unsuccessful because the current integrity check value for the memory location will belong to the previous key domain. The integrity check will fail because the reader cannot read data belonging to another key domain.

To alleviate this problem, when a new key domain is established, the owner of the new key domain writes new data to the memory locations within the key domain without attempting to read the memory locations first. On the write operation, a new integrity check value (ICV) will be calculated for the new key domain; thus, the owner of the new key domain will now own that memory content (and be able to read and write that memory location without integrity failures).

In one embodiment, a MOVNT instruction is used to perform the first write operation to a new memory address. The memory encryption engine (TMEi) writes the encrypted data and ICVs to memory, thereby completing the process of copying the data from unencrypted memory to encrypted memory that is part of the consumer VM's key domain.

The MOVNT instruction is a write-combining operation, which means that the MOVNT instruction does not require a read operation to fetch the memory contents because the current contents are not needed. The MOVNT instruction may bypass the cache and write directly to memory. As an alternative to using the MOVNT instruction, the running domain manager (VMMlet) may use uncached write operations to copy the data from unencrypted memory to encrypted memory that is part of the consumer VM's key domain. By writing to a memory address without first reading data from that memory address, a new integrity check value (ICV) is created (via write for ownership).

Once a full consumer domain (VM) image is installed, the domain (VM) will function as a normal VM, using secret keys to establish secure communications to the consumer, consumer-authorized third parties, and other authorized VMs. Secure storage is achieved by encrypting full volumes and/or files in file system with consumer secret keys. Secure communications are achieved via IPSec/TLS and consumer secret keys. Attestation is achieved using consumer's secret keys (PKI, etc.). Secure migration of domains (VMs) between servers in the cloud services provider's infrastructure can be achieved by using the consumer's secret keys to encrypt VM image pages (and compute integrity check values for those VM image pages). The VM image pages can then be sent to other servers in the cloud services provider's infrastructure, along with the consumer's domain manager (VMMlet) pages, to securely migrate the consumer's VM image from one server to another.

Figure 27:
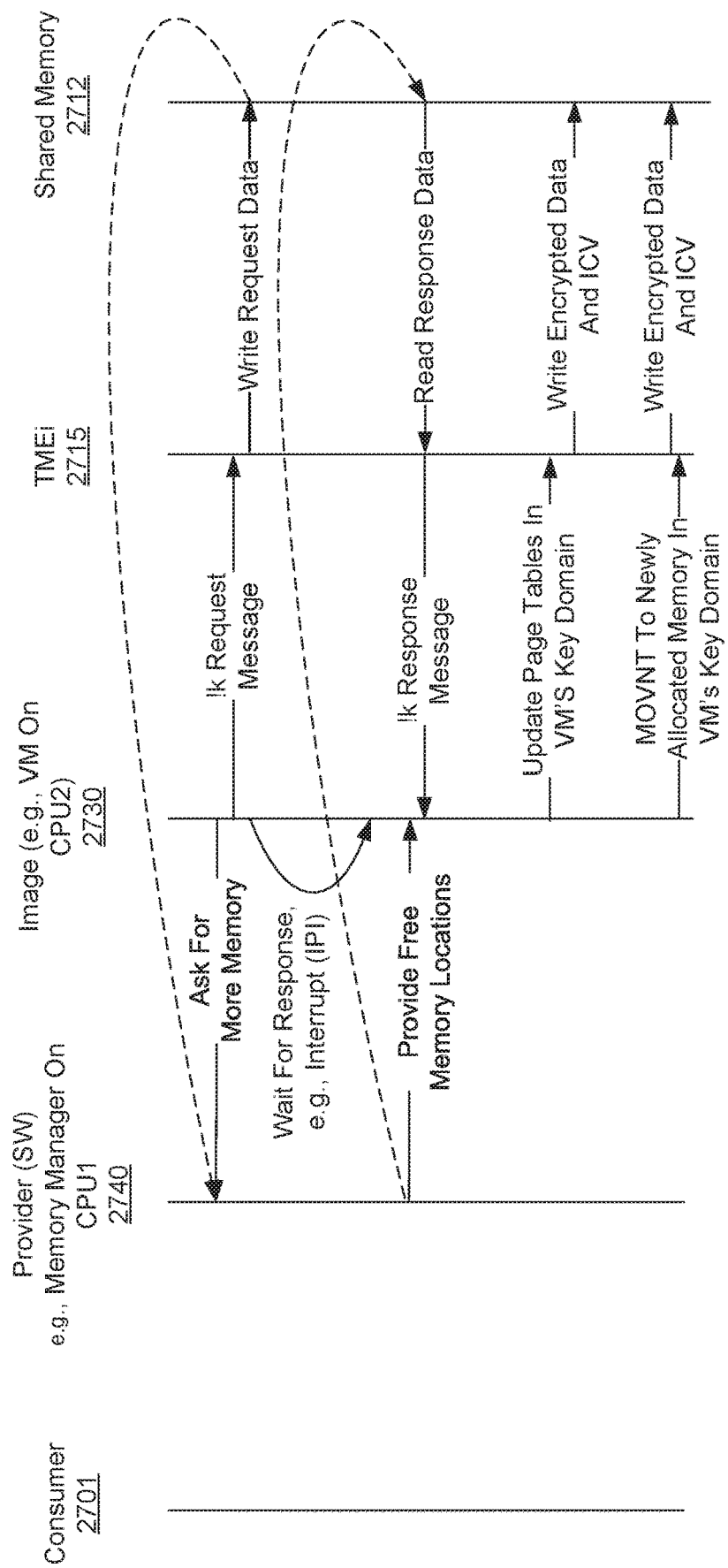
FIG. 27 is a diagram showing messages between components of a cloud services provider environment for a running domain manager (VMMlet) to request more memory pages from a memory manager in accordance with one embodiment of the invention.

FIG. 27 is a diagram showing messages between components of a cloud services provider's environment for a running domain manager (VMMlet) to request more memory pages from a cloud services provider's memory manager software. In this environment, multiple CPUs simultaneously share memory 2712. Cloud provider software (e.g., memory manager) 2740 runs on a first CPU1 of a key domain-capable server. A virtual machine 2730 runs on a second CPU2 of the key domain-capable server. VM 2730 requests additional memory, as shown in the "Ask for More Memory" action between VM 2730 and memory manager 2740. (Actually, the operating system that is part of VM 2730 running on top of the VMMlet may require more memory. The operating system may cause a VMExit to exit VM 2730, thereby invoking the host VMMlet, which then requests more memory from the cloud provider's memory manager 2740.) The domain manager (VMMlet) running on CPU2 sends the write request on behalf of the consumer's VM 2730 via shared unencrypted memory (with k-bit disabled), as shown by the "!k Request Message" action between VM 2730 and memory encryption engine (TMEi) 2715. The memory encryption engine (TMEi) 2715 passes through the memory request to shared memory 2712 without processing the request, because the k-bit is disabled. Memory manager 2740 on CPU1 reads the request for additional memory written by VM 2730 on CPU2, as indicated by the dotted line from memory 2712 to memory manager 2740 on CPU1. The domain image running on CPU2 (i.e., VM 2730) waits for a response, such as an interrupt (IPI), as shown in "Wait for Response, e.g. Interrupt (IPI)" action of VM 2730. When free memory locations are provided by the cloud services provider's memory manager software 2740, the memory manager 2740 on CPU1 writes response data to shared memory 2712 (with k-bit disabled), as shown by the dotted line from memory manager 2740 on CPU1 to shared memory 2712. VM 2730 on CPU2 reads the response data from shared memory 2712 (with k-bit disabled), as shown in the "Read Response Data" action between shared memory 2712 and memory encryption engine (TMEi) 2715. The memory encryption engine (TMEi) 2715 passes the response data through to VM 2730 on CPU2, as shown by the "!k Response Message" action from TMEi 2715 to VM 2730 on CPU2. The VM 2730 updates page tables in VM's key domain, as shown by the "Update Page Tables in VM's Key Domain" action between VM 2730 and memory encryption engine (TMEi) 2715. The memory encryption engine (TMEi) 2715 writes the encrypted data and integrity check value to memory 2712 (with k-bit enabled), as shown by the "Write Encrypted Data and ICV" action between memory encryption engine (TMEi) 2715 and shared memory 2712. The domain manager (VMMlet) hosting VM 2730 causes CPU2 to execute a MOVNT instruction to write data to the newly-allocated memory in VM's key domain, as indicated by the "MOVNT to Newly Allocated Memory in VM's Key Domain" action between VM 2730 and memory encryption engine (TMEi) 2715. In response, the memory encryption engine (TMEi) 2715 writes the encrypted data and ICV to the newly-allocated encrypted memory.

Figure 28:
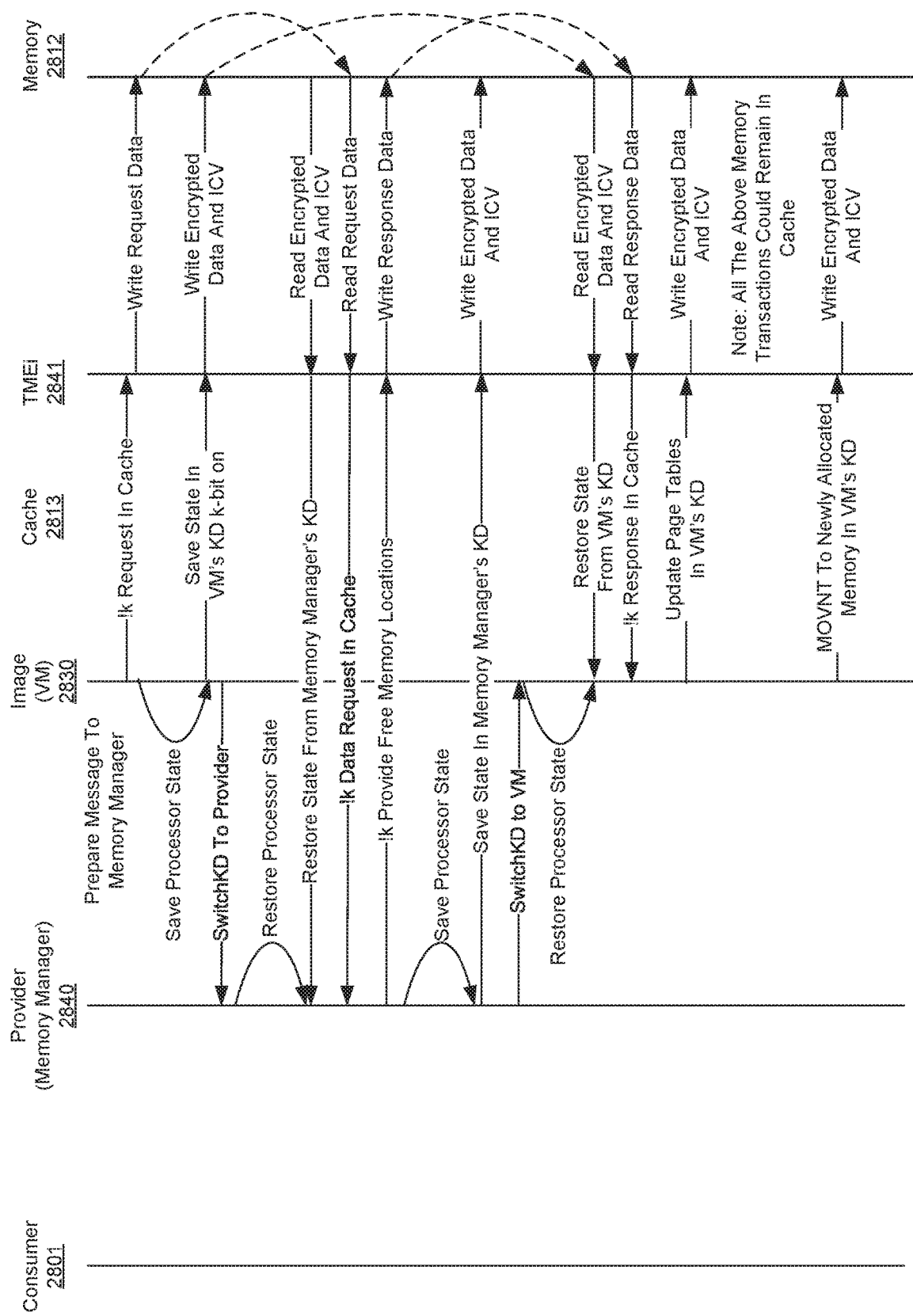
FIG. 28 is a diagram showing messages between components of a cloud services environment showing requesting additional memory pages while scheduling VMs on a single CPU in accordance with one embodiment of the invention.

FIG. 28 is a diagram showing messages between components of a cloud services environment showing requesting additional memory pages while scheduling VMs on a single CPU. The cloud services provider's memory manager 2840 decides the scheduling scheme with regard to which VM is currently executing. Domain managers (VMMlets) running on the cloud services provider's CPU/core receive timer events and yield time to other VMs based on the memory manager command queue (k-bit disabled shared memory region). A Switch Key Domain (SwitchKD) operation is used to switch to another domain manager (VMMlet).

Referring to FIG. 28, the VM 2830 prepares a message requesting additional memory from the memory manager 2840 in the "Prepare Message to Memory Manager" action and places the message in cache 2813 to be read into unencrypted (k-bit disabled) memory 2812 in the "!k Request in Cache" action between VM 2830 and memory encryption engine (TMEi) 2815. The memory encryption engine (TMEi) 2815 writes the request data to memory 2812 (with k-bit disabled) in the "Write Request Data" action between memory encryption engine (TMEi) 2815 and memory 2812. The VM 2830 saves the processor state in the "Save Processor State" action and places the saved VM processor state in cache 2813 in "Save State in VM's KD k-bit On". The VM's saved state processor state is written to the VM's key domain encrypted (k-bit enabled) memory. The memory encryption engine (TMEi) 2815 writes the saved VM processor state as encrypted data with ICVs to the VM's key domain encrypted (k-bit enabled) memory 2812 in the "Write Encrypted Data and ICV" action between memory encryption engine (TMEi) 2815 and memory 2812. Saving the VM's processor state enables the domain manager (VMMlet) to resume execution of the VM later using the saved processor state. In one embodiment, the domain manager (VMMlet) clears registers after the processor state has been saved so that the VM's secrets are not available after a switch to another key domain.

To enable the memory manager 2840 to allocate additional memory for VM 2830, the key domain is switched from the VM 2830 key domain to the memory manager 2840 key domain. In the "SwitchKD to Provider" action between VM 2830 and memory manager 2840, VM 2830 sends a Switch Key Domain instruction to the cloud services provider. Memory manager 2840 begins restoration of the processor state associated with the memory manager 2840 key domain in the "Restore Processor State" action. Encrypted data and integrity check values for the memory manager 2830 key domain are read from memory 2812 in the "Read Encrypted Data and ICV" action between memory 2812 and memory encryption engine (TMEi) 2815. Memory encryption engine (TMEi) 2815 decrypts the data for the current key domain and sends the decrypted data to cache (assuming that the corresponding ICV values are correct). Memory manager 2840 restores the processor state from the memory manager 2840 key domain in the "Restore State from Memory Manager's KD" action between memory encryption engine (TMEi) 2815 and memory manager 2840.

In the "Read Request Data" action between memory 2812 and memory encryption engine (TMEi) 2815, the memory encryption engine (TMEi) 2815 reads the additional memory request data from the k-bit disabled command queue of memory 2812 into cache 2813. In the "!k Data Request in Cache" action between memory encryption engine (TMEi) 2815 and memory manager 2840, the memory manager 2840 reads the additional memory data request saved in cache 2813.

In "!k Provide Free Memory Locations" action between memory manager 2840 and memory encryption engine (TMEi) 2815, memory manager 2840 sends the message via the unencrypted (k-bit disabled) memory command queue to provide free memory locations to the memory encryption engine (TMEi) 2815. In "Write Response Data" action between memory encryption engine (TMEi) 2815 and memory 2812, memory encryption engine (TMEi) 2815 writes response data, including addresses of the free memory locations allocated for VM 2830, to memory 2812. Having completed the allocation of additional memory in response to the request from VM 2830, memory management engine 2840 saves the current processor state in the controller's key domain in the "Save State in Memory Manager's KD" action. In the "Write Encrypted Data and ICV" action between memory encryption engine (TMEi) 2815 and memory 2812, memory encryption engine (TMEi) 2815 writes the encrypted data (saved processor state) and integrity check values to the memory manager 2840 key domain in memory 2812. Memory manager 2840 then executes a Switch Key Domain (SwitchKD) operation to switch back to the VM's key domain.

In response to switching to the VM 2830 key domain, VM 2830 begins to restore the VM 2830 saved processor state in the "Restore Processor State" action. Memory encryption engine (TMEi) 2815 reads encrypted data (including the processor state) and integrity check values for the VM 2830 key domain in the "Read Encrypted Data and ICV" action between memory encryption engine (TMEi) 2815 and memory 2812. In the "Restore State from VM's KD" action between memory encryption engine (TMEi) 2815 and VM 2830, the VM 2830 restores the saved processor state from its VM 2830 key domain.

At the time that VM 2830 was previously executing prior to switching to the memory manager 2840 key domain, VM 2830 had requested additional memory. In the "Read Response Data" action between memory encryption engine (TMEi) 2815 and memory 2812, memory encryption engine (TMEi) 2815 reads response data for the request for additional memory and provides the response data in cache 2813 for the VM 2830. The VM 2830 updates page tables in the VM 2830 key domain to reflect the newly-allocated memory locations in the "Update Page Tables in VM's KD" action between VM 2830 and memory encryption engine (TMEi) 2815. In the "Write Encrypted Data and ICV" action between memory encryption engine (TMEi) 2815 and memory 2812, the memory encryption engine (TMEi) 2815 writes encrypted data (the updated page tables) and integrity check values to memory 2812.

To establish ownership of the newly-allocated memory, the VM 2830 then performs a MOVNT operation (or other write operation that does not read contents of the memory location before writing to the memory location) to the newly-allocated memory in the VM's key domain in the "MOVNT to Newly Allocated Memory in VM's KD" action between VM 2830 and memory encryption engine (TMEi) 2815. The MOVNT operation establishes VM 2830 as owner of the newly-allocated memory. In the "Write Encrypted Data and ICV" action between memory encryption engine (TMEi) 2815 and memory 2812, the memory encryption engine (TMEi) 2815 writes the encrypted data and ICV to memory 2812. As part of this write operation, memory encryption engine (TMEi) 2815 calculates new integrity check values for the newly-allocated memory in the VM 2830 key domain. The new integrity check values will ensure that the VM 2830 key domain key can be used to decrypt contents of the newly-allocated memory.

Figure 29:
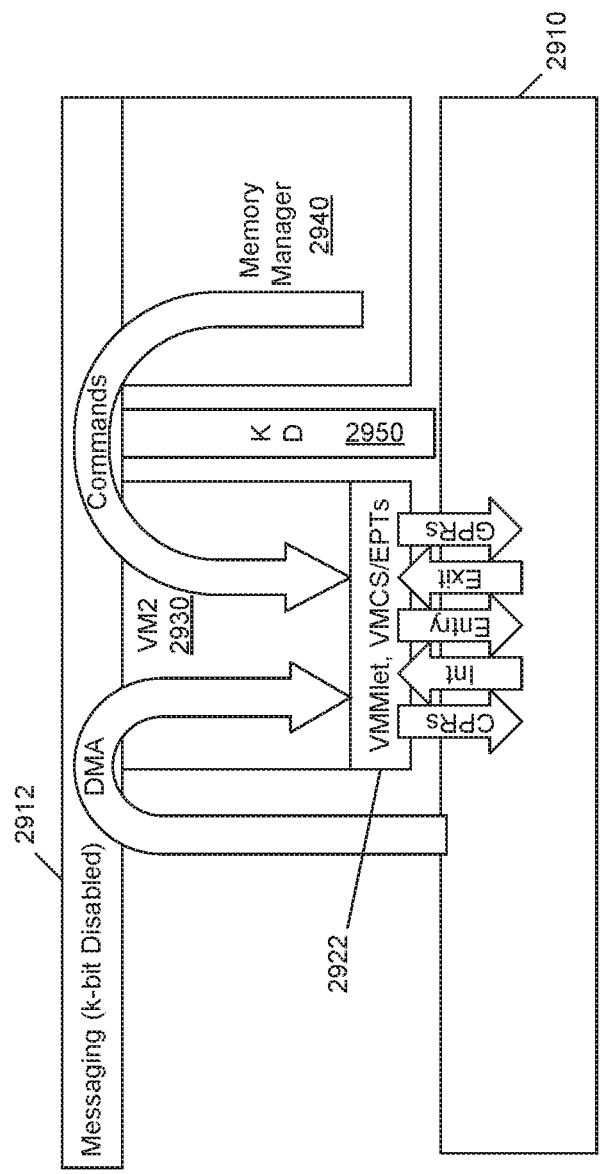
FIG. 29 is a diagram showing a running domain manager (VMMlet) in accordance with one embodiment of the invention.

FIG. 29 is a diagram showing a running domain manager (VMMlet) 2922. Prior to running the domain manager (VMMlet) 2922, the memory manager 2940 of a key domain-capable server verifies a hash of the processor state before executing the domain launch image for the domain manager (VMMlet). Once the processor state is verified, the domain launch image is executed to run the domain manager (VMMlet).

The memory manager 2940 issues commands to the running domain manager (VMMlet) 2922 via unencrypted (k-bit disabled) memory 2912. Similarly, hardware 2910 of the key domain-capable server issues Direct Memory Access (DMA) requests to the running domain manager (VMMlet) via unencrypted (k-bit disabled) memory 2912. In response to receiving these commands or DMA requests, domain manager (VMMlet) 2922 interacts with key domain-capable server hardware 2910 to set and/or access register values, process interrupts, perform VM entry and exit, and so on.

Memory manager 2940 decides the scheduling scheme with regard to which VM is currently executing; in FIG. 29, the currently executing VM is VM2 2930 and the associated key domain is key domain 2950. A Switch Key Domain (SwitchKD) operation is used to switch to another domain (VM).

Dynamic entry points can be created locally within a VM once the dynamic portion of the VM image (i.e., the remaining portion of the VM image that is not included in the domain launch image) is loaded. For example, in response to a Switch Key Domain (SwitchKD) instruction, a new keyed-hash message authentication code (HMAC) may be calculated based on the key domain key.

Interrupts and VM exit instructions are delivered to the current domain manager (VMMlet) running on the CPU/core of the key domain-capable server. The running domain manager (VMMlet) decides whether an interrupt/asynchronous event is intended for the currently running domain manager (VMMlet) or for another domain manager (VMMlet). If the interrupt/asynchronous event is intended for another domain manager (VMMlet), the domain manager (VMMlet) will schedule the correct domain manager (VMMlet) or notify the memory manager.

With regard to resource management, paging is accomplished through software rather than via a hardware paging mechanism. The domain manager (VMMlet) encrypts pages (including integrity metadata) in software (e.g., using Intel® AES new instructions (AESNI) for accelerating AES encryption), updates page tables and extended page tables, and sends encrypted pages through k-bit disabled memory for storage or migration.

With regard to input/output operations, either direct assignment or virtualized device models may be used. The k-bit designated unencrypted memory regions used for DMA and memory mapped input/output (MMIO) are non-encrypted. While direct assignment DMA is possible, MMIO/PCIe device space must be k-bit disabled (unencrypted) memory. The processor must assure that key domain transactions are only allowed to dynamic random access memory (DRAM) and not to device space.

Figure 30:
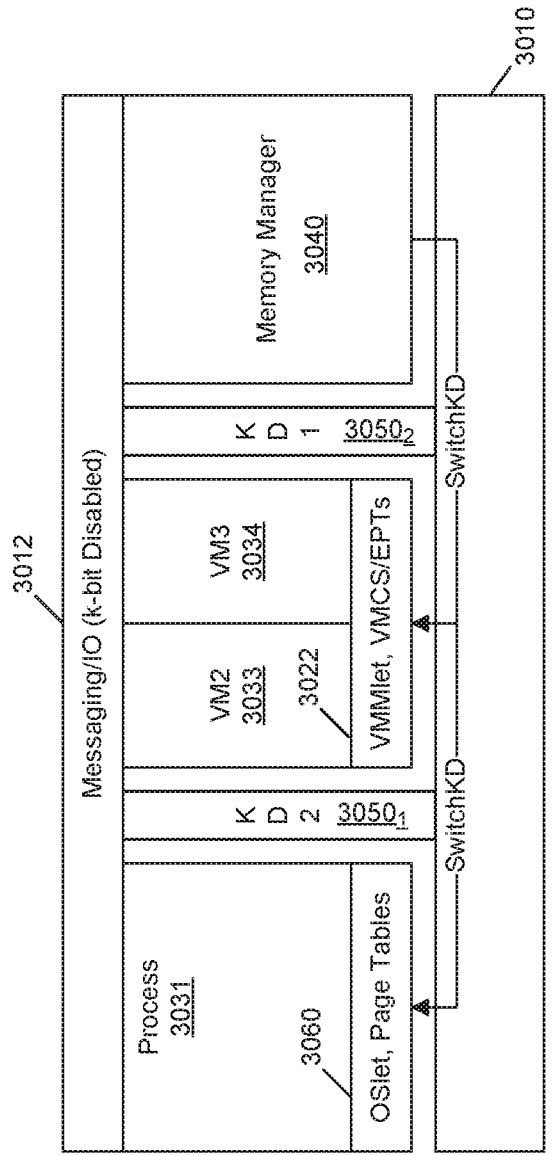
FIG. 30 is a diagram showing multiple virtual machines within a key domain managed by a domain manager (VMMlet), as well as a second key domain managed by another domain manager (OSlet) in accordance with one embodiment of the invention.

FIG. 30 is a diagram showing multiple virtual machines within a key domain managed by a domain manager (VMMlet), as well as a second key domain managed by an another type of domain manager (OSlet).

Because the domain manager (VMMlet) is a fully functional VMM, the domain manager (VMMlet) can host multiple guest operating systems (OS)s/VMs within its key domain. VM2 3033 and VM3 3034 are shown as running within key domain KD1 $3050_2$ of domain manager (VMMlet) 3022, and process 3031 is shown as running within key domain KD2 $3050_1$ of OSlet 3060. As is the case when switching between domain managers (VMMlets), a Switch Key Domain (SwitchKD) command is issued by memory manager 3040 to switch between domain types; i.e., a SwitchKD command is issued to switch between a domain manager (VMMlet) and a domain manager (OSlet).

Consumers want to be assured that public cloud services providers cannot access their workloads, even if served by a government issued warrant to do so. With the features provided by the secure public cloud environment described herein, a cloud services provider, on-site administrator or technician cannot access secure VM data, even if the VMM itself is rewritten (because the consumer can measure their entire TCB).

The above embodiments have been described with regard to a domain manager (VMMlet) that manages virtual machines, although the invention is not so limited. The same model can support containers; although there is no corresponding VMM, the OS kernel is the equivalent. Each container image in each key domain will have cooperating kernel components (referred to herein as a domain manager (OSlet)) measured by the provider. A domain manager (OSlet) responds to memory manager commands, interrupts, scheduling, resource management, etc., in a similar manner as the domain manager (VMMlet).

Figure 31B:
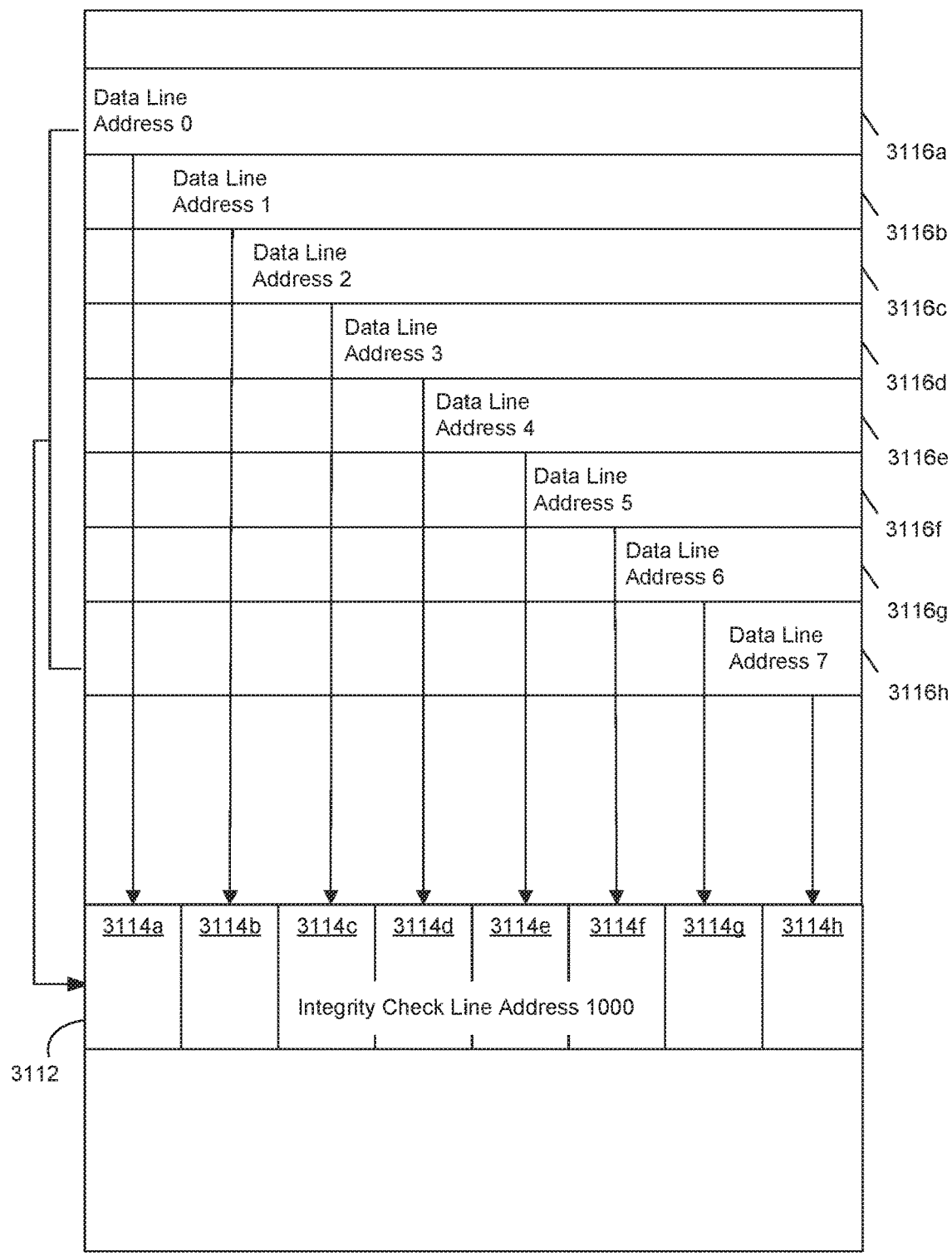
FIG. 31B is a diagram showing data lines stored in data memory address space and integrity values stored in integrity data address space.

FIGS. 31A and 31B illustrate determination of integrity line location and slot from a physical memory address as a hardware function of a memory encryption engine. Unused address bits are passed through cache, but they are unused because they correspond to unpopulated physical memory. The unused bits are used to encode key domain (KD) selector information in the address. Different keys can be selected based on unused address bits for memory position-dependent encryption of data lines and corresponding integrity check values.

Physical memory address 3100 may be used to determine a key or a tweak, discussed above, and/or an integrity check line 3112 and a slot 3114 (3114a-3114h) for an integrity value associated with a data line 3116 (3116a-3116h) according to an embodiment. The physical memory address 3100 may include a plurality of address bits that may be partitioned into a plurality of sections. The sections of the data physical memory address 3100 may be identified as data line bytes 3102, a data line physical address 3104 (actual location in memory of the data) which includes an integrity line slot selector 3110 and integrity line index 3108 (e.g., an offset to the integrity check line 3112), and unused address bits 3106 (e.g., alias bits) that alias to the same physical memory. The unused address bits 3106 passed through cache, but unused because unpopulated external memory, may be used to encoded alias information in the data physical memory address 3100. Accordingly, different keys can be selected based on unused address bits. For example, the encryption technique XTS (XEX-based (XOR-encrypt-XOR-based) tweaked codebook mode with cipher-text stealing) may use the alias bits for a tweak for the same physical memory location, where different address aliases may result in different ciphertext even if the data is the same A memory selector (e.g., memory encryption engine 415 of FIG. 4) may read the data line physical address 3104 and identify the corresponding integrity line address 3112 and integrity line slot (e.g., 3114a-3114h) to use to validate the data line bytes 3102 and/or the validity of an integrity check value stored in the integrity line slot (e.g., 3114a-3114h). The value in the alias bits 3106 may be stored in the integrity line slot (e.g., 3114a-3114h) as ciphertext used to decrypt the data line bytes, and/or compared with a value read from the integrity line slot (e.g., 3114a-3114h) identified by the alias bits 3106 to validate the data line bytes.

Notably, not all bits of memory may be addressable since, for example, the actual memory deployed in a computing platform may be substantially less than a maximum amount of possible memory for which a maximum amount of address space is provisioned. For example, not all 64-bits (of a 64-bit system) of physical memory are addressable (e.g., occupied with sufficient DIMM's). Thus, otherwise unused bits of the physical memory address 3100 may be used to determine, for example, which key and/or tweak is to be used when encrypting and/or decrypting memory for a particular data line.

The key domain and/or the tweak domain for the physical memory address 3100 may be any size. In the illustrated example, a value selector may use the unused address bits 3106 to derive a key and/or a tweak for the same physical memory address 3100. For example, a software value selector may select from among 16 keys (and/or 16 tweaks) defined by four most significant bits of the unused address bits 3106. In one example, setting the first bit to zero (0000) or to one (0001) may be used to derive the key tweak (e.g., if set bit to 1, encrypt with 1, if set to 0, encrypt with 0) or the tweak (e.g., if set bit to 1, use 1 in address for tweak, if set to 0, use 0 in address for tweak, etc.). Thus, different keys and/or tweaks may be used. In this case, a first integrity check will fail when data is decrypted with a wrong key and/or a wrong tweak, and/or a second integrity check will fail when an integrity value is checked against improperly decrypted data.

Additionally, an integrity check line and/or a slot may be determined and selected from the physical memory address 3100. For example, an integrity line selector may select the integrity check line from the integrity line index section 3108 of the physical memory address 3100, and/or the slot selector may select the slot from the integrity line slot selector section 3110 of the physical memory address 3100.

As shown in FIG. 31B, data lines may be stored in data memory address space and integrity values (e.g., an ICV, a copy, etc.) may be stored in integrity data address space. For example, the data lines in the data memory address space begin at address 0, and the integrity check lines in the integrity data memory address space begin 1000 cache lines away from the data lines at address 1000.

While various strategies may be implemented to map between each of the data lines and each of the integrity check lines (and/or each of the slots thereof) in embodiments, using a data line address may be an efficient approach to determine and select an appropriate integrity check line and an appropriate slot. For example, no lookup table may be needed to determine the appropriate integrity check line and/or the slot for an integrity value. In this regard, a value defined by intermediate bits of each of the data lines 3116a-3116h may map to the integrity check line 3112, indicated by the arrows from the data lines 3116a-3116h with the addresses 0-7 to the integrity check line 3112, and a value defined by least significant bits of each of the data lines 3116a-3116h may map to the appropriate slot 3114a-3114h that is to accommodate particular integrity values for each of the data lines 3116a-3116h, indicated by the location of the arrows.

Generally, selection of an appropriate integrity check line and an appropriate slot may be based on a function, such as (D-Dstart)/8+Istart, wherein the address Dstart of the start of the data memory region is subtracted from the address D of the data line that is to be accessed, wherein Istart is the start of the integrity value memory address space, and wherein the integer division by 8 may be done by shifting the address offset right by 3 (or choosing top bits minus the first 3 bits). Moreover, once the appropriate integrity check line is fetched, the offset for the appropriate slot may be determined by (D-Dstart) %8, wherein the modulo operation may select the least significant 3 bits of the address. It should be understood that while 3 bits may be used to select from 8 slots on an integrity check line, the integrity check lines may be different in size (e.g., half the size), such that 4 bits may be used to select from 16 slots per integrity check line to save on integrity value overhead, and so on.

The intermediate bits and/or the least significant bits may also be used as an index to an array of assigned locations stored in a privileged/secure memory location to identify the mappings. There may also be an implied mapping, wherein the first slot 3114a of the first integrity check line 3112 may be automatically selected for the data line 3116a having address 0, the second slot 3114b of the first integrity check line 3112 may be automatically selected for the data line 3116b having address 1, and so on. Any functions, mappings, and/or assignments may be used, such that the data lines 3116a-3116h with the addresses 0-7 may be mapped to anywhere in the integrity data address space, may be mapped to anywhere within the integrity check line 3112, and so forth.

A secure public cloud environment is achieved without additional performance overhead beyond a memory encryption engine. In one embodiment, the memory encryption engine is provided as a Memory Encryption Engine (MEE), as described in U.S. Pat. No. 8,819,455, "Parallelized Counter Tree Walk for Low Overhead Memory Replay Protection." In another embodiment, a memory encryption engine with integrity is provided, as described in U.S. Pat. No. 9,213,653, "Memory Integrity." In one implementation of the secure public cloud environment with a Total Memory Encryption with Integrity (TMEi) engine, the TMEi engine operates with only 3% overhead. Finally, only minimal hardware changes are used to ensure a secure public cloud environment, leveraging a memory encryption engine such as the TMEi engine and pushing most of the complexity to software (specifically the VMM). These features allow for simple verification of the VMM and quick time to market for hardware supporting the secure public cloud environment functionality.

Figure 32:
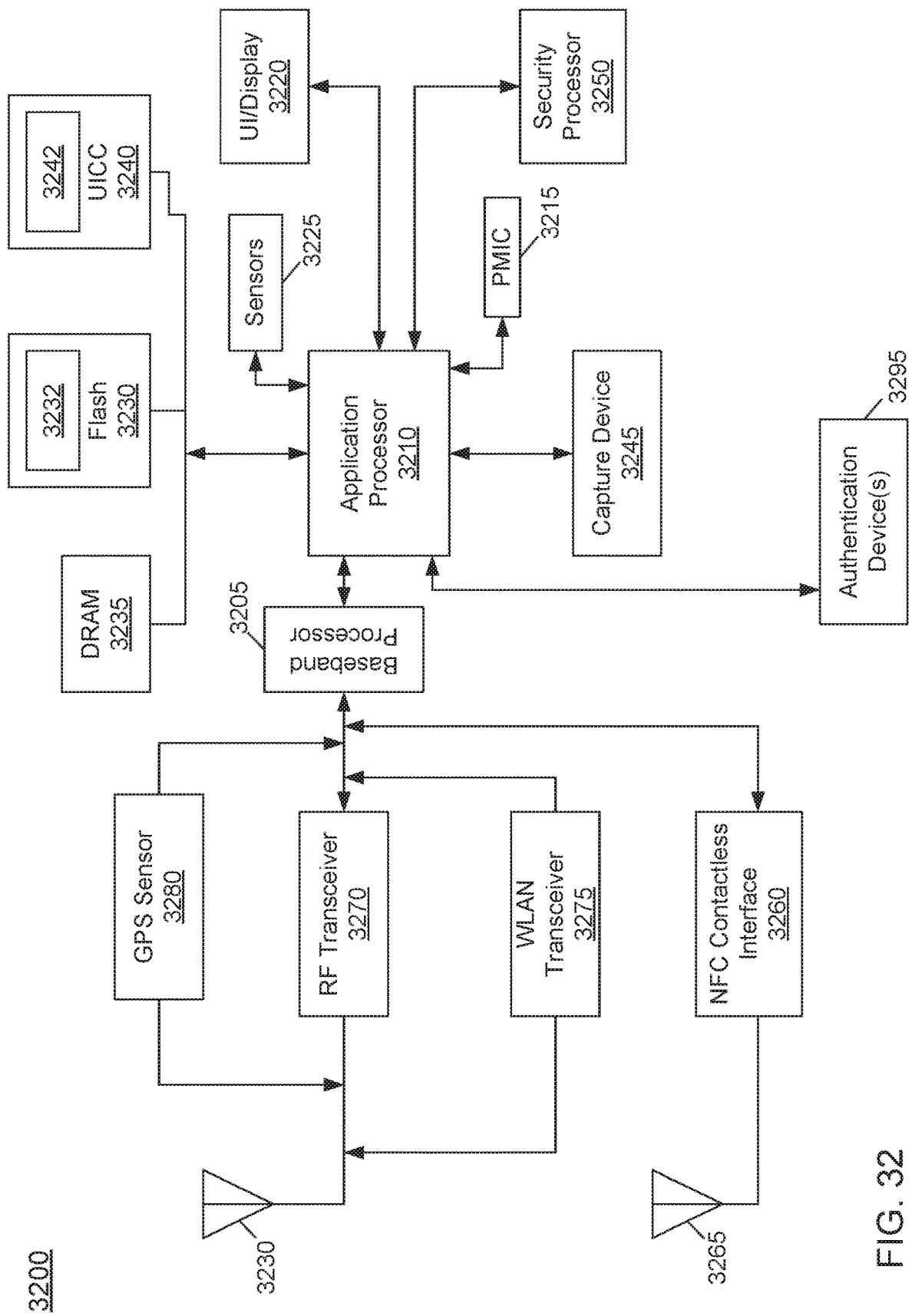
FIG. 32 is a diagram showing a system that can be used to implement an embodiment of the invention.

FIG. 32 is a diagram showing a system in accordance with one embodiment. As seen, system 3200 may be a smartphone or other wireless communicator or any other IoT device. A baseband processor 3205 is configured to perform various signal processing with regard to communication signals to be transmitted from or received by the system. In turn, baseband processor 3205 is coupled to an application processor 3210, which may be a main CPU of the system to execute an OS and other system software, in addition to user applications such as many well-known social media and multimedia apps. Application processor 3210 may further be configured to perform a variety of other computing operations for the device.

In turn, application processor 3210 can couple to a user interface/display 3220, e.g., a touch screen display. In addition, application processor 3210 may couple to a memory system including a non-volatile memory, namely a flash memory 3230 and a system memory, namely a DRAM 3235. In some embodiments, flash memory 3230 may include a secure portion 3232 in which keys, other secrets and other sensitive information may be stored and operated. One or more of these storages may store information for providing the secure public cloud described herein. As further seen, application processor 3210 also couples to a capture device 3245 such as one or more image capture devices that can record video and/or still images.

Still referring to FIG. 32, a universal integrated circuit card (UICC) 3240 comprises a subscriber identity module, which in some embodiments includes a secure storage 3242 to store secure identity information. System 3200 may further include a security processor 3250 that may that may implement a trusted execution environment (TEE), and which may couple to application processor 3210. Furthermore, application processor 3210 may implement a secure mode of operation, such as Intel® Software Guard Extensions (SGX) to a given instruction set architecture, and circuitry for hosting of a trusted execution environment (TEE). Security processor 3250 and/or application processor 3210 may be configured to participate in the operations in support of providing a secure public cloud as described herein. A plurality of sensors 3225, including one or more multi-axis accelerometers may couple to application processor 3210 to enable input of a variety of sensed information such as motion and other environmental information. In addition, one or more authentication devices 3295 may be used to receive, e.g., user biometric input for use in authentication operations.

As further illustrated, a near field communication (NFC) contactless interface 3260 is provided that communicates in a NFC near field via an NFC antenna 3265. While separate antennae are shown in FIG. 4, understand that in some implementations one antenna or a different set of antennae may be provided to enable various type of wireless functionality. A power management integrated circuit (PMIC) 3215 couples to application processor 3210 to perform platform level power management. To this end, PMIC 3215 may issue power management requests to application processor 3210 to enter certain low power states as desired. Furthermore, based on platform constraints, PMIC 3215 may also control the power level of other components of system 3200.

To enable communications to be transmitted and received such as in one or more IoT networks, various circuitry may be coupled between baseband processor 3205 and an antenna 3290. Specifically, a radio frequency (RF) transceiver 3270 and a wireless local area network (WLAN) transceiver 3275 may be present. In general, RF transceiver 3270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 3280 may be present, with location information being provided to security processor 3250, which may be used in certain security operations. Other wireless communications such as receipt or transmission of radio signals, e.g., AM/FM and other signals may also be provided. In addition, via WLAN transceiver 3275, local wireless communications, such as according to a Bluetooth™ or IEEE 802.11 standard can also be realized.

Figure 33:
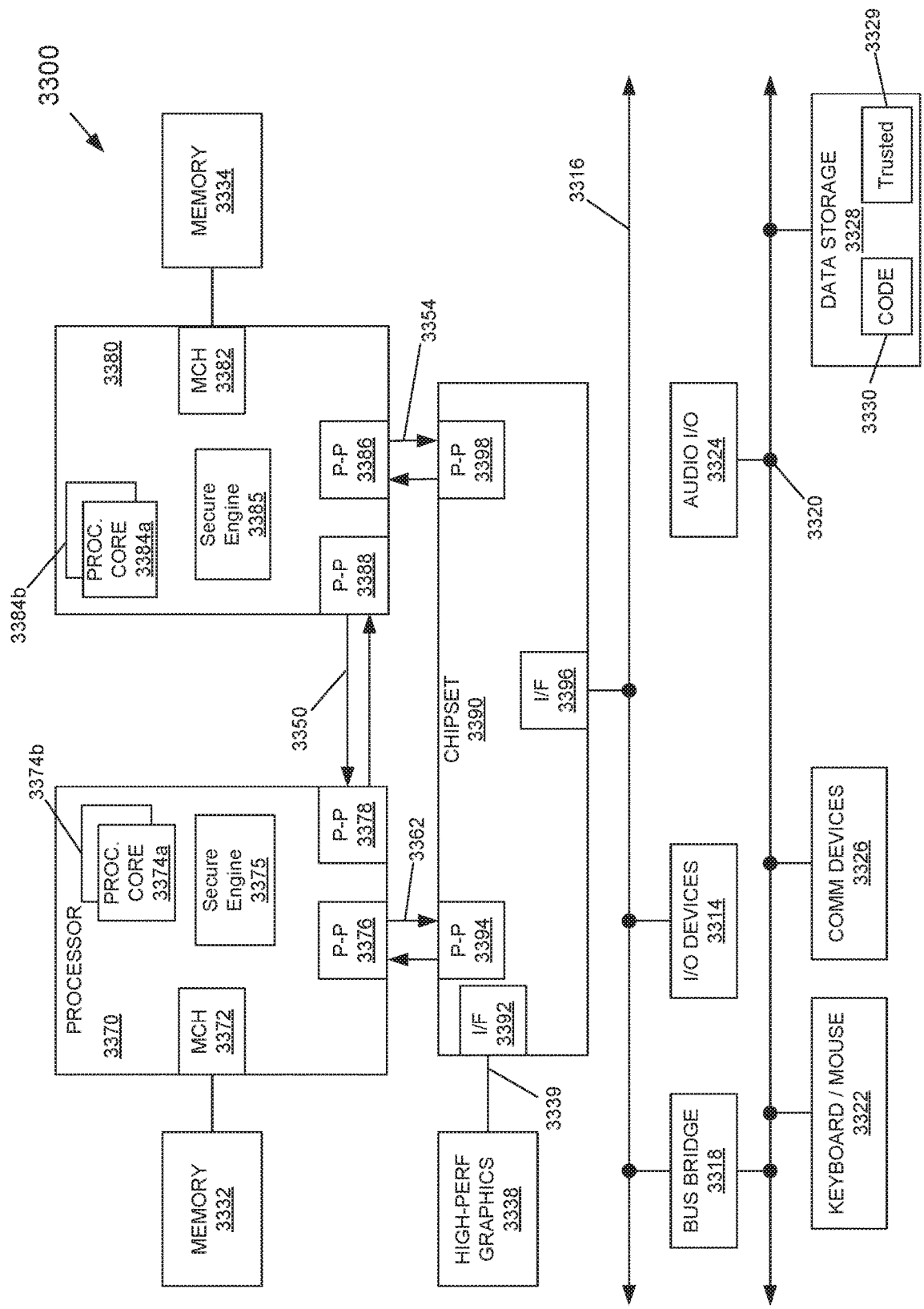
FIG. 33 is a diagram showing a system that can be used to implement an embodiment of the invention.

Referring now to FIG. 33, shown is a block diagram of a system in accordance with another embodiment of the invention. As shown in FIG. 32, multiprocessor system 3300 can be implemented as a point-to-point interconnect system such as a key domain-capable server system. System 3300 includes a first processor 3370 and a second processor 3380 coupled via a point-to-point interconnect 3350. As shown in FIG. 5, each of processors 3370 and 3380 may be multicore processors such as SoCs, including first and second processor cores (i.e., processor cores 3374a and 3374b and processor cores 3384a and 3384b), although potentially many more cores may be present in the processors. In addition, processors 3370 and 3380 each may include a secure engine 3375 and 3385 to perform the secure public cloud operations as described herein.

Still referring to FIG. 33, first processor 3370 further includes a memory manager hub (MCH) 3372 and point-to-point (P-P) interfaces 3376 and 3378. Similarly, second processor 3380 includes a MCH 3382 and P-P interfaces 3386 and 3388. As shown in FIG. 33, MCH's 3372 and 3382 couple the processors to respective memories, namely a memory 3332 and a memory 3334, which may be portions of main memory (e.g., a DRAM) locally attached to the respective processors. First processor 3370 and second processor 3380 may be coupled to a chipset 3390 via P-P interconnects 3352 and 3354, respectively. As shown in FIG. 33, chipset 3390 includes P-P interfaces 3394 and 3398.

Furthermore, chipset 3390 includes an interface 3392 to couple chipset 3390 with a high-performance graphics engine 3338, by a P-P interconnect 3339. In turn, chipset 3390 may be coupled to a first bus 3316 via an interface 3396. As shown in FIG. 33, various input/output (I/O) devices 3314 may be coupled to first bus 3316, along with a bus bridge 3318 which couples first bus 3316 to a second bus 3320. Various devices may be coupled to second bus 3320 including, for example, a keyboard/mouse 3322, communication devices 3326 and a data storage unit 3328 such as a non-volatile storage or other mass storage device. As seen, data storage unit 3328 may include code 3330, in one embodiment, including code for performing the secure public cloud operations described herein. As further seen, data storage unit 3328 also includes a trusted storage 3329 to store sensitive information to be protected. Further, an audio I/O 3324 may be coupled to second bus 3320.

Figure 34:
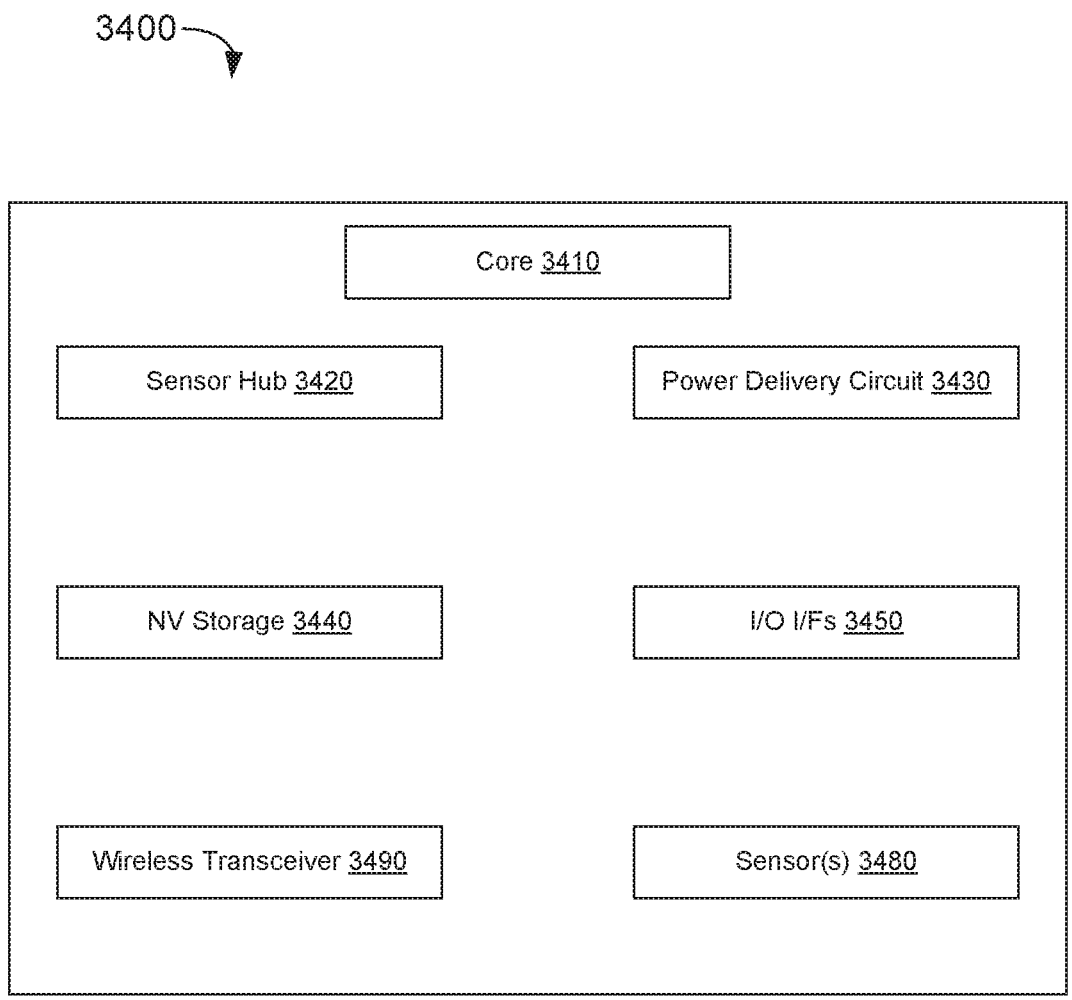
FIG. 34 is a diagram showing a system that can be used to implement an embodiment of the invention.

Embodiments may be used in environments where IoT devices may include wearable devices or other small form factor IoT devices such as an actuator and/or sensor. Referring now to FIG. 34, shown is a block diagram of a module 3400 in accordance with another embodiment. In one particular implementation, module 3400 may be an Intel® Curie™ module that includes multiple components adapted within a single small module. Module 3400 may be configured to participate in the secure public cloud operations described herein. As seen, module 3400 includes a core 3410 (of course, in other embodiments more than one core may be present). Such core may be a relatively low complexity in-order core, such as based on an Intel Architecture® Quark™ design. In some embodiments, core 3410 may implement a trusted execution environment. Core 3410 couples to various components including a sensor hub 3420, which may be configured to interact with a plurality of sensors 3480, such as one or more biometric, motion environmental or other sensors. A power delivery circuit 3430 is present, along with a non-volatile storage 3440. In an embodiment, this circuit may include a rechargeable battery and a recharging circuit, which may in one embodiment receive charging power wirelessly. One or more input/output (IO) interfaces 3450, such as one or more interfaces compatible with one or more of USB/SPI/I2C/GPIO protocols, may be present. In addition, a wireless transceiver 3490, which may be a Bluetooth™ low energy or other short-range wireless transceiver is present to enable wireless communications as described herein. Understand that in different implementations an IoT module can take many other forms that have, in comparison with a typical general purpose CPU or a GPU, a small form factor, low power requirements, limited instruction sets, relatively slow computation throughput, or any of the above.

As described above with reference to FIGS. 1-34, a consumer may provide an encrypted domain image to the cloud services provider. In the discussion of FIGS. 1-34, the consumer's encrypted domain image includes code to be executed as the consumer's workload and associated data. The consumer's workload and associated data are described above in the context of a consumer virtual machine, and a portion of the code provided by the consumer includes a portion of the code for a VMM managing the consumer's virtual machine. This portion of the VMM code is described above as a consumer domain manager image, or a "VMMlet."

In the discussion of FIGS. 1-34, the domain manager (VMMlet) is privileged code having the ability to create, exit, and resume execution of VMs. These privileges may be referred to as "vmxroot" functionality, and include the ability to perform commands such as a Virtual Machine Control Structure (VMCS) save/restore, General Purpose Register (GPR) save/restore, and/or VMexit/VMresume. Furthermore, the domain manager (VMMlet) controls critical resources such as Interrupt Descriptor Tables (IDT), Advanced Programmable Interrupt Controller (APIC) instructions, and paging data structures such as Page Tables and Extended Page Tables (EPTs). Because the domain manager image described in FIGS. 1-34 had root privileges (the VMMlet served as the VMM), the host VMM could access all memory (with its key). No restrictions were placed on the host VMM's access to the consumer's workload and data.

In contrast to the disclosure described with respect to FIGS. 1-34, the present disclosure does not provide root privileges to the consumer's image. Instead, the consumer's image runs as a guest VM, which can only access the memory that is mapped and granted permission in the Extended Page Tables (EPTs).

The following portions of this application describe techniques that reduce the encrypted consumer domain image to exclude the domain manager (VMMlet) and remove the need for the cloud services provider to trust consumer-provided code. The encrypted consumer domain image may include only an encrypted consumer domain control structure that is specific to the consumer's virtual machine. The control structures that normally would be provided by the host VMM are now also included in the encrypted consumer domain image provided by the consumer, or an intermediary trusted by the consumer, to the cloud services provider.

By providing the control structure that sets the consumer's VM processor state, the consumer retains control of the consumer workload without relying upon the host virtual machine monitor to protect the consumer's workload and data. Furthermore, providing the control structure within the encrypted memory for which the host VMM does not have access and for which the host VMM does not possess the encryption key further protects the consumer's workload and data from a compromised host VMM.

In one embodiment, where an agent has direct access to a guest VM's control and/or memory mapping structures, a software policy for mutual protection of the cloud environment is implemented. Either the agent or the guest VM that the agent protects can run at a given time, but both cannot run at the same time. The host VMM protects itself by verifying the agent's control structures (VMCS and EPTs, using a VMRead and/or HashKD instruction) prior to launching or resuming the agent to run in the cloud environment. The software policy implements several host self-protection rules, such as disallowing a VMCS that can edit itself, disallowing a VMCS that can edit its own EPTs, disallowing overlap in EPTs, and allowing an agent to modify another guest VM's VMCS only when the other guest VM is offline (not executing).

An agent protects another guest VM by verifying host requests to modify the other guest's VMCS or EPTs. An agent protects itself by keeping a separate VMCS for the guest and keeping a VMCS state for each hardware thread. An agent also checks EPTs to ensure that guest EPTs do not allow access to the agent, and that the guest EPTs do not leak data by specifying non-encrypted (k-bit off) memory when the data page should be encrypted (k-bit on). In addition, the agent will verify that guest physical address (GPA) to physical address memory mappings, permissions bits (R/W/X), memory types, paging hierarchy, and other control structure information are correct.

Furthermore, the host VMM and agent can maintain separate copies of verified control structures. By maintaining a separate copy of verified control structures, the host VMM and agent can compare the contents of the control structures to ensure they are the same (e.g., using the Hash Key Domain (HashKD) instruction to compare the hash values).

Figure 35:
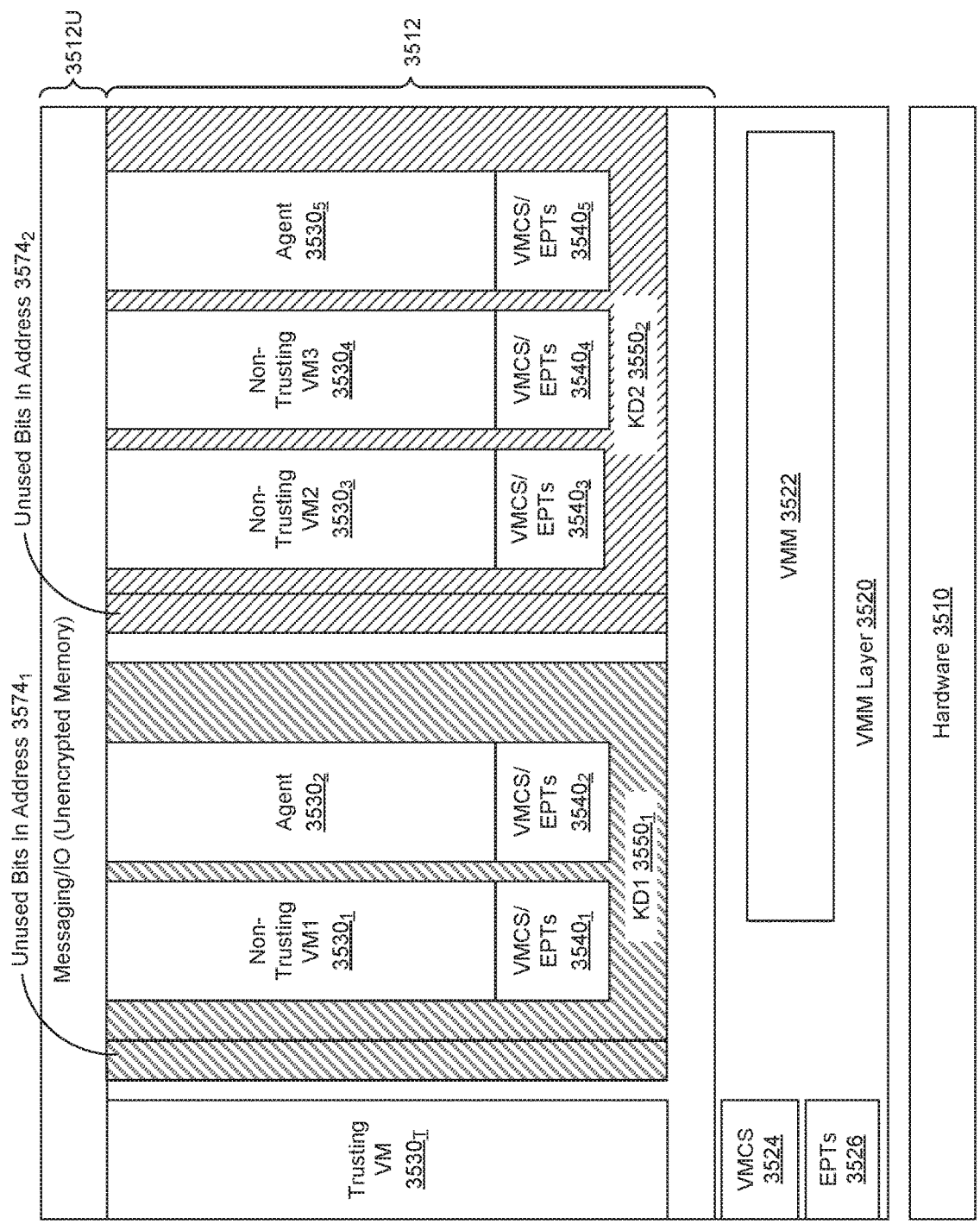
FIG. 35 shows an environment in which a non-trusting consumer virtual machine operates in a protected environment in which actions taken by the untrusted cloud service provider's virtual machine monitor can be verified.

FIG. 35 shows a cloud service provider server environment 3500 including hardware 3510 controlled by a virtual machine monitor (VMM) 3522 of a VMM layer 3520. VMM layer 3520 uses data structures such as a VM control structure (VMCS) 3524 and extended page tables (EPTs) 3526 to control execution of virtual machines (VMs). The VMCS is a data structure in memory that exists once for each logical processor for each guest VM, while the guest VM is managed by the host VMM. In a multi-processor system, each processor simultaneously executing the guest VM may have a unique VMCS. With every change of the execution context between different VMs, the VMCS is restored for the current VM, defining the state of the VM's virtual processor. Extended Page Tables (EPTs) are used to map memory addresses from Guest Physical Addresses (GPAs) known to the guest, to the Physical Addresses (PAs) used to address the physical memory.

Virtual machine $3530_T$ is an example of a typical implementation of a virtual machine, which is managed by VMM 3522 using VMCS 3524 and EPTs 3526, both of which are under the sole control of VMM 3522. Virtual machine $3530_T$ is referred to herein as a "trusting" virtual machine, because while VM $3530_T$ is managed by and under the control of VMM 3522, no mechanism exists for VM $3530_T$ to verify that VMM 3522 has not been compromised. Consequently, virtual machine $3530_T$ must trust that the actions of VMM 3522 will not compromise the consumer's workload or data or reveal consumer secrets. In addition, the code for VMM 3522 is considered to be a part of the consumer VM's Trusted Code Base (TCB).

In contrast to VMCS 3524 used by VMM 3522, each of virtual machines VM1 $3530_1$, VM2 $3530_3$, and VM3 $3530_4$ and agent virtual machines $3530_2$ and $3530_5$ includes protected memory regions and a respective data structure referred to herein as a "control structure." Each of VM1 $3530_1$, VM2 $3530_3$, and VM3 $3530_4$ includes protected memory regions (key domains) containing respective control structures VMCS/EPTs $3540_1$, VMCS/EPTs $3540_3$, and VMCS/EPTs $3540_4$. Similarly, agent virtual machines $3530_2$ and $3530_5$ include respective control structures VMCS/EPTs $3540_2$ and VMCS/EPTs $3540_5$ within their protected memory regions. While these control structures VMCS/EPTs $3540_{1-5}$ are shown as a combination of a VMCS with EPTs, the control structures may include a separate data structure for the VMCS from the EPTs. The control structures may also include other extended control structures such as a Virtualization Exception Information Page, an Extended Page Table Pointer (EPTP) List for VMFunctions, Model-Specific Register (MSR) bitmaps, Input/Output (I/O) bitmaps, MSR load and store pages, or any future control structure extensions to the VMCS.

The processor appends the key domain identifier/address selector for the currently executing guest VM to the uppermost portion of these addresses specified in the VMCS.

While VMM 3522 manages the instantiation of each of the non-trusting and agent virtual machines $3530_{1-5}$, the consumer, or their trusted intermediary, provides the control structures $3540_{1-5}$ to be used to control execution of the consumer's virtual machine and, in particular, to define the state of each VM's virtual processor.

Virtual machines VM1 $3530_1$, VM2 $3530_3$, and VM3 $3530_4$ and agent virtual machines $3530_2$ and $3530_5$ are executed within cryptographically protected regions of memory 3512 referred to as key domains, such as KD1 $3550_1$ and KD2 $3550_2$. A key domain key is used to encrypt and decrypt the data in each key domain.

Each non-trusting guest virtual machine, such as non-trusting VM1 $3530_1$, along with the associated control structures VMCS/EPTs $3540_1$, is hosted inside a key domain. This hosting scheme cryptographically protects the non-trusting guest virtual machine and associated control structures from tampering by a compromised virtual machine monitor. Furthermore, placing control structures for each virtual machine into the same key domain as the associated virtual machine enables each virtual machine to verify actions taken by the virtual machine monitor with regard to the control structures.

The key domain provides a protected environment in which a consumer virtual machine can operate with the consumer's confidence that the consumer's workload and data are protected. Similarly, the virtual machine monitor managing the consumer virtual machines can ensure that no consumer virtual machine has corrupted the cloud service provider's server platform hardware, or software or firmware running on the platform hardware.

A consumer virtual machine such as non-trusting VM1 $3530_1$ can verify actions requested by the untrusted cloud service provider's virtual machine monitor 3522 with respect to control structure $3540_1$. The cloud service provider's virtual machine monitor 3522 remains in control of the platform, manages execution of the consumers' virtual machines (such as non-trusting VM1 $3530_1$, non-trusting VM2 $3530_3$, and non-trusting VM3 $3530_4$) and can verify that the consumer's virtual machine has not corrupted a virtual machine control structure.

Key domains KD1 $3550_1$ and KD2 $3550_2$ each also include an agent guest virtual machine, respectively agent $3530_2$, having its own control structure $3540_2$, and agent $3530_5$, having its own control structure $3540_5$. Because virtual machine monitor 3522 cannot read data encrypted within a key domain, virtual machine monitor 3522 uses agent guest virtual machines $3530_2$ and $3530_5$ to act on behalf of VMM 3522 within the respective key domain KD1 $3550_1$ or KD2 $3550_2$. In particular, virtual machine monitor 3522 uses agent guest virtual machines to manipulate a control structure of a protected virtual machine. For example, virtual machine monitor 3522 may use agent $3530_5$ to manipulate the control structure of non-trusting VM3 $3530_4$ within key domain KD2 $3550_2$. Virtual machine monitor 3522 may use the consumer's agent to manipulate the control structure of a virtual machine in the process of switching execution to the virtual machine, resuming execution of the virtual machine after pausing execution, and so on.

A key domain such as KD1 or KD2 cryptographically separates virtual machines for each consumer from one another, as well as from the cloud service provider's virtual machine monitor. Similarly, actions taken by the non-trusting consumer virtual machine can be verified by the cloud service provider's virtual machine monitor. This mutual verification enables the cloud service providers to provide a public cloud environment that consumers can trust as protective of consumer virtual machine workloads and data, while enabling the cloud service provider to confirm that the activities of the consumer virtual machine have not corrupted the public cloud environment.

In one embodiment, the host VMM/agent relationship is established during system initialization. Trusted agent code, data, extended page tables and an initial VMCS are loaded into memory and measured. In one embodiment, the measurements of the trusted agent code, extended page tables, and VMCS are performed during a launch sequence for Intel®'s Trusted Execution Technology (TXT). TXT may also measure other state such as the state of a System Transfer Monitor to protect against System Management Mode (SMM) based accesses; BIOS and VMM measurements may also be taken. Finally, the agent establishes a secret value with the CPU that is stored in a hidden register and is used to identify a valid agent-authorized VMCS. Once a measured agent is loaded into the protected memory region (key domain), a VMM can be loaded outside the key domain and unprotected (trusting) guest VMs can be run normally.

Alternatively, when the protected memory region is an aliased memory encryption region, a secure enclave, such as provided by Intel®'s Software Guard Extensions (SGX), may load an already encrypted memory image into memory. When the secure enclave knows the memory encryption key domain key, the secure enclave can load and attest a VM image at runtime. The encrypted memory image may contain the VMCS, EPTs and code.

Similarly, the consumer, knowing the memory encryption key and using the Create Key Domain (CreateKD) instruction described herein, can encrypt the consumer's own image which can be loaded by the cloud service provider's software into plaintext memory that aliases to the key domain. The consumer image contains the VMCS, EPT and code image encrypted with the key domain key such that it is not accessible by the cloud services provider. The cloud services provider's host VMM may then load (via a VMPTRLD instruction) the consumer's VMCS in the key domain. The memory encryption engine will decrypt the VMCS structure from the consumer's encrypted image on memory reads (VMReads). The host VMM can verify the contents of the consumer's VMCS, and then the host VMM can call VMLaunch, which will enable the key domain key and pull the remainder of the consumer's image through the memory encryption engine, decrypting the consumer's image into cache as it executes. Either a VMLaunch or VMResume instruction will enable the specified key domain key (thus properly decrypting the memory contents).

In an embodiment in which the guest VM's protected memory region is protected using range registers, running the agent within the protected memory region has a different behavior. Only VMLaunch (and/or VMResume) of a guest VM can drop the range register protections to allow the guest VM to execute when a valid control structure (VMCS) resides within the key domain. When the guest VM exits (via VMExit) the range register protections are re-enabled before returning control to the host VMM. Write operations (VMWrites) from the host VMM directly to the protected VMCS are either limited or denied. As an optimization, some embodiments may allow limited write operations (VMWrites) to those regions of the VMCS that will not compromise the security of a guest VM, for example, restricting VMWrites from the host VMM exclusively to the host state area of the VMCS.

Editing a VMCS for a protected guest VM requires cooperation from the agent. A clear operation (VMClear) will return the cached VMCS into the guest VM's protected memory region (key domain). Then the host VMM can invoke the guest VM via VMLaunch (using the agent's VMCS). The agent can perform edits to the VMCS within the protected memory region (key domain) and verify the host state as well (e.g., using VMCS shadow VMRead/VMWrite or editing the in-memory VMCS structure).

When the agent has completed the edits to the VMCS, the agent can return (via a VMCall or VMExit) back to the host VMM. At this point, the host VMM can load the VMCS pointer (VMPTRLD) again and use VMReads to verify that the host state of the VMCS was not maliciously tampered with by the agent (i.e., verify that the host VMM's VMCS is correct/in an expected state). Meanwhile, read operations (VMReads) of the guest state area of the VMCS may be denied because the VMCS is within the key domain and guest VM state is to be hidden from the host VMM. If the VMCS is valid, the host VMM may then VMLaunch the agent-edited VMCS and resume the guest VM.

Hash Key Domain (HashKD) is an instruction used by the host VMM to "read through" the mechanisms protecting the protected memory region while maintaining confidentiality. In an embodiment protected by range registers, the processor range register protecting the guest VM's memory region will not block memory reads when originating from the HashKD instruction. In an embodiment protected as a key domain, the memory is encrypted, but the processor will allow the HashKD instruction to access the memory and decrypt it (for the purpose of generating a SHA2/3 hash of the memory's contents). The Hash Key Domain (HashKD) instruction can be used to assure the VMM that guest-formed structures, such as new EPTs, match the host VMM's expectations, and will not allow guest access to the host or other guests. The hash doesn't reveal the memory contents/secrets (unknown values), but if the hash value matches a structure the host already knows/expects, then the host VMM can be assured that memory was configured correctly by the guest agent, and launch the guest VM with the corresponding VMCS that references the validated EPT or any other control structure.

Using these techniques, the agent can create additional VMCSs and additional EPT structures for multiple guest VMs within a protected memory region (key domain), load consumer images into those guest VMs, and so on. The host VMM may then launch guest VMs using these VMCSs after validating their EPT's and/or other control structures using a Hash Key Domain (HashKD) instruction. Each of the guest VMCSs may contain a secret value shared between the agent and the CPU (and stored in a hidden register configured with the secret value when the key domain is created (Create Key Domain (CreateKD) instruction is executed). This secret value is validated when the VMPTRLD instruction is executed; only if the secret shared between the agent and the CPU is found will the VMCS be considered to be valid. In this way, a protected guest VM cannot collude with the host VMM to create its own VMCS. Nor can a malicious VMM send data to a protected VM (e.g. via an I/O or communications channel) that happens to be formatted as a VMCS and, thereby, undermine the guest's security. Additional fields can be added to the VMCS to allow the agent to control whether the host VMM can resume a guest VM. Resume operations (VMResumes) can be restricted by the guest VM, requiring the agent to first be run and reset the VMCS field before a VMCS can be re-launched by the host VMM.

Exit (VMExit) flows can be modified to first save (e.g., execute an XSAVE instruction) all processor register state, or guest interrupt handlers/"shims" can be inserted by the agent to assure that all processor register state is saved to protected memory and cleaned before returning control to the host VMM. For an unrestricted guest VM, the shim can intercept all interrupts and save and clean the guest register state before returning control to the host VMM (via VMCall). In one embodiment, Intel®'s Virtual Exceptions (#VE) can also be used to intercept all EPT violations and redirect those back to the guest shim where processor state may be saved to an encrypted memory area and cleared before transferring control by to the VMM via a VMCall. This technique prevents exposure of the guest VM's register state to the host.

Finally, multiple register ranges and/or multiple key domains can also be established, allowing multiple non-trusting guest VMs to be isolated from one another. When a control structure (VMCS) is loaded via a VMPTRLD instruction, the location of the VMCS determines which range or key domain is accessible after VMLaunch. Each key domain is then responsible for its own security having its own VMCSs, EPTs and code/data. Host VMM protection is assured by verifying a VMCS before launching a guest VM controlled by the VMCS and verifying the associated EPTs and other control structures (using HashKD) are correctly configured to restrict guest VM access to the host VMM and other guest VMs.

The memory protected by range registers may only be an alias back to host memory (e.g. the alias uses a high order unused address bit). This alias bit (or bits, referred to above as "k-bit(s)") is used by the memory encryption engine to determine whether the memory is to be encrypted with a secret key on writes, or decrypted on reads. In this way, the host VMM and its guest VMs share the same physical memory, but the protected guest VM contents are protected from host VMM access because the guest VM contents are encrypted in memory by the memory encryption engine using the guest VM's secret key domain key. Accessing memory through the host alias (e.g., with the high order physical address bit unset), disables the memory encryption engine leaving the encrypted contents encrypted. Conversely, if the encrypted memory is accessed by the guest VM with the high order address bit set, then the memory contents are first decrypted by the memory encryption engine using the secret key, leaving plaintext in the cache with the high order bits of the address corresponding to the key domain identifier/address selector. Meanwhile, the protected guest VMs can access memory through either the encrypted or plaintext aliases, allowing guest VMs to communicate with the host VMM and other guest VMs by accessing host memory regions (as controlled by the guest VM's EPTs verified by the host VMM via HashKD). Alternatively, a known shared key domain (or the host VMM's key domain) can be used for communication between the host VMM and the guest VMs.

The techniques disclosed herein enable a consumer's workload and secrets to be protected without exposing the consumer's key domain key used to encrypt the consumer's image, VMCS, EPTs, code and data. The key domain identifier/address selector is not exposed to the host VMM, nor does the key domain identifier appear in physical addresses of control structures (such as Extended Page Table or Virtual Machine Control Structure). The key domain identifier/address selector is used when a VMM enters a protected VM, where the VMM establishes the VM's key identifier when loading the VMCS via the a VM Pointer Load (VMPTRLD) instruction. If the VMCS decrypts properly (is not corrupt or invalid and/or the secret value inside the VMCS is correct), the hardware is using the correct key domain key (identified by the key domain identifier/address selector), and the key domain identifier/address selector is associated with the current key domain.

Using these techniques, an unlimited number of consumer key domains may be encrypted in memory. Keys are reprogrammed in the memory encryption engine for an available key domain identifier/address selector slot. For example, when a VM can be suspended so that it is not executing on any cores, the cache contents for that VM can be flushed. Then a Create Key Domain (CreateKD) instruction can be called by the VMM to establish a different key for the suspended VM's key domain identifier/address selector. In this way, suspended VMs can be scheduled To summarize the techniques used herein, the initial launch or resumption of a guest virtual machine (or agent) within a protected memory region (key domain) causes the hardware (e.g., a page miss handler) to set unused bits of a respective physical address for each memory location allocated to the guest virtual machine (or agent) to a key domain identifier/address selector. The key domain identifier/address selector identifies a protected memory region (key domain) in which data for the guest virtual machine (or agent) is encrypted by a key domain key. The unused bits of the physical addresses are set to the key domain identifier/address selector except in cases where the guest virtual machine's (or agent's) Extended Page Tables (EPTs) designate that encryption is to be turned off.

When a guest virtual machine (or agent) is to be initially launched or resumed, the key domain identifier/address selector is specified by the unused bits of an address provided in a VM Pointer Load (VMPTRLD) instruction that loads a control structure (VMCS) for the guest virtual machine (or agent) to be launched or resumed. In response to the VMPTRLD function call, CPU hardware reads the VMCS inside the key domain by setting the key domain identifier/address selector in the physical address. If the VMCS is invalid or corrupted, the host VMM will reject the requested VMPTRLD function call to load the VMCS. If the VMCS is valid, the VMCS will be written to cache for use by the agent or guest VM that is to be launched, the guest address space identifier will be flushed, and the guest state cleared so that the new VMCS can configure the address space and guest state for the newly-launched VM or agent.

Exiting the guest VM (or agent) causes the hardware (e.g., the page miss handler) to stop using the key domain identifier/address selector in the address or to switch back to the host VMM's key domain.

The agent is loaded and measured (e.g., by Intel®'s Trusted Execution Technologies (TXT), Software Guard Extensions (SGX) or Manageability Engine), or is simply included as an already encrypted in-memory image by the consumer for managing the consumer's VMs. The agent is XTS-encrypted for the key domain using the correct physical memory addresses as tweaks, runs as a guest VM, and manages the control structures (VMCS and EPTs) for the guest VMs that the agent protects. The consumer can trust the agent to provide measurements and attest to the validity of the host VMM, securely exchange private keys, load the consumer's encrypted domain image into a key domain, and maintain privacy of the consumer's workload and data.

In one embodiment, a guest virtual machine, such as an agent, can use a shim (such as an interrupt descriptor table hook) to intercept interrupts. A shim may be a driver in the guest operating system. The guest VM can create its own shim (a driver or code that intercepts interrupts/exceptions), or the agent can create a shim on the guest VM's behalf. The agent can also have its own shim (a driver or code to handle interrupts/exceptions, etc.). The shim runs as an unrestricted guest, handles interrupts and virtualization exceptions, causes VM exits using VMCall instructions, uses a virtualization exception handler to intercept Extended Page Table violations, uses a VMFunc function to switch into other Extended Page Tables, and assures that the general purpose register and XMM state that may hold confidential data are saved and cleaned before a transfer back to the host VMM is made via a VMCall instruction. A shim may selectively, depending on the context, expose some guest state to the host. For example, if a virtual device driver accessed device space with a register value that describes an I/O memory location to be used for DMA by a virtual device, this register data can be exposed to the host VMM (instead of being saved and cleared).

These features enable the "blinded" host VMM/hypervisor to remain in control of the platform. The host VMM can, for example, refuse to launch a guest virtual machine that does not have a valid or verifiable control structure (VMCS/EPT). Furthermore, the host VMM can set a "VM preempt" timer to pre-empt execution of a guest virtual machine and return control to the host VMM.

Figure 36:
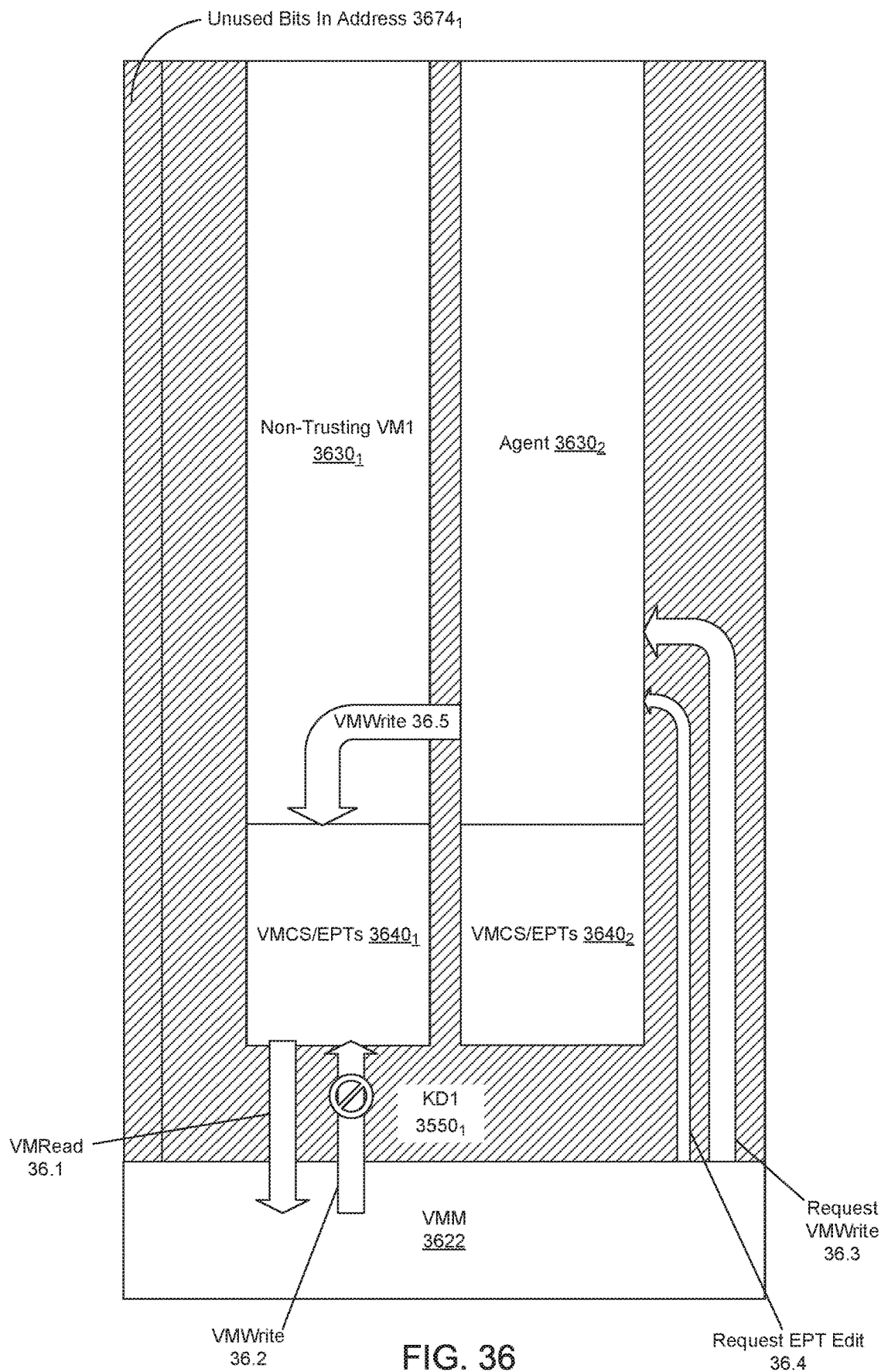
FIG. 36 shows a data flow for a virtual machine monitor (host VMM) to access a virtual machine control structure for a guest virtual machine running within a protected key domain.

FIG. 36 shows a data flow for a virtual machine monitor (host VMM) to access a virtual machine control structure for a guest virtual machine running within a protected key domain. Because host VMM 3622 has no access to the protected memory (key domain KD1 35501) where the agent 36302 resides, host VMM 3622 requests agent VM 36302 to interact with the control structure 36401 for non-trusting VM1 36301 on its behalf.

In action "VMRead" 36.1, host VMM 3622 is allowed to read the control structure VMCS/EPTs 36401, even though VMM 3622 does not possess the decrypted key domain key, without requesting gent VM 36302 to read the control structure VMCS/EPTs 36401 on its behalf. Processor microcode may allow read operations to be performed into the cached VMCS so that the host VMM can verify the VMCS before entry. A read operation does not expose confidential information about the guest VM (because the GPR register state is saved elsewhere, inaccessible to the host VMM). The read operation (VMRead) allows the host VMM to verify that the agent correctly edited a VMCS as the host VMM requested. An alternative to the read operation (VMRead) is to use a Hash Key Domain (HashKD) instruction to verify (by matching hash values) that the in-memory VMCS matches what the host VMM expects. Whether or not the host VMM uses an agent to read the control structure, the host VMM is allowed to verify but not modify the VMCS/EPTs.

In action "VMWrite" 36.2, VMM 3622 is not allowed to write data directly to the VMCS/EPTs 36401. Instead, in action "Request VMWrite" 36.3, VMM 3622 sends a VMWrite request to Agent 36302 to write to the control structure VMCS/EPTs 36401. In action "Request EPT Edit" 36.4, VMM 3622 requests Agent 36302 to edit the EPTs within VMCS/EPTs 36401. In "VMWrite" action 36.5, agent 36302 performs the requested edit of the EPTs within VMCS/EPTs 36401. In some embodiments, limited write operations (VMWrites) may be allowed by the host VMM, for example, by the CPU limiting host VMM write operations to those fields of the VMCS that have no effect on the guest VM's behavior. For example, the CPU may exclusively allow the host VMM to write to the host state area of the VMCS. Any write operations that affect the guest's security require the agent to perform.

Figure 37:
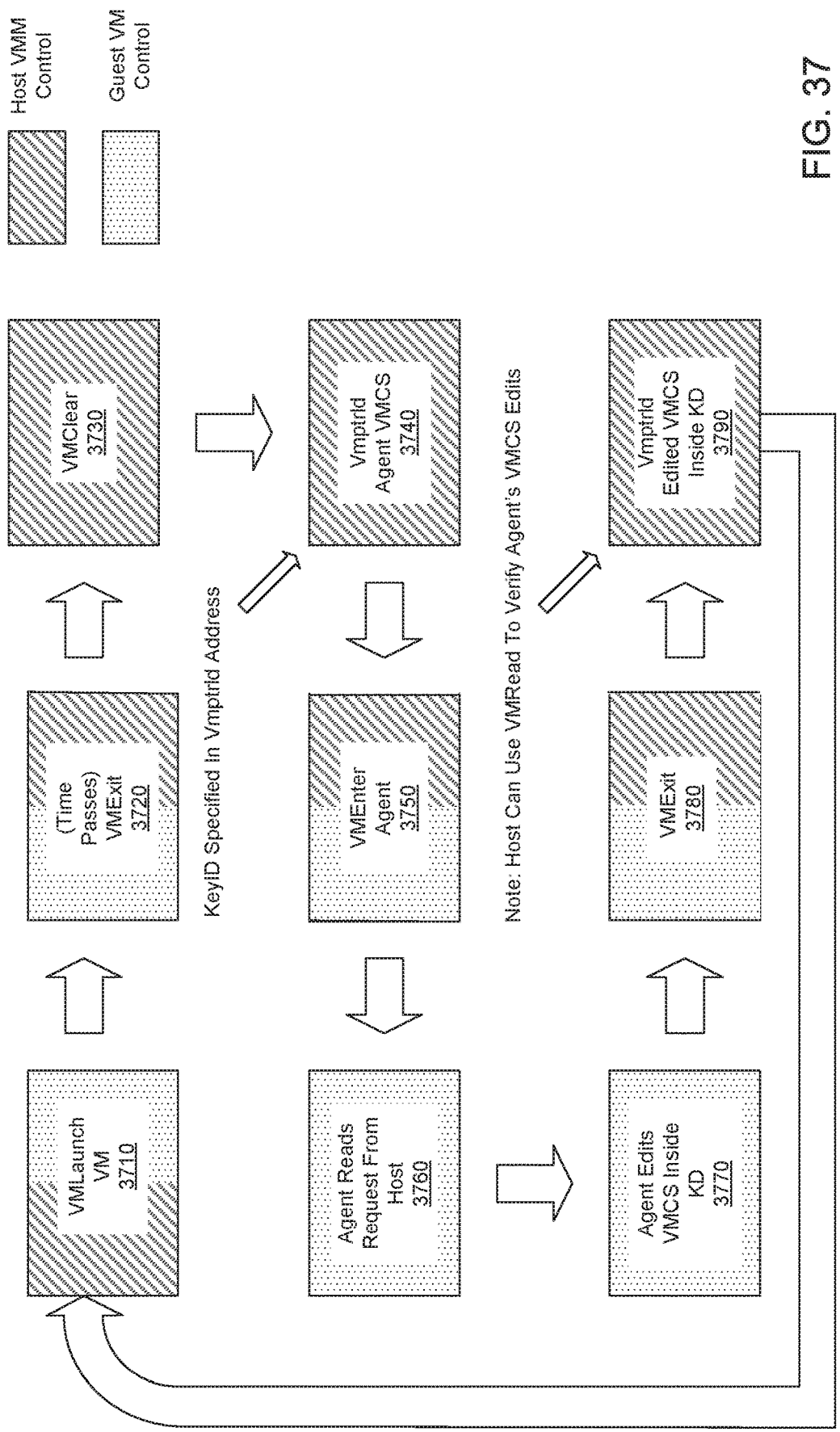
FIG. 37 shows a process for an agent acting on behalf of a virtual machine monitor to edit a virtual machine control structure for a guest virtual machine running within a protected key domain.

FIG. 37 shows a process for an agent acting on behalf of a virtual machine monitor to edit a virtual machine control structure for a guest virtual machine running within a protected key domain. Two types of shading are shown for each block; a line fill pattern is used to show actions under control of the host VMM, whereas a dot fill pattern shows that control has passed to the guest VM executing within the protected key domain.

At "VMLaunch VM" block 3710, the process begins with the host VMM launching a guest virtual machine. In one embodiment, to launch the guest virtual machine, the VMM first issues a command to execute a VM Pointer Load (VMPTRLD) instruction, which provides a pointer to a consumer-provided control structure (such as a VMCS) for the guest VM, thereby setting the current VMCS and key domain identifier/address selector. As a result of executing the VM Pointer Load instruction, the CPU caches the VMCS. If the VMCS is invalid or corrupted, the host VMM will reject the requested VMPTRLD function call to load the VMCS. If the control structure/VMCS is within the protected memory region (key domain), the key domain identifier/address selector is appended by hardware to each physical address belonging to the guest VM being launched. Once the current VMCS is established, the VMM issues a command to execute a VMLaunch or VMResume instruction (which are alternatively referred to herein as a VMEntry or VMEnter instruction).

Upon entering the guest VM, the key domain can be said to be "turned on," similar to the Switch Key Domain (SwitchKD) instruction described earlier. As shown by the transition from a line fill pattern to a dotted fill pattern in "VMLaunch" block 3710, control transitions from the host VMM to the guest VM within the key domain when the guest VM is launched. The VMCS is written to cache and the guest address space identifier is set, or else the guest TLB is cleared. The guest VM then executes until the guest VM has completed its workload.

At "(Time Passes) VMExit" block 3720, the guest VM finishes executing, and control returns to the host VMM. As shown by the transition from a dotted fill pattern to a line fill pattern in "(Time Passes) VMExit" block 3720, control transitions from the guest VM within the key domain back to the host VMM when the guest VM finishes executing. A VMExit is usually an asynchronous event caused by something the guest VM does (such as accessing an invalid, protected or paged-out memory region) or by an external event (such as an interrupt that is not handled by the guest VM or expiration of a preemption timer). Alternatively, a guest VM may issue a command to execute a VMCall instruction that causes a type of VMExit. When the guest VM exits, the key domain identifier/address selector is reset to the host VMM's key domain or the guest VM's protected memory range registers are re-enabled and control is returned to the host VMM.

Upon exiting a guest VM, and before returning control to the "root"/host VMM, microcode reprograms hardware (such as a page miss handler) to set the host VMM's or shared key domain on all physical addresses (except where an indicator (such as the k-bit described above) is set to turn encryption off). When returning control back to the host VMM, the guest's key domain key should no longer be used, nor should the guest VM's key domain identifier/address selector be used. Either the key for the host VMM is used, or encryption is turned off (k-bit off). Effectively, the CPU switches out of the guest VM's key domain (similar to an implicit Switch Key Domain) to the cloud service provider (host VMM's) key domain. Because the host VMM "root" is running underneath the guest VM that is exiting, control returns to the host VMM, switching the key domain back to the host VMM's key domain or to shared unencrypted memory (e.g., the shared bit indicator (k-bit) is off).

The host VMM executes a VMClear command at "VMClear" block 3730 to save the state of the guest VM from cache into memory. As part of the VMClear command, the host VMM provides a pointer to the key domain in which the guest VM was executing and checks for a valid control structure (VMCS) within the key domain or that the VMCS was already cached for the same address.

The pointer provided with the VMClear instruction should be the same as the pointer originally used to load into cache the VMCS with the VMPTRLD instruction, where the key domain ID was already appended to the pointer, which is a physical memory address, including the key domain ID. It is important that VMClear does not send a VMCS from one memory location to another, or from one key domain to another, as these actions would be an attack. Thus, the VMClear instruction uses the same pointer as given with the VMPTRLD instruction and cached by the processor or the processor will first need to verify that a valid VMCS is in the memory location being VMCleared for the specified key domain identifier/address selector.

If the VMCS is valid, and the pointer matches the memory address and key domain identifier/address selector of the cached VMCS, the host VMM flushes the VMCS to memory using the key domain identifier/address selector in the physical address so that the state of the guest virtual machine is saved within memory of the key domain. The VMCS may not be cached because not all processors will explicitly cache the VMCS; some processors will access the VMCS from memory. If the VMCS is not cached, the host VMM may perform consistency checks by reading the memory using the key domain identifier/address selector in the physical address to check for an invalid/corrupt VMCS (e.g., the secret value inside the VMCS does not match one of the values established in the processor's hidden register when the key domain was created (on execution of the CreateKD instruction)).

The processor first checks the VMCS by reading it before writing the VMCS to memory is to ensure that the VMCS is valid and not corrupted. For example, the VMCS will be corrupted if the host VMM specified the wrong key domain identifier/address selector, and therefore the VMCS decrypted incorrectly, or if the host VMM specified the wrong memory location for the VMCS. If invalid or corrupt VMCS data is found, the host VMM will receive an error and the VMCS will not be used by the processor.

Control proceeds from "VMClear" block 3730 to "VMPTRLD Agent VMCS" block 3740. The VMPTRLD instruction provides a physical address of a VM control structure (VMCS) for an agent to be loaded into memory. If the address of the agent VM control structure is inside a key domain, unused bits of the physical address include the key domain identifier/address selector.

As described above, the agent's code and control structure (VMCS) are provided to the host VMM by the consumer as part of the consumer's encrypted domain image, and the correct memory location of the VMCS is provided to the host VMM. The host VMM then proceeds to "VMEnter Agent" block 3750.

After confirming that the control structure (VMCS) to which the VM pointer load (VMPTRLD) instruction refers is valid, the host VMM will issue a VMEnter command (which may be either a VMLaunch or a VMResume command) to execute the agent within the protected memory region (key domain). The processor will use the key domain ID in the addresses (thus, allowing the agent to access the properly decrypted memory). In an embodiment in which the protected memory region is provided by range registers, the VMEnter instruction will disable the range register protections to run an agent within the protected memory region only if the agent's VMCS is inside the protected memory region and contains a secret value known only to the CPU and agent. As shown by the transition from a line fill pattern to a dotted fill pattern in "VMEnter Agent" block 3750, control transitions from the host VMM to the agent within the key domain when the agent is launched. Once the agent is in control within the key domain, the host VMM is "blind" to activity that occurs within the consumer's guest VM.

A host VMM may launch an agent within a key domain to request the agent to act on behalf of the host VMM to control execution of another guest VM executing within the protected memory region (key domain). To control execution of the other guest VM, the host VMM requests the agent to edit a control structure of the other guest VM. This request from the host VMM can be made in many forms, in accordance with agreed-upon software conventions between the cloud services provider and the consumer. For example, the request may be placed into an in-memory structure or command queue, or the request can include an entire VMCS to be copied from the host VMM's memory into the guest's protected key domain memory. Alternatively, the host VMM's request may be encoded in the processor registers (e.g. GPRs).

At "Agent Reads Request from Host" block 3760, the agent reads the request from the host VMM to edit the other guest VM's control structure. As noted above, the request may have been made in several forms, in accordance with agreed-upon software conventions between the cloud services provider and the consumer.

The agent proceeds to "Agent Edits VMCS Inside KD" block 3770, where the agent edits the control structure (VMCS) of the other guest VM within the key domain. This permission to read and write (using VMRead and VMWrite instructions) to the guest VM's control structure may be accomplished using VMCS shadowing. Without VMCS shadowing, a guest VM such as the agent normally cannot execute VMRead and VMWrite instructions, as the VMRead and VMWrite are intended for use by a host VMM running in VMXRoot mode. Because VMCS is an in-memory structure, a guest VM executing within the same key domain could directly edit the VMCS on behalf of the host VMM; however, for security reasons, at least one embodiment limits the ability to edit the VMCS to an agent.

After completing the edit of the other guest VM's control structure, the agent exits by executing a VMCall instruction, returning control back to the host VMM, as shown by the transition from a dotted fill pattern to a line fill pattern in "VMExit" block 3780. VMExits back to the host VMM re-enable the protected memory region provided by the encrypted key domain, blocking host VMM accesses not only to the agent's code/data, VMCS, and Extended Page Tables (EPT), but also to the code/data, VMCS, and EPTs of the guest VMs that are protected by the agent.

Upon receiving control back from the agent, at "VMPTRLD Edited VMCS Inside KD" block 3790, the host VMM first executes a VMPTRLD instruction with the address/pointer (including the key domain identifier/address selector) of the VMCS that was edited. The VMPTRLD instruction loads the edited control structure (VMCS) inside the key domain. Only then can the host VMM execute the VMRead instruction to verify that the agent made the edits to the other guest VM control structure as requested by the host VMM. Even though data in the key domain is encrypted and the host VMM does not have the decrypted key domain key, the host VMM is allowed to read portions of the in-memory VMCS control structure using a VMRead instruction.

After confirming that the guest VM control structure has been edited as requested, control then returns to "VMLaunch VM" block 3710, where the host VMM launches the guest VM to execute in accordance with the edited control structure as provided by the host VMM.

In some embodiments, write operations (VMWrites) may be restricted from the host VMM to the protected VMCS, requiring the host to always ask the agent to perform any edits to the VMCS on the host's behalf. In such embodiments, if the host VMM requests to perform a write operation to a VMCS inside a key domain, the write operation will be blocked. In other embodiments, limited write operations (VMWrites) by the host VMM may be allowed to specific VMCS fields (such as fields in the host state area that do not affect security of the guest VM).

The host VMM is allowed to perform a store operation (VMPTRST) to store the current (cached) VMCS pointer from the VMPTRLD instruction to a specified address in memory, which must be outside the protected or encrypted memory of the guest VM. The key domain is not specified as part of the physical address for a VMPTRST operation.

Figure 38:
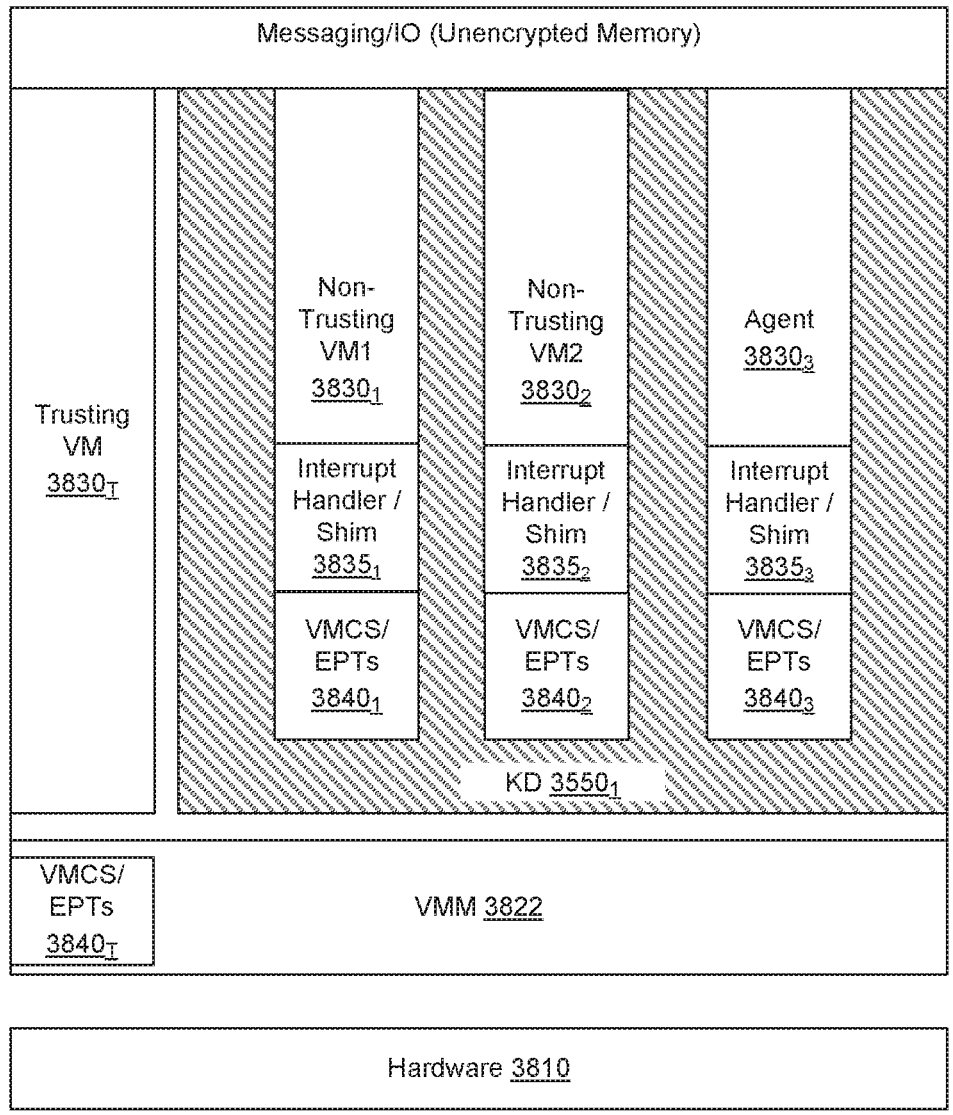
FIG. 38 shows an interrupt handler driver for a guest virtual machine to protect its virtual machine control structure from modification by a compromised virtual machine monitor.

FIG. 38 shows an interrupt handler/shim for a guest virtual machine to selectively protect the guest VM's processor register state (such as General Purpose Registers (GPRs)) from modification by a compromised virtual machine monitor. If a VMExit is triggered, the interrupt handler/shim is invoked prior to exiting the guest VM, giving the guest VM an opportunity to conditionally save and protect its processor register state before exiting to the host VMM. In the example shown, each of non-trusting guest virtual machines VM1 $3830_1$ and VM2 $3830_2$, and agent $3830_3$ within key domain $3550_1$ has its own respective interrupt handler/shim $3835_1$, $3835_2$, and $3835_3$. Rather than a VMExit instruction causing the respective host VMM to be instantiated, VMExit instructions are redirected to the respective interrupt handler/shim, which uses software to hide the guest VM's processor state from the host VMM 3822. One example of an interrupt handler/shim is a Virtualization Exceptions (#VE) driver described in U.S. Patent Application Publication 2015/0121366.

Each of interrupt handlers/shims $3835_1$, $3835_2$, and $3835_3$ may perform a General Purpose Register save or restore operation. In one embodiment, each guest VM runs as an unrestricted guest, intercepts all interrupts, uses a virtualization exception handler to intercept EPT violations, uses VMFunc to switch Extended Page Tables, and assures that General Purpose Register and other register states are conditionally saved and/or cleaned before transferring execution to a host VMM 3822 via a VMCall instruction.

Figure 39:
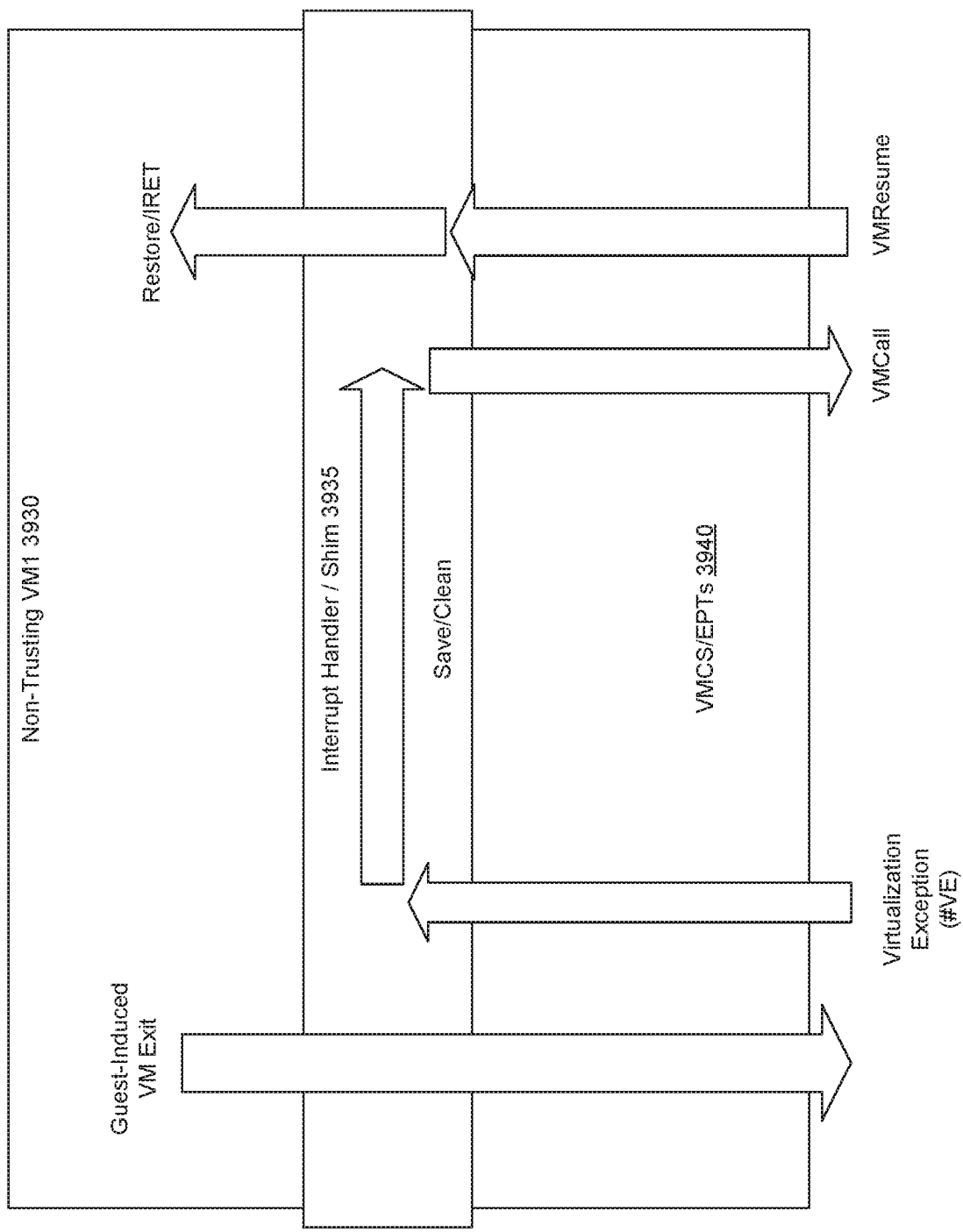
FIG. 39 shows operation of the interrupt handler driver of FIG. 38.

FIG. 39 shows an implementation of the interrupt handler/shim of FIG. 38. Non-trusting VM1 3930 causes a VMExit condition, resulting in a virtualization exception to be redirected back to the guest's interrupt handler/shim 3935. This redirection is considered to be a "guest-induced exit" rather than a VMM-induced exit. In one embodiment, guest-induced exits cause a virtualization exception, and interrupt handler/shim 3935 handles the virtualization exception. Interrupt handler/shim 3935 may include the virtualization exception handler (#VE) code (not shown), bypassing the host VMM. After the virtualization exception handler #VE handles the virtualization exception, control returns to interrupt handler/shim 3935, which conditionally saves and cleans the processor register values (e.g. GPRs) before making a VMCall to return control to the host VMM. The host VMM can then issue a command to execute a VMResume instruction, which will resume non-trusting VM1 3930, including interrupt handler/shim 3935. Interrupt handler/shim 3935 causes the register values to be restored and returns control to non-trusting VM1 3930, for example, by using a IRET instruction.

In one embodiment, virtualization exception handler #VE may intercept EPT violations, as well as CPUID and other guest-induced exit conditions. Virtualization exception handler #VE may decide which GPR/XMM register state is saved and/or cleaned before transferring control back to the host VMM by issuing a command to execute a VMCALL instruction. In this way, non-trusting VM1 3930 can decide the aspects of the CPU state that are to be exposed to the host VMM.

Figure 40:
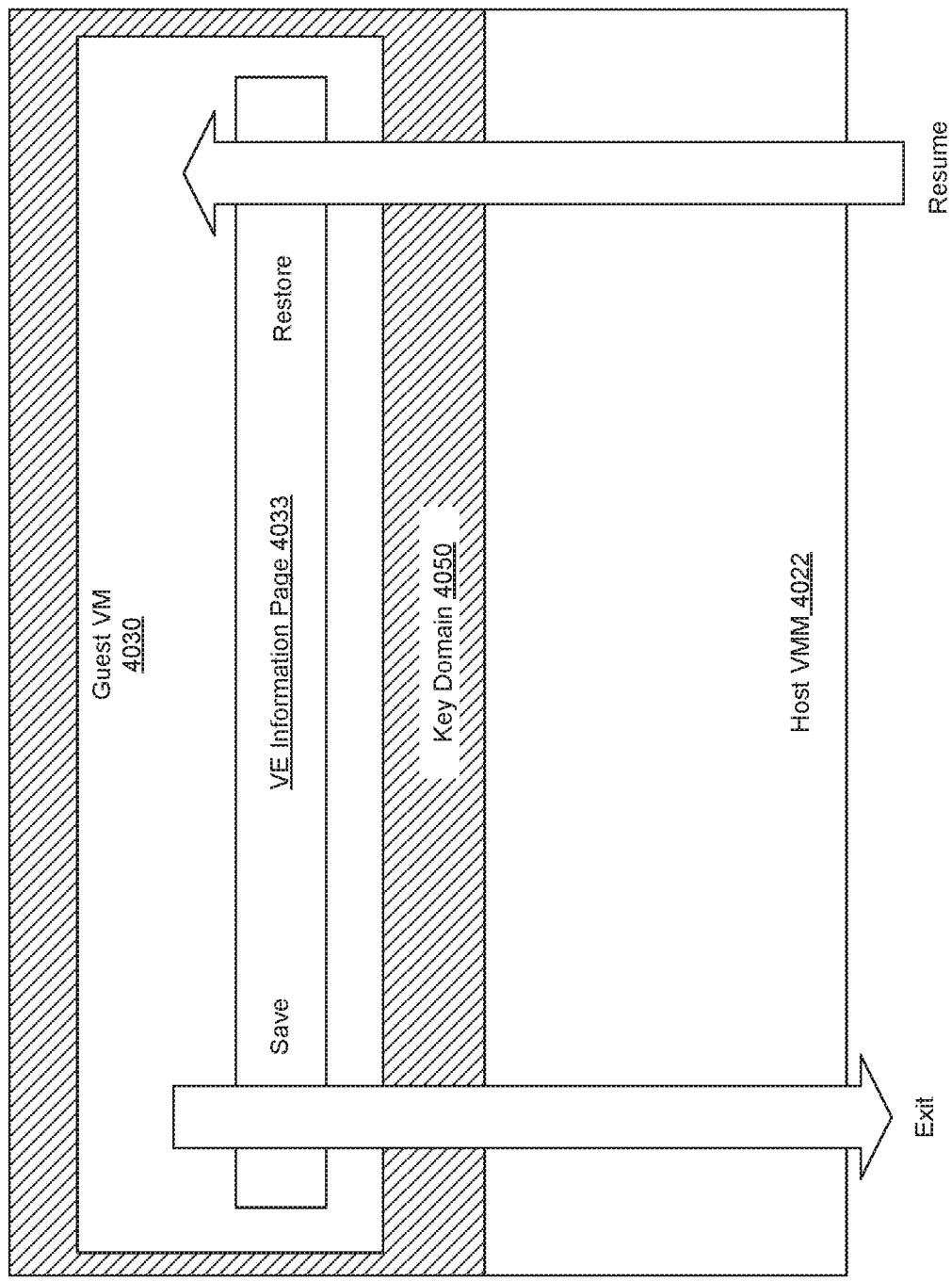
FIG. 40 shows operation of the virtualization exception handler/shim in saving processor register state upon exiting a virtual machine.

FIG. 40 shows a data flow during operation of the interrupt handler/shim driver of FIGS. 38 and 39. With regard to saving the encrypted state, some data within key domain 4050 will be register state information. Host VMM-specific exits (not requiring emulation, such as, for example, a preemption timer event) can automatically save CPU state. For example, the CPU can save all register state information to the VE Information Area 4033 (such as a 4 KB page), then clear the register state, set the VMCS to restore the register state on re-entry, and then exit the guest VM 4030. The host VMM 4022 will handle VMExit and VMResume instructions. Upon receiving a command to execute a VMResume instruction to resume a given VM, the CPU will check the VMCS, restore the guest VM's processor state from the VE Information Area 4033, and resume the guest VM.

Figure 41:
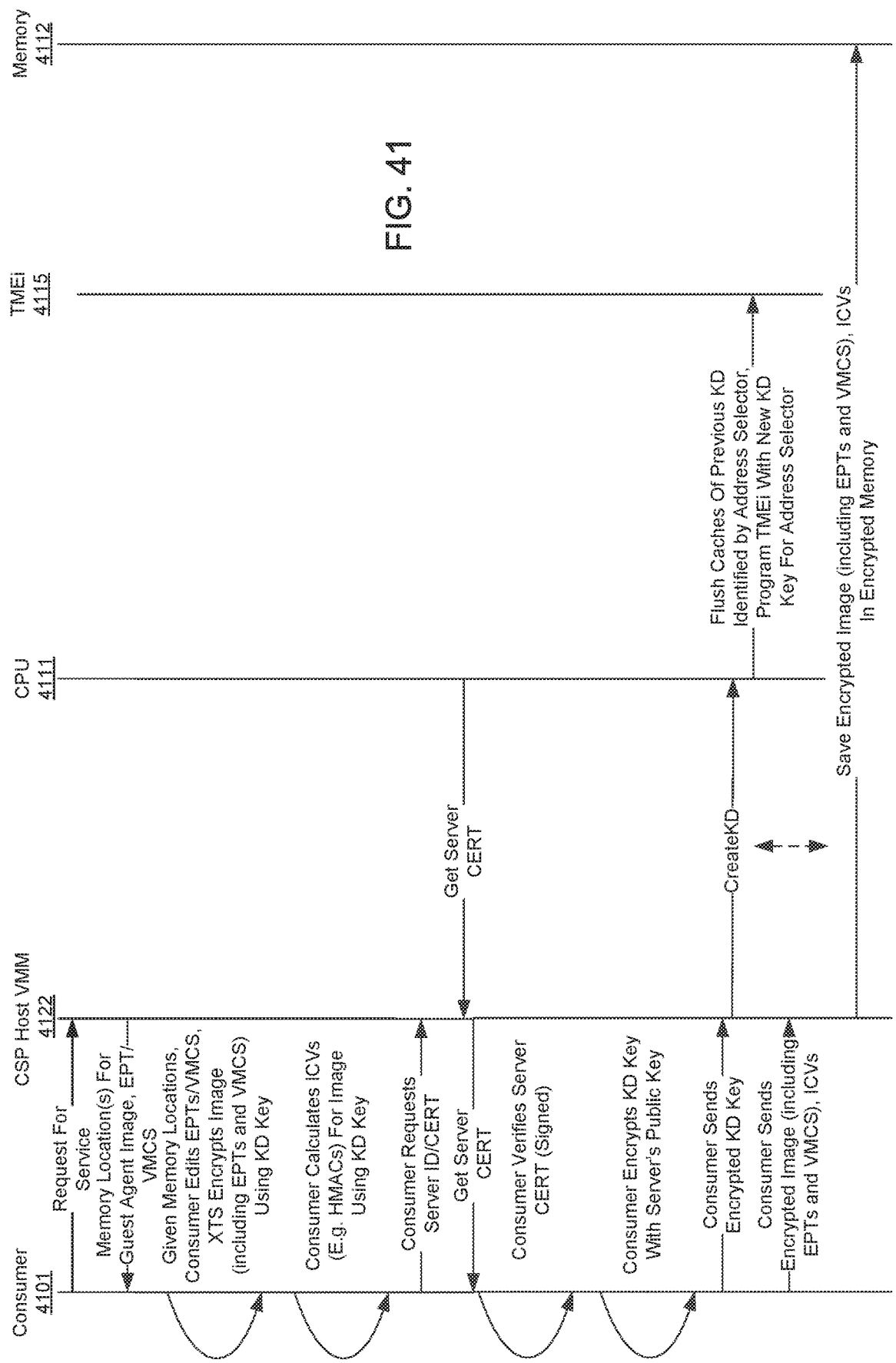
FIG. 41 shows creation of a key domain and installation of an encrypted guest code image, along with its encrypted control structure(s), into encrypted memory.

FIG. 41 is a diagram showing messages between components of a cloud service environment to encrypt a consumer-provided code image and establish a key domain in accordance with one embodiment of the invention. The data flows described for FIG. 41 are similar to the data flows described above for FIG. 13, although the data flows are in the context of a cloud services provider's host VMM and a consumer-provided image to be run as a guest virtual machine providing an agent. Note that the same data flows apply whether the consumer-provided image is for an agent to be run as a guest virtual machine or for any other consumer workload to be run as a guest virtual machine.

The consumer 4101 requests protected services from the cloud services provider, and in response, the cloud service provider's software, such as, for example, the host VMM 4122, provides memory locations for the guest agent image, Virtual Machine Control Structure (VMCS) and Extended Page Tables (EPTs). Given these memory locations, the consumer 4101 edits the VMCS and EPTs to be used to instantiate the guest agent image on the cloud services provider's servers.

In one embodiment, the guest agent image, including the control structure VMCS and EPTs, is then encrypted by the consumer 4101 using a memory position-dependent "tweaked" cipher (e.g., XTS) and the consumer's key domain key. The VMCS and EPTs are embedded within the guest agent image in the embodiment shown, although the VMCS and EPTs may be provided separately as long as they are encrypted using the consumer's key domain key.

The consumer 4101 may also calculate integrity check values (ICVs, e.g., keyed-hash message authentication codes (HMAC) values) for the encrypted guest agent image using the key domain key. The ICVs may be calculated as position-dependent values and are used to verify the position as well as the contents of the associated memory locations for the encrypted guest agent image.

The consumer 4101 requests the cloud services provider host VMM 4122 to identify a server in the cloud services provider's network that provides key domain management functionality. The cloud services provider host VMM 4122 obtains a server certificate for a key domain-capable server (in this example, from a server having CPU 4111) and provides the server certificate to the consumer 4101. The consumer 4101 verifies that the server certificate is signed by an authority certifying that the identified server provides key domain management functionality in accordance with at least one embodiment.

The consumer 4101 encrypts the consumer's key domain key (as well as any other consumer secret data such as the secret value stored within the VMCS) with the cloud services provider's key domain-capable server's public key corresponding to the key domain-capable server's certificate. The consumer 4101 sends the encrypted key domain key, encrypted guest agent image (including EPTs and VMCS), and (optionally) integrity check values (ICVs) to the cloud services provider host VMM 4122, which issues a Create Key Domain (CreateKD) command to the CPU 4111 of the key domain-capable server. In one embodiment, the cloud services provider host VMM 4122 identifies a key domain address selector to use for the new key domain, providing the key address domain selector to the CPU 4111 of the key domain-capable server. The CPU 4111 of the key domain-capable server creates and initializes a key domain. Initializing the key domain may include flushing caches of any previous key domain (identified by the previous key domain address selector) as well as flushing translation look-aside buffers that cached address mappings for the previous key domain. Initializing the key domain may also include programming the memory encryption engine with the decrypted key domain key as well as configuring hidden registers in the CPU corresponding to the secret value uniquely identifying the consumer's guest agent VMCS(s).

As an alternative to performing initialization functions as part of the Create Key Domain instruction, the CPU 4111 of the key domain-capable server may execute an Initialize Key Domain (InitKD) instruction to flush the caches and translation look-aside buffers.

The host VMM 4122 executing on CPU 4111 may also provide the consumer's encrypted guest agent image (including EPTs and VMCS) and integrity check values directly to memory 4112. The consumer's guest agent image is already encrypted, so that the consumer's guest agent image can be written directly to memory as if it were plaintext, bypassing the memory encryption engine TMEi 4115. Alternatively, the consumer's encrypted guest agent image may pass through the memory encryption engine TMEi 4115 with the encryption bit (k-bit) of the physical address turned off, so that the memory encryption engine TMEi 4115 treats the consumer's encrypted guest agent image as unencrypted plaintext. When the consumer's guest agent image is read later from memory 4112 using the correct key domain key, then the memory encryption engine TMEi 4115 will decrypt the content (as the encrypted VMCS/control structure is being read and the consumer's guest agent image is being executed by the CPU 4111).

Figure 42:
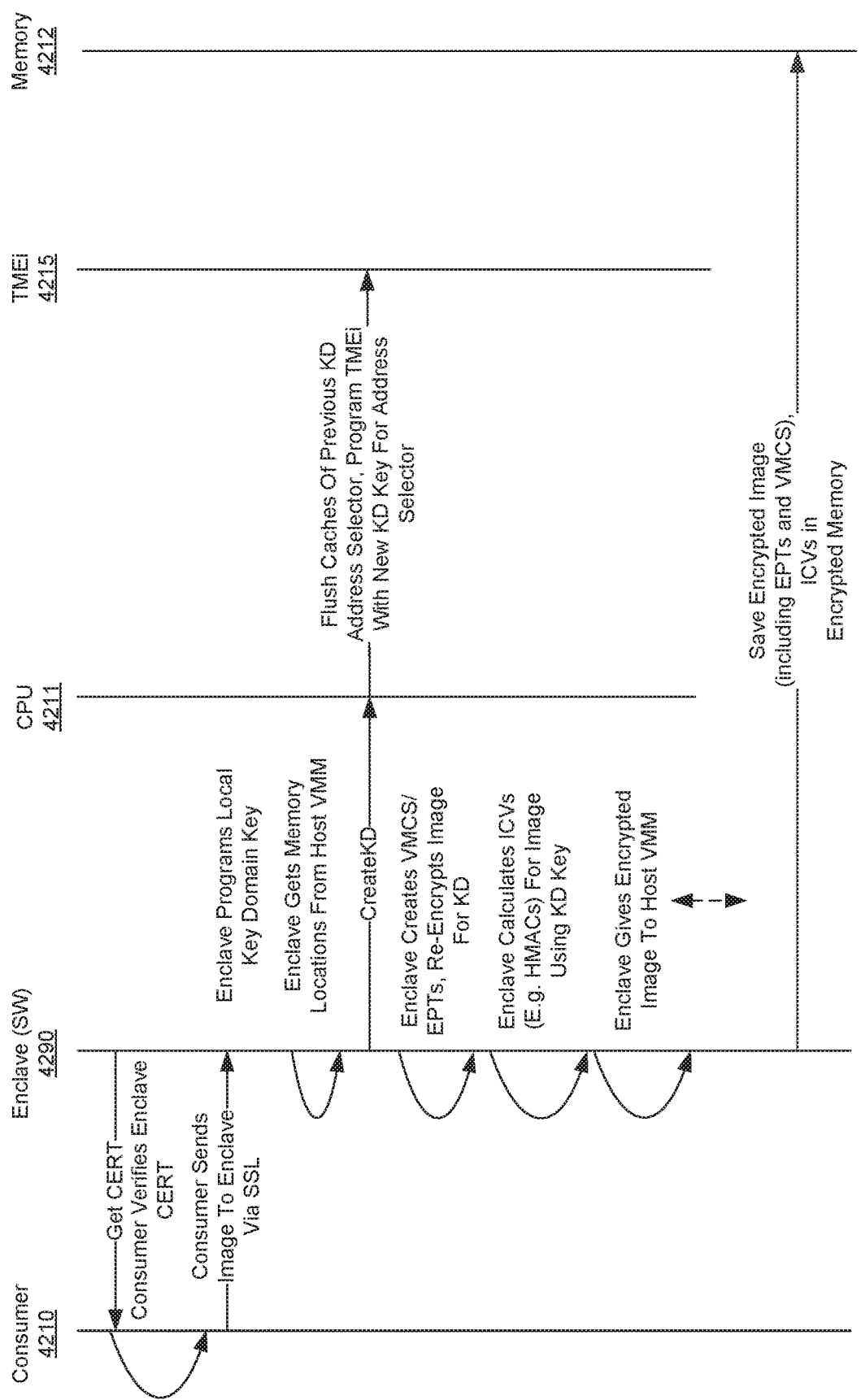
FIG. 42 shows an alternative process for creating a key domain and installing an encrypted guest code image, along with its encrypted control structure(s), into encrypted memory.

FIG. 42 shows an alternative embodiment for creating a key domain. In this example, a secure enclave (such as an enclave created using Intel®'s Software Guard Extensions (SGX)) creates the guest image locally on the cloud services provider's server. Consumer 4210 first obtains a certificate from enclave 4290 running on the cloud services provider's server. Consumer 4210 then verifies the enclave certificate, and sends the guest image to the enclave 4290 via a secure mechanism such as a Secure Sockets Layer connection. Enclave 4290 obtains the memory locations for the guest image, VCMS, and EPTs from the cloud services provider's host VMM (not shown), and programs a local key domain key. Enclave 4290 then issues a command to execute a create key domain instruction to CPU 4211. When creating the new key domain, local CPU 4211 flushes caches of the previous key domain address selector and programs the memory encryption engine TMEi 4215 with the key domain key for the address selector.

Enclave 4290 then creates the VMCS and EPTs for the guest image and re-encrypts the image (containing the VMCS and EPTs) using the key domain key that enclave 4290 previously determined. In the embodiment shown, enclave 4290 also calculates integrity check values for the guest image using the key domain key. Enclave 4290 then provides the encrypted guest image, including the VMCS and EPTs, to the cloud service provider's host VMM (not shown, but executing on CPU 4211). Alternatively, any other Trusted Execution Environment (TEE), such as a manageability engine (ME) or Converged Security Engine (CSE), could perform the same functions herein ascribed to the Enclave TEE. Likewise, a trusted third party server or service can produce the encrypted memory images on behalf of the consumer for instantiation on the cloud service provider's infrastructure.

As above for FIG. 41, host VMM (not shown) executing on CPU 4211 may also provide the consumer's encrypted guest image (including EPTs and VMCS) and integrity check values directly to memory 4212. The consumer's guest image is already encrypted, so that the consumer's guest image can be written directly to memory 4212 as if it were plaintext, bypassing the memory encryption engine TMEi 4215. Alternatively, the consumer's encrypted guest image may pass through the memory encryption engine TMEi 4215 with the encryption bit (k-bit) of the physical address turned off, so that the memory encryption engine TMEi 4215 treats the consumer's encrypted guest image as unencrypted plaintext. When the consumer's guest image is read later from memory 4212 using the correct key domain key, then the memory encryption engine TMEi 4215 will decrypt the content (as the encrypted VMCS/control structure is being read and the consumer's guest agent image is being executed by the CPU 4211).

Figure 43:
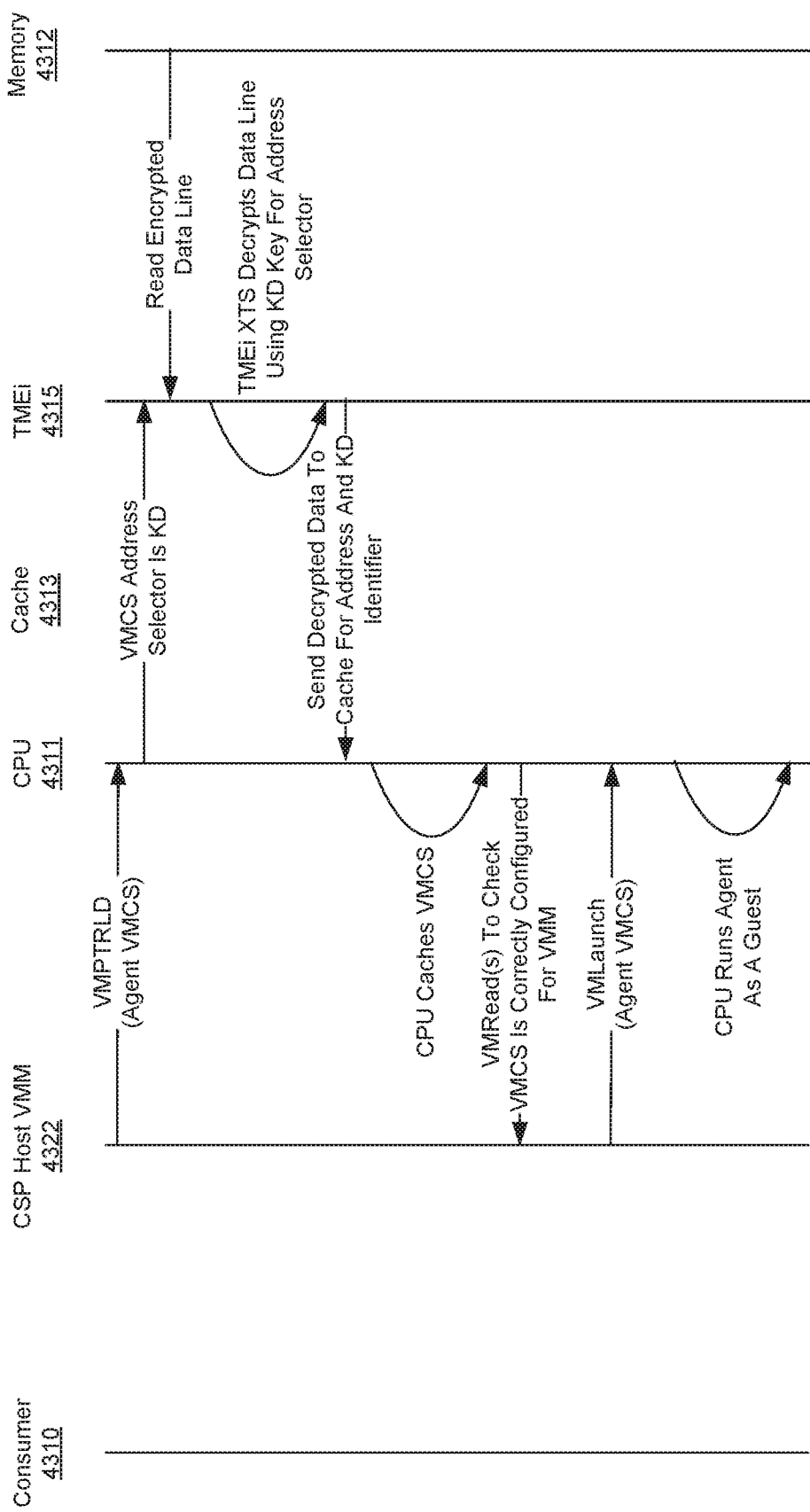
FIG. 43 shows one embodiment of a process for the host VMM to verify the consumer-provided agent VMCS.

FIG. 43 shows one embodiment of a process for the host VMM to verify the consumer-provided agent VMCS. The cloud services provider's host VMM 4322 issues a command to CPU 4311 to execute a VM Pointer Load (VMPTRLD) instruction using the consumer-provided agent's control structure (VMCS) address and key domain identifier/address selector located in the consumer's encrypted memory image. Memory encryption engine TMEi 4315 uses selected bits (such as the uppermost unused bits) of the physical address specified via the VMPTRLD instruction for the VMCS as the key domain identifier/address selector. Memory encryption engine TMEi 4315 reads the encrypted data line from memory 4312 and decrypts the data line (using a memory-position dependent cipher such as XTS, described above) using the key domain key determined from the key domain identifier/address selector. If the VMCS decrypts correctly, CPU 4311 then caches the VMCS, and the cloud services provider's host VMM 4322 performs a VMRead of the VMCS to ensure that the VMCS is correctly configured for host VMM 4322. If the VMCS is correctly configured, host VMM 4322 issues a command to execute a VMLaunch instruction to CPU 4311 to launch the agent using the consumer-provided agent VMCS. CPU 4311 then runs the agent as a guest VM.

The verification of the agent control structures (VMCS/EPTs) described with regard to FIG. 43 above may be performed alternatively using a Hash Key Domain (HashKD) instruction. In an implementation using HashKD, the CPU would execute a HashKD instruction of the memory locations where the VMCS/EPTs were initially installed to determine an expected hash value, create another hash value from the data produced in response to a read instruction, and verify that the two hash values match, thereby verifying the control structures (VMCS/EPTs).

Once the agent control structures (VMCS and EPTs) are verified by the host VMM, the host VMM trusts the agent. The agent can then be launched by the host VMM and used to modify the consumer's image by adding code or data to modify the functionality of the consumer's guest VM.

While the description of FIG. 43 pertains to verifying an agent VMCS, the same data flows apply to any consumer-provided guest VMCS to be used to launch a guest virtual machine.

Figure 44:
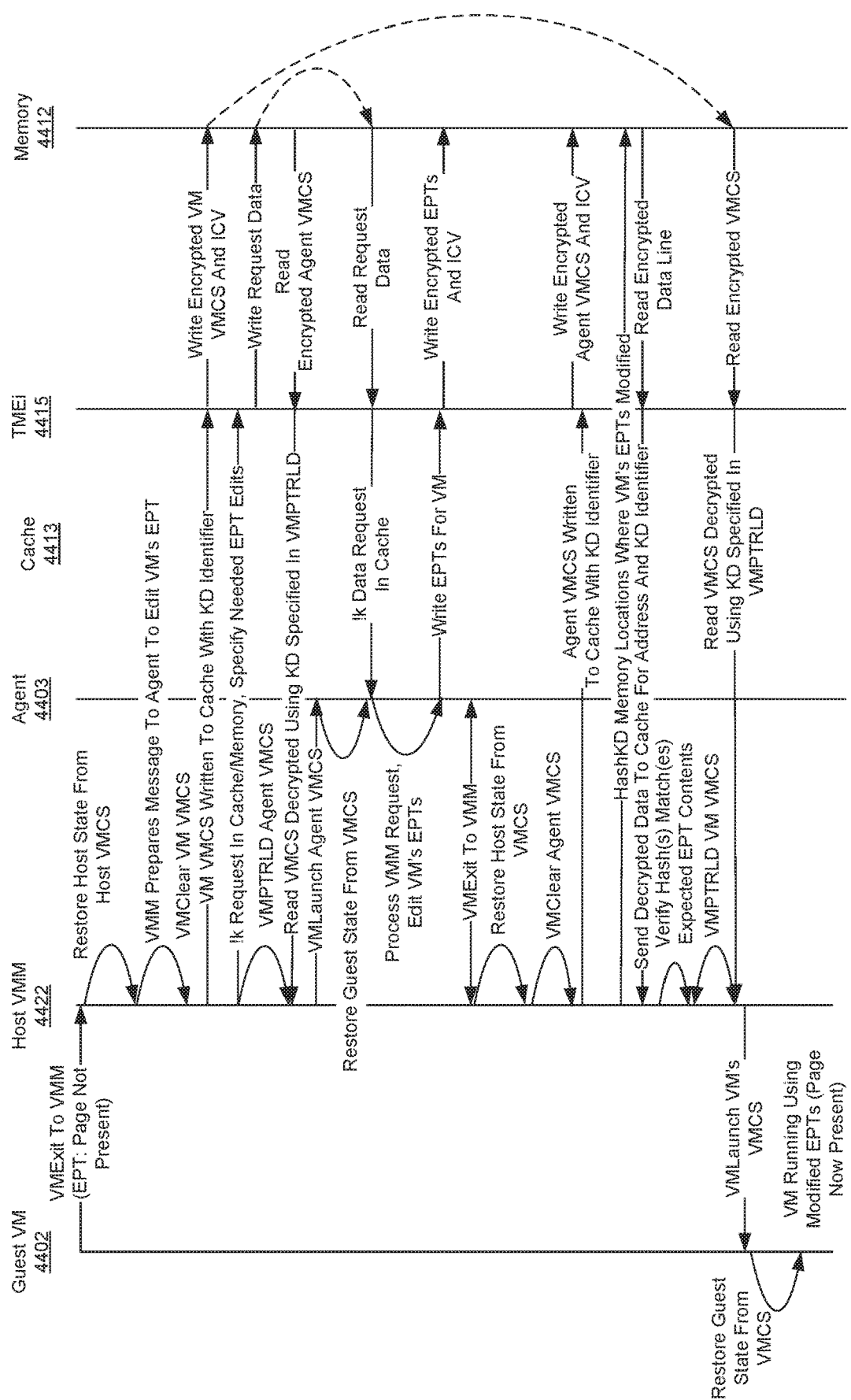
FIG. 44 is a data flow diagram showing data flows for a host VMM requesting an agent to modify Extended Page Tables for another guest Virtual Machine.

FIG. 44 provides an example of data flows of the host VMM requesting an agent to modify control structures (VMCS/EPTs) for another guest VM. The process described uses EPTs as an example of the control structure being modified, but the same process applies to both EPTs and VMCS modifications, as well as to modifications of any other control structures or memory contents of the guest VM.

When a guest VM 4402 exits and returns control to the cloud service provider's host VMM 4422, an EPT entry may indicate that a page is not present. As an example, the EPT entry may be set to indicate that a memory page is not present because the page was previously paged out by the host VMM. If the guest VM attempts to access the address for that non-present page, the associated EPT entry will reveal that the page is not present, causing a VMExit to occur. The goal of the host VMM, as shown in FIG. 44, is to replace the original page back into memory and then reset the exiting EPT entry to indicate the page is now present at a specified address so that the host VMM can resume the execution of the guest VM with the accessed page back in memory.

Upon receiving control, the CPU (not shown) will restore the host state for host VMM 4422 from the control structure (e.g., VMCS, not shown) with which it is associated. Host VMM 4422 may later decide to resume guest VM 4402, and send a message to an agent 4403 working on behalf of the host VMM 4422 within the key domain of guest VM 4402 to be resumed. The host VMM 4422 tracks which guest VMs have exited (in this example, guest VM 4402) because the host VMM 4422 launched the guest VMs, including guest VM 4402, initially. The host VMM 4422 also tracks the key domain to which each guest VM belongs because the host VMM 4422 specified the key domain identifier/address selector as part of the address used in the VM Pointer Load (VMPTRLD) instruction used to load the VMCS for the guest VM. The host VMM 4422 also tracks the agent for a given key domain and the associated guest VMs in that given key domain.

To resume guest VM 4402, host VMM 4422 prepares a message to the agent 4403 to edit the guest VM 4402's EPT and performs a clear operation (issuing a command to execute a VMClear instruction) to clear the guest VM 4402's VMCS from a per processor VMCS cache (not shown). As part of the clear operation, the guest VM 4402's VMCS is also returned to cache 4413 on its way back to memory 4412, along with the key domain identifier/address selector. The key domain identifier/address selector will be used as part of a selected set of bits (such as the uppermost unused bits) of the physical address to which the VMCS is ultimately written to indicate to the memory encryption engine which key domain key to use. Memory encryption engine TMEi 4415 writes the encrypted VMCS, along with integrity check values for embodiments that have integrity, to memory 4412.

After issuing the command to execute a VMClear instruction, host VMM 4422 performs two operations. In the first operation performed by host VM 4422, host VMM 4422 places an unencrypted (k-bit off, also designated as !k) request into a memory location that is shared with the agent 4403 (which may be in cache 4413 or memory 4412), specifying the requested edits for VM 4402's EPT. In the example shown, memory encryption engine TMEi 4415 writes the plaintext request into a memory location in memory 4412. Later, agent 4403 will retrieve the requested edits for VM 4402's EPT from memory 4412. In addition to the EPT edit request, the host VMM 4422 may provide additional information to the agent, including the encrypted page contents that are to be paged back into memory.

In the second operation performed by host VM 4422, host VMM 4422 issues a command to execute a VMPTRLD instruction, providing a pointer to the agent 4403's VMCS and the key domain identifier/address selector, which determines the key to be used to decrypt agent 4403's VMCS. Agent 4403's VMCS is read from memory 4412 by memory encryption engine TMEi 4415, which decrypts the agent 4403's VMCS using the key domain identifier/address selector specified in the VMPTRLD instruction. Host VMM 4422 obtains the decrypted VMCS produced by memory encryption engine TMEi 4415. In response to correctly loading the agent's VMCS, host VMM 4422 issues a command to execute the VMLaunch instruction, which launches the agent 4403 using the properly decrypted agent VMCS as the control structure. The CPU running the agent 4403 code restores the guest state of the associated virtual processor from the decrypted agent VMCS.

In the example shown, agent 4403 causes the request data to be read from memory 4412. In one embodiment, agent 4403 checks a command queue location in memory, and finds another request from the host VMM 4422 there, and then agent 4403 responds to the command by causing the request data to be read from memory. The request could also be communicated to the host VMM 4422 as a processor register state (e.g., via a GPR register state), which the host VMM 4422 could use to trigger agent 4403 to read the request from memory. Other embodiments may use different mechanisms to communicate to agent 4403 that there is an outstanding host VMM 4422 request.

The unencrypted request data is read from cache by agent 4403, and agent 4403 processes host VMM 4422's request to edit guest VM 4402's EPTs. Agent 4403 writes the EPT edits for VM 4402 to memory 4412 via memory encryption engine TMEi 4415, which causes the encrypted EPTs and associated integrity check values to be written to memory 4412. Alternatively, agent 4403, which has access to the memory encryption key and memory locations of the EPT entries, may simply use the memory encryption key to encrypt the edited EPT structures and communicate this ciphertext (the encrypted edited EPT structures) back to the host VMM 4422 via a shared memory channel.

The agent 4403 may also decrypt any encrypted page contents provided by the host VMM 4422 that are to be paged back into memory. For example, the agent 4403 may decrypt the pages using a different secret key that the agent 4403 uses for paging, using the guest physical address (GPA) address as a tweak. The agent 4403 may also verify the page contents or use ICVs to verify that the page contents were not modified since they were last paged-out and encrypted with the same secret key and tweak. The agent 4403 may then either write the decrypted page(s) to memory, assuming the agent has access to these memory locations, or the agent may re-encrypt the pages using the memory encryption key and physical address tweak, returning the resulting ciphertext back to the host VMM 4422 via a shared memory channel. Having completed the request to edit the EPTs made by host VMM 4422, agent 4403 has completed its task and exits, returning control to host VMM 4422.

The CPU executing the VMExit restores the host VMM 4422 state from the host state area of the agent 4403's VMCS. The host VMM 4422 optionally may issue a command to execute a VMClear instruction to clear agent 4403's VMCS. As part of the clear operation, agent 4403's VCMS is written to Cache 4413 with the key domain identifier/address selector. The encrypted agent VMCS and associated integrity check values are written to memory 4412 by the memory encryption engine 4415.

Host VMM 4422 may then verify that the agent 4403 correctly edited the EPTs for VM 4402 by issuing a command to execute a Hash Key Domain (HashKD) instruction on the memory locations where VM 4402's EPTs were to be modified or on the locations where the host VMM installed the EPT ciphertext provided by the agent. Memory encryption engine TMEi 4415 uses the key domain identifier/address selector as the address selector to read the encrypted data for the associated key domain. Memory encryption engine TMEi 4415 reads the encrypted data line, decrypts the data, and sends the decrypted data to cache 4413 for the address and key domain identifier/address selector.

The processor executing the HashKD instruction reads the decrypted data obtained by memory encryption engine TMEi 4415, and the host VMM 4422 verifies that a hash value of the contents of the memory locations read matches the hash value for the expected EPT contents. At this point, the host VMM 4422 may also write to the correct memory locations any ciphertext for the pages re-encrypted by the agent 4403 and returned via shared memory (for cases where the agent does not have access to the memory to install the pages itself). If the hash values match, host VMM 4422 issues a command to execute a VMPTRLD instruction for the VM 4402's VMCS. At this point, the host VMM may then re-verify the contents of the VMCS using VMReads. Host VMM 4422 then issues a command to launch the guest VM 4402 from the VM 4402's VMCS. The processor executing the code for VM 4402 restores the state of VM 4402's virtual processor from VM 4402's VMCS and executes VM 4402 using the modified EPTs, which now indicate that the pages are present and identify the memory addresses in which the pages are located.

The memory transactions described with reference to FIG. 44 may reside in cache 4413, thereby eliminating the need for the memory encryption engine (TMEi 4415) to read and write data from cache 4413 to memory 4412, and vice versa. Nevertheless, the above memory transactions are described as though data for each transaction is evicted from cache 4413 into memory 4412.

Some embodiments may also enable Page Modification Logging (PML) so that the host VMM can track memory locations accessed by a guest agent. The number of Hash Key Domain (HashKD) instructions can be limited to only those memory locations that were actually modified while the agent was executing. Here the PML address and log page would remain in the host VMM's key domain (or shared memory/k-bit off), so that the VMM can track the actions of the guest VM.

Similarly, some embodiments may use a sub-page policy table (SPPT) [as described in U.S. Pat. No. 9,335,943 B2] to allow the host VMM to additionally restrict the memory locations an agent can access. In such embodiments, the host VMM would control the SPPT and an agent could be given access to memory via its EPTs, with the agent's VMCS indicating that an additional SPPT is enabled. The sub-page protection table pointer in the VMCS would use the host VMM's key domain (or shared memory/k-bit off). The agent's EPT entries include the SPP bit set for each entry that the host VMM can override write access using the host VMM's SPPT.

Figure 45:
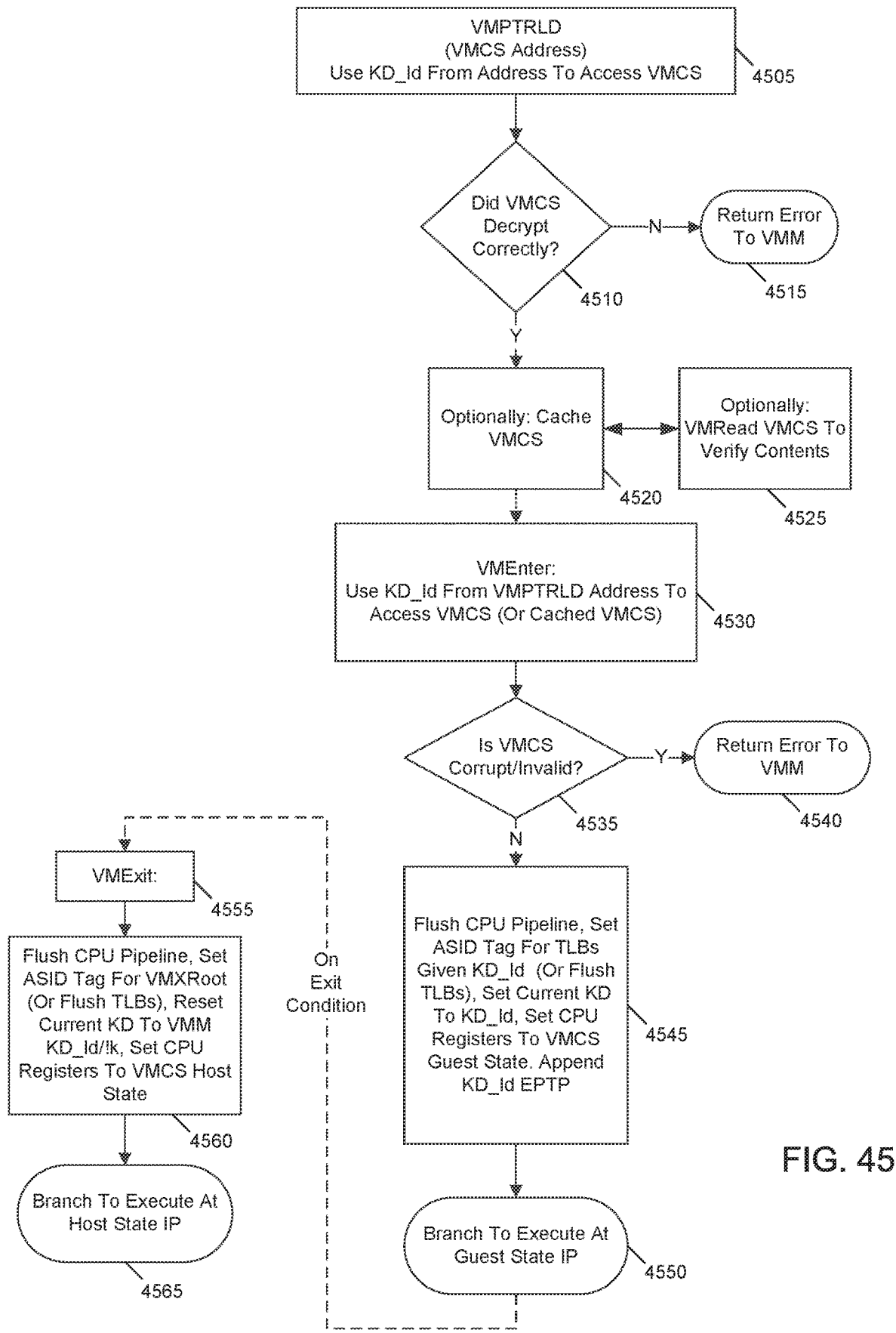
FIG. 45 is a flowchart showing loading a virtual machine control structure for a guest virtual machine, verifying the virtual machine control structure, launching the guest virtual machine, executing the guest virtual machine code image, and exiting the guest virtual machine to return control to the host virtual machine monitor.

FIG. 45 is a flowchart showing execution of the VM Pointer Load (VMPTRLD), VMEnter (VMLaunch or VMResume), and VMExit instructions. At block 4505, in response to a VMPTRLD instruction providing a VMCS address, the key domain identifier/address selector from the VMCS address is used to access the VMCS. At decision point 4510, a decision is made whether VMCS decrypted correctly by verifying the VMCS's contents (which can include a version number and the secret value shared between the agent and the processor and stored within the agent VMCS, as described above with reference to FIG. 37, "VMEnter Agent" block 3750). If the VMCS did not decrypt correctly, control proceeds to block 4515, where an error is returned to the host VMM issuing the command to execute the VMPTRLD instruction. If the VMCS decrypted correctly, control proceeds to block 4520, which optionally caches the VMCS. In block 4525, an optional VMRead instruction is executed by the host VMM to verify contents of the VMCS.

From block 4520, control proceeds to block 4530, where a VMEnter instruction is executed. A virtual machine is instantiated (typically either launched or resumed) using the key domain identifier/address selector from the address in the VMPTRLD instruction to access the VMCS for entering the virtual machine (if the VMCS was not already cached at block E20). If the VMCS was already cached at block 4520, block 4530 can use the cached VMCS to instantiate the virtual machine.

At decision point 4535, a decision is made whether the VMCS is corrupt or invalid because the processor will perform other consistency checks on the VMCS when attempting to restore the guest's processor state. If the VMCS is corrupt or invalid, control proceeds to block 4540, where an error is returned to the host VMM. If the VMCS is not corrupt or invalid, control proceeds to block 4545. At block 4545, the CPU pipeline is flushed. An address space identifier tag is set for transaction look-aside buffers (TLBs) given the key domain identifier/address selector or the TLBs are flushed. CPU registers are set to the VMCS guest state.

Additionally, if there is a Virtualization Exception (VE) Information Page indicated by its physical address in the VMCS, and the VMCS indicates that additional guest state is currently stored there, the remainder of the processor registers will be restored from the VE Info Page. Restoring the processor registers includes adding the current key domain identifier/address selector to the VE Info Page address. The Extended Page Table Pointer (EPTE) is a physical address for the base of the EPT table. Because the EPT table is inside the key domain of the guest VM, this address should likewise include the key domain identifier/address selector so that the EPT structures decrypt properly.

Control proceeds from block 4545 to block 4550, where a branch to execute at the guest state instruction pointer (IP) is made. Execution continues until an exit condition to exit the currently-executing virtual machine, and control proceeds to block 4555. As with any VMExit, guest processor state is stored to the current VMCS. If there is a VE Info Page present and the exit was not due to a VMCall, then the remainder of the guest's processor register state may be saved to the VE Info Page and then these registers cleared. From block 4555, control proceeds to block 4560. At block 4560, the CPU pipeline is flushed. An address space identifier tag is set for VMXRoot or the TLBs are flushed. The current key domain is set to the host VMM key domain identifier/address selector in embodiments where the host VMM has its own key domain identifier/address selector. In other embodiments, where the host VMM is in unencrypted memory, the k-bit is set to "off" and the key domain identifier/address selector address bits are cleared. CPU registers are set to the cached VMCS host state. Control proceeds from block 4560 to block 4565, where a branch to execute at the host state instruction pointer (IP) is made.

In FIG. 45, EPTs remain under the host VMM's control (as normal). To prevent memory remapping attacks, some embodiments may add a new table (called a Reverse Mapping Table, not shown), which is accessed by the processor (Page Miss Handler (PMH)) on a page walk. After the address mappings are determined by the page walk, the resulting physical address is checked against an entry in the Reverse Mapping Table (RMT) indexed by the resulting physical address. The entry includes the physical address and its associated guest physical address (and the permission bits and/or k-bit) expected by the consumer (and/or consumer's agent). If the PMH determines that the guest physical address (GPA) or permissions do not match those determined by the completed page walk, then the CPU will exit (executing a VMExit instruction indicating the error). This RMT entry is accessed by the processor/PMH using the key domain ID belonging to the executing guest VM. Thus, each RMT table entry must be XTS encrypted using the consumer's key, so that only the consumer or the consumer's agent can produce these RMT entries as they apply to the consumer's key domain.

Figure 46:
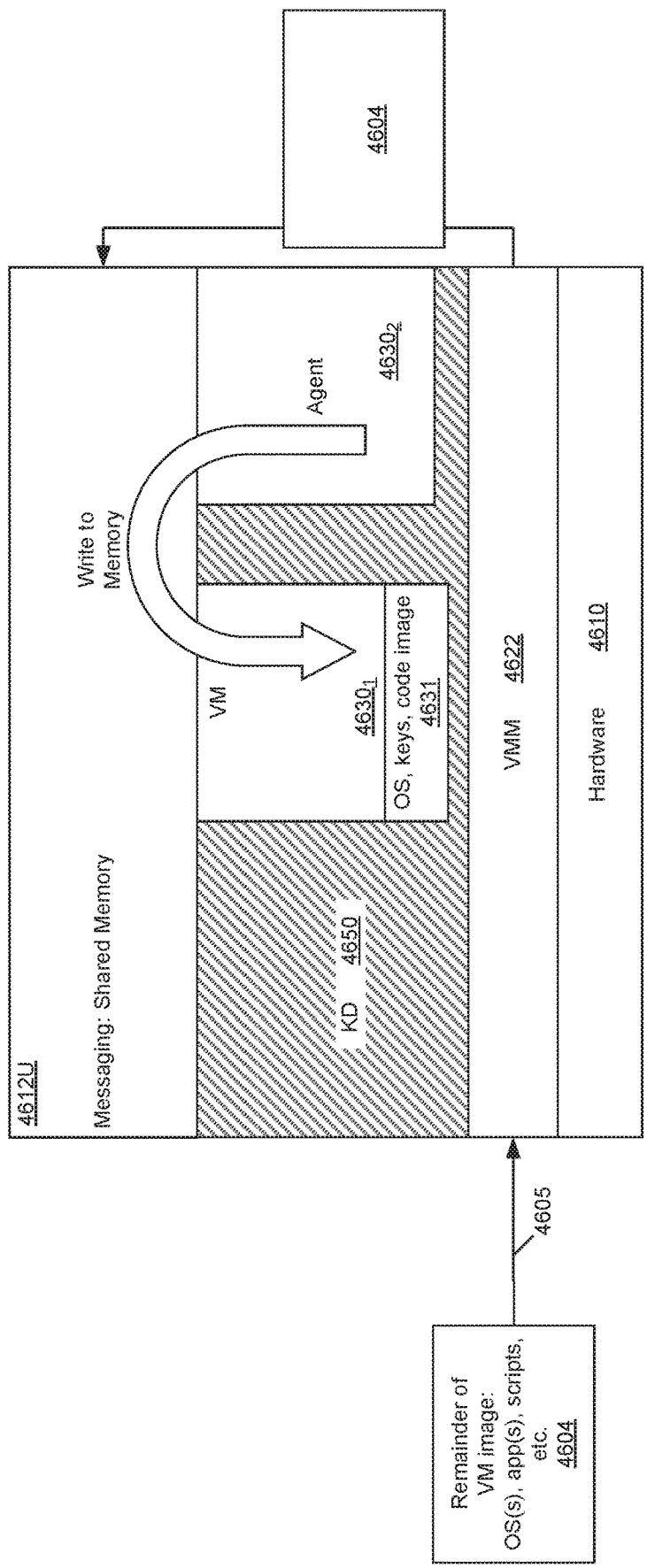
FIG. 46 shows a process for updating a consumer's guest VM image.

Referring now to FIG. 46, a process for updating a consumer's guest VM image is shown. The process begins after the consumer's initial code image 4631 has been established to run within key domain 4650 as a guest VM $4630_1$, which can only access the memory that is mapped and granted permission in the Extended Page Tables (EPTs) provided by the consumer as part of the encrypted guest control structure. To enable the consumer's guest VM $4630_1$ to provide additional functionality, additional code can be added to the guest VM $4630_1$ code image 4631. Because guest VM $4630_1$ has access to only the portion of memory within key domain 4650, however, the cloud service provider's host VMM 4622 and guest agent 4630₂ are involved to update the guest VM's code image 4631.

As noted above, the consumer's encrypted guest code image may include code for launching a second guest, the guest agent. Once the guest agent 4630₂ is running as a guest agent virtual machine within the consumer's encrypted key domain 4650, the guest agent 4630₂ can perform several tasks on behalf of the host VMM 4622. Guest agent 4630₂ performs tasks on behalf of the host VMM 4622 as requested, as long as the tasks do not compromise the consumer's guest VM 4630₁. Host VMM 4622 can verify that tasks performed by the agent 4630₂ have been performed as requested. Consequently, host VMM 4622 does not need to provide the code image for agent 4630₂ or to trust agent 4630₂.

As examples of tasks that can be performed by agent 4630₂ on behalf of host VMM 4622, agent 4630₂ can create other guest virtual machines inside key domain 4650, request more memory from the host VMM 4622, and move memory pages to the consumer guest VM 4630₁ workload from the consumer or a consumer-authorized third party. For example, agent 4630₂ can securely communicate the consumer-encrypted remainder of the guest VM code image 4604 to the consumer's guest VM 4630₁. The encrypted remainder of the VM code image 4604 may be communicated first via a secure connection (e.g., a Transport Layer Security/Secure Sockets Layer (TLS/SSL) session)) established between the consumer and the guest agent 4630₂. Host VMM 4622 copies the encrypted packets and buffers containing the remainder of the VM code image 4604 to shared memory 4612U for retrieval by the guest agent 4630₂. Guest agent 4630₂ terminates the TLS/SSL session by decrypting the data contained in the encrypted packets and buffers.

Running within key domain 4650, the guest agent 4630₂ can access the memory encryption key domain key used by the consumer (as the consumer created the initial guest VM image with that key domain key in FIG. 41). Using the key domain key, the agent 4630₂ may separately XTS encrypt additional data/code/structures (with the appropriate memory address tweaks). The guest agent 4630₂ can then provide the resulting ciphertext to the host VMM 4622 (for example, via shared memory channel 4612U, as shown by the "write memory" arrow from agent 4630₂ through shared memory 4612U). The host VMM 4622 can then install that ciphertext (which the host VMM 4622 cannot decrypt as the host VMM 4622 doesn't have the key domain key) into the appropriate memory locations (at the addresses for which they are encrypted), as only the host VMM 4622 has access to all of memory, including unencrypted shared memory 4612U.

For example, to change the memory locations to which the guest agent 4630₂ has access, the host VMM 4622 can request the guest agent 4630₂ to generate the appropriate ciphertext (using the consumer's memory encryption key domain key) for the new EPT data and address tweaks (and calculate the Integrity Check Values (ICVs) if integrity is desired). The host VMM 4622 would then copy the ciphertext to memory at the correct locations on behalf of the guest agent 4630₂ as only the host VMM 4622 has the ability to address all memory. Once the updated agent EPTs are correctly installed, then the guest agent 4630₂ would have direct access to these new memory locations.

A similar process is followed to restrict the memory locations that the guest agent 4630₂ may access, as the host VMM 4622 may request the guest agent 4630₂ to create ciphertext for selected EPT structures to designate the selected EPT structures as not present (no permission or no mapping). In all cases, once the ciphertext is installed into the correct memory locations, the host VMM 4622 can verify the contents of the ciphertext using the Hash Key Domain (HashKD) command described above.

The cloud service provider's host VMM 4622 is in control of the system, memory and other resources, but the guest agent 4630₂ is in control of producing data of which the guest agent 4630₂ approves, as only the guest agent 4630₂ has the memory encryption key domain key and can pass this approved encrypted data to the host VMM 4622.

For systems with System Management Mode (SMM) or similar privileged modes enabled, SMM should not have access to a consumer's key or key domain identifier/address selector. Similarly, when a System Management Interrupt (SMI) occurs during the execution of a consumer's guest VM, the guest processor register state should be saved to memory locations inaccessible to SMM and cleared.

Figure 47:
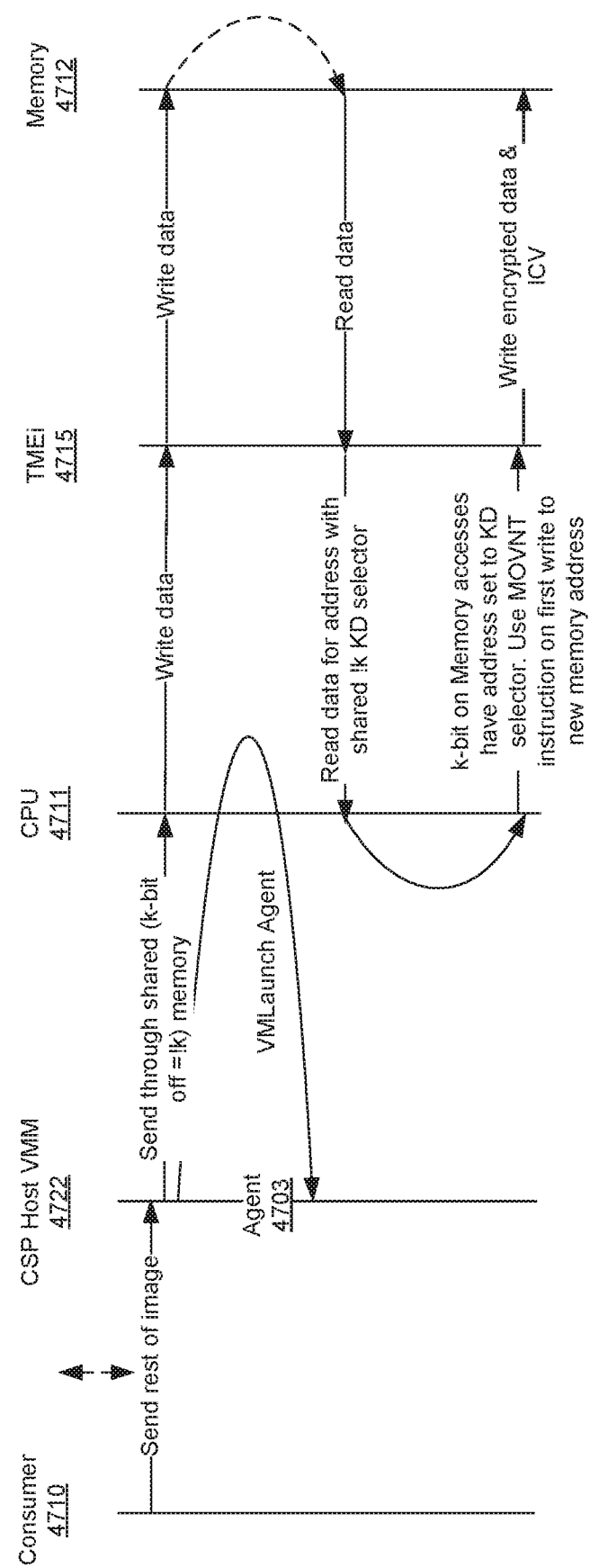
FIG. 47 shows a process for adding pages to a consumer's guest VM workload.

FIG. 47 describes another process for a consumer to add pages to the consumer's guest VM workload. In the example shown, packets for the rest of the consumer's guest VM image are sent by the consumer to the host VMM 4722 directly (via a secure communication session between the consumer and the guest agent as described above with respect to FIG. 46). In response, the host VMM 4722 writes the data for the rest of the consumer's guest VM image to memory 4712 via memory encryption engine TMEi 4715.

Host VMM 4722 issues a command to launch a guest agent on CPU 4711, and CPU 4711 begins executing the guest agent code image provided by the consumer as part of the encrypted guest VM code image to provide guest agent 4703. Host VMM 4722 sends the rest of the consumer's guest VM image through a shared (encryption bit (k-bit) off) portion of memory 4712. The running agent 4703 reads data for the rest of the consumer's guest VM image from the host VMM 4722's shared portion of memory 4712 (not encrypted, with k-bit off) by requesting the memory encryption engine TMEi 4715 to read the data from an address with the uppermost unused bits set to a key domain identifier/address selector for the shared (k-bit off) key domain. As the agent 4703 is the endpoint for a secure communication session with the consumer, the agent 4703 decrypts the network packets (e.g., using the OpenSSL software library) into the shared memory region. The running agent 4703 copies the resulting decrypted data to encrypted memory (encrypted with the consumer's key domain key, with k-bit on) at an address with the uppermost unused bits set to a key domain identifier/address selector for the consumer's key domain. During the first write to a new memory address, the MOVNT instruction may be used to perform a write-combining operation, which writes to the new memory address in memory 4712 without first reading the contents of the new memory address that is to be written. Memory encryption engine TMEi 4715 then writes the encrypted data for the rest of the consumer's guest VM image, along with integrity check values (ICVs), to memory 4712.

Agent 4703 process the data (for example, decrypting the data in software, performing integrity checks, and so on). The consumer forms a secure communication session (for example, using a TLS/Secure Sockets Layer session from the consumer using the consumer's encryption key (key domain key) to the agent image's TLS stack), and packets are sent via a controller through the shared memory (not encrypted, with k-bit off).

The above embodiments describe an environment in which a consumer can trust that its secrets and data are as secure in the public cloud as in a private cloud environment.

A consumer (or the consumer's trusted intermediary) can provide an encrypted guest virtual machine (VM) image that can be installed in a protected region of memory (referred to as a key domain) in which memory pages are encrypted with a consumer-provided key domain key. The consumer's encrypted guest virtual machine image can be decrypted by the cloud service provider server's processor using the key domain key that is provided to the host VMM by the consumer only as an encrypted key domain key. The consumer's guest VM can be verified by a cloud service provider's software/host virtual machine monitor (VMM), without the host VMM being exposed to the encryption key domain key or the contents of the encrypted guest virtual machine image and the secrets contained therein. The consumer's encrypted guest virtual machine image can be executed using processor state information decrypted by the processor from within consumer-provided control structure(s) that are also provided to the host VMM encrypted with the consumer's key domain key.

The control structure information encrypted with the consumer's key domain key may contain memory mapping structures (Extended Page Tables (EPTs)).

A processor executing the consumer's encrypted guest virtual machine image may encounter a situation where an exit from the guest VM to the host VMM is needed. When the guest's VM is exited, the host processor automatically switches the current key domain back to either the host VMM's key domain or to a shared key domain shared between the host VMM and each guest virtual machine managed by the host VM. In an exit of the guest VM, the consumer-provided guest control structure specifies a protected memory location where the host processor may automatically store and clear processor registers on exits to the host VMM.

In one embodiment, the guest VM code image contains interrupt handler code to intercept interrupts and convert guest VM exits to exceptions, where the guest VM may save processor register information to protected memory and clear or conditionally expose processor registers needed by the host VMM. When the guest VM has completed preparation for saving the guest VM's processor state, the guest VM can invoke the host VMM.

In one embodiment, the consumer-provided encrypted guest VM image and guest control structure can be dynamically updated or modified by sending encrypted image updates or encrypted control structure updates (deltas) that are installed and verified by the host VMM into the host's memory. The encrypted image update may serve as a replacement for the guest VM's encrypted code image, or the encrypted image update may be a "delta" image that is used to modify the guest VM's encrypted code image.

Dynamic updates to the encrypted guest control structure may be initiated by either the host VMM or the guest VM. For example, the host VMM may determine that the guest code image should be moved to a different memory location. Moving the guest code image to a different memory location affects Extended Page Tables (EPTs) of the guest control structure. The guest VM can verify the change to the guest control structure and provide an updated encrypted guest control structure to the host VMM. The host VMM can copy the guest-provided updated encrypted guest control structure into the appropriate memory locations.

As an example of a dynamic update to the encrypted guest control structure initiated by a guest VM, the guest VM may request more memory from the host VMM. In response to this request, the host VMM may determine that the Extended Page Tables (EPTs) of the guest control structure must be modified. The guest VM can verify the allocation of additional memory and the resulting change to the guest control structure and provide an updated encrypted guest control structure to the host VMM. The host VMM can copy the updated encrypted guest control structure into the appropriate memory locations.

A shared communication channel can be established between a protected guest VM and the host VMM using, for example, a bit of a physical address for a memory location to indicate whether the memory location is to be shared. In one embodiment, the bit may be turned off to indicate that the memory location is to be shared, and the bit may be turned on to indicate that the memory location is to be protected (encrypted).

Requests for changes to the consumer-provided guest control structure or guest VM image can be sent over the shared communication channel between the host VMM and a protected guest VM. A protected guest VM can verify that such requests do not compromise the security of the guest VM, and the guest VM can produce ciphertext for the requested changes using the key domain key. The guest VM can then provide the ciphertext implementing the requested changes to the host VMM. The host VMM can install the guest VM-provided ciphertext into memory and verify that the requested changes were completed correctly by the guest VM (e.g. using a Hash Key Domain (HashKD) instruction). Once the ciphertext is verified, the host VMM can then execute the modified guest VM image.

In one embodiment, the consumer-provided encrypted guest VM image may contain code to implement a second guest VM (agent) that has access to the consumer-provided guest VM's memory (key domain). This agent is provided by the consumer to enable the host VMM to request the agent to perform tasks on behalf of the host VMM. The host VMM can communicate requests to the agent over shared communications channel. The host VMM can request the agent to modify control structures or contents of memory of a second guest VM (or third guest VM, and so on) on the host VMM's behalf. The agent can verify that host VMM requests to change memory of a guest VM do not compromise the consumer's security policy. The host VMM can verify changes were correctly made to memory by the agent (for example, via a HashKD instruction) and then execute the modified guest VM.

In addition, the agent can perform memory paging operations upon request by the host VMM. For example, the agent can "page out" a page (usually containing 4 KB of data) of protected memory, encrypting contents of the protected memory using a second key for offline storage. In this paging out scenario, the agent provides an encrypted page to the host VMM via the shared memory channel. The agent can also perform "paging in" operations on the host VMM's request, decrypting memory content provided by the host VMM via the shared memory channel with a second key, verifying the content, and installing the decrypted content into protected memory.

In each of the above embodiments, the cryptographic memory protection provided to key domains may optionally include integrity verification, where integrity check values (ICVs) can be used to verify the contents of a memory location.

Building upon and/or providing alternative approaches to other embodiments disclosed in this specification, embodiments of the invention may include extending an existing instruction set architecture and/or reusing existing virtualization technology, such as EPTs and multi-key memory integrity technology (MKTME, MKTMEi), to reduce the complexity (compared to other approaches involving new instructions, new CPU data structures, and/or other changes to hardware, firmware, etc.) of protecting VMs from attacks by other VMs, a VMM, a system administrator, or physical means. Embodiments may include two new instructions (referred to in this specification as VMPageIn and VMPageOut) to allow the CPU to control paging (provide secure paging) with memory integrity and solve the guest to host physical address translation problem with memory integrity. Embodiments may provide a stateless approach, eliminating CPU data structure maintenance and complexity while providing security for the tenant VMs. Embodiments are possible with no new modes, no measurement of images for either the cloud service provider (CSP) or its clients while providing protection against corruption, replay, and remapping attacks.

Embodiments of the invention may include substituting MACs for HPAs in existing VT control structures and extended page tables, allowing a client (software tool or service) to create a transportable secure VM image encoding the client's full security policy, performing a secure key exchange, and using the ISA to verify these MACs against actual page contents (and original GPAs) to restore memory addresses where the VM image lands. Transforming the VM image in place alleviates the need for the VMM to allocate additional memory for copying a VM image from one location in memory to another.

Figure 48:
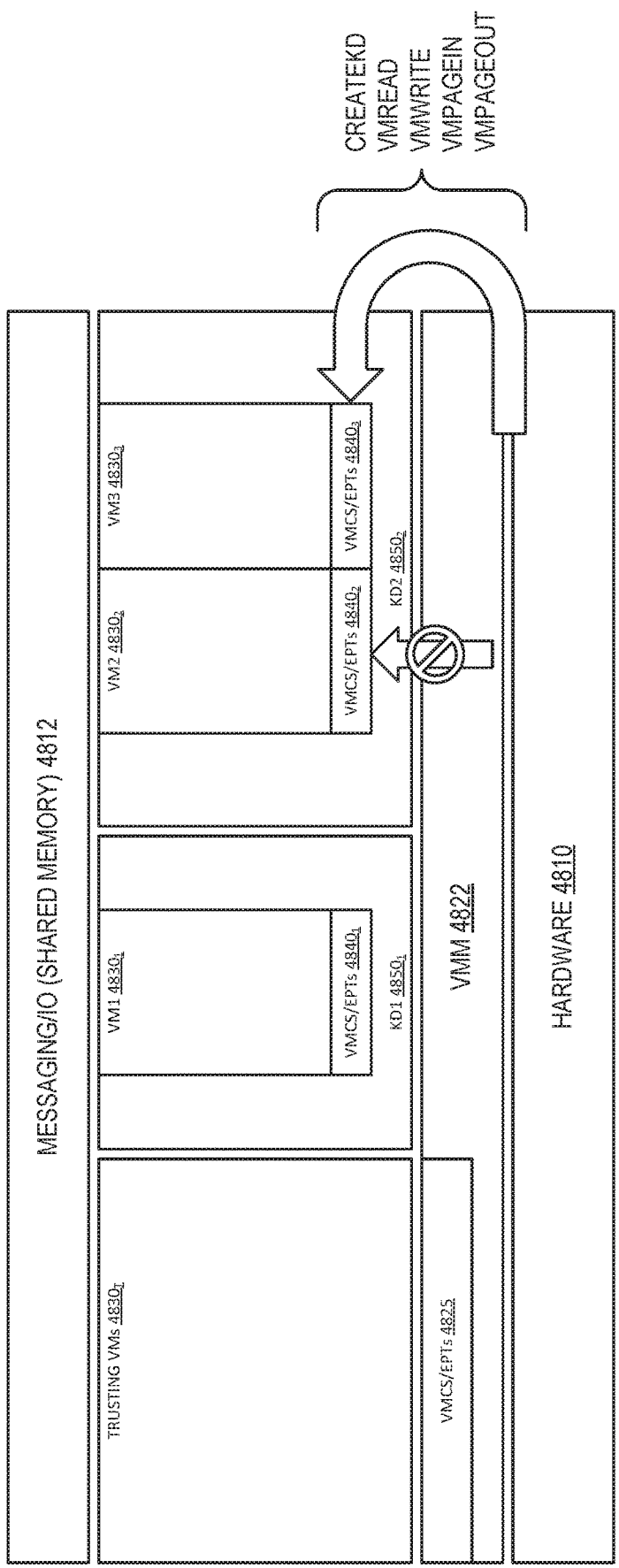
FIG. 48 illustrates a key domain architecture according to an embodiment of the invention.

In an embodiment, for example as shown in FIG. 48, a VMM (e.g., VMM 4822) may have no direct access to the encrypted and integrity protected memory of a secure VM (e.g., VMs 4830). The VM's private memory encryption key also protects the VMCS and EPT structures (e.g., VMCS/EPTs 4840) governing the VM's behavior and are likewise not directly accessible by the VMM. However, embodiments described above provide for the VMM to use CPU controlled mechanisms to have restricted access to these structures through the hardware. In embodiments, the VMM may use VMRead and VMWrite instructions to access portions of the VMCS. For example, the VMM may use VMRead and VMWrite instructions to access the host region of the VMCS, but not to access to the guest regions of the VMCS, and it may use them only for read but not for write access to the EPTP field, and so on. In other words, the VMM may use VMRead to interrogate the client provided VMCS (and, thus, the VMM doesn't need to measure the client image) but is limited in which VMCS fields it may VMWrite. In these and/or other embodiments of the invention, the CPU controlled access may be extended, using two new instructions (VMPageIn and VMPageOut, as described below) to provide restricted access to the EPTs from the VMM.

Initialization of a key domain, according to embodiments described above and/or according to embodiments described or further described below, may include loading at least one VMCS structure and one EPTP root into memory. To provide for initialization of a key domain, embodiments may include an instruction such as a CreateKD instruction as described above and/or further described below. A CreateKD instruction may take the following inputs: (1) a client/consumer (owner of a secure VM provided by a CSP) key encrypted with the server's public key (e.g., the server's RSA public key, where the server's corresponding RSA private key is inaccessible/unknowable by the CSP or VMM); (2) the KeyID (specified by the VMM) to be used to reference the client/consumer key for the secure VM; (3) a physical address pointer (host physical address or HPA) to the initial VMCS that was created by the client/consumer and provided to the CSP's VMM; (4) a physical address pointer (host physical address or HPA) to the root EPT structure; and (5) a message authentication code (MAC) for the VMCS and EPT pages to verify their integrity given the provided client/consumer key. Accordingly, the CreateKD instruction may be referred to as having the following format: CreateKD ([in] RSAEncryptedKey, [in] KeyID, [in] VMCS_HPA, [in] EPTP, [in] MAC).

Figures 49A, 49B:
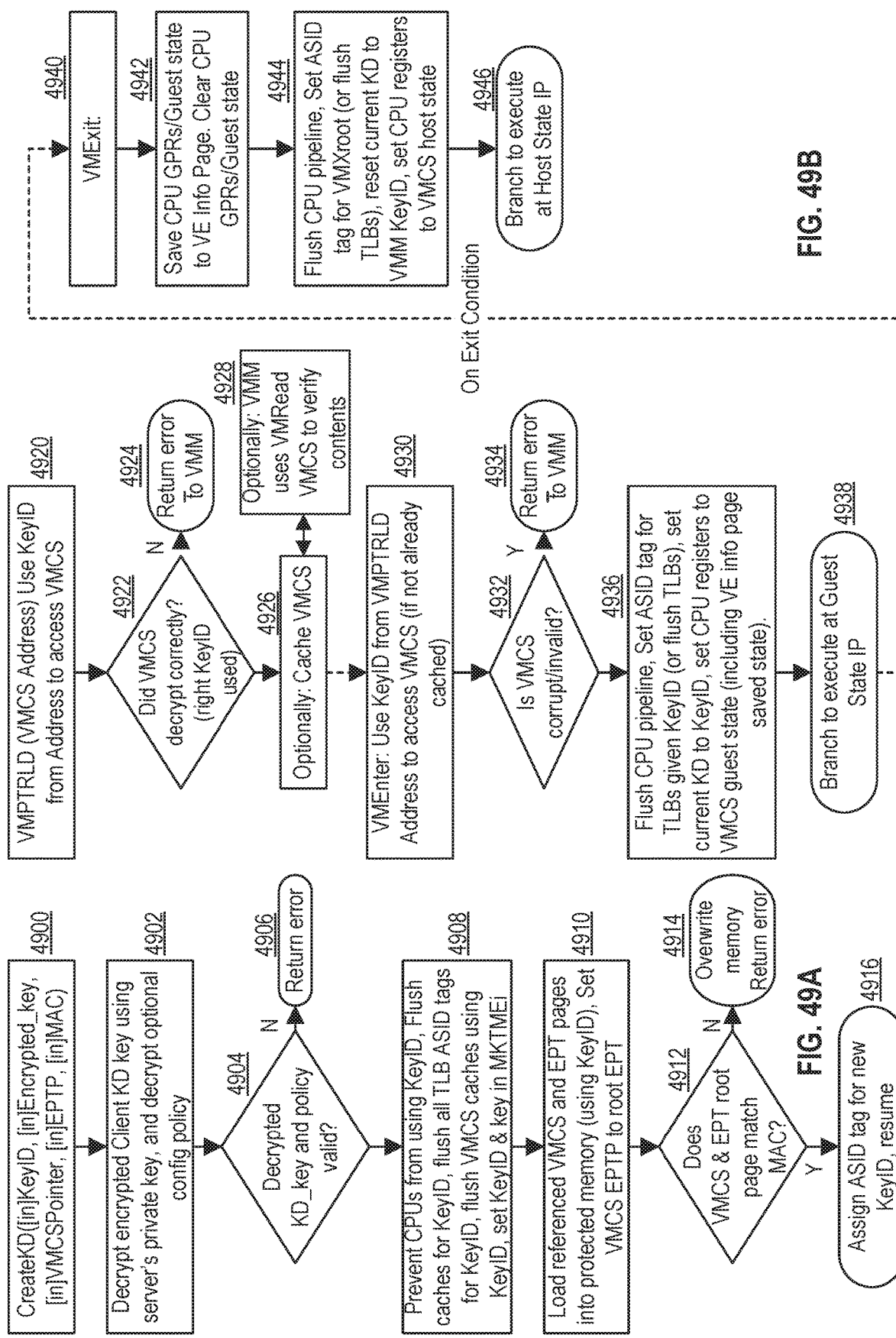
FIGS. 49A and 49B illustrate methods of creating and using key domains according to embodiments of the invention.

To execute or otherwise in response to a single instruction, such as a CreateKD instruction, a processor (e.g., processor 411 of FIG. 4) or processor core (e.g., core 416 or 418 of FIG. 4), including or along with encryption hardware (e.g., MEE 415 of FIG. 4), may perform a method embodiment of the invention, for example, as illustrated in FIG. 49A. Other such method embodiments of the invention may include any portion or portions shown in FIG. 49A (irrespective of whether FIG. 49A indicates that a portion may be optional) and/or a portion or portions not shown in FIG. 49A, in a variety of orders. A method embodiment may include (e.g., in 4900) receiving, decoding, or otherwise recognizing a CreateKD instruction. A method embodiment may include (e.g., in 4902) decrypting, using a server's private key (e.g., an RSA private key), an encrypted client key. A method embodiment may include (e.g., in 4902) decrypting a key domain configuration policy. A method embodiment may include (e.g., in 4904) determining whether the decrypted client key and/or the configuration policy are valid. If not (e.g., in 4906) the method embodiment may return an error. If the decrypted client key and/or the configuration policy are determined to be valid (e.g., in 4904), then (e.g., in 4906), initialization of a key domain having a KeyID which processors may be prevented from using may begin, and may include flushing caches of an old KeyID, flushing processor TLBs of old KeyID mappings/ASIDs, flushing VMCS caches using a KeyID, and loading a new secret key (e.g., using or as with a PCONFIG instruction) into a memory encryption and integrity engine for that KeyID (e.g., memory encryption engine 415 of FIG. 4 or another MKTME/MKTMEi engine). A method embodiment may include (e.g., in 4910) loading referenced VMCS and EPT pages into protected memory (using the KeyID) and setting the EPTP in the VMCS to the HPA of the EPT root page. A method embodiment may include (e.g., in 4912) checking the integrity of the VMCS page and the EPT root page using the secret client key and the MAC. Note that in various method embodiments may include portions of the method shown in FIG. 49A in a different order, for example, setting the EPTP in the VMCS to the HPA of the EPT root page may be performed after the EPT root page has been verified. If (e.g., in 4912) it is determined that the VMCS page and the EPT root page are correct, the processor may proceed to write/store (a direct write/non-temporal write or a write to memory without a proceeding memory read for ownership) these two pages into the MKTME encrypted and integrity protected memory region using the new KeyID, otherwise (e.g., in 4914) aborting the instruction and overwriting the pages. If the MAC is correct, the VMCS page and the EPT root page are now the only two pages loaded into the VM's cryptographically protected memory for the KeyID, and (e.g., in 4916) an ASID tag may be assigned for the new KeyID.

Other embodiments may have instructions to add VMCS(s) individually (e.g., VMAddKD instruction), specifying the KeyID, the VMCS HPA, and the client's MAC for the VMCS to be added. VMAddKD may add the VMCS into the private KeyID if the MAC matches the contents of the VMCS as specified by the client. The CPU may then maintain a private structure that maintains the number of VMCSs installed for a particular key. Note that a client's VMCS may also contain MACs for certain VMCS fields that would normally contain HPAs such that the content of a page must match the MAC value before an HPA may be assigned to that field.

Figure 50:
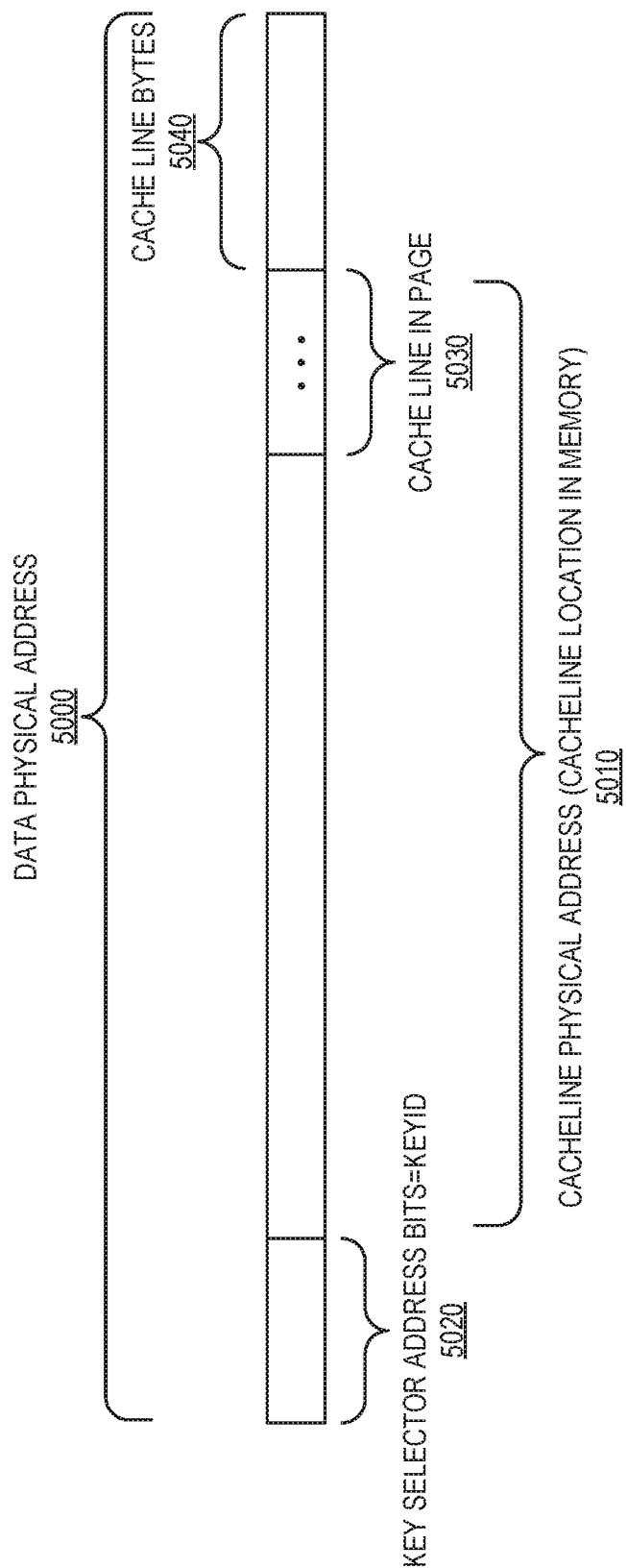
FIG. 50 illustrates a KeyID within a data physical address according to an embodiment of the invention.

FIG. 49B illustrates a method of entering and exiting a virtual machine in a key domain according to an embodiment of the invention. Other such method embodiments of the invention may include any portion or portions shown in FIG. 49B (irrespective of whether FIG. 49B indicates that a portion may be optional) and/or a portion or portions not shown in FIG. 49B, in a variety of orders. A method embodiment may include (e.g., in 4920) using/executing a VMCS pointer load instruction (e.g., VMPTRLD) to provide for accessing a VMCS, where the instruction specifies an address including a KeyID (e.g., specified as part 5020 of physical address 5000, as shown in FIG. 50). Note that only the processor may select KeyIDs created by CreateKD; these KeyIDs are inaccessible to the VMM/software and cannot be mapped via page tables or extended page tables. The processor may switch to the KeyID based on the location of the current VMCS as specified with a VMPTRLD on VM Entry (e.g., VMLaunch), VMReads or VMWrites, and/or VMPageIn or VMPageOut instructions. VMPTRLD may maintain a lock on a VMCS structure to assure no other thread/core may simultaneously load the same VMCS.

A method embodiment may include (e.g., in 4922) determining whether the VMCS decrypted properly (e.g., the correct KeyID was used; if not (e.g., in 4924), an error may be returned to the VMM; if so, the VMCS may be cached (e.g., in 4926) and/or the VMM may use VMRead instructions to verify the content of the VMCS (e.g., in 4928). A method embodiment may include (e.g., in 4930) using/executing a VMEnter instruction with a KeyID from the VMPTRLD address to access the VMCS. A method embodiment may include (e.g., in 4932), determining whether the VMCS is corrupt/invalid; if so (e.g., in 4934), returning an error to the VMM; if not (e.g., in 4936), flushing the processor pipeline, setting TLB ASID tags for the KeyID (or flushing the TLBs), setting the current KeyID to the KeyID from the VMPTRLD address, and setting processor registers to the VMCS guest state. A method embodiment may include (e.g., in 4938), branching to execute a next instruction specified by the guest state's instruction pointer.

A method embodiment may include, based on detecting a VM exit condition or event, initiating an exit from the virtual machine (e.g., in 4940). A method embodiment may include (e.g., in 4942) saving guest state and clearing it from processor registers. A method embodiment may include (e.g., in 4944) flushing the processor pipeline, setting TLB ASID tags for the root (or flushing the TLBs), setting the current KeyID to the KeyID for the VMM, and setting processor registers to the VMCS host state. A method embodiment may include (e.g., in 4946), branching to execute a next instruction specified by the host state's instruction pointer.

Embodiments of the invention may include using/executing a VMClear instruction to return a cached/loaded/current VMCS back to an unlocked state and into the memory location from which it was loaded with the KeyID with which it was loaded (as specified within the VMCS address provided to VMPTRLD). VMClear may be extended to keep the state of the VMCS, whether it is current/loaded and locked or cleared and unlocked. VMClear may also flush the TLBs of the KeyID used to load the VMCS, as well as the PXE caches and any other residual state that may have been maintained for a loaded/current/cached VMCS. In this way, a VMCS that is cleared (via VMClear) may be freed via a new instruction (such as VMFreeKD). Executing a VMFreeKD instruction specifying the VMCS's HPA and KeyID may return to the VMM a MAC of the VMCS in memory as well as the VMCS encrypted in the client's key, such that the VMCS itself may be securely paged-out of memory, decrementing the VMCS count in the CPUs tracking structure (the inverse of VMAddKD). When all VMCS(s) are freed for a KeyID, all the CPU caches on all packages may be invalidated of any content cached with the KeyID and then the KeyID may be reassigned (CreateKD again).

According to an embodiment of the invention, a VMCS may include a field containing a secret identifier identifying the data structure as a VMCS added by the CPU (the secret value known only to the CPU). An EPT root may include a number of page table entries (EPTEs) marked as not-present (or using a new bit that indicates the entries contain MAC values instead of HPAs) and containing one MAC per page table entry pertaining to the referenced page (instead of the HPA). These MACs may be created by the client using the client's key in a secure MAC function (e.g., SHA3 KMAC). For example: MAC=SHA3(Key, GPAStart, GPAEnd, Page-Content), where the Key is the secret key, the GPAStart is the first guest physical address pertaining to a range of GPAs covered by the EPT entry, and the GPAEnd is the last GPA corresponding to this range. Each EPT entry may cover a range of addresses, starting at the root EPT structure, to cover the entire guest physical address space. Actual data/VM image pages may have a 4 KB range (page size) or may specify large pages (e.g., 2 MB or larger), where the full-page contents for the GPA range are computed with the MAC. Not present pages may be indicated as such in the EPTE with an invalid MAC value.

Figure 51:
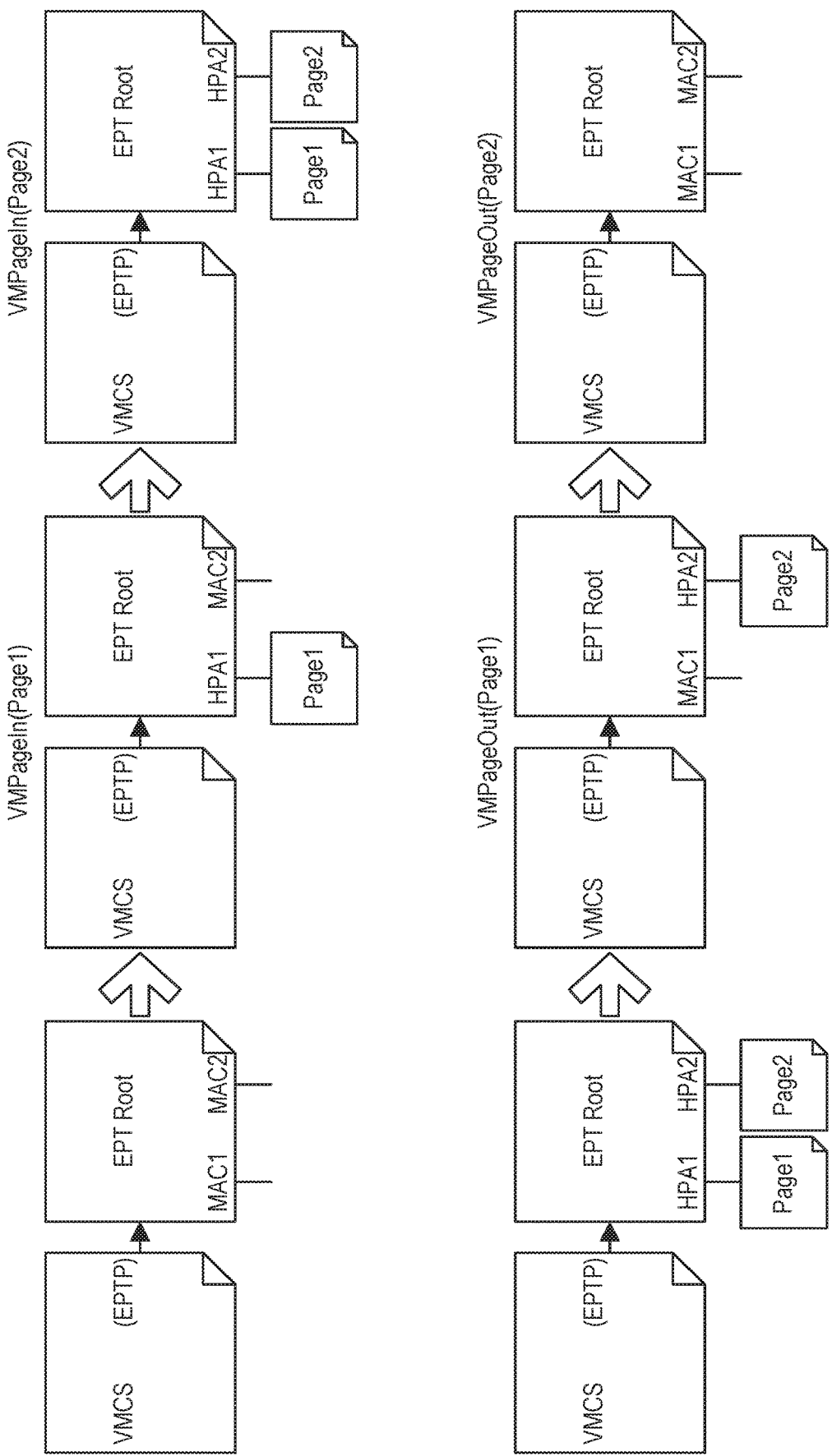
FIG. 51 illustrates use of VMPageIn and VMPageOut instructions according to an embodiment of the invention.

FIG. 51 illustrates how a secure virtual machine image for a client may be built (e.g., by a VMM) using a VMPageIn instruction and paged out (e.g., by a VMM) using a VMPageOut instruction according to embodiments of the invention as described below.

In embodiments of the invention, the CPU allows the VMM to page-in and page-out EPT pages from the secure VM. First, the VMM will make the CreateKD VMCS current via a VMPTRLD instruction specifying the VM's KeyID in the input physical address. Then, the VMM may issue a VMRead to access the VMCS. In embodiments of the invention, the VMRead concept may be extended to read the EPTs as referenced by the EPTP in the VMCS. This can be done by walking the EPT from GPA to HPA. So, the processor will allow the VMM to VMRead a page from the VM's EPT by specifying the GPA as a parameter. The processor will then walk the VMCS's EPTP for the GPA to get the HPA. Then, it will read the actual page plaintext using the VM's KeyID.

Embodiments of the invention provide a single instruction for the VMM to execute to change an EPTE from a MAC value to an HPA value, as well as to page-in a content page from memory. For example, the VMPageIn instruction may have the following format: VMPageIn([in] GPAStart, [in] GPAEnd, [in] HPAofPage, [in] Permissions).

Figures 52A, 52B:
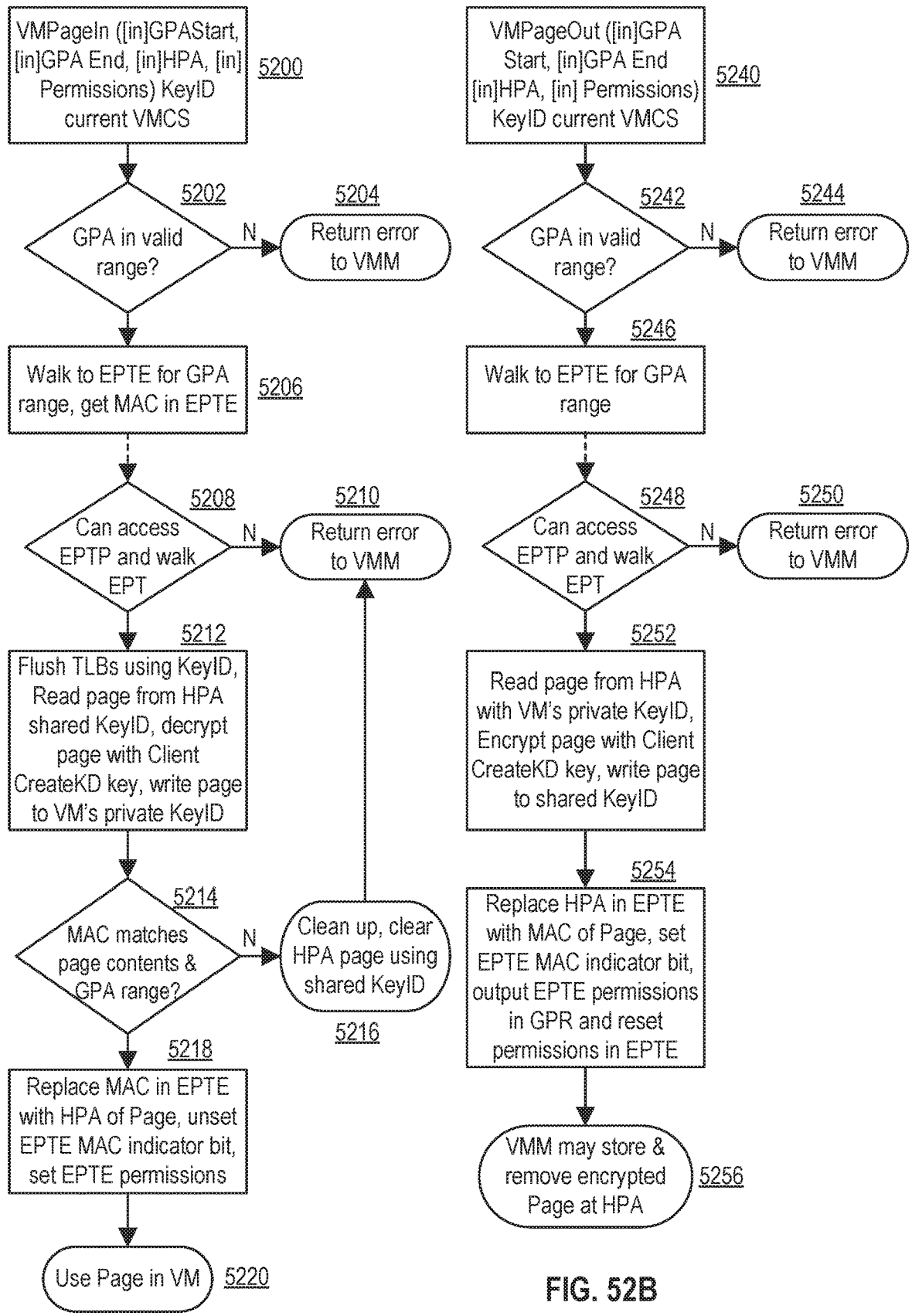
FIG. 52A and FIG. 52B illustrates methods of executing VMPageIn and VMPageOut instructions according to an embodiment of the invention.

To execute or otherwise in response to this single instruction, a processor (e.g., processor 411 of FIG. 4) or processor core (e.g., core 416 or 418 of FIG. 4), including or along with encryption hardware (e.g., MEE 415 of FIG. 4), may perform a method embodiment of the invention, for example, as illustrated in FIG. 52A. Other such method embodiments of the invention may include any portion or portions shown in FIG. 52A and/or a portion or portions not shown in FIG. 52A, in a variety of orders. A method embodiment may include (e.g., in 5200) receiving, decoding, or otherwise recognizing a VMPageIn instruction.

In embodiments, the VMPageIn instruction may be used starting from the EPTP in the current (VMPTRLD) VMCS. Even though the VMM has no write access to the protected VMCS, the processor may access the EPTP field using the VM's private KeyID (MKTMEi key) and access the EPT root. Given the GPA range, the processor may (e.g., in 5206) navigate the extended page table until it finds the EPTE leaf for the GPA range (or (e.g., in 5210) report an error if any of the intermediate EPTEs are not present or corrupt). It may (e.g., in 5214) use the MAC in that EPTE to verify the contents of the HPA page being paged in. It may (e.g., in 5212) read (load) the memory contents using the shared KeyID, decrypt them using the Client's CreateKD key (e.g., AES-XTS encrypted using the GPA as a tweak), and then write (store) the contents back to memory at the same address using the VM's private KeyID (KeyID specified in the address to VMPTRLD). Thus, transforming the page in place from the client key to the private MKTME key for the VM. If the HPA page was already mapped to a different GPA for the VM using the VM's MKTMEi key, then the memory integrity check will fail when reading (loading) using the shared KeyID, thus, indicating to the processor a sharing error (memory-remapping attack) and failing to load the page (overwriting/clearing the page contents by writing default values using the shared key, e.g., in 5216). Likewise, if the MAC in the EPTE does not match to contents of the paged-in page indicating a GPA or content modification attempt (attack) and failing to load the page (overwriting/clearing the page with default contents using the shared key, e.g., in 5216). If the MAC matches the contents of the paged-in page, then (e.g., in 5218) the EPTE will be updated with the HPA (physical address) of the loaded page and the permissions (and memory types, etc.) will be set as specified in the VMPageIn instruction in the EPTE. If the HPA was previously mapped to the same KeyID, all concurrent processors should flush their TLBs for the same KeyID and wait for the VMPageIn instruction to successfully complete if they are executing a VM using the same KeyID. In some embodiments, the processor may use an HPA tracker structure to determine if an HPA was already in use for a particular key, and only allow page-in operations for HPAs that are not currently already used by the same client key. Only freed (paged-out) HPAs may then be reused.

Embodiments of the invention provide a single instruction for the VMM to execute to page-out guest pages from memory. For example, the VMPageOut instruction may have the following format: VMPageOut([in] GPAStart, [in] GPAEnd, [out] Permissions).

To execute or otherwise in response to this single instruction, a processor (e.g., processor 411 of FIG. 4) or processor core (e.g., core 416 or 418 of FIG. 4), including or along with encryption hardware (e.g., MEE 415 of FIG. 4), may perform a method embodiment of the invention, for example, as illustrated in FIG. 52B. Other such method embodiments of the invention may include any portion or portions shown in FIG. 52B and/or a portion or portions not shown in FIG. 52B, in a variety of orders. A method embodiment may include (e.g., in 5240) receiving, decoding, or otherwise recognizing a VMPageOut instruction.

In embodiments, the VMPageOut instruction may be used starting from the EPTP in the current (VMPTRLD) VMCS. Even though the VMM has no direct access to the MKTME encrypted VMCS, the processor may access the EPTP field using the VM's private KeyID (MKTMEi key) and access the EPT root. Given the GPA range, the processor may (e.g., in 5246) navigate the extended page table until it finds the EPTE leaf for the GPA range (or (e.g., in 5250) report an error if any of the intermediate EPTEs are not present or corrupt). It may (e.g., in 5252) read (load) the page using the VM's private KeyID, calculate the associated MAC given the contents and GPA, and re-encrypt the contents using the client's CreateKD key, writing them back to the same memory page using the shared KeyID (e.g. using AES-XTS with the GPA range used as a tweak). The calculated MAC for the paged-out page and its GPA may be stored in the associated EPTE which may be set not present while the original permissions are provided in an output register (or memory location) on successful completion of the instruction (e.g., in 5254). In embodiments where the CPU maintains an HPA tracker, the HPA may be recorded as freed for the client key, allowing its reuse for subsequent VMPageIn operations.

To later restore such a page to a new HPA, a VMM may VMPageIn the page specifying the GPA of the page and the desired HPA (EPT leaf node) and permissions for the encrypted page being restored for the associated MAC. The processor may decrypt the page using the VM's secret paging key (client's key specified in CreateKD) and check whether the MAC matches the GPA and the page's content. The processor may update the EPTE's HPA and permissions for the given GPA and write the decrypted page's contents to the HPA location using the VM's private KeyID (a direct write, non-temporal write, or write-for-ownership). This will cause updated memory integrity information to be restored. In some embodiments, the EPTEs have MACs that are references to already paged-in pages (HPAs). If a VMPageIn specifies an already loaded HPA and the MAC matches the paged-in page contents, then the EPTE may be updated with the HPA of the paged-in page contents that matches the referencing MAC. In this way, EPT structures may reference already-paged in pages of other EPT structures or form other directed graph structures that maintain the client's specified security policy. The HPA Tracker may have a reference count to track how many references there are to the same HPA. Similarly, when a reference is paged out via VMPageOut, the reference count in the HPA tracker will be decremented for the paged-out HPA.

For proper versioning, it may be assumed that the EPT table is fixed in memory once loaded. Each time a page is VMRead to be paged out, the EPTE leaf is marked not present, and the MAC (note, MAC may be truncated to fit) value for the VMPageOut page is stored in the EPTE, replacing the HPA, as the HPA is no longer valid. Then, when the VMM pages-in the page with VMPageIn back into memory, the processor may check the EPTE for the specified GPA and verify the stored MAC matches the restored page contents and GPA. Thus, no replay is possible. Once all the leaf EPTE entries of an EPT page are paged-out and set not present, the EPT page itself may be paged-out and its MAC stored up into the parent EPTE, replacing the EPT page's HPA with the calculated MAC value. In this way, all the EPT structure may be rolled up into the Root EPT and, finally, the Root EPT itself may be represented as a MAC value stored in the VMCS EPTP, replacing the HPA for the EPT Root with its MAC value. Thus, the entire EPT hierarchy, representing the correct full state of the VM at any particular point in time, may be paged-in and paged-out.

To assure an HPA page is not already mapped, the processor may read it from memory using the shared KeyID. The shared key with integrity will report an error if the page was already mapped as non-shared (e.g., stored with a VM's private key). Thus, pages need to first be written with shared KeyID or a special key before they can be reassigned. When paging in memory, whole pages should be checked with the VM private key against the MAC. Read cacheline shared, if no error, write cacheline with VM data to VM private key. Repeat for whole page while calculating the MAC. Other embodiments may prevent HPA reuse simply by requiring that only incrementing or decrementing HPAs are used, where the processor tracks the highest and lowest HPA assigned to a key and assures that no HPA between the current lowest and highest HPA can be paged-in. Other embodiments may have a HPA tracker structure that maintains whether an HPA is currently assigned to a key domain, and may contain a reference count for how many structures reference the HPA from within the key domain.

The above method will work for paging any level of the EPT tree as well, allowing the EPT tree to be paged in and out as well. Instead of a leaf GPA of a content page, the path taken (GPA range) through the tree can be encoded with the MAC, or consider each intermediate level as a GPA range and use that to calculate the MAC for the EPT page referenced by the parent EPTE. Then, the paged-in EPT page contents may be compared with the parent EPTE's MAC to verify that the child EPT page is correct. The parent EPTE's MAC may then be replaced with the child EPT page's HPA, and the parent's EPTE permissions may be set.

The EPT Root page may also be paged out (e.g., by specifying the entire GPA range and saving the MAC into GPRs) but should be reestablished with a new CreateKD. In some embodiments, the Root EPT cannot be paged in as there is no parent EPTE with a MAC to verify it against. Other embodiments may allow the RootEPT MAC to be paged out and stored in a VMCS structure, replacing the EPTP with the Root EPT's MAC, specifying the entire GPA range as part of the MAC calculation (as the entire GPA range is covered by the EPT Root).

A client may configure the initial EPT image with the correct MACs so the VMM may page it in, all the EPT pages, all the way up to the EPTP root and the VMCS. In some embodiments, the client may allow the VM's memory to be extended if the EPTE is marked not present; a special bit or MAC value (e.g. zero MAC) may indicate that the client allows this GPA to be filled with a zero page. In this case, the processor may allow a page-in operation to the private GPA space by filling the private KeyID page with zeros (or other default value) and then setting the EPTE HPA for this zeroed-out page. After the page is used by the VM, the page-out operation (VMPageOut) may then calculate the correct MAC for the page and store it in the associated EPTE, thus securely extending the memory of the guest VM with pages that were not part of the original encrypted VM image.

Shared pages using the shared KeyID may be specified through GPA to HPA mappings as well. For example, a high memory region of GPA addresses may be implicitly used for shared memory. This GPA region may always cause the physical addresses to be appended with the Shared KeyID (and not the VM's private KeyID). Thus, the VM may use this region of the GPA space to communicate with the VMM, for I/O, virtual devices, and so on. The VMM may use the VMPageIn instruction to set the HPAs for these shared GPAs as well, only the MAC will not be checked for the higher GPA address space and the pages will not be decrypted using the client's key as they are plaintext. Likewise, VMPageOut may be used by the VMM to set the EPT mappings to not present for the shared KeyID GPA region, but otherwise not produce a MAC or encrypt the associated pages with the client's secret key as the shared pages are plaintext to both the VM and VMM. Other embodiments may allow the VMM to extend the shared memory portion of the EPT tree, directly reading and writing to shared memory the EPT children entries and leaf entries of the EPT tree. That is, the shared portion of the EPT tree (GPA range) below the EPT Root may be accessed with the shared KeyID, allowing the EPT child entries to be walked by the processor using the shared KeyID.

Figure 53:
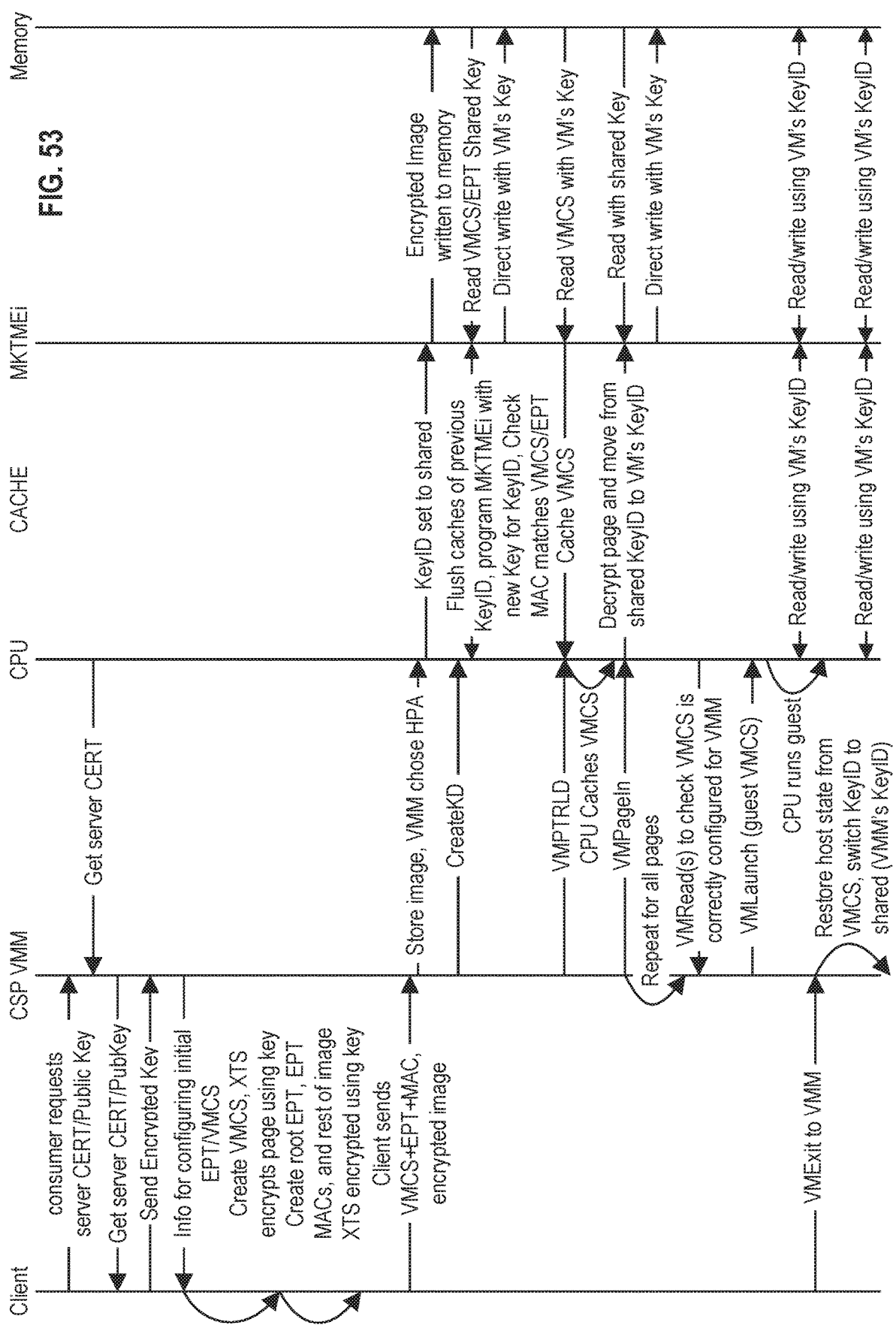
FIG. 53 illustrates the end-to-end provisioning of a secure VM according to an embodiment of the invention.

FIG. 53 illustrates the end-to-end provisioning of a secure VM according to an embodiment of the invention.

As explained above in the description of FIG. 49B, on a VMExit to the VMM, the processor GPR state will be saved inside of a VM's private Key Domain, and the register state cleared. This state may be stored on a VE Info Page as referenced by the VMCS, or otherwise made accessible to the VM to access on a #VE (virtualization exception). The VM may always run the guest's #VE handler to access secure state on the VMM's behalf where the VM may control what processor or memory state is made available to the VMM in order to protect the VM's secrets. For example, the #VE handler of a guest may share information with the VMM via a shared memory region or by selecting a shared KeyID from the page table mappings. The CreateKD instruction may also include the HPA of the VE Info page for the reference VMCS and set the VMCS HPA field for the VE Info Page (so that the VMM can decide the HPA for the VE Info Page). In other embodiments, the VEInfo page may be paged-in via the VMPageIn instruction into the guest's GPA space and a modified VMWrite may check a MAC in the VMCS (e.g., located at the VE Info Page address field), to verify the correct VE Info Page was referenced by the VMCS, and then set the HPA field for the VE Info Page if it computes to the correct MAC value. Similarly, a VMRead of the VE Info Page field may set the field to the MAC value representing the current VE Info Page and replace the HPA with this MAC value returning the HPA in a register as would the VMRead. Multiple VMCSs may be added, specifying different VE Info Pages allowing re-entrant handling of interrupts, faults, exceptions or SMIs within the guest.

In embodiments, the CreateKD may be extended to specify a list of multiple initial VMCS structures and VMCS Shadow structures. The processor may link the Shadow VMCS to its corresponding VMCS (link pointer) if the MAC matches for all the structures loaded by CreateKD. Providing the shadow allows the VM to access the shadow VMCS using VMRead and VMWrite instructions, as well as supporting nested virtualization. In other embodiments, the client may specify the MAC for the page contents of the shadow VMCS Link Pointer field and the VMM may specify the HPA of the shadow VMCS in a modified VMWrite where the processor may verify that the contents of the specified HPA page match the MAC in the VMCS field for the shadow VMCS link pointer. If the MAC in the field specified by the client matches the contents of the page, the processor will write the HPA of the shadow page to the VMCS Shadow Link Pointer field. Similarly, a VMRead for the VMCS Shadow Link Pointer field may calculate the MAC value for the shadow VMCS, store this MAC in the VMCS Shadow Link Pointer field and return the HPA of the shadow VMCS.

The following paragraphs pertain to further embodiments, each of which may be modified to include elements related to a VMPageIn instruction and/or a VMPageOut instruction as described above.

In Example 1, an apparatus to securely execute a consumer workload in a public cloud environment without exposing data or secrets of the consumer includes a processor; and a memory coupled to the processor; where the processor is to execute an untrusted host virtual machine monitor to manage execution by the processor of at least one guest virtual machine; the untrusted host virtual machine monitor is to receive an encrypted key domain key, an encrypted guest code image encrypted by a key domain key, and an encrypted guest control structure encrypted by the key domain key, the key domain key inaccessible to the untrusted host virtual machine monitor; the untrusted host virtual machine monitor is to issue a create command to the processor to create a first key domain, the first key domain comprising a region of the memory to be encrypted by the key domain key, the untrusted host virtual machine monitor to further verify the encrypted guest control structure; in response to receiving the create command, the processor is to create the first key domain and decrypt the encrypted key domain key to produce the key domain key; the untrusted host virtual machine monitor is to issue a launch command to the processor to launch a first guest virtual machine within the first key domain; and in response to receiving the launch command, the processor is to switch to the first key domain, decrypt the encrypted guest control structure to produce a guest control structure containing guest processor state information, decrypt the encrypted guest code image to produce a guest code image, and execute the guest code image within the first key domain using the guest processor state information.

Example 2 includes the apparatus of Example 1, where the untrusted host virtual machine monitor is to verify the encrypted guest control structure by issuing a command to the processor to execute at least one of a Hash Key Domain instruction and a VM Read instruction.

Example 3 includes the apparatus of Example 1, where in response to an event triggering an exit condition of the first guest virtual machine, the processor is to switch from the first key domain to a second key domain.

Example 4 includes the apparatus of Example 3, where the second key domain is unencrypted; and the second key domain is a shared region of the memory shared by the untrusted host virtual machine monitor and each guest virtual machine managed by the untrusted host virtual machine monitor.

Example 5 includes the apparatus of Example 3, where the second key domain is encrypted by a second key domain key for the untrusted host virtual machine monitor; the second key domain key is accessible to the untrusted host virtual machine monitor and to each guest virtual machine managed by the untrusted host virtual machine monitor; and the second key domain is a shared region of the memory shared by the untrusted host virtual machine monitor and each guest virtual machine managed by the untrusted host virtual machine monitor.

Example 6 includes the apparatus of Example 3, where the guest control structure specifies a protected location of the memory where the processor may store the guest processor state information.

Example 7 includes the apparatus of Example 6, where, in response to an event triggering an exit condition of the first guest virtual machine, the processor is to save the guest processor state information for the first guest virtual machine in the protected location of the memory; the untrusted host virtual machine monitor is to issue a resume command to the processor to resume the first guest virtual machine; and in response to receiving the resume command, the processor is to switch to the first key domain, retrieve the guest processor state information for the first guest virtual machine from the protected location of the memory, and execute the guest code image within the first key domain using the guest processor state information.

Example 8 includes the apparatus of Example 3, where the guest code image includes interrupt handler code to intercept an interrupt; the processor is to convert an exit condition of the first guest virtual machine to an exception; the guest code image is to save processor register information to the protected location of the memory in response to at least one of the interrupt and the exception; the guest code image is to clear a first processor register if the first processor register is not needed by the untrusted host virtual machine monitor; the guest code image is to conditionally expose a second processor register if the second processor register is needed by the untrusted host virtual machine monitor; the guest code image is to invoke the untrusted host virtual machine monitor; and the first guest virtual machine is to exit when the untrusted host virtual machine monitor is invoked.

Example 9 includes the apparatus of Example 3, where the untrusted host virtual machine monitor is to receive an encrypted updated guest control structure, install the encrypted updated guest control structure in the memory, and verify the encrypted updated guest control structure; the processor is to decrypt the encrypted updated guest control structure to produce an updated guest control structure; in response to verifying the encrypted updated guest control structure, the untrusted host virtual machine monitor is to issue an enter command to the processor to enter the first guest virtual machine using the updated guest control structure; and in response to receiving the enter command, the processor is to enter the first guest virtual machine using the updated guest control structure.

Example 10 includes the apparatus of Example 9, where the untrusted host virtual machine monitor is further to receive an encrypted updated guest code image and to install the encrypted updated guest code image in the memory; the processor is to decrypt the encrypted updated guest code image update to produce an updated guest code image; and the processor is to enter the first guest virtual machine by executing the updated guest code image using the updated guest control structure.

Example 11 includes the apparatus of Example 3, where the untrusted host virtual machine monitor is to determine whether a change to the guest control structure is needed; the first guest virtual machine is to verify that the change to the guest control structure does not compromise security of the first guest virtual machine; the first guest virtual machine is to produce an encrypted updated guest control structure incorporating the change using the key domain key; and the first guest virtual machine is to send the encrypted updated guest control structure to the untrusted host virtual machine monitor via a shared region of the memory shared by the untrusted host virtual machine monitor and the first guest virtual machine.

Example 12 includes the apparatus of Example 11, where the untrusted host virtual machine monitor is to install the encrypted updated guest control structure in the memory; the untrusted host virtual machine monitor is to verify the encrypted updated guest control structure; the processor is to decrypt the encrypted updated guest control structure to produce an updated guest control structure; in response to verifying the encrypted updated guest control structure, the untrusted host virtual machine monitor is to issue an enter command to the processor to enter the first guest virtual machine using the updated guest control structure; and in response to receiving the enter command, the processor is to enter the first guest virtual machine using the updated guest control structure.

Example 13 includes the apparatus of Example 12, where the untrusted host virtual machine monitor determines whether the change is needed to the guest control structure in response to a request received from the first guest virtual machine.

Example 14 includes the apparatus of Example 13, where the request further includes a second change to the guest code image; the first guest virtual machine is to verify that the second change to the guest code image does not compromise security of the first guest virtual machine; the first guest virtual machine is to produce an encrypted updated guest code image incorporating the second change using the key domain key; and the first guest virtual machine is to send the encrypted updated guest control image to the untrusted host virtual machine monitor via the shared region of the memory.

Example 15 includes the apparatus of Example 14, where the untrusted host virtual machine monitor is to receive the encrypted updated guest code image; the processor is to decrypt the encrypted updated guest code image to produce an updated guest code image; and the processor is to execute the guest code image by executing the updated guest code image.

Example 16 includes the apparatus of Example 15, where the encrypted guest code image includes an agent code image; the encrypted guest control structure includes an agent control structure; the untrusted host virtual machine monitor is to verify the agent control structure; the untrusted host virtual machine monitor is to issue a second launch command to the processor to launch a second guest virtual machine within the first key domain, the second guest virtual machine to provide an agent to act on behalf of the untrusted host virtual machine monitor within the first key domain; and in response to receiving the second launch command, the processor is to switch to the first key domain, decrypt the encrypted guest code image to produce the agent code image, decrypt the encrypted guest control structure to produce the agent control structure containing agent processor state information, and execute the agent code image within the first key domain using the agent processor state information.

Example 17 where the apparatus of Example 16, where the untrusted host virtual machine monitor is to communicate a request to modify the guest control structure of the first guest virtual machine to the agent via a shared region of memory shared by the agent and the untrusted host virtual machine monitor; in response to reading the request from the shared region of memory, the agent is to modify the guest control structure of the first guest virtual machine within the first key domain to produce a modified guest control structure of the first guest virtual machine; the untrusted host virtual machine monitor is to verify the modified guest control structure of the first guest virtual machine; upon verifying the modified guest control structure, the untrusted host virtual machine monitor is to issue an enter command to the processor to enter the first guest virtual machine within the first key domain; and in response to receiving the enter command, the processor is to execute the guest code image within the first key domain using second guest processor state information from the modified guest control structure.

Example 18 includes the apparatus of Example 16, where the untrusted host virtual machine monitor is to communicate a request to the agent to retrieve a page from encrypted storage, where each page of the encrypted storage is encrypted by a storage key; the agent is to decrypt the page using the storage key to produce a decrypted page; the agent is to verify the decrypted page; and if the decrypted page is verified, the agent is to install the decrypted page into the memory.

Example 19 includes the apparatus of Example 18, where if the agent has access to a location in the memory into which the decrypted page is to be installed, the agent is to copy the decrypted page into the location of the memory; and if the agent does not have access to a location in the memory into which the decrypted page is to be installed: the agent is further to re-encrypt the page using the key domain key and a physical address of the location as a tweak to produce a re-encrypted page; and the untrusted host virtual machine monitor is to install the re-encrypted page into the memory.

Example 20 includes the apparatus of Example 16, where the untrusted host virtual machine monitor is to communicate a request to the agent to move a page from encrypted memory to storage, where each page of the encrypted memory is encrypted by the key domain key; the agent is to decrypt the page using the key domain key to produce a decrypted page; the agent is to verify the decrypted page; and if the decrypted page is verified, the agent is to re-encrypt the decrypted page with a storage key for the storage to produce a storage-encrypted page, move the storage-encrypted page to the storage, and provide the storage-encrypted page to the untrusted host virtual machine monitor.

Example 21 includes the apparatus of Example 1, where the untrusted virtual machine monitor is to issue a load command to the processor to load the encrypted guest control structure into the memory, the load command comprising a pointer to a physical address in the memory from which to load the encrypted guest control structure and a key domain identifier for the first key domain; and, in response to receiving the load command, the processor is to determine a key domain key corresponding to the key domain identifier, where the processor is to use the key domain key to decrypt the encrypted guest control structure.

Example 22 includes the apparatus of Example 1, where the processor is further to confirm integrity of the encrypted guest control structure.

Example 23 includes a processor to securely execute a consumer workload in a public cloud environment without exposing data or secrets of the consumer, the processor to execute an untrusted host virtual machine monitor to manage execution by the processor of at least one guest virtual machine; create a first key domain in response to a create command issued by the untrusted host virtual machine monitor, the first key domain comprising a region of a memory to be encrypted by a key domain key, the key domain key inaccessible to the untrusted host virtual machine monitor; decrypt an encrypted key domain key received from the untrusted host virtual machine monitor to produce the key domain key; launch a first guest virtual machine within the first key domain in response to a launch command issued by the untrusted host virtual machine monitor, where to launch the first guest virtual machine includes to: switch to the first key domain, decrypt an encrypted guest control structure received from the untrusted host virtual machine monitor to produce a guest control structure containing processor state information, decrypt an encrypted guest code image received from the untrusted host virtual machine monitor to produce a guest code image, and execute the guest code image within the first key domain using the processor state information.

Example 24 includes the processor of Example 23, where the processor is further to switch from the first key domain to a second key domain in response to an event triggering an exit condition of the first guest virtual machine.

Example 25 includes the processor of Example 24, where the second key domain is unencrypted; and the second key domain is a shared region of the memory shared by the untrusted host virtual machine monitor and each guest virtual machine managed by the untrusted host virtual machine monitor.

Example 26 includes the processor of Example 24, where the second key domain is encrypted by a second key domain key for the untrusted host virtual machine monitor; the second key domain key is accessible to the untrusted host virtual machine monitor and to each guest virtual machine managed by the untrusted host virtual machine monitor; and the second key domain is a shared region of the memory shared by the untrusted host virtual machine monitor and each guest virtual machine managed by the untrusted host virtual machine monitor.

Example 27 includes the processor of Example 23, where the guest control structure specifies a protected location of the memory where the processor may store the guest processor state information.

Example 28 includes the processor of Example 27, where the processor is further to: save the guest processor state information for the first guest virtual machine in the protected location of the memory in response to an event triggering an exit condition of the first guest virtual machine; and in response to receiving a resume command from the untrusted host virtual machine monitor, the processor is further to: switch to the first key domain, retrieve the guest processor state information for the first guest virtual machine from the protected location of the memory, and execute the guest code image within the first key domain using the processor state information.

Example 29 includes the processor of Example 23, where the processor is further to: convert an exit condition of the first virtual machine to an exception.

Example 30 includes the processor of Example 23, where the processor is further to: decrypt an encrypted updated guest control structure to produce an updated guest control structure; and enter the first guest virtual machine using the updated guest control structure in response to receiving an enter command to enter the first guest virtual machine.

Example 31 includes the processor of Example 23, where the processor is further to: decrypt an encrypted updated guest code image update to produce an updated guest code image; and enter the first guest virtual machine by executing the updated guest code image using the updated guest control structure.

Example 32 includes the processor of Example 23, where the processor is further to: in response to receiving a second launch command to launch a second guest virtual machine within the first key domain, the second guest virtual machine to provide an agent to act on behalf of the untrusted host virtual machine monitor within the first key domain, the processor is to: switch to the first key domain, decrypt the encrypted guest code image to produce an agent code image, decrypt the encrypted guest control structure to produce an agent control structure containing agent processor state information, and execute the agent code image within the first key domain using the agent processor state information.

Example 33 includes the processor of Example 23, where the processor is further to: in response to receiving an enter command to enter the first guest virtual machine using a modified guest control structure, execute the guest code image within the first key domain using second guest processor state information from the modified guest control structure.

Example 34 includes the processor of Example 23, where the processor is further to: determine a corresponding key domain key for a key domain identifier for the first key domain, where the processor is to use the corresponding key domain key to decrypt the encrypted guest control structure in response to receiving a load command to load the encrypted guest control structure into the memory, the load command comprising a pointer to a physical address in the memory from which to load the encrypted guest control structure and the key domain identifier for the first key domain.

Example 35 includes the processor of Examples 23-34 further comprising a system on a chip (SoC) incorporated in a user equipment touch-enabled device.

Example 36 is a system comprising a display, a memory, and the processor of one or more of the above Examples 23-34.

Example 37 includes at least one computer-readable medium comprising instructions that, when executed by a processor, cause a computer to securely execute a consumer workload in a public cloud environment without exposing data or secrets of the consumer, the computer to: receive an encrypted key domain key, an encrypted guest code image encrypted by a key domain key, and an encrypted guest control structure encrypted by the key domain key; issue a create command to the processor to create a first key domain, the first key domain comprising a region of a memory to be encrypted by the key domain key; verify the encrypted guest control structure; and issue a launch command to the processor to launch a first guest virtual machine within the first key domain.

Example 38 includes the computer-readable media of Example 37, where the instructions further cause the computer to: verify the encrypted guest control structure by issuing a command to the processor to execute at least one of a Hash Key Domain instruction and a VM Read instruction.

Example 39 includes the computer-readable media of Example 37, where the instructions further cause the computer to: issue a resume command to the processor to resume the first guest virtual machine.

Example 40 includes the computer-readable media of Example 37, where the instructions further cause the computer to: intercept an interrupt; save processor register information to a protected location of the memory in response to at least one of the interrupt and an exception thrown when the first guest virtual machine causes an exit condition; clear a first processor register if the first processor register is not needed by an untrusted host virtual machine monitor managing execution of the first guest virtual machine; conditionally expose a second processor register if the second processor register is needed by the untrusted host virtual machine monitor; invoke the untrusted host virtual machine monitor; and exit the first guest virtual machine when the untrusted host virtual machine monitor is invoked.

Example 41 includes the computer-readable media of Example 37, where the instructions further cause the computer to: receive an encrypted updated guest control structure, install the encrypted updated guest control structure in the memory, and verify the encrypted updated guest control structure; and issue an enter command to the processor to enter the first guest virtual machine using an updated guest control structure in response to verifying the encrypted updated guest control structure, the updated guest control structure produced by the processor decrypting the encrypted updated guest control structure.

Example 42 includes the computer-readable media of claim 41, where the instructions further cause the computer to: receive an encrypted updated guest code image; and install the encrypted updated guest code image in the memory.

Example 43 includes the computer-readable media of claim 37, where the instructions further cause the computer to: determine whether a change to the guest control structure is needed; verify, by the first virtual machine, that the change to the guest control structure does not compromise security of the first guest virtual machine; produce, by the first virtual machine, an encrypted updated guest control structure incorporating the change using the key domain key; and send, by the first virtual machine, the encrypted updated guest control structure to an untrusted host virtual machine monitor via a shared region of the memory shared by the untrusted host virtual machine monitor and the first guest virtual machine.

Example 44 includes the computer-readable media of claim 43, where the instructions further cause the computer to: install the encrypted updated guest control structure in the memory; verify the encrypted updated guest control structure; and issue an enter command to the processor to enter the first guest virtual machine using an updated guest control structure in response to verifying the encrypted updated guest control structure, the updated guest control structure produced by the processor decrypting the encrypted updated guest control structure.

Example 45 includes the computer-readable media of claim 44, where the instructions further cause the computer to: determine whether the change is needed to the guest control structure in response to a request received from the first guest virtual machine.

Example 46 includes the computer-readable media of claim 45, where the instructions further cause the computer to: verify, by the first virtual machine, that a second change to the guest code image included in the request does not compromise security of the first guest virtual machine; produce, by the first guest virtual machine, an encrypted updated guest code image incorporating the second change using the key domain key; and send, by the first guest virtual machine, the encrypted updated guest control image to the untrusted host virtual machine monitor via the shared region of the memory.

Example 47 includes the computer-readable media of claim 46, where the instructions further cause the computer to: receive the encrypted updated guest code image, where executing the guest code image includes executing an updated guest code image produced by the processor decrypting the encrypted updated guest code image.

Example 48 includes the computer-readable media of claim 37, where the instructions further cause the computer to: verify an agent control structure included within the encrypted guest control structure; and issue a second launch command to the processor to launch a second guest virtual machine within the first key domain using the agent control structure, the second guest virtual machine to provide an agent to act on behalf of the untrusted host virtual machine monitor within the first key domain.

Example 49 includes the computer-readable media of claim 48, where the instructions further cause the computer to: communicate a request to modify the guest control structure of the first guest virtual machine to the agent via a shared region of memory shared with the agent; modify, by the agent, the guest control structure of the first guest virtual machine within the first key domain to produce a modified guest control structure of the first guest virtual machine in response to reading the request from the shared region of memory; verify the modified guest control structure of the first guest virtual machine; and issue an enter command to the processor to enter the first guest virtual machine within the first key domain using the modified guest control structure upon verifying the modified guest control structure.

Example 50 includes the computer-readable media of claim 48, where the instructions further cause the computer to: communicate a request to the agent to retrieve a page from encrypted storage, where each page of the encrypted storage is encrypted by a storage key; decrypt, by the agent, the page using the storage key to produce a decrypted page; verify, by the agent, the decrypted page; and install the decrypted page into the memory if the decrypted page is verified.

Example 51 includes the computer-readable media of claim 50, where the instructions further cause the computer to: copy, by the agent, the decrypted page into the location of the memory if the agent has access to a location in the memory into which the decrypted page is to be installed; and if the agent does not have access to a location in the memory into which the decrypted page is to be installed: re-encrypt, by the agent, the page using the key domain key and a physical address of the location as a tweak to produce a re-encrypted page, and install, by the untrusted host virtual machine monitor, the re-encrypted page into the memory.

Example 52 includes the computer-readable media of claim 48, where the instructions further cause the computer to: communicate a request to the agent to move a page from encrypted memory to storage, where each page of the encrypted memory is encrypted by the key domain key; decrypt, by the agent, the page using the key domain key to produce a decrypted page; verify, by the agent, the decrypted page; and if the decrypted page is verified: re-encrypt, by the agent, the decrypted page with a storage key for the storage to produce a storage-encrypted page, move, by the agent, the storage-encrypted page to the storage, and provide, by the agent, the storage-encrypted page to the untrusted host virtual machine monitor.

Example 53 is a method to securely execute a consumer workload in a public cloud environment without exposing data or secrets of the consumer, the method including: receiving an encrypted key domain key, an encrypted guest code image encrypted by a key domain key, and an encrypted guest control structure encrypted by the key domain key; issuing a create command to a processor create a first key domain, the first key domain comprising a region of a memory to be encrypted by the key domain key; verifying the encrypted guest control structure; and issuing a launch command to the processor to launch a first guest virtual machine within the first key domain, where the launch command includes a pointer to an address of the encrypted guest control structure.

Example 54 includes the method of Example 53, where verifying the encrypted guest control structure includes verifying the encrypted guest control structure by issuing a command to the processor to execute at least one of a Hash Key Domain instruction and a VM Read instruction.

Example 55 includes the method of Example 53, further comprising: issuing a resume command to the processor to resume the first guest virtual machine.

Example 56 includes the method of Example 53, further comprising: intercepting an interrupt; saving processor register information to a protected location of the memory in response to at least one of the interrupt and an exception thrown when the first guest virtual machine causes an exit condition; clearing a first processor register if the first processor register is not needed by an untrusted host virtual machine monitor managing execution of the first guest virtual machine; conditionally exposing a second processor register if the second processor register is needed by the untrusted host virtual machine monitor; invoking the untrusted host virtual machine monitor; and exiting the first guest virtual machine when the untrusted host virtual machine monitor is invoked.

Example 57 includes the method of Example 53, further comprising: receiving an encrypted updated guest control structure, installing the encrypted updated guest control structure in the memory, and verifying the encrypted updated guest control structure; and issuing an enter command to the processor to enter the first guest virtual machine using an updated guest control structure in response to verifying the encrypted updated guest control structure, the updated guest control structure produced by the processor decrypting the encrypted updated guest control structure.

Example 58 includes the method of Example 57, further comprising: receiving an encrypted updated guest code image; and installing the encrypted updated guest code image in the memory.

Example 59 includes the method of Example 53, further comprising: determining whether a change to the guest control structure is needed; verifying, by the first virtual machine, that the change to the guest control structure does not compromise security of the first guest virtual machine; producing, by the first virtual machine, an encrypted updated guest control structure incorporating the change using the key domain key; and sending, by the first virtual machine, the encrypted updated guest control structure to an untrusted host virtual machine monitor via a shared region of the memory shared by the untrusted host virtual machine monitor and the first guest virtual machine.

Example 60 includes the method of Example 59, further comprising: installing the encrypted updated guest control structure in the memory; verifying the encrypted updated guest control structure; and issuing an enter command to the processor to enter the first guest virtual machine using an updated guest control structure in response to verifying the encrypted updated guest control structure, the updated guest control structure produced by the processor decrypting the encrypted updated guest control structure.

Example 61 includes the method of Example 60, further comprising: determining whether the change is needed to the guest control structure in response to a request received from the first guest virtual machine.

Example 62 includes the method of Example 61, further comprising: verifying, by the first virtual machine, that a second change to the guest code image included in the request does not compromise security of the first guest virtual machine; producing, by the first guest virtual machine, an encrypted updated guest code image incorporating the second change using the key domain key; and sending, by the first guest virtual machine, the encrypted updated guest control image to the untrusted host virtual machine monitor via the shared region of the memory.

Example 63 includes the method of Example 62, further comprising: receiving the encrypted updated guest code image, where executing the guest code image includes executing an updated guest code image produced by the processor decrypting the encrypted updated guest code image.

Example 64 includes the method of Example 53, further comprising: verifying an agent control structure included within the encrypted guest control structure; and issuing a second launch command to the processor to launch a second guest virtual machine within the first key domain using the agent control structure, the second guest virtual machine to provide an agent to act on behalf of the untrusted host virtual machine monitor within the first key domain.

Example 65 includes the method of Example 64, further comprising: communicating a request to modify the guest control structure of the first guest virtual machine to the agent via a shared region of memory shared with the agent; modifying, by the agent, the guest control structure of the first guest virtual machine within the first key domain to produce a modified guest control structure of the first guest virtual machine in response to reading the request from the shared region of memory; verifying the modified guest control structure of the first guest virtual machine; and issuing an enter command to the processor to enter the first guest virtual machine within the first key domain using the modified guest control structure upon verifying the modified guest control structure.

Example 66 includes the method of Example 64, further comprising: communicating a request to the agent to retrieve a page from encrypted storage, where each page of the encrypted storage is encrypted by a storage key; decrypting, by the agent, the page using the storage key to produce a decrypted page; verifying, by the agent, the decrypted page; and installing the decrypted page into the memory if the decrypted page is verified.

Example 67 includes the method of Example 66, further comprising: copying, by the agent, the decrypted page into the location of the memory if the agent has access to a location in the memory into which the decrypted page is to be installed; and if the agent does not have access to a location in the memory into which the decrypted page is to be installed: re-encrypting, by the agent, the page using the key domain key and a physical address of the location as a tweak to produce a re-encrypted page, and installing, by the untrusted host virtual machine monitor, the re-encrypted page into the memory.

Example 68 includes the method of Example 64, further comprising: communicating a request to the agent to move a page from encrypted memory to storage, where each page of the encrypted memory is encrypted by the key domain key; decrypting, by the agent, the page using the key domain key to produce a decrypted page; verifying, by the agent, the decrypted page; and if the decrypted page is verified: re-encrypting, by the agent, the decrypted page with a storage key for the storage to produce a storage-encrypted page, moving, by the agent, the storage-encrypted page to the storage, and providing, by the agent, the storage-encrypted page to the untrusted host virtual machine monitor.

In Example 69, a computer-readable medium including instructions is to perform the method of any of the above Examples.

In Example 70, a computer-readable medium including data is to be used by at least one machine to fabricate at least one integrated circuit to perform the method of any one of the above Examples.

In Example 72, an apparatus comprises means for performing the method of any one of the above Examples.

In Example 73, an apparatus to securely execute a consumer workload in a public cloud environment without exposing data or secrets of the consumer comprises: means for receiving an encrypted key domain key, an encrypted guest code image encrypted by a key domain key, and an encrypted guest control structure encrypted by the key domain key; means for issuing a create command to a processor create a first key domain, the first key domain comprising a region of a memory to be encrypted by the key domain key; means for verifying the encrypted guest control structure; and means for issuing a launch command to the processor to launch a first guest virtual machine within the first key domain, where the launch command includes a pointer to an address of the encrypted guest control structure.

Example 74 includes the apparatus of Example 73, wherein the means for verifying the encrypted guest control structure comprises means for issuing a command to the processor to execute at least one of a Hash Key Domain instruction and a VM Read instruction.

Example 75 includes the apparatus of Example 73, further comprising: means for issuing a resume command to the processor to resume the first guest virtual machine.

Example 76 includes the apparatus of Example 73, further comprising: means for intercepting an interrupt; means for saving processor register information to a protected location of the memory in response to at least one of the interrupt and an exception thrown when the first guest virtual machine causes an exit condition; means for clearing a first processor register if the first processor register is not needed by an untrusted host virtual machine monitor; means for conditionally exposing a second processor register if the second processor register is needed by the untrusted host virtual machine monitor; means for invoking the untrusted host virtual machine monitor; and means for exiting the first guest virtual machine when the untrusted host virtual machine monitor is invoked.

Example 77 includes the apparatus of Example 73, further comprising: means for receiving an encrypted updated guest control structure, installing the encrypted updated guest control structure in the memory, and verifying the encrypted updated guest control structure; and means for issuing an enter command to the processor to enter the first guest virtual machine using an updated guest control structure in response to verifying the encrypted updated guest control structure, the updated guest control structure produced by the processor decrypting the encrypted updated guest control structure.

Example 78 includes the apparatus of Example 77, further comprising: means for receiving an encrypted updated guest code image; and means for installing the encrypted updated guest code image in the memory.

Example 79 includes the apparatus of Example 73, further comprising: means for determining whether a change to the guest control structure is needed; means for verifying, by the first virtual machine, that the change to the guest control structure does not compromise security of the first guest virtual machine; means for producing, by the first virtual machine, an encrypted updated guest control structure incorporating the change using the key domain key; and means for sending, by the first virtual machine, the encrypted updated guest control structure to an untrusted host virtual machine monitor via a shared region of the memory shared by the untrusted host virtual machine monitor and the first guest virtual machine.

Example 80 includes the apparatus of Example 79, further comprising: means for installing the encrypted updated guest control structure in the memory; means for verifying the encrypted updated guest control structure; and means for issuing an enter command to the processor to enter the first guest virtual machine using an updated guest control structure in response to verifying the encrypted updated guest control structure, the updated guest control structure produced by the processor decrypting the encrypted updated guest control structure.

Example 81 includes the apparatus of Example 80, further comprising: means for determining whether the change is needed to the guest control structure in response to a request received from the first guest virtual machine.

Example 82 includes the apparatus of Example 81, further comprising: means for verifying, by the first virtual machine, that a second change to the guest code image included in the request does not compromise security of the first guest virtual machine; means for producing, by the first guest virtual machine, an encrypted updated guest code image incorporating the second change using the key domain key; and means for sending, by the first guest virtual machine, the encrypted updated guest control image to the untrusted host virtual machine monitor via the shared region of the memory.

Example 83 includes the apparatus of Example 82, further comprising: means for receiving the encrypted updated guest code image, where executing the guest code image includes executing an updated guest code image produced by the processor decrypting the encrypted updated guest code image.

Example 84 includes the apparatus of Example 73, further comprising: means for verifying an agent control structure included within the encrypted guest control structure; and means for issuing a second launch command to the processor to launch a second guest virtual machine within the first key domain using the agent control structure, the second guest virtual machine to provide an agent to act on behalf of the untrusted host virtual machine monitor within the first key domain.

Example 85 includes the apparatus of Example 84, further comprising: means for communicating a request to modify the guest control structure of the first guest virtual machine to the agent via a shared region of memory shared with the agent; means for modifying, by the agent, the guest control structure of the first guest virtual machine within the first key domain to produce a modified guest control structure of the first guest virtual machine in response to reading the request from the shared region of memory; means for verifying the modified guest control structure of the first guest virtual machine; and means for issuing an enter command to the processor to enter the first guest virtual machine within the first key domain upon verifying the modified guest control structure.

Example 86 includes the apparatus of Example 84, further comprising: means for communicating a request to the agent to retrieve a page from encrypted storage, where each page of the encrypted storage is encrypted by a storage key; means for decrypting, by the agent, the page using the storage key to produce a decrypted page; means for verifying, by the agent, the decrypted page; and means for installing the decrypted page into the memory if the decrypted page is verified.

Example 87 includes the apparatus of Example 86, further comprising: means for copying, by the agent, the decrypted page into a location of the memory if the agent has access to the location in the memory into which the decrypted page is to be installed; and means for re-encrypting, by the agent, the page using the key domain key and a physical address of the location as a tweak to produce a re-encrypted page if the agent does not have access to a location in the memory into which the decrypted page is to be installed; and means for installing, by the untrusted host virtual machine monitor, the re-encrypted page into the memory if the agent does not have access to a location in the memory into which the decrypted page is to be installed.

Example 88 includes the apparatus of Example 84, further comprising: means for communicating a request to the agent to move a page from encrypted memory to storage, where each page of the encrypted memory is encrypted by the key domain key; means for decrypting, by the agent, the page using the key domain key to produce a decrypted page; means for verifying, by the agent, the decrypted page; re-encrypting, by the agent, the decrypted page with a storage key for the storage to produce a storage-encrypted page if the decrypted page is verified; means for moving, by the agent, the storage-encrypted page to the storage; and means for providing, by the agent, the storage-encrypted page to the untrusted host virtual machine monitor.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a hardware core, including an instruction decoder to decode a create key domain instruction and a virtual machine (VM) page-in instruction, wherein the create key domain instruction is to specify an encrypted client key;
wherein the hardware core is to perform operations corresponding to the create key domain instruction, including to create a key domain in which to execute a first VM, and wherein the hardware core is also to perform operations corresponding to the VM page-in instruction, including paging a first VM guest page into the key domain, wherein paging the first VM guest page into the key domain includes verifying the first VM guest page using a message authentication code (MAC) stored in an extended page table entry (EPTE) for the first VM guest page and replacing the MAC in the EPTE with a host physical address of the first VM guest page; and
an encryption engine to decrypt the first VM guest page using the client key responsive to the VM page-in instruction.

2. The processor of claim 1, wherein:
the hardware core is also to execute a VM page-out instruction to page the first VM guest page out of the key domain; and
the encryption engine is also to encrypt the first VM guest page responsive to the VM page-out instruction.

3. The processor of claim 1, wherein the key domain is to include a plurality of protected memory locations to store a plurality of VM guest pages, including the first VM guest page.

4. The processor of claim 3, wherein execution of the create key domain instruction includes decrypting an encrypted key domain key to provide to the encryption engine for decrypting the plurality of VM guest pages.

5. The processor of claim 1, wherein the VM page-in instruction is to specify a first guest physical address to indicate a start of a guest physical address range for the first VM.

6. The processor of claim 5, wherein the VM page-in instruction is to specify a second guest physical address to indicate an end of the guest physical address range for the first VM.

7. The processor of claim 3, wherein the VM page-in instruction is to specify a host physical address of a first protected memory location to store the first VM guest page.

8. The processor of claim 7, wherein the VM page-in instruction is to specify permissions for accessing the first protected memory location.

9. The processor of claim 2, wherein the VM page-out instruction is to specify a first guest physical address to indicate a start of a guest physical address range for the first VM and a second guest physical address to indicate an end of the guest physical address range for the first VM.

10. The processor of claim 9, wherein the VM page-out instruction is to specify permissions for accessing the first VM guest page.

* * * * *